United States Patent
Bakaraju et al.

(10) Patent No.: US 11,874,532 B2
(45) Date of Patent: *Jan. 16, 2024

(54) DEVICES, SYSTEMS AND/OR METHODS FOR MYOPIA CONTROL

(71) Applicant: Brien Holden Vision Institute Limited, Sydney (AU)

(72) Inventors: Ravi Chandra Bakaraju, Kingsford (AU); Klaus Ehrmann, Queenscliff (AU); Cathleen Fedtke, Casula (AU); Padmaja Sankaridurg, Marouba (AU); Arthur Ho, Matraville (AU)

(73) Assignee: Brien Holden Vision Institute Limited, Sydney (AU)

( * ) Notice: Subject to any disclaimer, the term of this patent is extended or adjusted under 35 U.S.C. 154(b) by 0 days.

This patent is subject to a terminal disclaimer.

(21) Appl. No.: 17/550,728

(22) Filed: Dec. 14, 2021

(65) Prior Publication Data
US 2023/0034749 A1    Feb. 2, 2023

Related U.S. Application Data

(63) Continuation of application No. 16/344,318, filed as application No. PCT/AU2017/051173 on Oct. 25, 2017, now Pat. No. 11,226,497.
(Continued)

(51) Int. Cl.
*G02C 3/00* (2006.01)
*G02C 5/00* (2006.01)
(Continued)

(52) U.S. Cl.
CPC .......... *G02C 7/086* (2013.01); *G02C 2202/16* (2013.01); *G02C 2202/20* (2013.01); *G02C 2202/24* (2013.01)

(58) Field of Classification Search
CPC ... G02C 7/02; G02C 7/04; G02C 5/00; G02C 7/06; G02C 7/061; G02C 7/00; A61F 2/1613; B29D 11/00826
(Continued)

(56) References Cited

U.S. PATENT DOCUMENTS

| 2008/0137030 A1* | 6/2008 | Hoffman | G02C 7/104 351/159.63 |
| 2008/0225402 A1 | 9/2008 | Ballet et al. | |

(Continued)

FOREIGN PATENT DOCUMENTS

| CN | 102038596 A | 5/2011 |
| CN | 104678572 A | 6/2015 |

(Continued)

OTHER PUBLICATIONS

International Search Report dated Jan. 18, 2018 for PCT/AU2017/051173.

*Primary Examiner* — Dawayne Pinkney
(74) *Attorney, Agent, or Firm* — Jones Day

(57) ABSTRACT

The present disclosure is directed generally to a lens that provides a stop signal to a myopic eye, over a substantial portion of the spectacle lens that the viewer is using. The present disclosure is directed to devices, methods and/or systems of imposing a stop signal to eye growth, using a spectacle lens in conjunction with a micro lenslet array. The present disclosure is also directed to devices, methods and/or systems of modifying incoming light through spectacle lenses that utilizes chromatic cues to decelerate the rate of myopia progression. The present disclosure is directed to devices, methods and/or systems of imposing a stop signal to eye growth, using a spectacle lens in conjunction with a refractive optical element and/or diffractive optical element that offer conflicting or contradictory optical signals at a wavelength between 510 nm and 610 nm.

20 Claims, 93 Drawing Sheets

Diffractive optical elements (DOE) embedded into a spectacle lens

Related U.S. Application Data

(60) Provisional application No. 62/412,507, filed on Oct. 25, 2016.

(51) Int. Cl.
*G02C 7/02* (2006.01)
*G02C 7/08* (2006.01)

(58) Field of Classification Search
USPC .......... 351/159.7, 41, 159.01–159.3, 159.05,
351/159.06, 159.09, 159.39–159.4,
351/159.75–159.76, 160 R
See application file for complete search history.

(56) References Cited

U.S. PATENT DOCUMENTS

| | | | |
|---|---|---|---|
| 2014/0327875 A1* | 11/2014 | Blum | G02C 7/049 623/6.22 |
| 2016/0113815 A1* | 4/2016 | Hyde | A61F 9/00804 606/5 |
| 2016/0306192 A1 | 10/2016 | Marshall et al. | |
| 2016/0377884 A1 | 12/2016 | Lau et al. | |
| 2018/0039096 A1 | 2/2018 | Shioya et al. | |

FOREIGN PATENT DOCUMENTS

| WO | WO2012/122411 | 9/2012 |
|---|---|---|
| WO | WO2015/147758 | 10/2015 |

\* cited by examiner

Refractive optical elements (ROE) embedded into a spectacle lens

Diffractive optical elements (DOE) embedded into a spectacle lens

Refractive optical elements (ROE) embedded into a spectacle lens

Diffractive optical elements (DOE) embedded into a spectacle lens

Refractive optical elements (ROE) embedded into a spectacle lens

Diffractive optical elements (DOE) embedded into a spectacle lens

Refractive optical elements (ROE) embedded into a spectacle lens

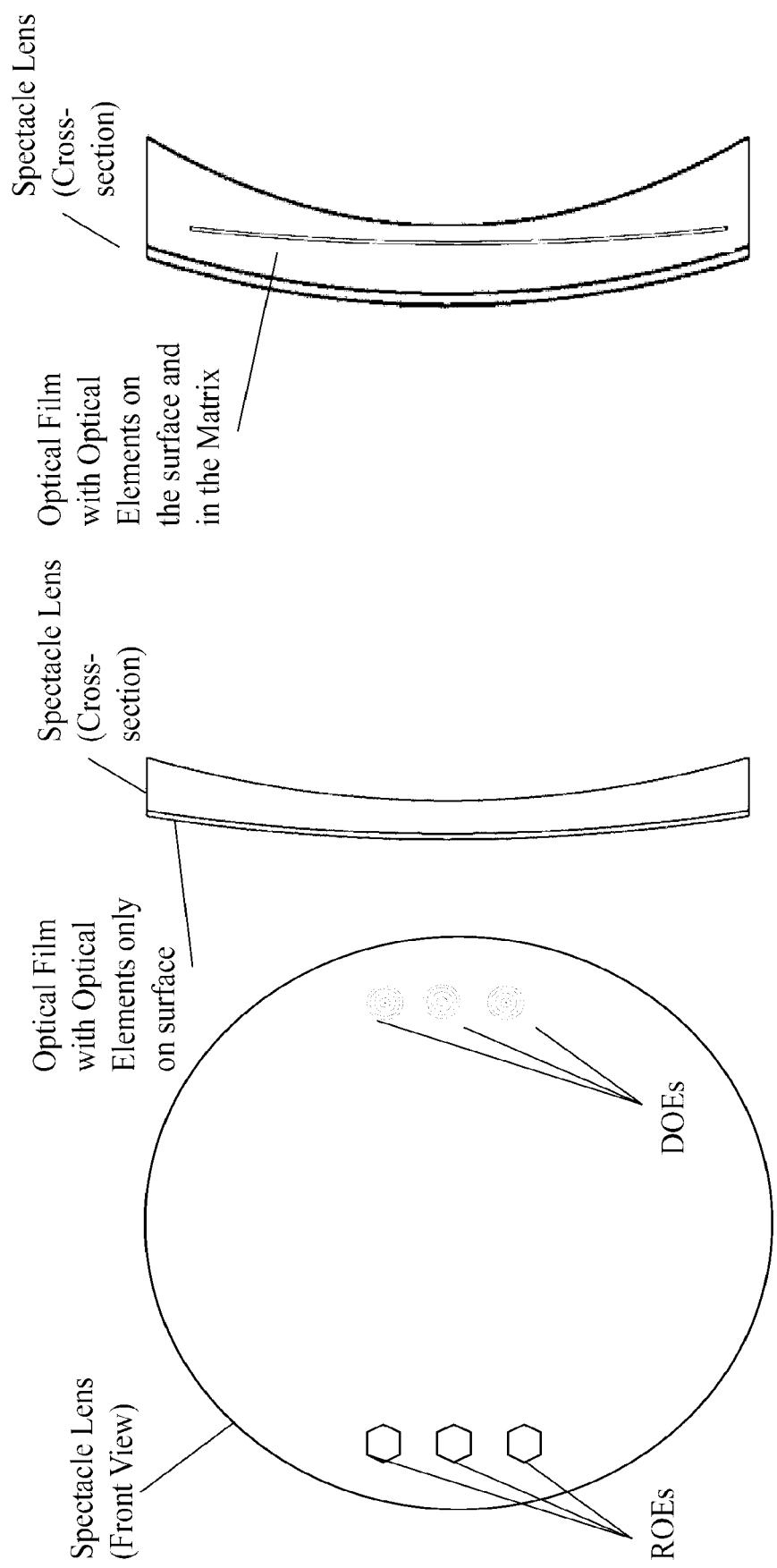

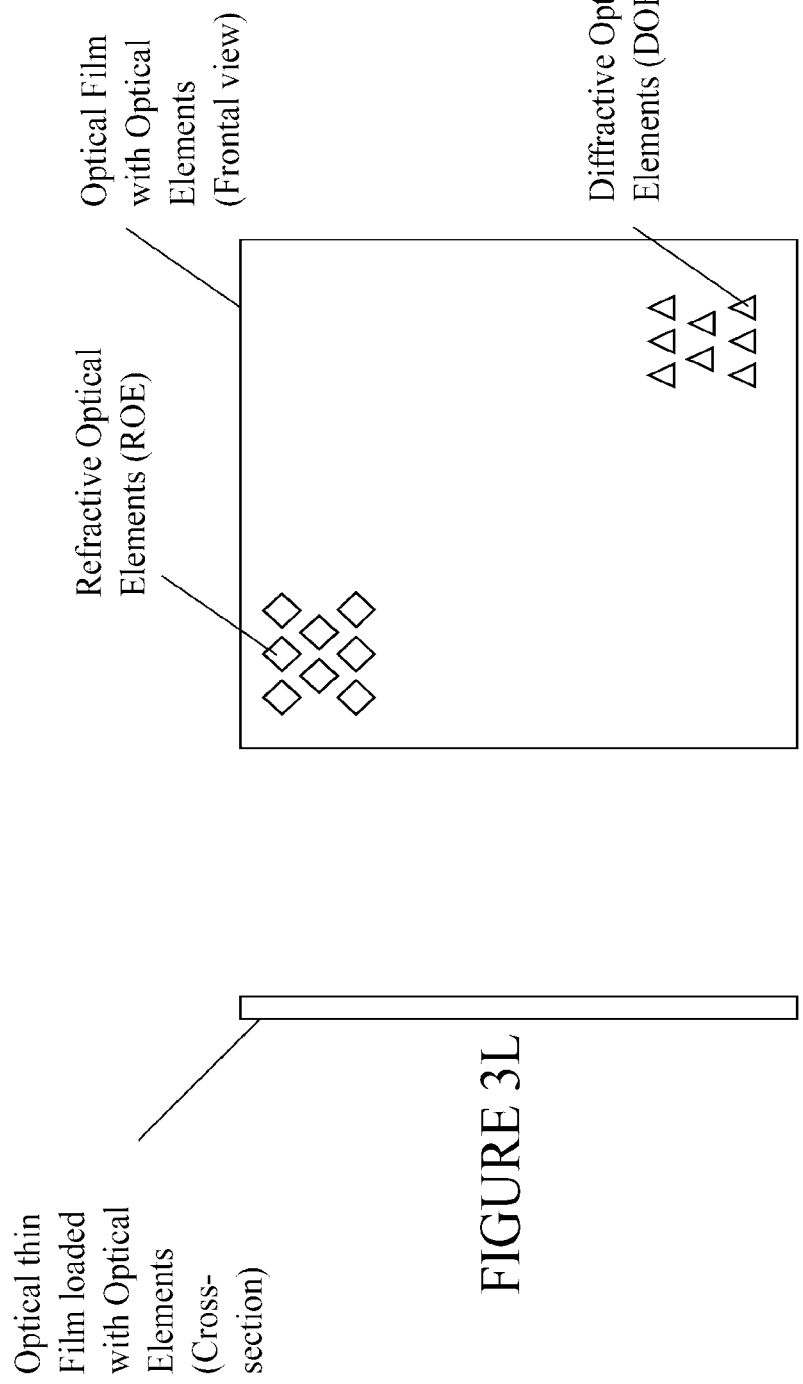

Refractive optical elements (ROE) embedded into a spectacle lens

Diffractive optical elements (DOE) embedded into a spectacle lens

Refractive optical elements (ROE) embedded into a spectacle lens

Refractive optical elements (ROE) embedded into a spectacle lens

Refractive optical elements (ROE) embedded into a spectacle lens

Diffractive optical elements (DOE) embedded into a spectacle lens

Diffractive optical elements (DOE) embedded into a spectacle lens

Diffractive optical elements (DOE) embedded into a spectacle lens

Refractive optical elements (ROE) embedded into a spectacle lens

Refractive optical elements (ROE) embedded into a spectacle lens

Diffractive optical elements (DOE) embedded into a spectacle lens

Diffractive optical elements (DOE) embedded into a spectacle lens

Refractive optical elements (ROE) embedded into a spectacle lens

Diffractive optical elements (DOE) embedded into a spectacle lens

Refractive optical elements (ROE) embedded into a spectacle lens

Refractive optical elements (ROE) embedded into a spectacle lens

Refractive optical elements (ROE) embedded into a spectacle lens

Diffractive optical elements (DOE) embedded into a spectacle lens

Diffractive optical elements (DOE) embedded into a spectacle lens

Diffractive optical elements (DOE) embedded into a spectacle lens

FIGURE 20E
OBJ: 0.0000 (deg)

FIGURE 20F
OBJ: 5.0000 (deg)

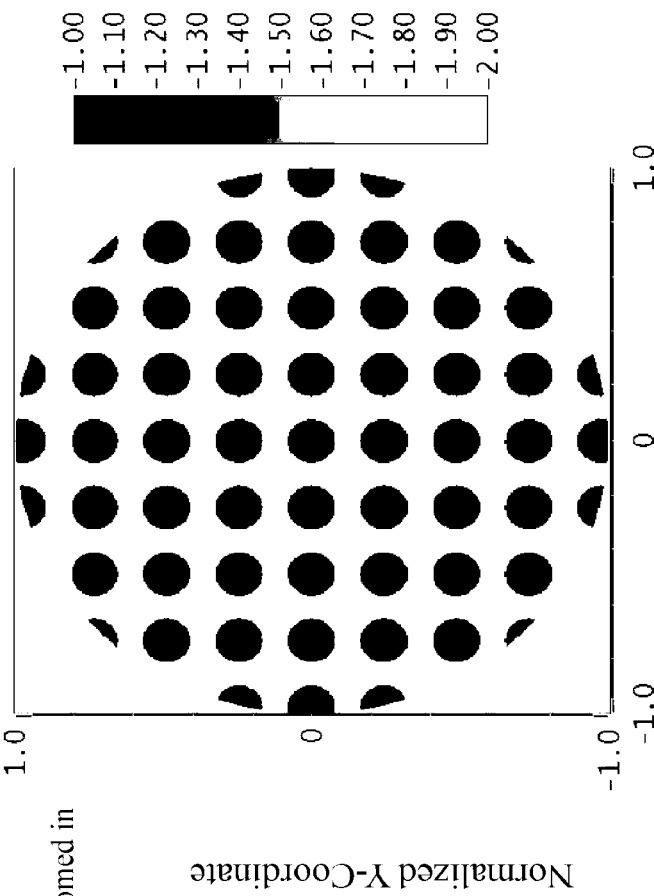
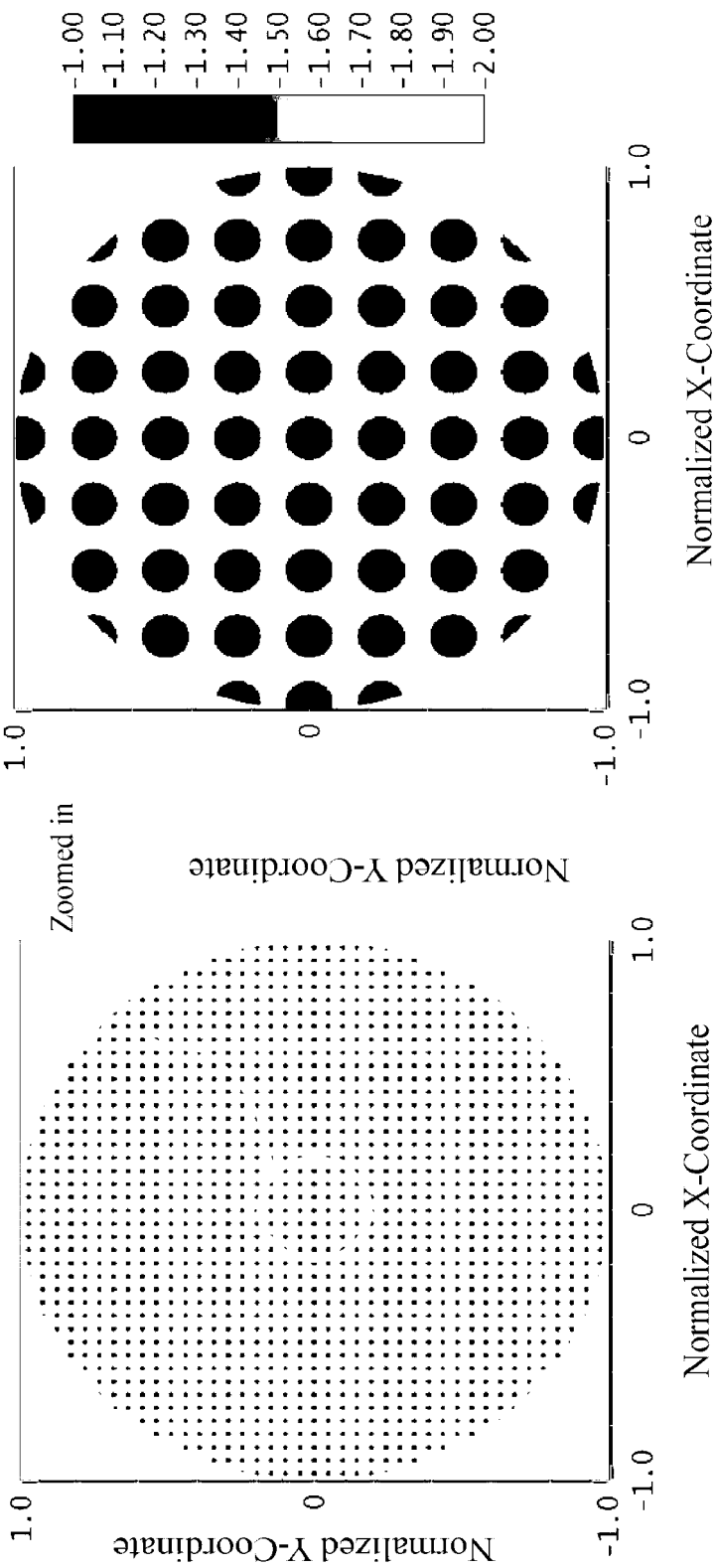

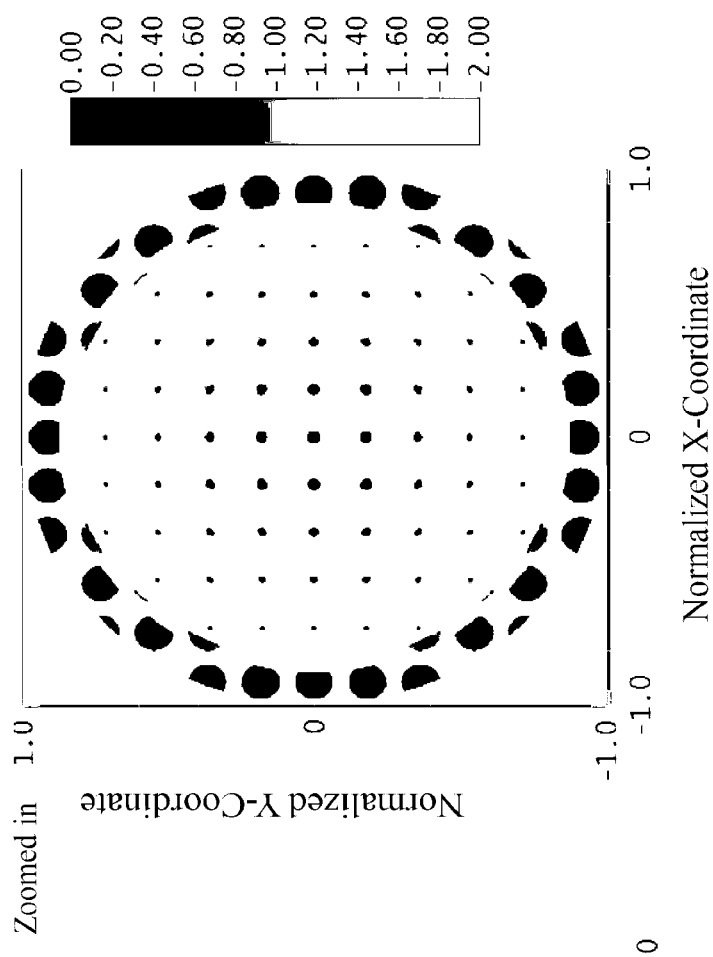
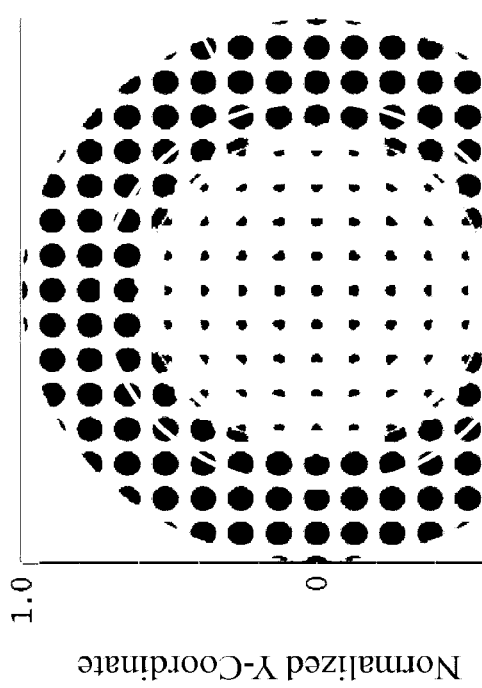
FIGURE 24A
FIGURE 24B

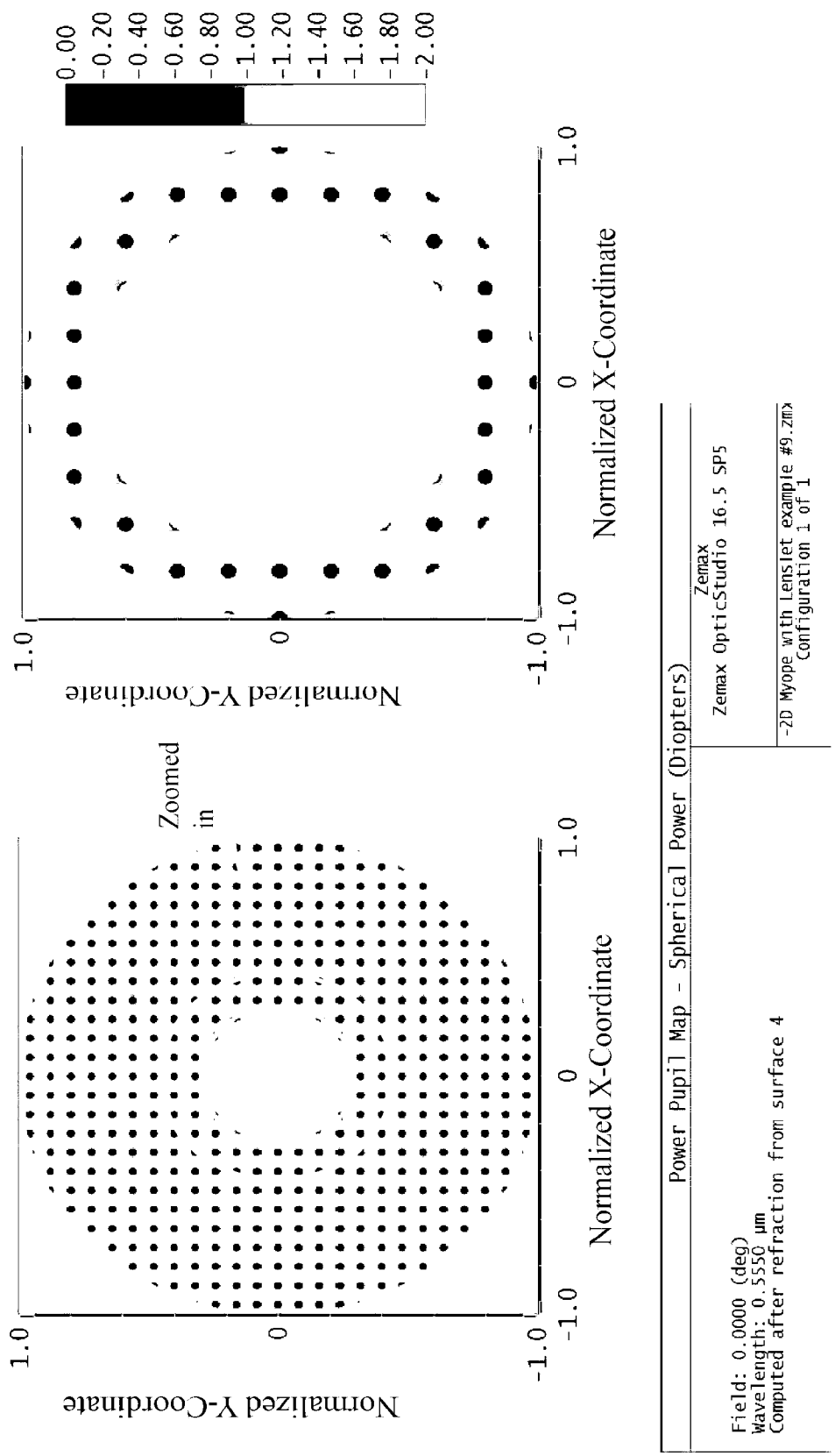

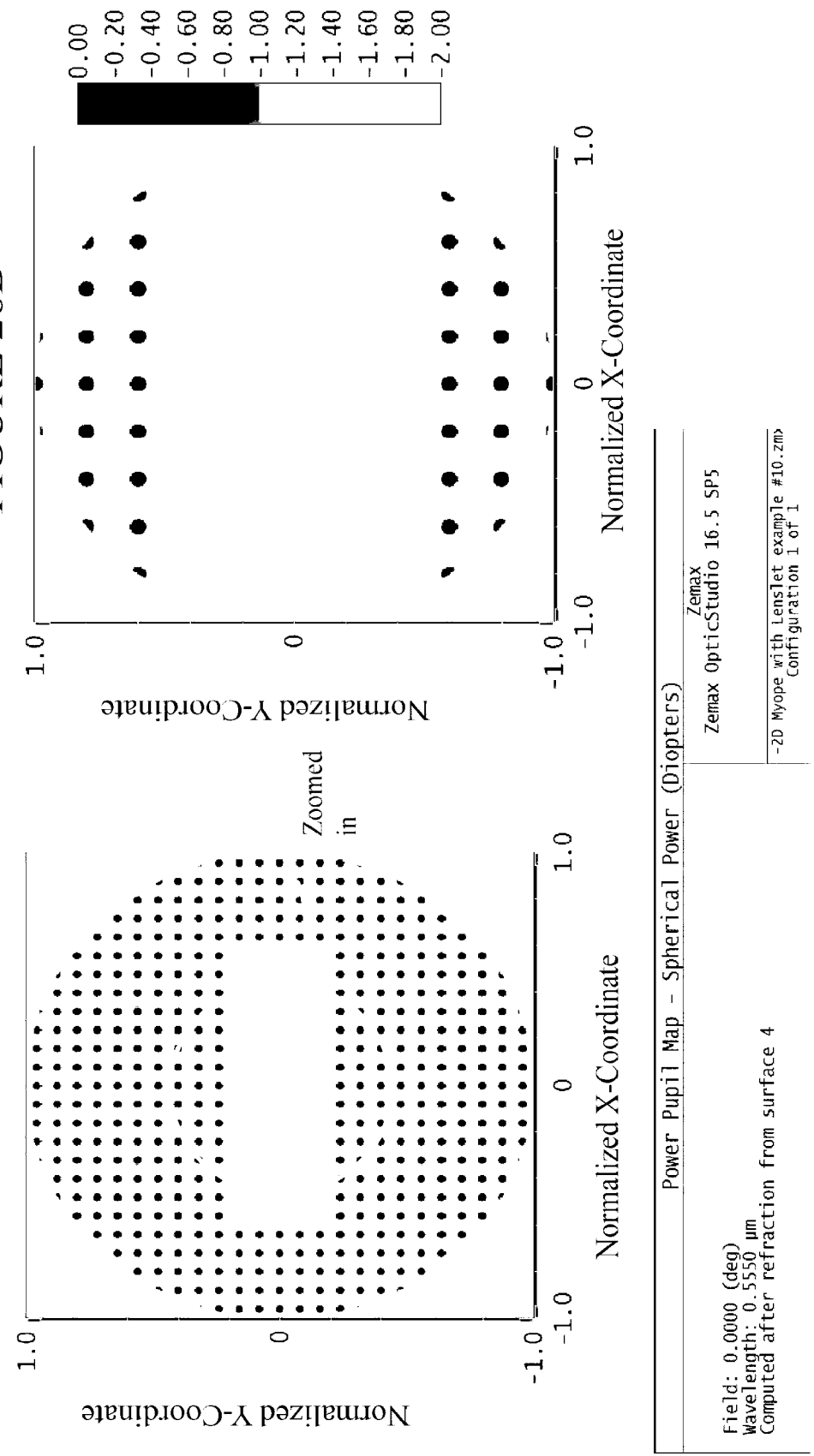

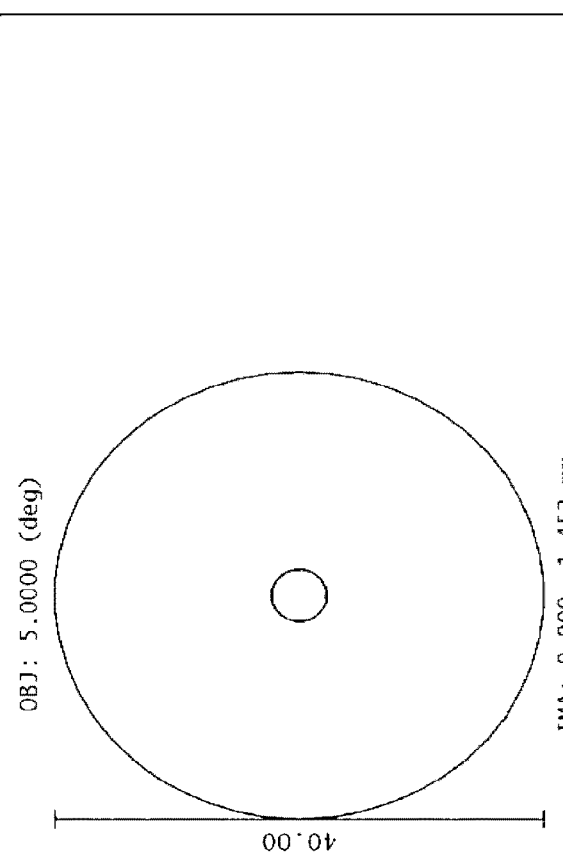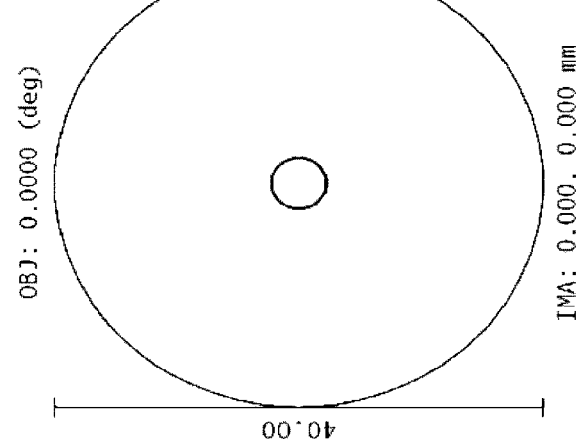
FIGURE 29C
FIGURE 29D

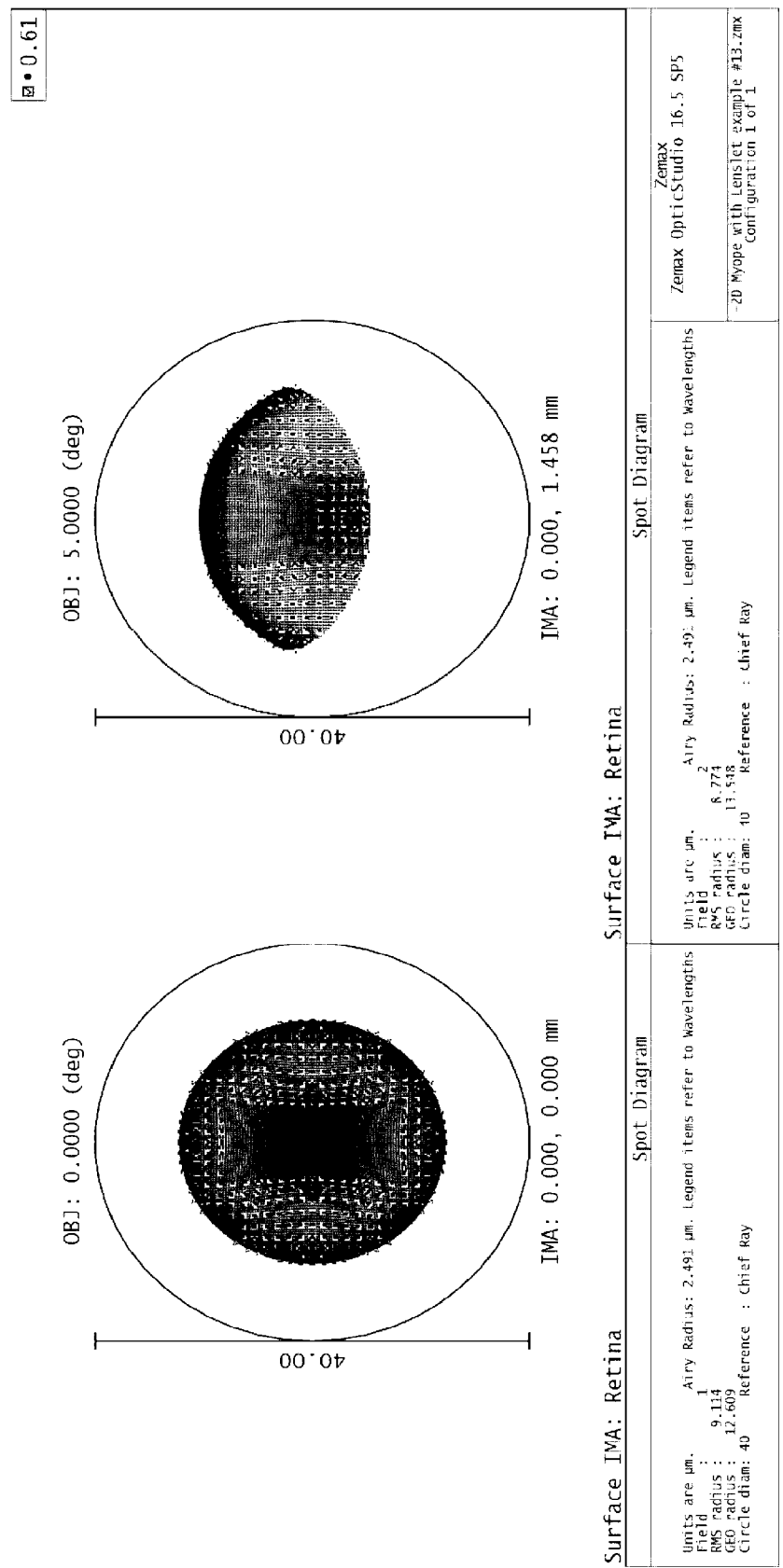

DEVICES, SYSTEMS AND/OR METHODS FOR MYOPIA CONTROL

CROSS REFERENCE TO RELATED APPLICATIONS

This application is a continuation of U.S. application Ser. No. 16/344,318, filed Apr. 23, 2019, which is the National Phase application of International Application No. PCT/AU2017/051173, filed Oct. 25, 2017, which designates the United States and was published in English, and which further claims priority to and is related to U.S. Application No. 62/412,507 entitled "Devices, Systems and/or Methods for Myopia Control" filed on 25 Oct. 2016. All of the foregoing related applications, in their entirety, are incorporated herein by reference.

FIELD

This disclosure relates at least in part to the introduction of conflicting chromatic cues at the retinal level of the wearer's eye that serve as a stop signal to the myopic eye or the eye that may be progressing to myopia. This disclosure also relates at least in part to the introduction of conflicting optical signals to the M and/or L cones at the retinal level of the wearer's eye that may serve as a stop signal to the myopic eye or the eye that may be progressing to myopia. This disclosure also relates at least in part to the use of refractive optical elements (ROE) and/or diffractive optical elements (DOE) in conjunction with spectacle lenses, aimed to introduce conflicting, contradictory or disagreeing optical signals between the neighboring cone photoreceptors, particularly the M and/or L cone receptors that may participate in the growth control mechanisms of emmetropization. This disclosure also relates at least in part to one or more of the following: altering, changing and/or reducing the longitudinal chromatic aberration of the wearer's eye for the wavelengths corresponding to the about 50%, 75% and 100% peak sensitivities of the L-cone receptors that may play a role in the emmetropisation process. This disclosure also relates at least in part to one or more of the following: altering, changing and/or reducing the longitudinal chromatic aberration of the wearer's eye for the wavelengths corresponding to about 75% and 100% peak sensitivities of the M-cone receptors that may hold cues for the direction of eye growth. This disclosure also relates at least in part to one or more of the following: altering, changing and/or reducing the longitudinal chromatic aberration of the wearer's eye for the wavelengths between approximately 510 nm and approximately 610 nm that may serve as a stop signal to the progressing myopic eye. This disclosure also relates to at least in part the introduction of focus pattern at the retinal level of the wearer's eye that is deliberately altered to make it spectrally and/or spatially variant which may serve as a stop signal to the progressing myopic eye. This disclosure also relates at least in part to the use of ROEs and/or DOEs in conjunction with an ophthalmic lens, for example, spectacle lens that is aimed to deliberately alter, change and/or reduce the longitudinal chromatic aberration of the eye for the wavelengths corresponding to M and/or L cone receptors of the wearer's eye that may serve as a stop signal to retard the rate of progression of a myopic eye or an eye that may be progressing towards myopia. This disclosure also relates at least in part to the use of a single micro lenslet, a few micro lenslets or a micro lenslet array optics in conjunction with an ophthalmic lens, for example, spectacle lenses. This disclosure also relates at least in part to the use of micro lenslet array optics in conjunction with spectacle lenses aimed to decelerate the rate of myopia progression by introducing a stop signal. This disclosure also relates at least in part to the use of optical films in conjunction with spectacle lenses that are aimed to alter the optical signal received by M and/or L cone receptors of the wearer's eye that may serve as a stop signal to a progressing myopic eye. In this disclosure, the use of optical films would broadly include surface alterations and/or alterations to the matrix material of the spectacle lenses. This disclosure also relates at least in part to the introduction of a stop signal to a progressing myopic eye by altering and/or reducing the longitudinal chromatic aberration corresponding to the M and/or L cones on the retina using a spectacle lens system that is independent or substantially independent of the wearer's viewing angle through the spectacle lens system. The present disclosure also relates to the methods and systems for exercising the eye and inhibiting/controlling the progression of myopia using a regimen of spectacle lenses that introduce temporal variations in chromatic aberrations at the M and/or L cone receptors of the wearer's eye.

BACKGROUND

The discussion of the background of the present disclosure is included to explain the context of the disclosed embodiments. This is not to be taken as an admission that the material referred to was published, known or part of the common general knowledge at the priority date of the embodiments and claims presented in this disclosure.

For an image to be perceived clearly, the optics of the eye should result in an image that is focused on the retina, particularly on the fovea. Myopia, commonly known as short-sightedness, is an optical disorder of the eye, wherein the on-axis images are focused in front of the fovea of the retina. Hyperopia, commonly known as long-sightedness, is an optical disorder of the eye wherein on-axis images are focused behind the fovea of the retina. The focusing of images in front of or behind the fovea of the retina creates a lower order aberration, called defocus. Astigmatism is another type of lower order aberration, where the optics of the eye deviates from spherical curvature, resulting in distorted images, as light rays are prevented from meeting at a common focus. In addition to lower order aberrations, an eye may also have higher order optical aberrations, including but not limited to, spherical aberration, coma and/or trefoil.

In myopia, the visual focus defect is such that distant objects (items in the scenery being viewed by the eye) appear blurred because their images are focused in front of the fovea instead of on the fovea. Myopia is a common visual disorder, affecting around a quarter of the adult population of the USA, and its prevalence is increasing. In some countries, most notably in the Asian region, the prevalence of myopia is now higher than 80% in school-age children. Thus, a large percentage of the world's population has myopia at a level that requires some form of optical correction in order to see clearly. Myopic refractive error, in particular, is progressive in younger patients (i.e. the refractive error increases over time). It is also known that myopia progresses regardless of age of onset, and myopia tends to increase in amount requiring progressively stronger correction. High amounts of myopia can lead to some forms of retinal pathology; with increased risk of retinal detachment, cataract and glaucoma. In addition, accompanying this visual disorder are personal, social and financial burdens to the individual and to the community. These include the direct costs of vision correction and management (which amounts to several billion dollars a year), as well as indirect costs such as productivity and quality of life. The visual and potential pathological effects of myopia and its consequent inconvenience and cost to the individual and community makes it desirable to have effective strategies to prevent or delay the onset of myopia, to stop or slow the progress, or limit the amount of myopia occurring in patients.

Ocular system attains and maintains emmetropia (where the eye length is well matched to the focal length of its optics) by using the visual feedback mechanism to adjust the position of the retina in relation to the optics of the eye. The axial length of the eye is controlled by homeostatic growth control mechanisms that involve "grow" and "stop" signals. The ocular system relies on visual experience as a principal input for effective functioning of the homeostatic feedback mechanism. The error signals that can decode the sign of optical defocus aid an increase or decrease in the rate of eye growth to result in a minimal refractive error. Such a compensation mechanism has been repeatedly shown in numerous experiments, where the animal eyes compensate for the optical defocus imposed with the spectacle lenses, by adjusting the rate of the eye growth. Ametropia results in the event of a failure of such an active emmetropization process. There is enough evidence from the literature that defocus signals govern the emmetropization process. The refractive indices of human eye's optical media are highly wavelength dependent, exhibiting significant levels of chromatic dispersion. The longitudinal chromatic aberration (LCA) of the eye has been defined as the change in total refractive power of the eye as a function of the wavelength, considered in visible white light (from approximately 400 nm to approximately 700 nm). The LCA of the human eye is approximately 2 diopters (D) (from approximately 400 nm to approximately 700 nm, FIG. 18B) and it relates to the measure of on-axis chromatic dispersion. FIG. 18B shows the longitudinal chromatic focal shift in Diopters. The table on FIG. 18B shows the focal shift for each reference wavelength with respect to 540 nm treated as the reference wavelength. The peak cone sensitivity for S-Cones is 443 nm which corresponds to focal shift of −0.72D with respect to the reference wavelength (540 nm). Similarly, the focal shifts from the reference wavelength (540 nm) for the rest of the reference planes may be deduced from the table in FIG. 18B. The chromatic dispersion appearing due to off-axis illumination is referred to as transverse chromatic aberration (TCA).

With respect to spectacle lens design options, they include progressive additional lenses (aimed to reduce accommodative lag or on-axis hyperopia), concentric bifocals and executive bifocals (aimed at reducing on and off-axis hyperopia). Each of these options have their own strengths and weaknesses with respect to retarding the rate of myopia progression in children.

There is a need in the art for an ophthalmic lens or an ophthalmic lens system that provides a stop signal to eye growth irrespective of the direction of gaze of the wearer's eye relative to the center of the ophthalmic lens or the lens system. The ophthalmic lens may be, for example, a spectacle lens. There is also need in the art for an ophthalmic lens that may be used alone or as an ophthalmic lens system in combination with another ophthalmic lens such as a contact lens or spectacle wherein the lens or the lens system provides a stop signal for eye growth irrespective of the direction of gaze of the wearer's eye relative to the center of the ophthalmic lens or the lens system.

There is a need in the art for a spectacle lens system that provides a stop signal to the progressing eye no matter what portion of the spectacle lens system the child and/or viewer is using. There is also need in the art for a spectacle lens system or a device (i.e. micro lenslet array) that may be combined with a spectacle lens, wherein the lens (or the combination product) provides a stop signal to progressing eye growth, for a portion or a substantial portion of the viewing angles of the spectacle lens system used by a person.

The present disclosure is directed to devices, methods and/or systems that are capable of providing a spectacle lens system that provides a stop signal to the progressing eye no matter what portion of the spectacle lens system the child and/or viewer is using.

The present disclosure is directed to devices, methods and/or systems that are capable of providing an ophthalmic lens or a lens system that provides a stop signal to the progressing eye irrespective of the direction of gaze of the wearer's eye relative to the center of the ophthalmic lens or the lens system.

The present disclosure is also directed to devices, methods and/or systems that are capable of providing a spectacle lens system and/or a device that may be combined with a spectacle lens, wherein the lens (or the combination) provides a stop signal to progressing eye, for a portion or a substantial portion of the viewing angles of the spectacle lens system used by a person. The present disclosure is also directed to devices, methods and/or systems that are capable of imposing conflicting chromatic signals at the retinal level of the corrected eye, by using micro lenslet arrays as part of and/or in conjunction with spectacle lenses.

The present disclosure is also directed to devices, methods and/or systems that are capable of imposing contradictory chromatic signals to the neighboring M and/or L cone receptors at the retinal level of the corrected eye, by using refractive optical elements (ROEs) and/or diffractive optical elements (DOEs) as part of and/or in conjunction with spectacle lenses.

The present disclosure is also directed to devices, methods and/or systems that are capable of imposing spatially and/or spectrally variant focal patterns at the retinal level of the corrected eye, particularly to the M and/or L cone receptors, by using refractive optical elements (ROEs) and/or diffractive optical elements (DOEs) as part of and/or in conjunction with spectacle lenses.

The present disclosure is also directed to devices, methods and/or systems that are capable of altering the longitudinal chromatic aberration, particularly over the wavelengths stimulating the M and/or L cone receptors, by using refractive optical elements (ROEs) and/or diffractive optical elements (DOEs) as part of and/or in conjunction with spectacle lenses.

The present disclosure is also directed to devices, methods and/or systems that are capable of providing an ophthalmic lens or a lens system, wherein the ophthalmic lens or a lens system provides a stop signal to eye growth, for a portion or a substantial portion of the viewing angles of the spectacle lens system used by a person. The present disclosure is also directed to devices, methods and/or systems that are capable of imposing conflicting chromatic signals at the retinal level of the corrected eye, by using micro lenslet arrays as part of and/or in conjunction with spectacle lenses. This present disclosure is also directed to devices, methods and/or systems of modifying incoming light through spectacle lens systems that offers chromatic cues to the eye that facilitates deceleration in the rate of myopia progression.

This is achieved via use of micro lenslet arrays as part of and/or in conjunction with spectacle lenses.

This present disclosure is also directed to devices, methods and/or systems of modifying incoming light through spectacle lens systems to provide chromatic cues to slow eye growth. This is achieved via use of micro lenslet arrays as part of and/or in conjunction with spectacle lenses.

The present disclosure is also directed to devices, methods and/or systems that are capable of substantially altering the path of light to provide a directional signal to control eye growth at the retinal level of the corrected eye, by using micro lenslet arrays as part of and/or in conjunction with spectacle lenses.

The present disclosure is also directed to devices, methods and/or systems that are capable of substantially altering the path of light to provide a directional signal to slow eye growth, by using micro lenslet arrays, optical films embedded with ROEs and/or DOEs as part of and/or in conjunction with spectacle lenses.

There is a need for improved systems, devices and/or methods for retarding the rate of progression of myopia or in persons so affected. The present disclosure is directed to overcome and/or ameliorate at least one of the disadvantages of the prior art as will become apparent from the discussion herein. The present disclosure also provides other advantages and/or improvements as discussed herein.

The subject headings used in the detailed description are included for the ease of reference of the reader and should not be used to limit the subject matter found throughout the disclosure or the claims. The subject headings should not be used in construing the scope of the claims or the claim limitations.

Definitions

Terms are used herein as generally used in the art, unless otherwise defined in the following:

The term "myopic eye" means an eye that is already myopic, is pre myopic, or has a refractive condition that is progressing towards myopia.

The term "stop signal" means an optical signal that may facilitate slowing, arresting, retarding, inhibiting, or controlling the growth of an eye and/or refractive condition of the eye.

The term "viewing angle" means direction of the gaze of the eye of a wearer through an ophthalmic lens, spectacle lens, spectacle lens system, or combination thereof, relative to the eye looking straight ahead in primary gaze.

The term "Fill Ratio" is expressed as the percentage of the micro lenslets containing area from the total surface area of the spectacle lens blank or base ophthalmic lens. The diameter of the individual micro lenslets may be used for calculating the two dimensional area that the micro lenslets occupy as compared to the area of the array not occupied by micro lenslets.

The term "Pupil Fill Ratio" is defined as the percentage of the cumulative area of micro lenslets within the projected pupil area onto the plane of micro lenslets relative to the total area of the pupil projected onto the plane of micro lenslets for a particular viewing angle. In certain embodiments, where the pupil fill ratio varies with viewing angle, the fill ratio is defined to be the average percentage of the micro lenslets containing area from the total surface area of the spectacle lens blank or base ophthalmic lens.

The term "Focal Length" or (f) of micro lenslets is understood to mean the length calculated according to following equation:

$$f = \frac{n_2}{n_2 - n_3} * R$$

Where n2 is refractive index of the n2 layer at about 555 nm, n3 is the refractive index of the n3 layer at about 555 nm and R is the radius of curvature of the micro lenslet (for example, see FIG. 1). In other embodiments, n2 and/or n3 may be defined at one or more wavelengths within the following ranges: 500 nm to 600 nm, 400 nm to 700 nm or 380 nm to 800 nm.

For toric micro lenslets, the term "Focal length" relates to one of two principal meridians ($F_s$) and ($F_t$) and it is understood that they are substantially different from each other. The toric focal lengths are calculated by the following equations:

$$f_s = \frac{n_2}{n_2 - n_3} * R_s$$

$$f_t = \frac{n_2}{n_2 - n_3} * R_t$$

Where n2 is refractive index of the n2 layer, n3 is the refractive index of the n3 layer and $R_s$ and $R_t$ are the radius of curvatures of the micro lenslet in two principal meridans. The principal meridians of the individual micro lenslets may be substantially same or substantially different from each other.

The term "micro lenslet array" is generally understood as an optical system consisting of a plurality of micro lenslets with same focal length in a same plane. However, the term 'micro lenslet array' in this disclosure is not so limited. The term "micro lenslet array" is understood to mean a plurality of micro lenslets that together form an array. The micro lenslets that make up the array may or may not be in the same plane and/or may or may not have same focal length. The micro lenslet array may be formed in a sheet, as part of a sheet, in multiple sheets or as part of a spectacle lens system. The array may be made up of at least 1, 2, 3 or 4 layers. The devices disclosed herein may have at least 1, 2, 3 or 4 micro lenslet arrays. One or more micro lenslets may have a diameter that is approximately 10 µm, approximately 20 µm, approximately 30 µm, approximately 50 µm, approximately 75 µm, approximately 100 µm, approximately 150 µm, approximately 200 µm, approximately 400 µm, approximately 500 µm, approximately 600 µm, approximately 750 µm. The diameter of micro lenslets making up a micro lenslet array may vary. One or more micro lenslets may have a diameter that is between 10 µm and 20 µm, 10 µm and 30 µm, 10 µm and 50 µm, 10 µm and 75 µm, 10 µm and 100 µm, 10 µm and 150 µm, 10 µm and 200 µm, 10 µm and 400 µm, 10 µm and 500 µm, 10 µm and 600 µm, 10 µm and 750 µm, 20 µm and 30 µm, 20 µm and 50 µm, 20 µm and 75 µm, 20 µm and 100 µm, 20 µm and 150 µm, 20 µm and 200 µm, 20 µm and 400 µm, 20 µm and 500 µm, 20 µm and 600 µm or 20 µm and 750 µm. In certain embodiments, one or more micro lenslets may have a diameter that is between 150 µm and 400 µm, 150 µm and 300 µm, 200 µm and 400 µm or combinations thereof.

The term "Radius of Curvature" or (R) is understood to mean the reciprocal of the curvature with units of distance (example mm, m, etc). In this disclosure, $R_s$ is the radius of curvature of the spectacle lens and $R_t$ is the radius of curvature of a lenslet.

The term "spectacle lens" is understood to mean a lens blank, a finished or substantially finished spectacle lens.

The term "spectacle lens system" is understood to mean a lens blank, a finished or substantially finished spectacle lens that contains one or more micro lenslet arrays. These micro lenslet arrays may be located on the anterior surface of the spectacle lens, the posterior surface of the spectacle lens, within the body of the spectacle lens or combinations thereof.

SUMMARY

The present disclosure is directed to overcoming one or more of the problems described herein. Briefly summarized, the human retina comprises of three different cone (S, M and L types) that are sensitive to short, medium and long wavelengths of the visible spectrum. The M and L cones represent more than 90% of the cones on the retina, particularly in the macular region and the sampling of L cones is approximately two to three times of the cones. Measurement and/or correction of refractive errors tends to be centered on the 555 nm wavelength, which corresponds to an approximate mid-point between the peak sensitivities of M and L cones. In these circumstances, a substantial portion of the L cones experience out of focus (hyperopic blur); which is associated with growth stimulus for the corrected eye resulting in progressive myopia. Accordingly, stimulus to M and L cones may limit the stimulus to eye growth pattern and therefore limit a progressing myopic eye.

Certain embodiments are directed to methods, devices and/or systems that change, substantially change, alter, or substantially alter, the optical signal received by the L cones, or at the wavelengths that correspond to the approximate (100%, 75% and 50%) peak sensitivities of the L cones (565 nm, 610 nm and 625 nm respectively), while continuing to correct the refractive error of the wearer's eye for the central wavelength on or around 540 to 560 nm.

Certain embodiments are directed to methods, devices and/or systems that alter, or substantially alter, the optical signal received by a substantial portion of the L cones of a wearer's eye, at a plurality of the wavelengths, that correspond to the approximately 100%, 75% and 50% peak sensitivities of the substantial portion of the L cones and correct at least in part a refractive error of the wearer's eye for the central wavelengths between 540 nm and 560 nm.

Certain embodiments are directed to methods, devices and/or systems that alter, or substantially alter, the optical signal received by a substantial portion of the L cones of a wearer's eye at approximately 565 nm, 610 nm and 625 nm wavelengths and correct at least in part a refractive error of the wearer's eye for the central wavelengths between 540 nm and 560 nm.

Certain embodiments are directed to methods, devices and/or systems that change, or substantially change, or alter, or substantially alter, the optical signal received by the M cones, or at the wavelengths that correspond to the approximate (75% and 100%) peak sensitivities of the M cones (510 nm and 535 nm respectively), while continuing to correct the refractive error of the wearer's eye for the central wavelength between 540 nm and 560 nm Certain embodiments are directed to methods, devices and/or systems that alter, or substantially alter, the optical signal received by a substantial portion of the M cones of a wearer's eye, at a plurality of the wavelengths, that correspond to the approximately 75% and 100% peak sensitivities of the substantial portion of the L cones and correct at least in part a refractive error of the wearer's eye for the central wavelengths between 540 nm and 560 nm.

Certain embodiments are directed to methods, devices and/or systems that alter, or substantially alter, the optical signal received by a substantial portion of the M cones of a wearer's eye at approximately 510 nm and 535 nm wavelengths and correct at least in part a refractive error of the wearer's eye for the central wavelengths between 540 nm and 560 nm.

In certain other embodiments, a change or substantial change to the optical signal received by the L cones includes creating a conflicting optical signal at the retinal plane populated with L cones, where the conflicting optical signal means some of the L cones receive an in focus signal while the remainder receive an out of focus signal (either myopic or hyperopic). The proportion of L cones that receive a conflicting signal may be one or more of the following combinations: approximately 10% (in focus)-90% (out of focus), approximately 20% (in focus)-80% (out of focus), approximately 30% (in focus)-70% (out of focus), approximately 40% (in focus)-60% (out of focus), approximately 50% (in focus)-50% (out of focus), approximately 60% (in focus)-40% (out of focus), approximately 70% (in focus)-30% (out of focus), approximately 80% (in focus)-20% (out of focus), and approximately 90% (in focus)-10% (out of focus). In other embodiments, introducing conflicting signal at the L-Cone receptor plane of the wearer's eye may be referred to as conflicting chromatic cues. In some other embodiments, introducing conflicting signal at the L-Cone receptor plane may also be referred to as introduction of a stop signal.

In certain other embodiments, a change or substantial change to the optical signal received by the L cones includes creating contradictory optical signals to the neighboring L cones at the retinal plane, where the contradictory optical signal means some of the L cones receive a myopic signal while the remainder receive a hyperopic signal. The proportion of L cones that receive a contradictory optical signal may be one or more of the following combinations: approximately 10% (myopic)-90% (hyperopic), approximately 20% (myopic)-80% (hyperopic), approximately 30% (myopic)-70% (hyperopic), approximately 40% (myopic)-60% (hyperopic), approximately 50% (myopic)-50% (hyperopic), approximately 60% (myopic)-40% (hyperopic), approximately 70% (myopic)-30% (hyperopic), approximately 80% (myopic)-20% (hyperopic), and approximately 90% (myopic)-10% (hyperopic). In other embodiments, introducing contradictory signal at the L-Cone receptor plane of the wearer's eye may be referred to as contradictory chromatic cues. In some other embodiments, introducing contradictory signal at the L-Cone receptor plane may also be referred to as introduction of a stop signal.

In certain other embodiments, a change or substantial change to the optical signal received by the M cones includes creating a conflicting optical signal at the retinal plane populated with M cones, where the conflicting signal means some of the M cones receive an in focus signal while the remainder receive an out of focus signal (myopic). The proportion of M cones that receive a conflicting signal may be one or more of the following combinations: approximately 10% (in focus)-90% (out of focus), approximately 20% (in focus)-80% (out of focus), approximately 30% (in focus)-70% (out of focus), approximately 40% (in focus)-60% (out of focus), approximately 50% (in focus)-50% (out of focus), approximately 60% (in focus)-40% (out of focus), approximately 70% (in focus)-30% (out of focus), approximately 80% (in focus)-20% (out of focus), and approximately 90% (in focus)-10% (out of focus). In other embodiments, the concept of introducing conflicting signal at the M-Cone receptor plane of the wearer's eye may be referred to as conflicting chromatic cues. In some other embodiments, the concept of introducing conflicting signal at the M-Cone receptor plane is also referred to as introduction of a stop signal.

In certain other embodiments, a change or substantial change to the optical signal received by the M cones includes creating contradictory optical signals at the retinal plane populated with M cones, where the contradictory optical signals results in some of the M cones receive a myopic signal while the remainder receive a hyperopic signal. The proportion of M cones that receive a contradictory optical signal may be one or more of the following combinations: approximately 10% (myopic)-90% (hyperopic), approximately 20% (myopic)-80% (hyperopic), approximately 30% (myopic)-70% (myopic), approximately 40% (myopic)-60% (hyperopic), approximately 50% (myopic)-50% (hyperopic), approximately 60% (myopic)-40% (hyperopic), approximately 70% (myopic)-30% (hyperopic), approximately 80% (myopic)-20% (hyperopic), and approximately 90% (myopic)-10% (hyperopic). In other embodiments, the concept of introducing contradictory signal at the M-Cone receptor plane of the wearer's eye may be referred to as contradictory chromatic cues. In some other embodiments, the concept of introducing contradictory signal at the M-Cone receptor plane is also referred to as introduction of a stop signal.

Certain embodiments are directed to methods, devices and/or systems that provide a stop signal by creating regions on the retina with spatially and/or spectrally variant focal patterns.

Certain embodiments are directed to a spectacle lens incorporating a micro lenslet array or a combination of a spectacle lens and a micro lenslet array, wherein the spectacle lens system is capable of providing a stop signal for a portion or a substantial portion of the viewing angles of the spectacle lens system used by a person.

Certain embodiments are directed to a spectacle lens incorporating a ROE, DOE or combination of ROE and DOE or a combination of a spectacle lens and a ROE, DOE or a combination of ROE and DOE, wherein the spectacle lens system is capable of providing a stop signal for a portion or a substantial portion of the viewing angles of the spectacle lens system used by a person.

Certain embodiments are directed to devices, methods and/or systems that are capable of imposing a stop signal in the wearers' eyes by using micro lenslet arrays as part of and/or in conjunction with a spectacle lens.

Certain embodiments are directed to devices, methods and/or systems that are capable of modifying incoming light through spectacle lens systems that offer chromatic cues to decelerate the rate of myopia progression. This is achieved via use of micro lenslet arrays as part of and/or in conjunction with spectacle lenses. In certain other embodiments, this may be achieved via use of ROEs, DOEs or combination of ROE and DOE.

Certain embodiments are directed to devices, methods and/or systems that use a micro lenslet arrays in conjunction with spectacle lenses and this combination may be used to reduce the rate of myopia progression by introducing conflicting chromatic cues/signals at the retinal level. In certain other embodiments, this may be achieved via use of ROEs, DOEs or combination of ROE and DOE.

Certain embodiments are directed to a device that provides a stop signal.

Certain embodiments are directed to an ophthalmic lens, for example, a spectacle lens incorporating a micro lenslet array or an ophthalmic lens system involving a combination of a spectacle lens and a micro lenslet array, wherein the ophthalmic lens or ophthalmic lens system is capable of providing a stop signal irrespective (or substantially irrespective) of the direction of gaze of the wearer's eye relative to the center of the ophthalmic lens or the ophthalmic lens system. In certain other embodiments, this may be achieved via use of ROEs, DOEs or combination of ROE and DOE.

Certain embodiments are directed to devices, methods and/or systems that are capable of imposing a stop signal in the wearers' eyes by using micro lenslet arrays as part of and/or in conjunction with a spectacle lens. In certain other embodiments, this may be achieved via use of ROEs, DOEs or combination of ROE and DOE.

Certain embodiments are directed to devices, methods and/or systems that are capable of modifying incoming light through an ophthalmic lens or an ophthalmic lens system to offer chromatic cues to decelerate eye growth. This may be achieved via use of micro lenslet arrays as an ophthalmic lens or in conjunction with spectacle lenses as an ophthalmic lens system. In certain other embodiments, this may be achieved via use of ROEs, DOEs or combination of ROE and DOE.

Certain embodiments are directed to devices, methods and/or systems that use micro lenslet arrays in conjunction with spectacle lenses and this combination may be used to reduce the rate of eye growth by introducing conflicting chromatic cues/signals at the retinal level. In certain other embodiments, this may be achieved via use of ROEs, DOEs or combination of ROE and DOE.

Certain embodiments are directed to devices, methods and/or systems that use ROEs, DOEs, or combinations of ROEs and DOEs in conjunction with spectacle lenses and this combination may be used to reduce the rate of eye growth by introducing conflicting chromatic cues/signals at the retinal level.

Certain embodiments are directed to devices, methods and/or systems that use micro lenslet arrays in conjunction with spectacle lenses and this combination may be used to reduce the rate of eye growth by introducing contradictory chromatic cues/signals at the retinal level.

Certain embodiments are directed to devices, methods and/or systems that use ROEs, DOEs, or combinations of ROEs and DOEs in conjunction with spectacle lenses and this combination may be used to reduce the rate of eye growth by introducing contradictory chromatic cues/signals at the retinal level.

According to certain exemplary embodiments, a method for choosing corrective spectacle lenses for an individual in the attempt to inhibit and/or control their progression of myopia by introduction of temporal variations in longitudinal and/or transverse chromatic aberration experienced at the M and/or L cones receptors is as follows. The exemplary method comprises measuring the refractive condition of both eyes of a person based on refraction techniques; identifying a prescription for a first pair of spectacle lenses for the person based on, at least in part, the measurement of the eyes, the first pair of lenses comprising a set of single vision lenses; identifying a prescription for a second pair of spectacle lenses for the person based, at least in part, the measurement of the eyes, the second pair of lenses comprise a set of single vision lenses used in conjunction with a ROE and/or DOE; identifying and prescribing the first pair of lenses for the first time period; identifying and prescribing the second pair of lenses for the second time period; wherein the second lens pair is configured to introduce conflicting and/or contradictory optical signals at the M and/or L cone receptors of the wearers eye.

Other exemplary embodiments are directed to another exemplary method for choosing corrective spectacle lenses for an individual in the attempt to send a stop signal to a progressing eye by introduction of temporal variation in longitudinal and/or transverse chromatic aberration experienced at the M and/or L cone receptors as follows. The method comprises of choosing a prescription for a person based on, at least in part, the measurement of the eye; identifying a prescription for a first pair of spectacle lenses comprising a first lens for the left eye and first lens for the right eye; identifying a prescription for a second pair of spectacle lenses comprising a second lens for the left eye and second lens for the right eye; identifying first time period for the person to wear the first pair of lenses; identifying the second time period for the person to wear the second pair of lenses; wherein the first or second lens pair is configured to introduce conflicting or contradictory optical signals to the M and/or L cone receptors of the left or right eye of the individual.

Certain embodiments are directed to devices, methods and/or systems for reducing or slowing eye growth.

Certain embodiments are directed to devices, methods and/or systems for reducing rate of myopia progression.

As well as the embodiments discussed in the summary, other embodiments are disclosed in the specification, drawings and claims. The summary is not meant to cover each and every embodiment, combination or variations contemplated with the present disclosure. This summary is not intended to be limiting as to the embodiments disclosed herein. In addition, limitations of one embodiment may be combined with limitations of other embodiments to form additional embodiments.

DESCRIPTION OF THE DRAWINGS

Exemplary embodiments will now be described, by way of example only, with reference to the accompanying drawings in which:

FIG. 3I is a schematic front view of a spectacle lens coated with a thin film designed with ROEs and DOEs according to certain embodiments.

FIG. 3J is a schematic cross sectional view of a spectacle lens surface coated with a thin film designed with ROEs and DOEs according to certain embodiments.

FIG. 3K is a schematic cross sectional view of a spectacle lens surface coated with a thin film and another optical film embedded in the spectacle matrix designed with ROEs and DOEs according to certain embodiments.

FIG. 3L is a schematic cross sectional view of an optical thin film according to certain embodiments.

FIG. 3M is a schematic front view of an optical thin film comprising of ROEs and DOEs according to certain embodiments.

FIG. 20E shows additional data related to FIG. 20A. It illustrates the on-axis, geometric spot diagram analysis at the retinal plane, when the incoming light, with one of the two wavelengths of the polychromatic source (610 nm), with a vergence of zero diopters, is incident on a 2 Diopter Myopic Model eye that has been corrected with a spectacle lens embedded with a ROE array, described in FIG. 20A and FIG. 20B.

FIG. 20F shows additional data related to FIG. 20A. It illustrates the 5 degrees off-axis, geometric spot diagram analysis at the retinal plane, when the incoming light, with one of the two wavelengths of the polychromatic source (610 nm), with a vergence of zero diopters, is incident on a 2 Diopter Myopic Model eye that has been corrected with a spectacle lens, described in FIGS. 20A and 20B.

FIG. 21A illustrates a two-dimensional power profile a spectacle lens embedded with a ROE array, according to certain embodiments. The power profile in this figure is described over normalized coordinates, over 5 mm optic zone diameter.

FIG. 21B illustrates the zoomed in version of the two-dimensional power profile a spectacle lens embedded with a ROE array shown in FIG. 21A, according to certain embodiments. The power profile in this figure is described over normalized coordinates, over 1 mm optic zone diameter to highlight the actual power of the ROE element (+1D).

FIG. 24A illustrates a two-dimensional power profile a spectacle lens embedded with a ROE array, according to certain embodiments. The power profile in this figure is described over normalized coordinates, over 5 mm optic zone diameter.

FIG. 24B illustrates the zoomed in version of the two-dimensional power profile a spectacle lens embedded with a ROE array shown in FIG. 24A, according to certain embodiments. The power profile in this figure is described over normalized coordinates, over 3.5 mm optic zone diameter to highlight the actual power of the ROE element (+2D).

FIG. 27A illustrates a two-dimensional power profile a spectacle lens embedded with a ROE array, according to certain embodiments. The power profile in this figure is described over normalized coordinates, over 5 mm optic zone diameter.

FIG. 27B illustrates the zoomed in version of the two-dimensional power profile a spectacle lens embedded with a ROE array shown in FIG. 27A, according to certain embodiments. The power profile in this figure is described over normalized coordinates, over 1.5 mm optic zone diameter to highlight the actual power of the ROE element (+2D).

FIG. 28A illustrates a two-dimensional power profile a spectacle lens embedded with a ROE array, according to certain embodiments. The power profile in this figure is described over normalized coordinates, over 5 mm optic zone diameter.

FIG. 28B illustrates the zoomed in version of the two-dimensional power profile a spectacle lens embedded with a ROE array shown in FIG. 28A, according to certain embodiments. The power profile in this figure is described over normalized coordinates, over 2 mm optic zone diameter to highlight the actual power of the ROE element (+2D).

FIG. 29D shows additional data related to FIG. 29A. It illustrates the 5 degrees off-axis, geometric spot diagram analysis at the retinal plane, when the incoming light, with one of the two wavelengths of the polychromatic source (555 nm), with a vergence of zero diopters, is incident on a 2 Diopter Myopic Model eye that has been corrected with a spectacle lens, described in FIG. 29A.

Figure 29A:
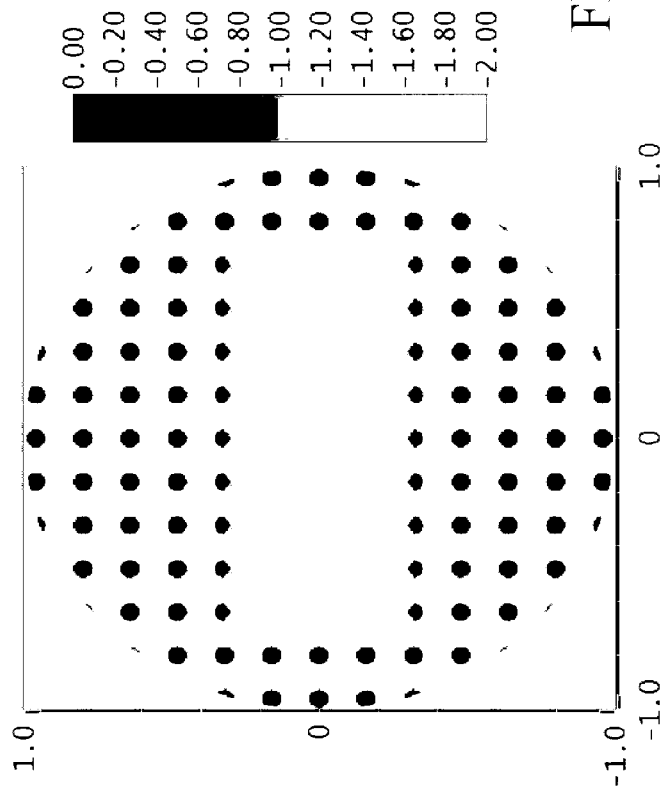
FIG. 29A illustrates a two-dimensional power profile a spectacle lens embedded with a ROE array, according to certain embodiments. The power profile in this figure is described over normalized coordinates, over 5 mm optic zone diameter. The power of individual element is +1D.
Figure 29E:
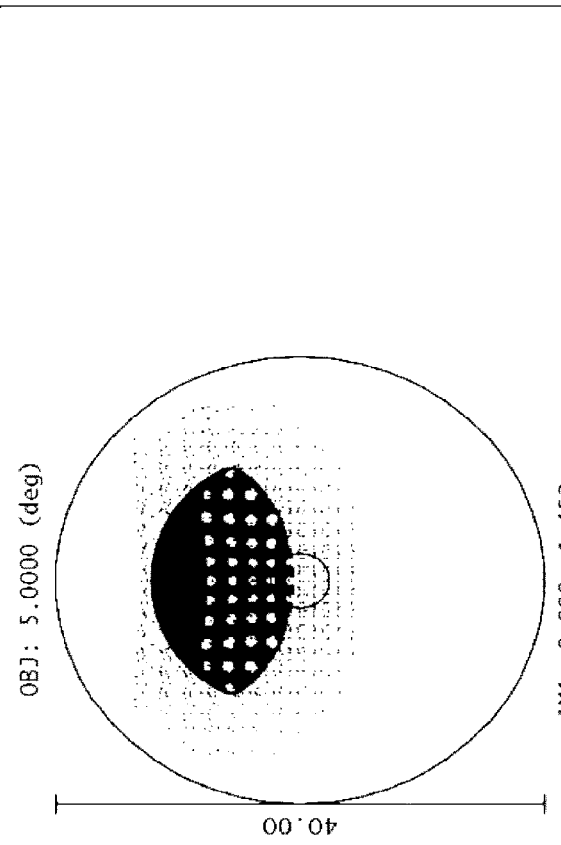
FIG. 29C shows additional data related to FIG. 29A. It illustrates the on-axis, geometric spot diagram analysis at the retinal plane, when the incoming light, with one of the two wavelengths of the polychromatic source (555 nm), with a vergence of zero diopters, is incident on a 2 Diopter Myopic Model eye that has been corrected with a spectacle lens embedded with a ROE array, described in FIG. 29A.

FIG. 29E shows additional data related to FIG. 29A. It illustrates the on-axis, geometric spot diagram analysis at the retinal plane, when the incoming light, with one of the two wavelengths of the polychromatic source (610 nm), with a vergence of zero diopters, is incident on a 2 Diopter Myopic Model eye that has been corrected with a spectacle lens embedded with a ROE array, described in FIG. 29A.

Figure 29F:
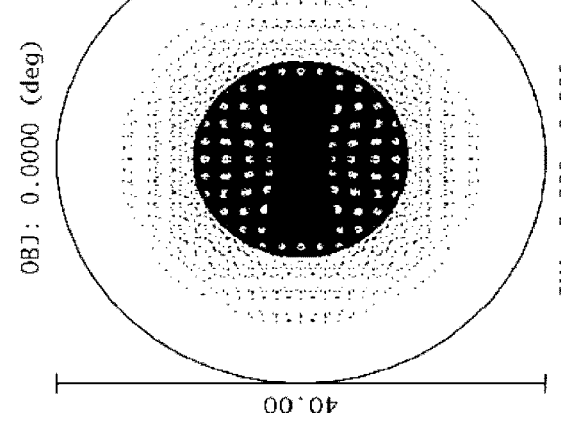

FIG. 29F shows additional data related to FIG. 29A. It illustrates the 5 degrees off-axis, geometric spot diagram analysis at the retinal plane, when the incoming light, with one of the two wavelengths of the polychromatic source (610 nm), with a vergence of zero diopters, is incident on a 2 Diopter Myopic Model eye that has been corrected with a spectacle lens, described in FIG. 29A.

Figure 30B:
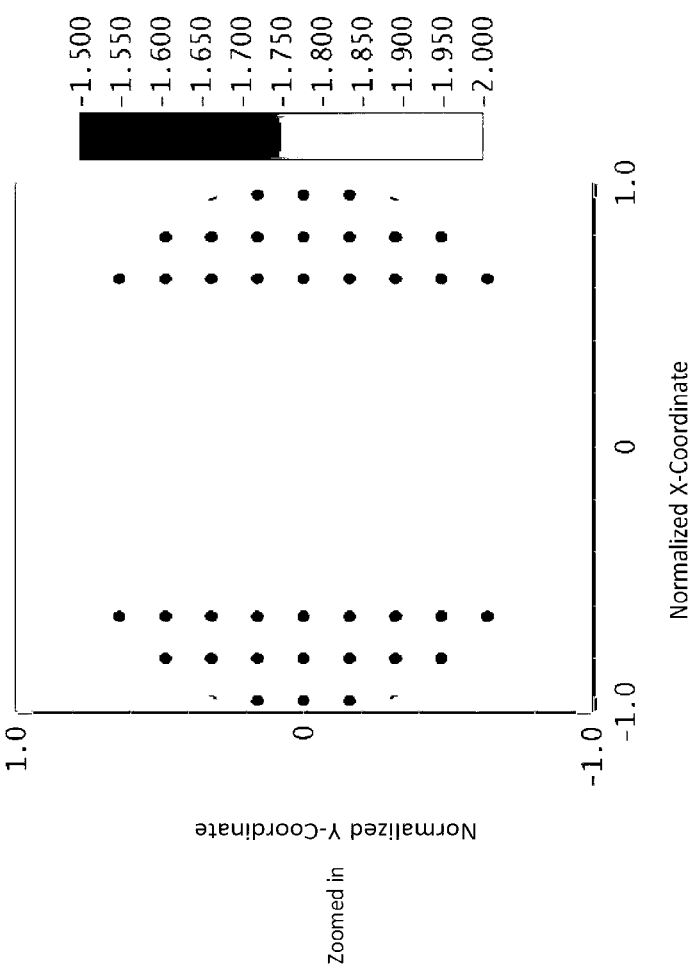
Figure 30A:
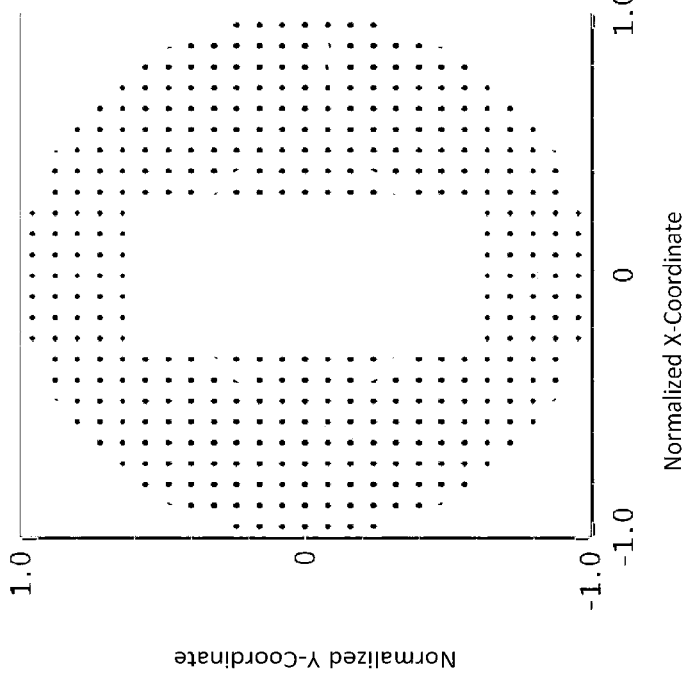

FIG. 30A illustrates a two-dimensional power profile a spectacle lens embedded with a ROE array, according to certain embodiments. The power profile in this figure is described over normalized coordinates, over 5 mm optic zone diameter.

FIG. 30B illustrates the zoomed in version of the two-dimensional power profile a spectacle lens embedded with a ROE array shown in FIG. 30A, according to certain embodiments. The power profile in this figure is described over normalized coordinates, over 2.5 mm optic zone diameter to highlight the actual power of the ROE element (+2D).

Figures 30C, 30D:
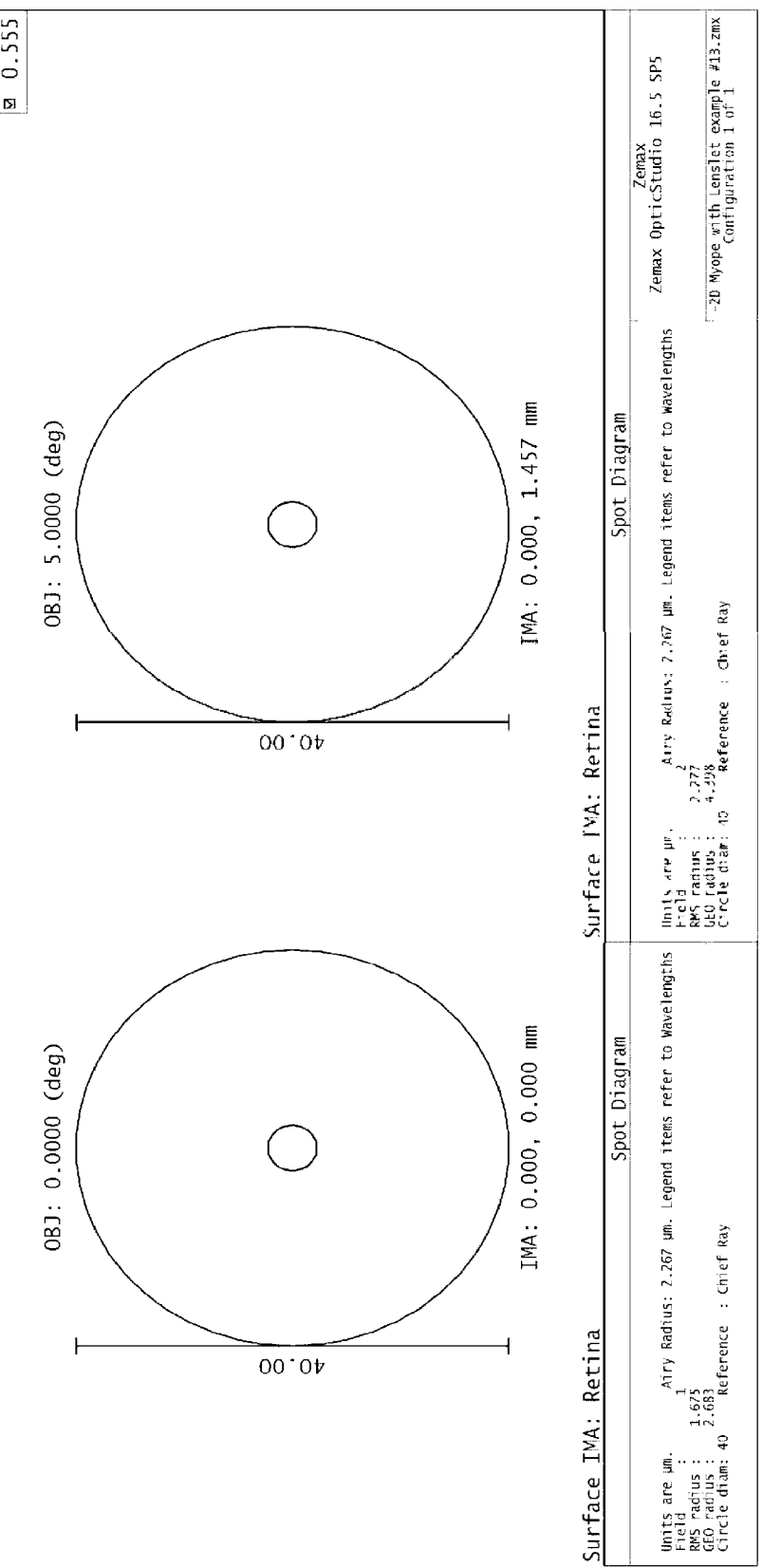
Figure 31:
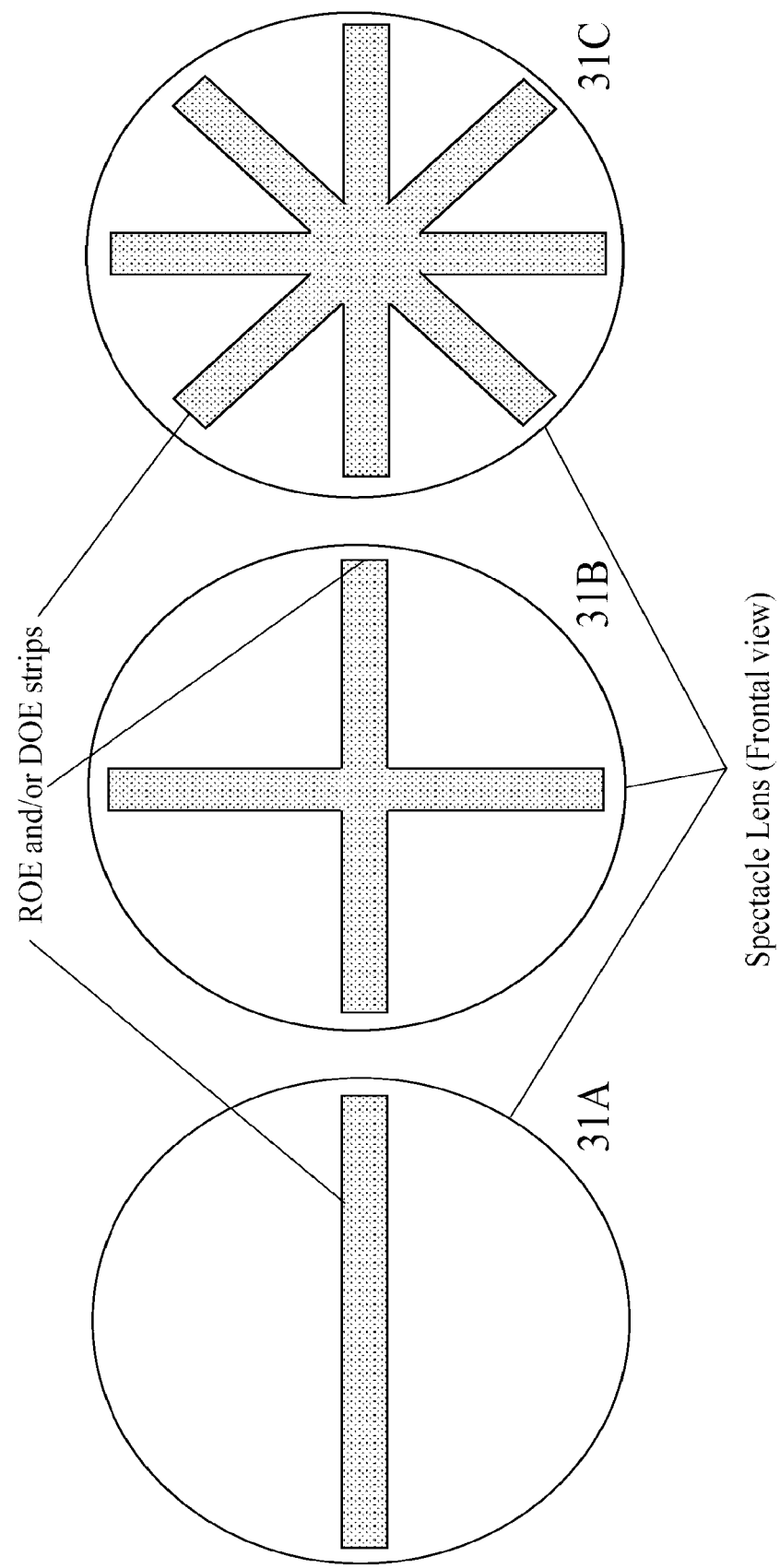
Figure 32:
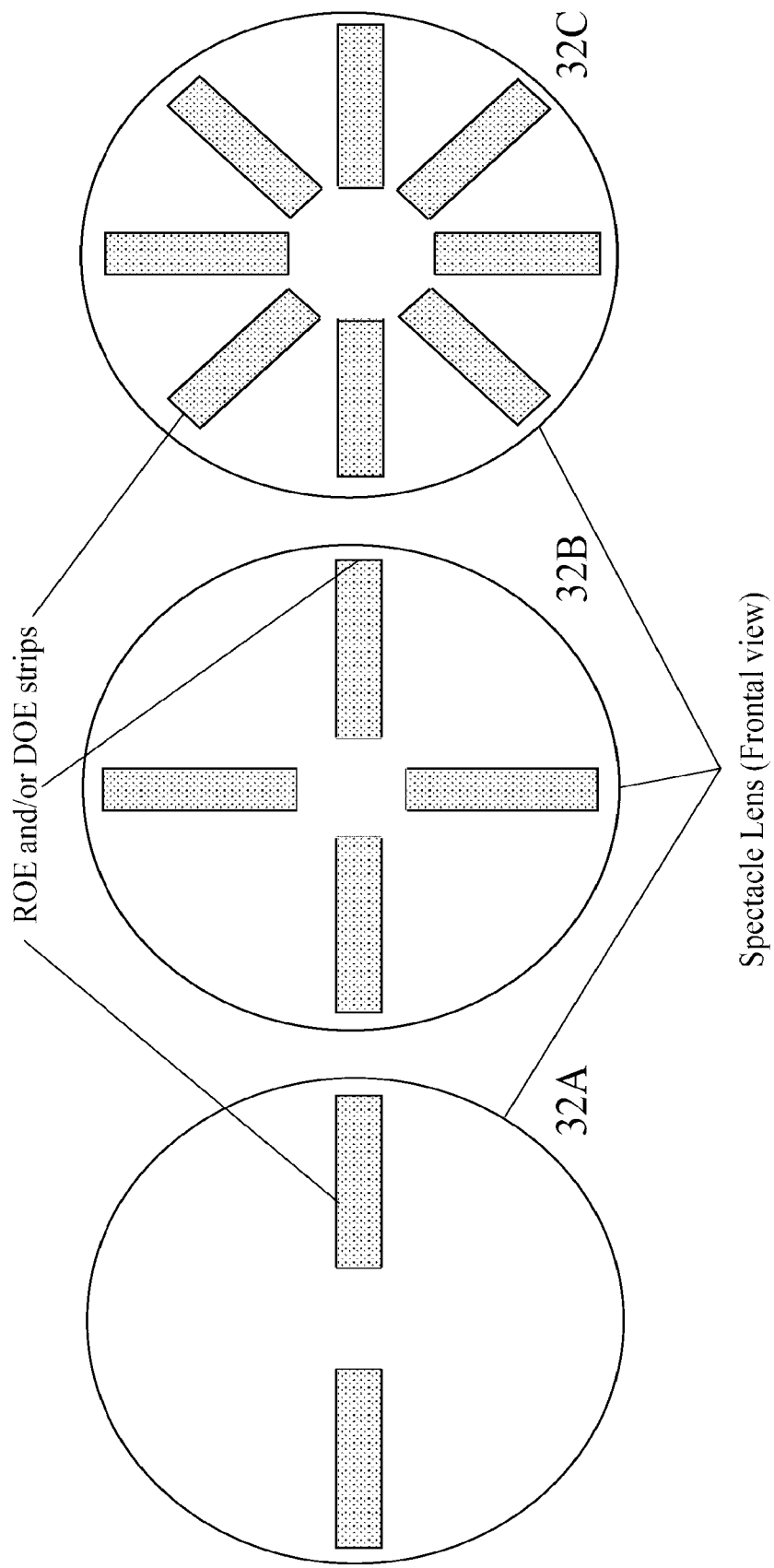
Figure 33:
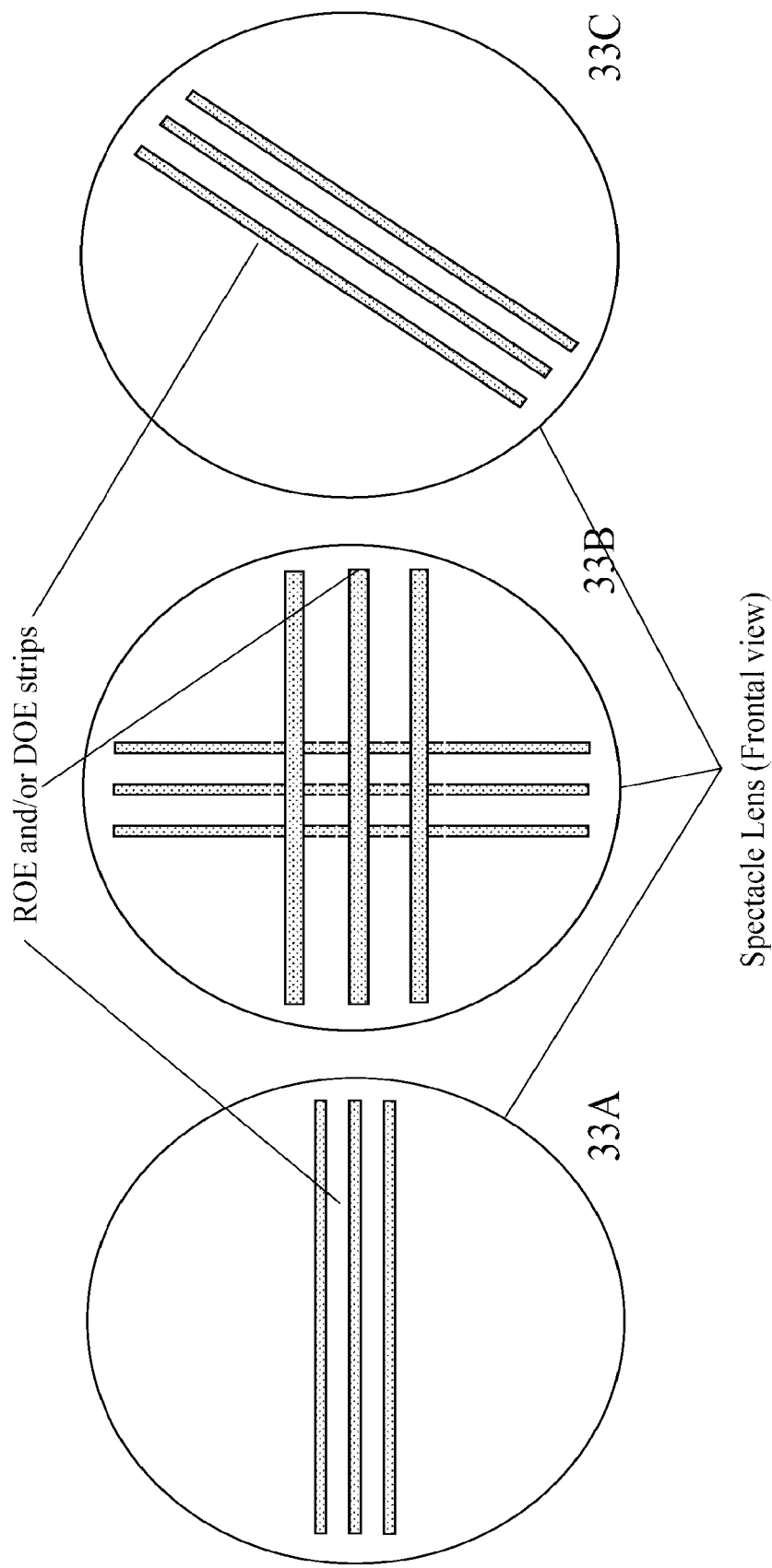
Figure 34:
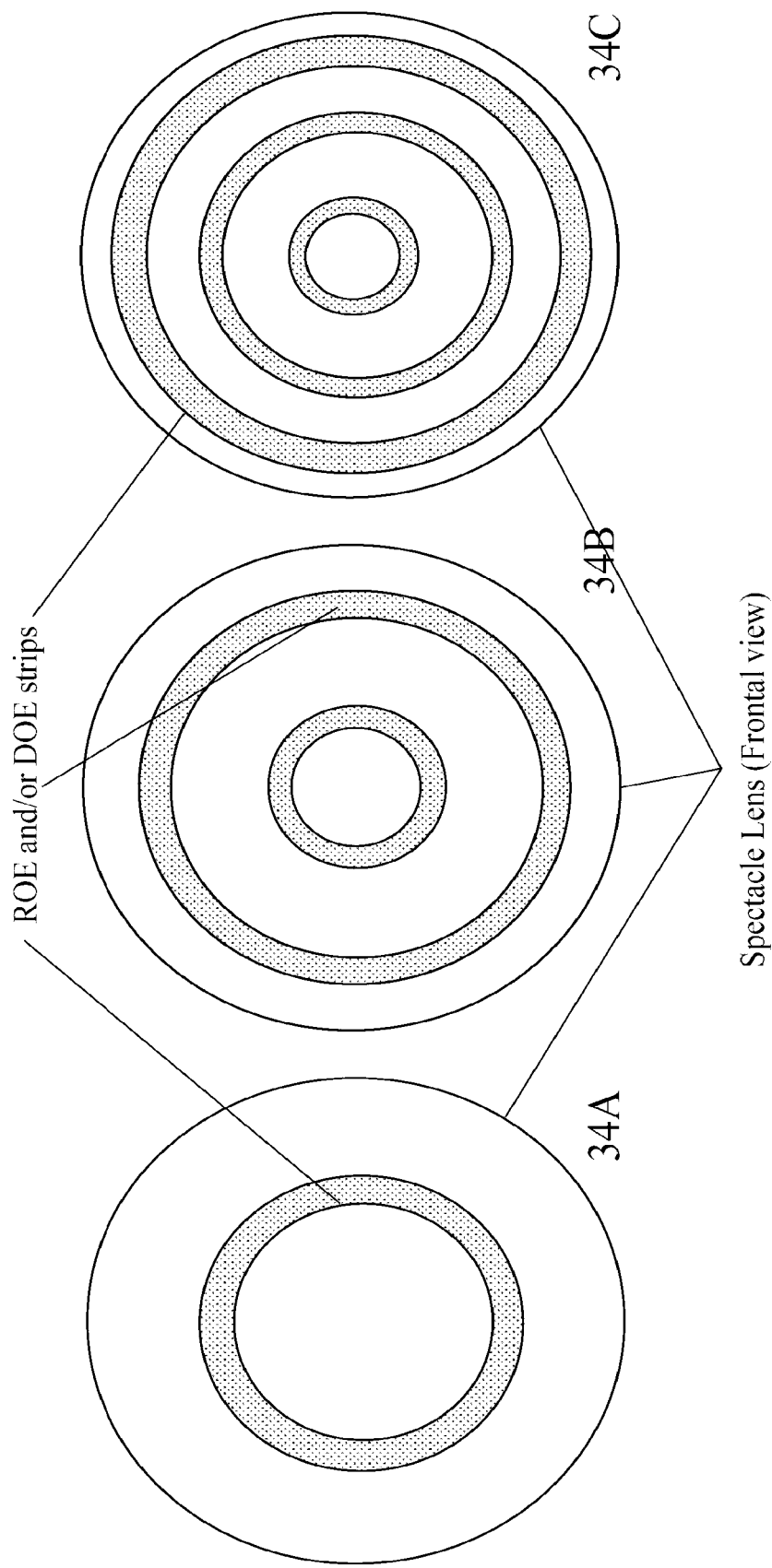
Figure 35:
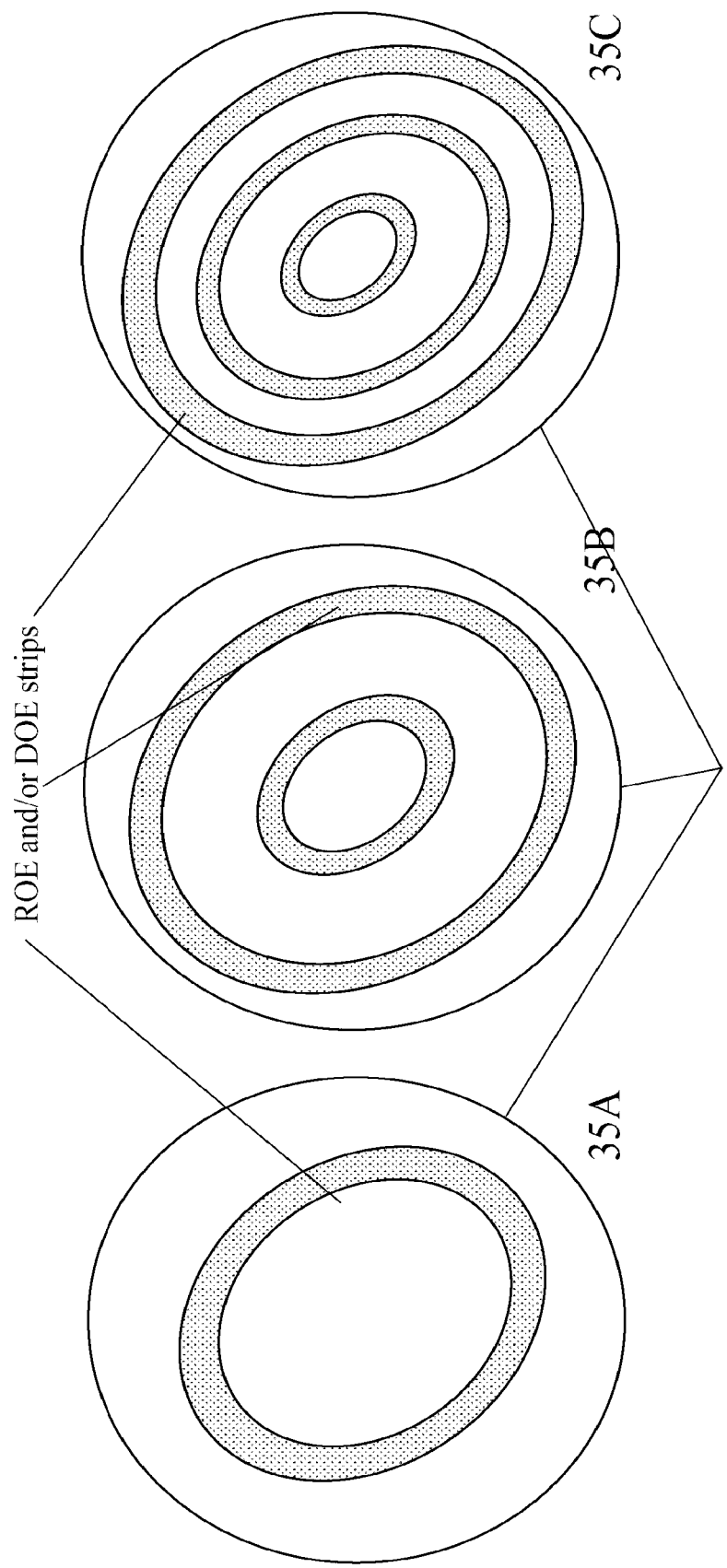

FIG. 30C shows additional data related to FIG. 30A. It illustrates the on-axis, geometric spot diagram analysis at the retinal plane, when the incoming light, with one of the two wavelengths of the polychromatic source (555 nm), with a vergence of zero diopters, is incident on a 2 Diopter Myopic Model eye that has been corrected with a spectacle lens embedded with a ROE array, described in FIGS. 30A and 30B.

FIG. 30D shows additional data related to FIG. 30A. It illustrates the 5 degrees off-axis, geometric spot diagram analysis at the retinal plane, when the incoming light, with one of the two wavelengths of the polychromatic source (555 nm), with a vergence of zero diopters, is incident on a 2 Diopter Myopic Model eye that has been corrected with a spectacle lens, described in FIGS. 30A and 30B.

FIG. 30E shows additional data related to FIG. 30A. It illustrates the on-axis, geometric spot diagram analysis at the retinal plane, when the incoming light, with one of the two wavelengths of the polychromatic source (610 nm), with a vergence of zero diopters, is incident on a 2 Diopter Myopic Model eye that has been corrected with a spectacle lens embedded with a ROE array, described in FIG. 30A and FIG. 30B.

FIG. 30F shows additional data related to FIG. 30A. It illustrates the 5 degrees off-axis, geometric spot diagram analysis at the retinal plane, when the incoming light, with one of the two wavelengths of the polychromatic source (610 nm), with a vergence of zero diopters, is incident on a 2 Diopter Myopic Model eye that has been corrected with a spectacle lens, described in FIGS. 30A and 30B.

FIGS. 31, 32, 33, 34, and 35 illustrate the frontal views of devices embedded with various types of optical patterns that may be used as an overlay on a spectacle lens or incorporated into a spectacle lens, according to certain embodiments.

Figure 36:
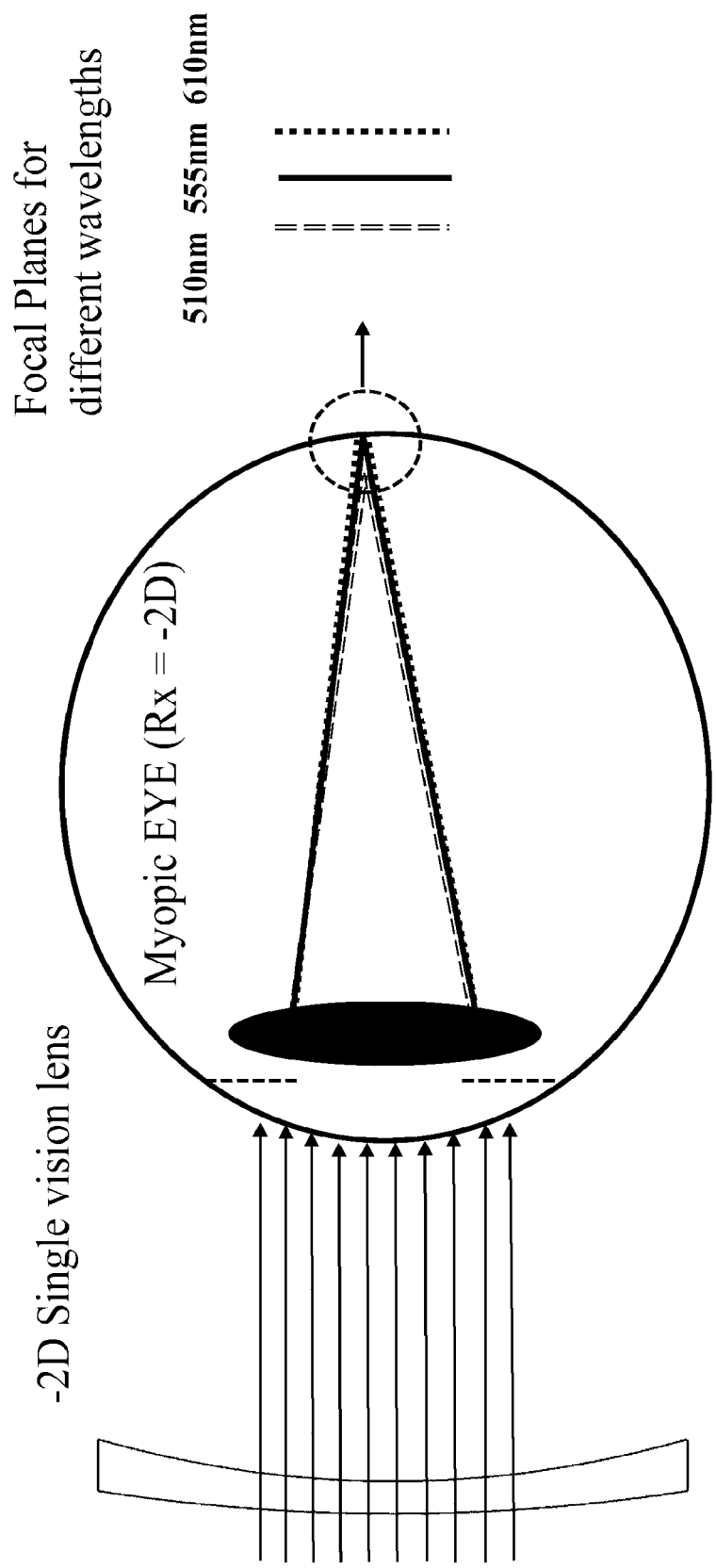
Figure 37:
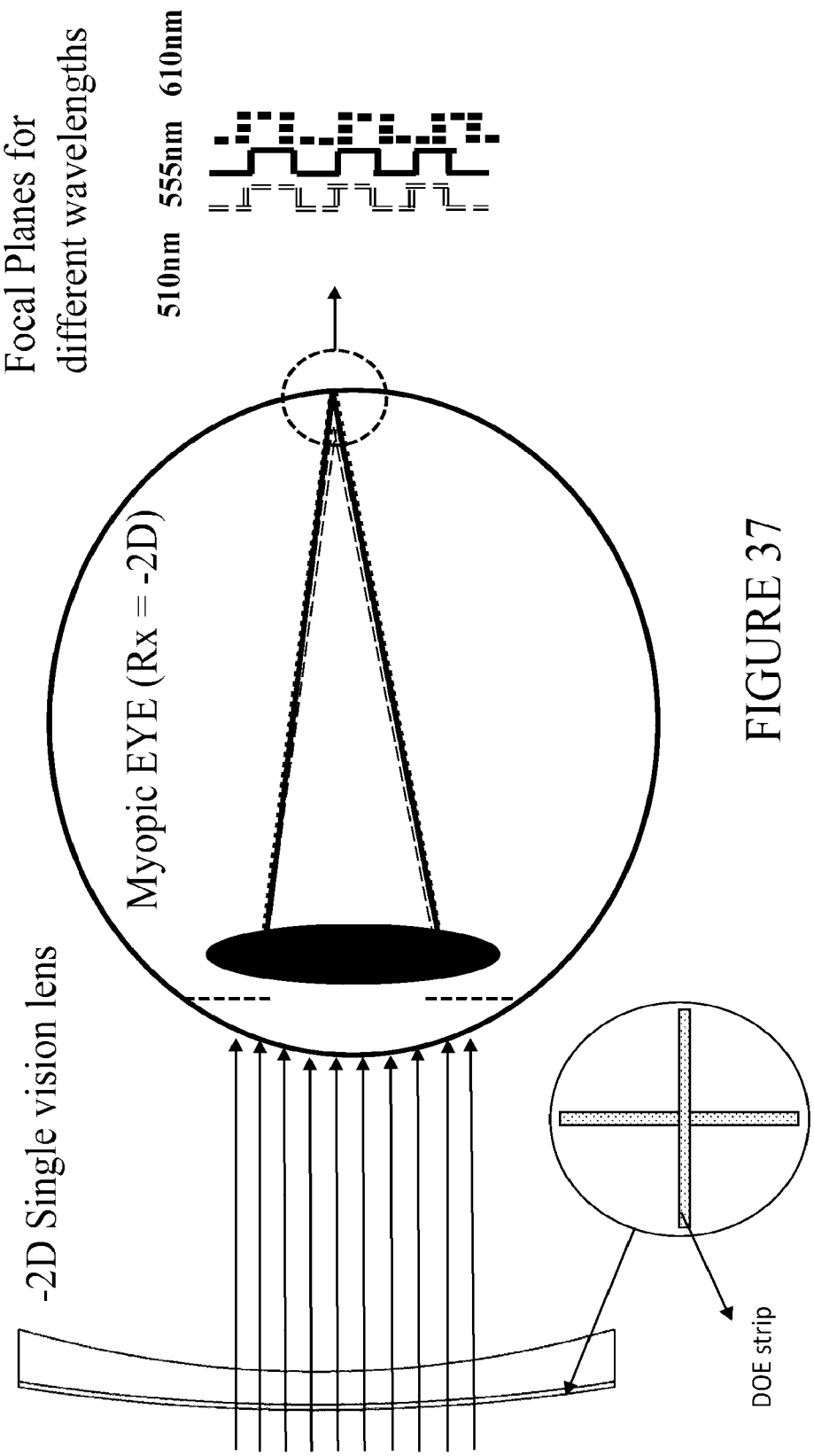

FIGS. 36 and 37 illustrate an alternate method of correction of the exemplary −2D myopic model eye using two pairs of spectacle lenses, according to certain embodiments.

DETAILED DESCRIPTION

The following description is provided in relation to several embodiments that may share common characteristics and features. It is to be understood that one or more features of one embodiment may be combined with one or more features of other embodiments. In addition, a single feature or combination of features in certain of the embodiments may constitute additional embodiments. Specific structural and functional details disclosed herein are not to be interpreted as limiting, but merely as a representative basis for teaching one skilled in the art to variously employ the disclosed embodiments and variations of those embodiments.

The subject headings used in the detailed description are included only for the ease of reference of the reader and should not be used to limit the subject matter found throughout the disclosure or the claims. The subject headings should not be used in construing the scope of the claims or the claim limitations.

One or more of the following advantages is found in one or more of the disclosed devices, methods and/or systems:

A. The spectacle lens systems provides a stop signal to reduce or stop eye growth (or the state of refractive error) of the wearer's eye for at least a portion or a substantial portion of the viewing angles through the spectacle lens system and thus increasing the potential to reduce the rate of myopia progression.

B. For effective myopia control, the wearer of the spectacle lens system does not have to look thorough a certain portion of the spectacle lens system.

C. The spectacle lens system visually look like a typical spectacle lens and does not suffer from the potential dislike shown by certain wearers (for example, executive bifocal spectacles).

D. The ability to alter the micro lenslet array patterns, ROE array patterns, DOE array patterns, the diameter of the lenslets, diameter of the individual ROE, diameter of the individual DOE, the depth of the lenslet, sagittal depth of the surface of individual ROE, sagittal depth of the surface of individual DOE, spatial location of the lenslets, spatial location of the ROE, spatial location of the DOE, the focal length of the lenslets, focal length of the individual ROE, focal length of the individual DOE, spacing between the lenslets, spacing between the individual ROE, spacing between the individual DOE, the refractive index of the lenslet material, refractive index of the individual ROE, refractive index of the individual DOE, the refractive index of the spectacle lens material or combinations thereof.

E. The ophthalmic lens or ophthalmic lens system provides a stop signal to reduce or stop eye growth (or the state of refractive error) to the wearer's eye irrespective (or substantially irrespective) of the direction of gaze of the wearer's eye relative to the center of the ophthalmic lens or the ophthalmic lens system.

F. For effective slowing of eye growth, the wearer of the ophthalmic lens or ophthalmic lens system does not have to look thorough a certain portion of the spectacle lens system.

Certain embodiments of the present disclosure are directed to devices, methods and/or systems that are capable of providing a spectacle lens system that provides a stop signal to the progressing eye no matter what portion of the spectacle lens system the child and/or viewer is using.

Certain embodiments of the present disclosure are directed to devices, methods and/or systems that are capable of providing a spectacle lens system and/or a device that may be combined with a spectacle lens, wherein the lens (or the combination product) provides a stop signal to progressing eye, for a portion or a substantial portion of the viewing angles of the spectacle lens system used by a person. In certain embodiments, a substantial portion of the viewing angles may be understood to mean at least 55, 60, 70, 80, 90, 95 or 99% of the total viewing angles available to a wearing of the spectacle lens system or of the device. In other embodiments, a substantial portion of the viewing angles may be understood to mean at least 55, 60, 70, 80, 90, 95 or 99% of the total viewing angles of the device in those portions or areas of the device that contain lenslet.

Certain embodiments of the present disclosure are directed to devices, methods and/or systems that are capable of providing a ophthalmic lens system that provides a stop signal to eye growth irrespective (or substantially irrespective) of the direction of gaze of the wearer's eye relative to the center of the ophthalmic lens or the ophthalmic lens system.

Certain embodiments of the present disclosure are directed to devices, methods and/or systems that are capable of providing an ophthalmic lens and/or a device that may be combined with a spectacle lens (referred to as the lens system), wherein the lens (or the combination product) provides a stop signal to eye growth, wherein at least a substantial portion section of the lens provides a stop signal to eye growth for a portion or a substantial portion of the viewing angles of the spectacle lens system used by a person. In certain embodiments, at least a substantial portion of the viewing angles may be understood to mean at least 55, 60, 70, 80, 90, 95 or 99% of the total viewing angles available to a wearing of the spectacle lens system or of the device. In other embodiments, at least a substantial portion of the viewing angles may be understood to mean at least 55, 60, 70, 80, 90, 95 or 99% of the total viewing angles of the device in those portions or areas of the device that contain lenslet.

The micro lenslet arrays, ROE arrays or DOE arrays disclosed herein may vary substantially in their properties. In certain embodiments, micro lenslet arrays, ROE arrays or DOE arrays may be manufactured in sheets that may be made up of more than 1 layer, for example 2, 3, 4 or 5 layers. In certain embodiments, micro lenslet arrays, ROE arrays or DOE arrays may be manufactured in sheets that may be made up of at least 1, 2, 3, 4 or 5 layers. The sheets may then be cut or configured to properly fit or work in conjunction with a spectacle lens blank. The micro lenslet arrays, ROE arrays or DOE arrays, or sheets containing the micro lenslet arrays, ROE arrays or DOE arrays, may be located on the anterior surface of the spectacle lens, the posterior surface of the spectacle lens, embedded in the spectacle lens matrix, in the first layer of the spectacle lens, in the second layer of the spectacle lens, in the third layer of the spectacle lens, in the fourth layer of the spectacle lens, in the fifth layer of the spectacle lens or combinations thereof. The micro lenslet arrays, ROE arrays or DOE arrays may be applied or adhered to a spectacle lens in order to work in conjunction with the spectacle lens in a number of ways including, but not limited to, adhesives (thermal or chemical) or mechanical.

In certain embodiments, the micro lenslet arrays, ROE arrays or DOE arrays may be integrally formed and/or molded as part of the spectacle lens. In certain embodiments, the spectacle lens containing a micro lenslet arrays, ROE arrays or DOE arrays may be formed and/or molded in multiple layers, for example 1, 2, 3, 4 or 5 layers. In certain embodiments, the spectacle lens containing a micro lenslet arrays, ROE arrays or DOE arrays may be formed and/or molded of at least 1, 2, 3, 4 or 5 layers. The micro lenslet arrays, ROE arrays or DOE arrays may be located on the anterior surface of the spectacle lens, the posterior surface of the spectacle lens, in the first layer of the spectacle lens, in the second layer of the spectacle lens, in the third layer of the spectacle lens, in the fourth layer of the spectacle lens, in the fifth layer of the spectacle lens or combinations thereof.

The Micro Lenslets, ROEs or DOEs

In certain embodiments, the Fill Ratio of the micro lenslets may be 5%, 10%, 20%, 25%, 30%, 40%, 50%, 60%, 70% or 80% of the total surface area of the micro lenslet array. In certain embodiments, the Fill Ratio of the micro lenslets may be between 10% to 20%, 10% to 30%, 20% to 40%, 20% to 50%, 30% to 50%, 40% to 60%, 20% to 80% of the total surface area of the micro lenslet array. In certain embodiments, the Fill Ratio of the micro lenslets may be at least 5%, 10%, 20%, 25%, 30%, 40%, 50%, 60%, 70% or 80% of the total surface area of the micro lenslet array. In certain embodiments, the Fill Ratio of the lenslets may be at about 10%, approximately 10%, between 5% and 15%, between 8% and 12% or at least 10% of the total surface area of the lenslet array.

In certain embodiments, the Fill Ratio of the ROEs may be 5%, 10%, 20%, 25%, 30%, 40%, 50%, 60%, 70% or 80% of the total surface area of the ROE array. In certain embodiments, the Fill Ratio of the ROEs may be between 10% to 20%, 10% to 30%, 20% to 40%, 20% to 50%, 30% to 50%, 40% to 60%, 20% to 80% of the total surface area of the ROE array. In certain embodiments, the Fill Ratio of the ROEs may be at least 5%, 10%, 20%, 25%, 30%, 40%, 50%, 60%, 70% or 80% of the total surface area of the ROE array. In certain embodiments, the Fill Ratio of the ROE may be at about 10%, approximately 10%, between 5% and 15%, between 8% and 12% or at least 10% of the total surface area of the ROE array.

In certain embodiments, the Fill Ratio of the DOEs may be 5%, 10%, 20%, 25%, 30%, 40%, 50%, 60%, 70% or 80% of the total surface area of the DOE array. In certain embodiments, the Fill Ratio of the DOEs may be between 10% to 20%, 10% to 30%, 20% to 40%, 20% to 50%, 30% to 50%, 40% to 60%, 20% to 80% of the total surface area of the DOE array. In certain embodiments, the Fill Ratio of the DOEs may be at least 5%, 10%, 20%, 25%, 30%, 40%, 50%, 60%, 70% or 80% of the total surface area of the DOE array. In certain embodiments, the Fill Ratio of the DOEs may be at about 10%, approximately 10%, between 5% and 15%, between 8% and 12% or at least 10% of the total surface area of the DOE array.

In certain embodiments, the Pupil Fill Ratio of the micro lenslets may be 5%, 10%, 20%, 25%, 30%, 40%, 50%, 60%, 70% or 80% of the total surface area of the micro lenslet array. In certain embodiments, the Pupil Fill Ratio of the micro lenslets may be between 10% to 20%, 10% to 30%, 20% to 40%, 20% to 50%, 30% to 50%, 40% to 60%, 20% to 80% of the total surface area of the micro lenslet array. In certain embodiments, the Pupil Fill Ratio of the micro lenslets may be at least 5%, 10%, 20%, 25%, 30%, 40%, 50%, 60%, 70% or 80% of the total surface area of the micro lenslet array. In certain embodiments, the Pupil Fill Ratio of the lenslets may be at about 10%, approximately 10%, between 5% and 15%, between 8% and 12% or at least 10% of the total surface area of the lenslet array.

In certain embodiments, the Pupil Fill Ratio of the ROEs may be 5%, 10%, 20%, 25%, 30%, 40%, 50%, 60%, 70% or 80% of the total surface area of the ROE array. In certain embodiments, the Pupil Fill Ratio of the ROEs may be between 10% to 20%, 10% to 30%, 20% to 40%, 20% to 50%, 30% to 50%, 40% to 60%, 20% to 80% of the total surface area of the ROE array. In certain embodiments, the Pupil Fill Ratio of the ROEs may be at least 5%, 10%, 20%, 25%, 30%, 40%, 50%, 60%, 70% or 80% of the total surface area of the ROE array. In certain embodiments, the Pupil Fill Ratio of the ROE may be at about 10%, approximately 10%, between 5% and 15%, between 8% and 12% or at least 10% of the total surface area of the ROE array.

In certain embodiments, the Pupil fill ratio of the DOEs may be 5%, 10%, 20%, 25%, 30%, 40%, 50%, 60%, 70% or 80% of the total surface area of the DOE array. In certain embodiments, the Pupil Fill Ratio of the DOEs may be between 10% to 20%, 10% to 30%, 20% to 40%, 20% to 50%, 30% to 50%, 40% to 60%, 20% to 80% of the total surface area of the DOE array. In certain embodiments, the Pupil Fill Ratio of the DOEs may be at least 5%, 10%, 20%, 25%, 30%, 40%, 50%, 60%, 70% or 80% of the total surface area of the DOE array. In certain embodiments, the Pupil Fill Ratio of the DOEs may be at about 10%, approximately 10%, between 5% and 15%, between 8% and 12% or at least 10% of the total surface area of the DOE array.

In certain embodiments, the Pupil fill ratio may be constant, substantially constant with varying viewing angles. In other embodiments, the Pupil fill ratio may vary with viewing angle. In yet other embodiments, the Pupil fill ratio may monotonically increase with viewing angle, monotonically decrease with viewing angle, non-monotonically vary with viewing angle. In yet other embodiments, the Pupil fill ratio may vary gradually with viewing angle.

In certain embodiments, the area of one or more micro lenslets in the micro lenslet array may be approximately 314, 1963, 7854, 31416, 70686, 196350, 441786 square microns ($\mu m^2$). In certain embodiments, the area of one or more ROE in the ROE array may be approximately 314, 1963, 7854, 31416, 70686, 196350, 441786 square microns. In certain embodiments, the area of one or more DOE in the DOE array may be approximately 314, 1963, 7854, 31416, 70686, 196350, 441786 square microns.

In certain embodiments, the diameter of one or more micro lenslets in the micro lenslet array may be approximately 0.01, 0.05, 0.2, 0.3, 0.5, 0.75 mm or combinations thereof. In certain embodiments, the diameter of one or more micro lenslet in the micro lenslet array may be approximately between 0.01 and 0.75 mm, 0.01 and 0.2 mm, 0.05 and 0.15 mm, 0.05 and 0.2 mm or combinations of thereof.

In certain embodiments, the diameter of one or more ROEs in the ROE array may be approximately 0.01, 0.05, 0.2, 0.3, 0.5, 0.75 mm or combinations thereof. In certain embodiments, the diameter of one or more ROEs in the ROE array may be approximately between 0.01 and 0.75 mm, 0.01 and 0.2 mm, 0.05 and 0.15 mm, 0.05 and 0.2 mm or combinations of thereof.

In certain embodiments, the diameter of one or more DOEs in the DOE array may be approximately 0.01, 0.05, 0.2, 0.3, 0.5, 0.75, 0.8 or combinations thereof. In certain embodiments, the diameter of one or more DOEs in the DOE array may be approximately between 0.01 and 0.75 mm, 0.01 and 0.2 mm, 0.05 and 0.15 mm, 0.05 and 0.2 mm or combinations of thereof.

In exemplary embodiments, the shapes of the micro lenslets, refractive and/or diffractive optical elements may be circular, semi-circular, non-circular, oval, rectangular, hexagonal, square or combinations thereof to introduce the desired conflicting or contradictory signal at the neighboring M and/or L cones to produce a stop signal for the progressing myopic eye.

In exemplary embodiments, the arrangement of the elements of the micro lenslet, refractive and/or diffractive optical element array may be circular, semi-circular, non-circular, oval, rectangular, hexagonal or square to introduce the desired conflicting or contradictory signal at the neighboring M and/or L cones to produce a stop signal for the progressing myopic eye.

In certain embodiments, the center-to-center spacing (s) between two or more micro lenslets in the array may be 0.05, 0.1, 0.5, 0.5, 1, 2, 3 4, 5, 6, 7, or 8 mm or combinations thereof. In certain embodiments, the center-to-center spacing (s) between two or more micro lenslets in the micro lenslet array may be at least 0.05, 0.1, 0.5, 0.5, 1, 2, 3 4, 5, 6, 7, or 8 mm or combinations thereof. In certain embodiments, the center-to-center spacing (s) between two or more micro lenslets in the micro lenslet array may be between 0.05 and 8 mm, 0.1 and 0.5 mm, 0.2 and 10 mm, 0.2 and 0.4 mm 1 and 3 mm, 2 and 5 mm or combinations thereof. In certain embodiments the center-to-center spacing (s) between two or more micro lenslets in the lenslet array may be about 0.2 mm, approximately 0.2 mm, at least 0.2 mm, 0.2 mm, about 0.3 mm, approximately 0.3 mm, at least 0.3 mm, 0.3 mm, about 0.4 mm, approximately 0.4 mm, at least 0.4 mm, 0.4 mm, or combinations thereof.

In certain embodiments, the center-to-center spacing (s) between two or more ROEs or DOEs in the array may be 0.05, 0.1, 0.5, 0.5, 1, 2, 3 4, 5, 6, 7, or 8 mm or combinations thereof. In certain embodiments, the center-to-center spacing (s) between two or more ROEs or DOEs in the ROE/DOE array may be at least 0.05, 0.1, 0.5, 0.5, 1, 2, 3 4, 5, 6, 7, or 8 mm or combinations thereof. In certain embodiments, the center-to-center spacing (s) between two or more ROEs or DOEs in the ROE/DOE array may be between 0.05 and 8 mm, 0.1 and 0.5 mm, 0.2 and 10 mm, 0.2 and 0.4 mm, 1 and 3 mm, 2 and 5 mm or combinations thereof. In certain embodiments the center-to-center spacing (s) between two or more ROEs or DOEs in the ROE/DOE array may be about 0.2 mm, approximately 0.2 mm, at least 0.2 mm, 0.2 mm, about 0.3 mm, approximately 0.3 mm, at least 0.3 mm, 0.3 mm, about 0.4 mm, approximately 0.4 mm, at least 0.4 mm, 0.4 mm, or combinations thereof.

In certain embodiments, the border-to-border spacing (s) between two or more micro lenslets in the array may be 0, 0.05, 0.1, 0.5, 0.5, 1, 2, 3 4, 5, 6, 7, or 8 mm or combinations thereof. In certain embodiments, the border-to-border spacing (s) between two or more micro lenslets in the micro lenslet array may be at least 0, 0.05, 0.1, 0.5, 0.5, 1, 2, 3 4, 5, 6, 7, or 8 mm or combinations thereof. In certain embodiments, the border-to-border spacing (s) between two or more micro lenslets in the micro lenslet array may be between 0 and 0.05, 0.05 and 8 mm, 0.1 and 0.5 mm, 0.2 and 10 mm, 0.2 and 0.4 mm, 1 and 3 mm, 2 and 5 mm or combinations thereof. In certain embodiments the border-to-border spacing (s) between two or more micro lenslets in the lenslet array may be about 0.2 mm, approximately 0.2 mm, at least 0.2 mm, 0.2 mm, about 0.3 mm, approximately 0.3 mm, at least 0.3 mm, 0.3 mm, about 0.4 mm, approximately 0.4 mm, at least 0.4 mm, 0.4 mm, or combinations thereof.

In certain embodiments, the border-to-border spacing (s) between two or more ROEs or DOEs in the array may be 0, 0.05, 0.1, 0.5, 0.5, 1, 2, 3 4, 5, 6, 7, or 8 mm or combinations thereof. In certain embodiments, the border-to-border spacing (s) between two or more ROEs or DOEs in the ROE/DOE array may be at least 0, 0.05, 0.1, 0.5, 0.5, 1, 2, 3 4, 5, 6, 7, or 8 mm or combinations thereof. In certain embodiments, the border-to-border spacing (s) between two or more ROEs or DOEs in the ROE/DOE array may be between 0 and 0.05, 0.05 and 8 mm, 0.1 and 0.5 mm, 0.2 and 10 mm, 0.2 and 0.4 mm, 1 and 3 mm, 2 and 5 mm or combinations thereof. In certain embodiments the border-to-border spacing (s) between two or more ROEs or DOEs in the ROE/DOE array may be about 0.2 mm, approximately 0.2 mm, at least 0.2 mm, 0.2 mm, about 0.3 mm, approximately 0.3 mm, at least 0.3 mm, 0.3 mm, about 0.4 mm, approximately 0.4 mm, at least 0.4 mm, 0.4 mm, or combinations thereof.

In certain embodiments, the shape of one or more of the micro lenslets or ROEs may be described by one or more of the following: a sphere, an asphere, extended odd polynomial, extended even polynomial, conic section, biconic section, toric surface or Zernike polynomials.

In certain other embodiments, the phase profile of one or more of the DOEs may be described by one or more of the following: a sphere, an asphere, extended odd polynomial, extended even polynomial, conic section, biconic section, toric or Zernike polynomials. The surface of one or more of the DOEs may be described as a binary step, 2-step, 4-step, 8-step, kinoform, or a blazed grating.

In certain other embodiments, fabrication of the DOEs, in particular diffractive micro lenslet arrays, may be through construction of a continuous surface relief structure over the refractive spectacle lens using laser direct writing techniques. Fermat's principles may be used to design, fabricate, and/or characterize diffractive optical elements, for example diffractive micro lenslet arrays with continuous deep surface relief structures using parallel laser direct writing on thin films which may be used in conjunction with a conventional spectacle lens. In certain other embodiments, the DOE may take a shape of strip over the spectacle lens instead of an array of DOEs.

In certain embodiments, the Focal Length of one or more of the micro lenslet may be at least 50, 100, 200, 300, 400, 500, 600, 700, 800, 900, 1000, 2000 mm or combinations thereof. In certain embodiments, the Focal Length of one or more of the micro lenslets may be less than 50, 100, 200, 300, 400, 500, 600, 700, 800, 900, 1000, 2000 mm or combinations thereof. In certain embodiments, the Focal Length of one or more of the micro lenslets may between 300 to 500 mm, 200 to 600 mm, 100 to 2000 mm, 250 to 600 mm, 200 to 1000 mm or combinations thereof. In certain embodiments, the Focal Length of one or more of the micro lenslets may between 300 to 500 mm.

In certain embodiments, the Focal Length of one or more of the ROE and/or DOE may be at least 50, 100, 200, 300, 400, 500, 600, 700, 800, 900, 1000, 2000 mm or combinations thereof. In certain embodiments, the Focal Length of one or more of the ROE and/or DOE may be less than 50, 100, 200, 300, 400, 500, 600, 700, 800, 900, 1000, 2000 mm or combinations thereof. In certain embodiments, the Focal Length of one or more of the ROE and/or DOE may between 300 to 500 mm, 200 to 600 mm, 100 to 2000 mm, 250 to 600 mm, 200 to 1000 mm or combinations thereof. In certain embodiments, the Focal Length of one or more of the ROE and/or DOE may between 300 to 500 mm.

In certain embodiments, the Radius of Curvature ($R_i$) of one or more of the micro lenslet or ROE may be at approximately 0.1, 0.5, 1, 1.5, 2, 2.5, 3, 4, 5, 10, 20, 30, 40, 50, 70, 80, 100 mm or combinations thereof. In certain embodiments, the Radius of Curvature ($R_l$) of one or more of the micro lenslets or ROEs may be at less than 1.5, 2, 2.5, 3, 4, 5, 10, 20, 30, 40, 50, 70, 80, 100 mm or combinations thereof. In certain embodiments, the Radius of Curvature ($R_l$) of one or more the micro lenslets or ROEs may between 0.1 to 1.5 mm, 0.5 to 50 mm, 0.5 to 3 mm, 1 to 10 mm, 0.5 to 4 mm, 1 to 20 mm, or combinations thereof. In certain embodiments, the Radius of Curvature ($R_l$) of one or more the micro lenslets or ROEs may about 1 mm, approximately 1 mm, about 0.5 mm, approximately 0.5 mm, about 1.5 mm, or approximately 1.5 mm.

In certain embodiments, the refractive index of the one or more of the micro lenslets or ROEs may be higher than the refractive index of the material substantially surrounding (or surrounding) the micro lenslet or ROE. This provides for a positive power for micro lenslet or ROE, although there may be exemplary embodiments where a negative power is preferred, which may be achieved by selecting a refractive index of the micro lenslet or ROE that is lower than the refractive index of the material substantially surrounding (or surrounding) the micro lenslet or ROE. In certain embodiments, a useful range for the refractive index of the micro lenslet or ROE is between 1.3 and 1.7, 1 and 1.7, 1 and 1.5.

In certain embodiments, where the micro lenslet array is a multilayer array the refractive index of the layer containing the one or more micro lenslets may be higher than the refractive index of the layer of the array that is anterior to the layer containing the one or more micro lenslets. This may provide for a positive micro lenslet power, although there may be exemplary embodiments where a negative power is desirable, which may be achieved by selecting a refractive index of the micro lenslet layer that is lower than the refractive index of the layer anterior and/or posterior to layer containing the one or more micro lenslets. In certain embodiments, a preferred range for the refractive index of the micro lenslet layer is between 1.3 and 1.7, 1 and 2, 1 and 1.5.

In certain embodiments, where the ROE array is a multilayer array the refractive index of the layer containing the one or more ROEs may be higher than the refractive index of the layer of the array that is anterior to the layer containing the one or more ROEs. This may provide for a positive ROE power, although there may be exemplary embodiments where a negative power is desirable, which may be achieved by selecting a refractive index of the ROE layer that is lower than the refractive index of the layer anterior and/or posterior to layer containing the one or more ROEs. In certain embodiments, a useful range for the refractive index of the ROE layer is between 1.3 and 1.7, 1 and 2, 1 and 1.5.

In certain embodiments, the smaller the difference is between the refractive indices of the one or more micro lenslets (or the layer containing the micro lenslets) as compared with the area substantially surrounding the micro lenslets (or the refractive index of the layer anterior and/or posterior to layer containing the one or more micro lenslet), the smaller the radius of curvature may be made for the same (or substantially the same) focal length. This may be advantageous in terms of manufacturability and quality consistency. In certain embodiments, differences between the two refractive indexes of around 0.001, 0.005, 0.01, 0.05 or 0.1 are contemplated.

In certain embodiments, the smaller the difference is between the refractive indices of the one or more ROEs (or the layer containing the ROEs) as compared with the area substantially surrounding the ROEs (or the refractive index of the layer anterior and/or posterior to layer containing the one or more ROE), the smaller the radius of curvature may be made for the same (or substantially the same) focal length. This may be advantageous in terms of manufacturability and quality consistency. In certain embodiments, differences between the two refractive indexes of around 0.001, 0.005, 0.01, 0.05 or 0.1 are contemplated.

In certain embodiments, it is also possible to omit a layer, entirely or partially, and have the micro lenslets exposed to air with a refractive index of 1. This may have the advantage of simplifying the manufacturing.

In certain embodiments, it is also possible to omit a layer, entirely or partially, and have the ROEs exposed to air with a refractive index of 1. This may offer the advantage of simplifying the manufacturing.

Figure 2:
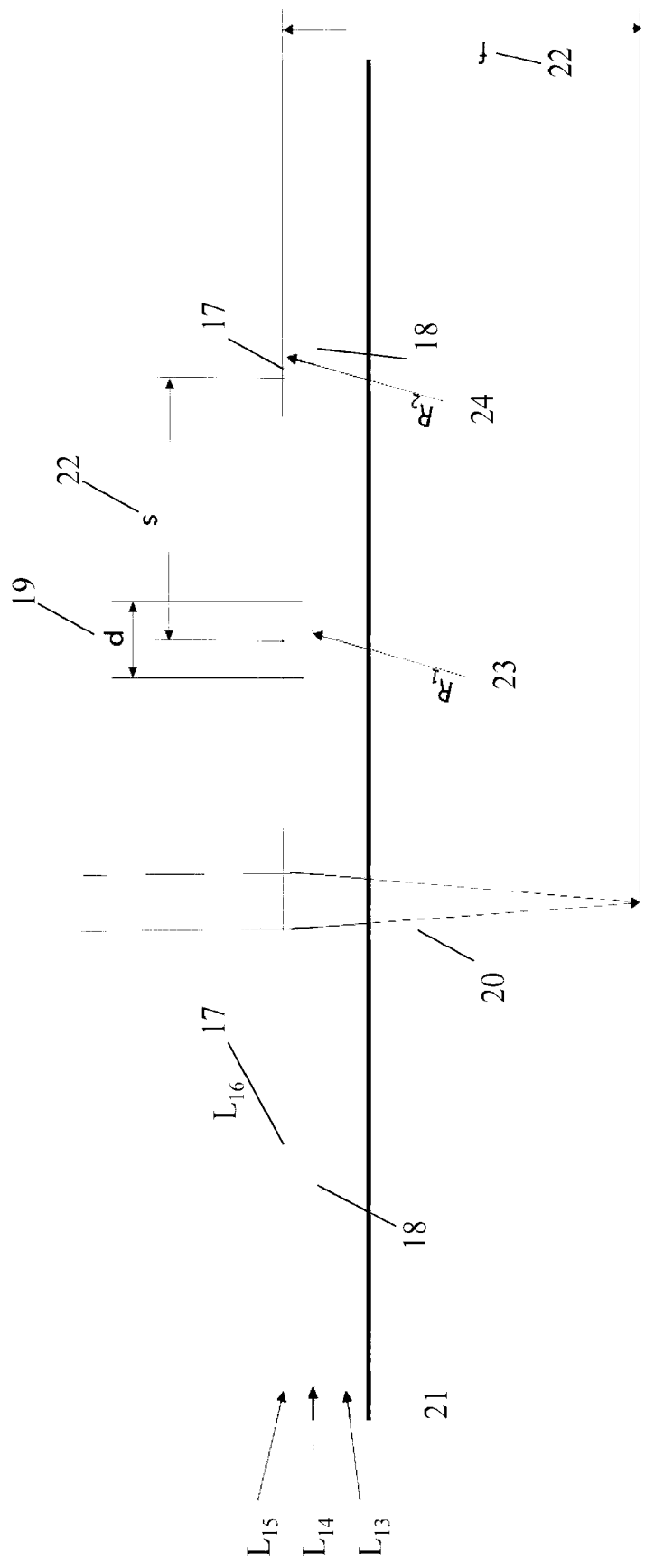
FIG. 2 is a schematic side view drawing a three layer lenslet array comprising ROEs according to certain embodiments.

In certain embodiments, optical variations such as shown in FIG. 2 provide additional parameters to facilitate ease of manufacturing and consistent optical quality. By having 2 radii of curvatures and 3 refractive index variables, optical properties like longitudinal chromatic aberrations may also be optimized.

In certain embodiments, it may be easier to manufacture and implement to have a micro lenslet, ROE or DOE pattern that is uniform across the entire spectacle lens, however, there may be advantages in efficacy and wearability for non-uniform arrangements of micro lenslet, ROE or DOE arrays. The non-uniformity may relate to the fill ratio of the micro lenslet, ROE or DOE; the diameter of the micro lenslet, ROE or DOE, the radii or focal length of the micro lenslet, ROE or DOE; the refractive indices of the micro lenslet, ROE or DOE; or the spacing between the micro lenslets, ROE or DOE; or a combination thereof. In certain embodiments, the uniform arrangements of micro lenslet, DOE or ROE arrays may relate to the fill ratio, the lenslet/ROE/DOE diameter, radii or focal length, refractive indices or spacing, or a combination thereof.

In certain embodiments, a substantial portion of the micro lenslets making up the micro lenslet array may be understood to mean at least 20, 30, 40, 50, 60, 70 80, 90, 95 or 98% of the micro lenslets. In certain embodiments, a substantial portion of the micro lenslets making up the micro lenslet array may be understood to mean between 20 and 80%, 20 and 60%, 30 and 80%, 40 and 90%, 50 and 99%, between 60 and 70%, between 80 to 95%, between 85 to 98% or between 60 to 80% of the micro lenslets.

In certain embodiments, a substantial portion of the ROEs or DOEs making up the ROE or DOE array may be understood to mean at least 20, 30, 40, 50, 60, 70 80, 90, 95 or 98% of the ROEs or DOEs. In certain embodiments, a substantial portion of the ROEs or DOEs making up the ROE or DOE array may be understood to mean between 20 and 80%, 20 and 60%, 30 and 80%, 40 and 90%, 50 and 99%, between 60 and 70%, between 80 to 95%, between 85 to 98% or between 60 to 80% of the ROEs and DOEs.

In certain embodiments, the micro lenslet, ROE or DOE array is located, formed, placed or combinations thereof on the anterior surface, posterior surface, embedded in the lens matrix or combinations thereof. In certain other embodiments, the micro lenslet, ROE or DOE array is located, formed, placed or combinations thereof on one of the two surfaces of an ophthalmic lens and the other surface may have other features for further reducing eye growth including but not limited to one of more of reduction of peripheral hyperopic defocus, inducing myopic defocus, reducing accommodative lag or combination thereof. In certain other embodiments, the micro lenslet, ROE or DOE array is located, formed, placed or combinations thereof on one of the two surfaces of an ophthalmic lens and the other surface has relative hyperopia incorporated in the surface profile to further reduce eye growth.

In certain embodiments, the micro lenslet, ROE or DOE array is located, formed, placed or combinations thereof on the anterior surface, posterior surface, embedded in the lens matrix or combinations thereof. In other embodiments, the micro lenslet, ROE or DOE array is located in certain regions of the anterior surface or posterior surface or embedded in the lens matrix and the other regions of the anterior surface or posterior surface or lens matrix devoted to features for producing myopic defocus.

EXAMPLES

Example 1: Three Layer Micro Lenslet Array

Figure 1A:
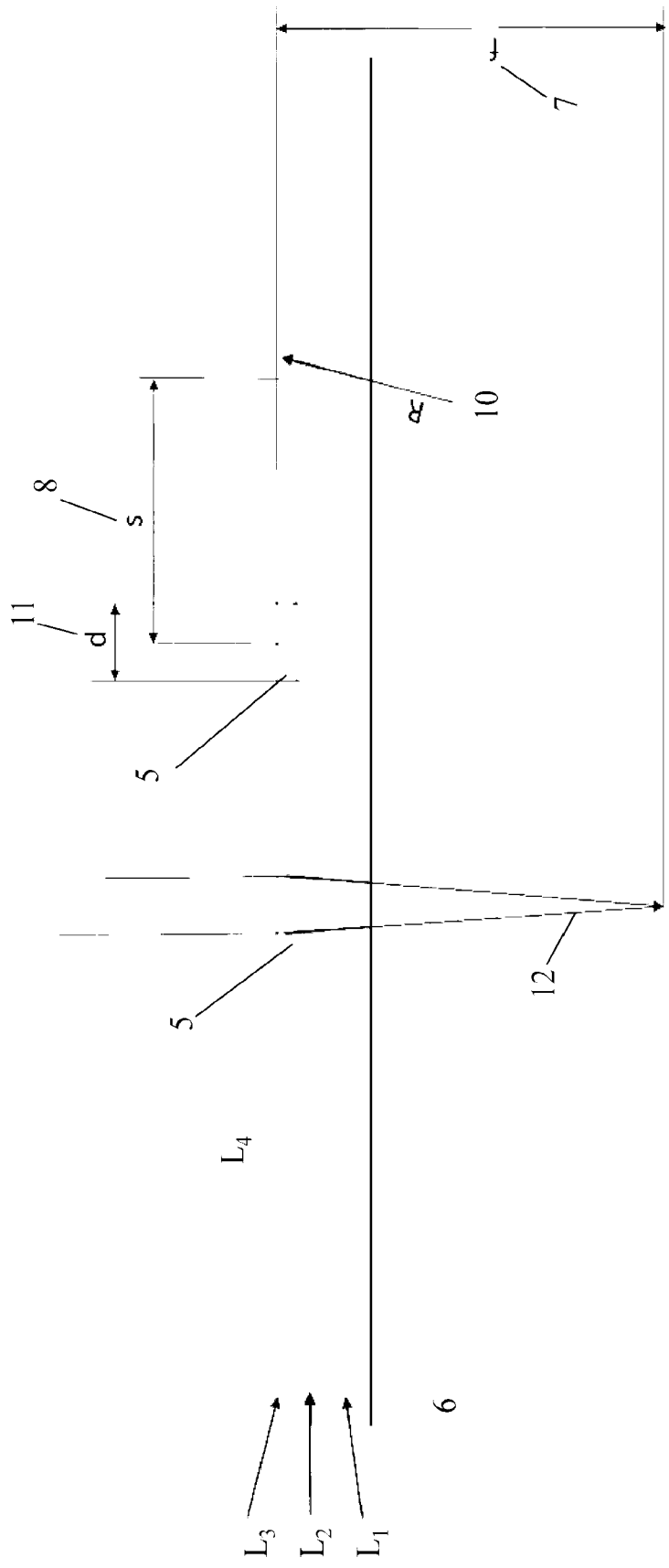
FIG. 1A is a schematic side view drawing of a three layer lenslet array constituting refractive optical elements (ROEs) according to certain embodiments.
Figure 1B:
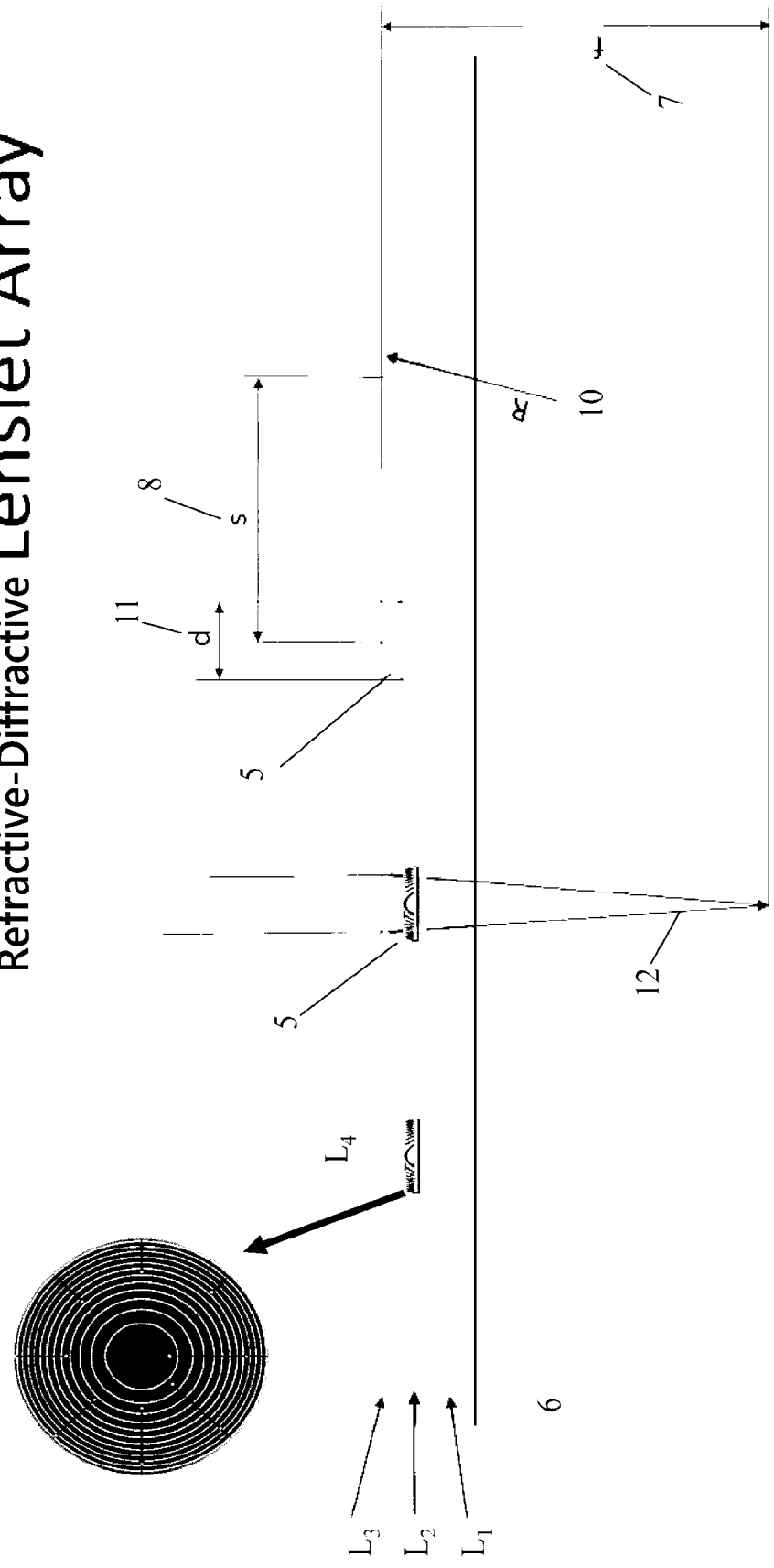
FIG. 1B is a schematic side view drawing of a three layer lenslet array constituting ROEs and diffractive optical elements (DOEs) according to certain embodiments.

FIG. 1 shows an exemplary embodiment of a multi-layer micro lenslet array in a side view, not to scale. The $L_1$ layer is a transparent foil that acts as substrate for the micro lenslet array. The foil is a plastic polymer, however, other appropriate materials may be used. In this example, the $L_2$ layer contains a number of micro lenslets which are shown in side view in FIG. 1 as small surface elevations 5 on the surface of the layer $L_2$, In this example, the diameter (d) or 11 is approximately 0.1 mm for each micro lenslet. The focal path of the light entering the micro lenslet array is exemplified in 12 in FIG. 1. The material used in the $L_2$ layer is another plastic polymer, however, other suitable materials may be used. In this example the Fill Ratio in the $L_2$ layer is approximately 10%. The $L_3$ layer is a protective layer that covers the $L_2$ layer. The material used in the $L_3$ layer is a plastic adhesive, however, other suitable materials may be used. The $L_4$ layer in FIG. 1 is the air located above the micro lenslet array. Also shown in FIG. 1 is an optional transparent adhesive 6 that may be used to attach the micro lenslet array to another surface such as the surface of a spectacle lens.

In this example the inter-lenslet spacing (s) or 8 is approximately 0.3 mm and is the distance between the individual micro lenslets as measured from the center of each of the lenslets. The Focal Length f or 7 is between 300 to 500 mm. The Radius of Curvature ($R_l$) or 10 is approximately 1 mm for each of the micro lenslets in this example.

In this example, the refractive index values for $L_2$ is higher than that of $L_3$. The refractive index value for $L_2$ in this example is between is between 1.3 and 1.7.

Example 2: Three Layer Micro Lenslet Array

FIG. 2 shows an exemplary embodiment of a multi-layer micro lenslet array in a side view. In this example, the micro lenslets are found on the surface of two separate layers in the micro lenslet array. The $L_{13}$ layer is a transparent foil that acts as substrate for the micro lenslet array and it also contains a portion of the micro lenslet 18 which are shown in side view in FIG. 2 as small surface elevations 18 in this example. The foil is a plastic adhesive. In this example, the $L_{14}$ layer contains a number of micro lenslets 17, concentric with micro lenslets 18, which are shown in side view in FIG. 2 as small bumps 17 on the surface of the layer $L_{14}$. In this example, the diameter (d) or 19 is approximately 0.1 mm for each lenslet. The focal path of the light entering the micro lenslet array is exemplified in 20 in FIG. 2. The material used in the $L_{14}$ layer is plastic polymer, however, other suitable materials may be used. In this example the Fill Ratio in the $L_{14}$ layer is approximately 10%. The $L_{15}$ layer is a protective layer that covers the $L_{14}$ layer. The material used in the $L_{15}$ layer is another plastic adhesive. The $L_{16}$ layer in FIG. 2 is the air located above the micro lenslet array. Also shown in FIG. 2 is an optional transparent adhesive 21 that may be used to attach the micro lenslet array to another surface such as the surface of a spectacle lens.

In this example the spacing (s) or 22 is approximately 0.3 mm and is the distance between individual micro lenslets as measured from the center of each of the lenslets. The Focal Length f or 22 is between 300 to 500 mm. In this micro lenslet array there are two Radii of Curvatures $R_1$ ($R_1$) and $R_2$ ($R_1$). $R_1$ or 23 is the Radius of Curvature in the layer $L_{13}$ is approximately 1.1 mm for each of the micro lenslets in this layer in this example. $R_2$ or 24 is the Radius of Curvature in the layer $L_{14}$ is approximately 1 mm for each of the micro lenslets this layer and in this example. In this example, the refractive index values for Lia is higher than for $L_{14}$ and $L_{14}$ is higher than $L_{15}$. This configuration is less sensitive to small variations in refractive indices or radii of curvatures, allowing greater ease of manufacturing while still providing accurate focal length of the lenslets.

Example 3: Two Layer Micro Lenslet Array

FIGS. 3A to 3E illustrate non-limiting exemplary embodiments of micro lenslet arrays in side views with respect to a spectacle lens system. There are many other suitable implementations of using micro lenslets on spectacle lenses that are not shown in FIGS. 3A-E that would be apparent to those of ordinary skill in the art. The geometry of the micro lenslets may depend on a number of factors, including but not limited to: refractive index of the substrate layers, diameter, radius of curvature, effective focal length of individual lenslets, inter-lenslet spacing or combinations thereof.

Figure 3A:
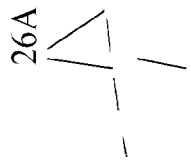
FIG. 3A is a schematic side view of a spectacle lens with lenslets made of ROEs according to certain embodiments.

FIG. 3A illustrates a spectacle lens system wherein the convex shaped micro lenslets are molded directly into the spectacle lens, either on the anterior or posterior surface. FIG. 3A illustrates micro lenslets 26 that are mold on the anterior portion of the spectacle lens 25. The area closer to the eye is 27 and the area exterior to the spectacle lens is 28. Micro lenslets mold on the posterior surface of the spectacle lens are not shown in FIG. 3A, however, such a design is contemplated in the present disclosure.

Figure 3B:
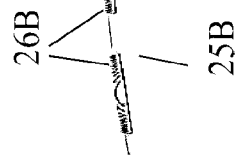
FIG. 3B is a schematic side view of a spectacle lens with lenslets made of DOEs according to certain embodiments.

FIG. 3B illustrates a spectacle lens system wherein the convex shaped micro lenslets 31 are molded directly into the spectacle lens 32, as a doublet with the micro lenslets 31 in between the two lens halves (or portions) 29 and 30. In this example, the two halves (or portions) 29 and 30 have different refractive indexes. FIG. 3B illustrates micro lenslets 31 that are mold on the anterior portion of the lens half (or portion) 29 of the spectacle lens 32.

Figure 3C:
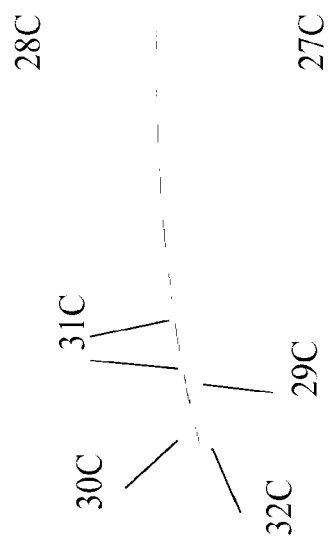
FIG. 3C is a schematic side view of a spectacle lens with lenslets made of ROEs according to certain embodiments.

FIG. 3C illustrates a spectacle lens system in side view wherein the spectacle lens 35 prior to the addition of the material that forms the micro lenslets have molded or machined concave dips 34 on the anterior surface of the spectacle lens 35. In order to manufacture the spectacle lens 32, the concave dips are filled with a material with a different refractive index from the refractive index of the material of the spectacle lens in order to form the micro lenslets 33. The present disclosure also contemplates a spectacle lens where convex dips are molded or machined on the posterior surface of the spectacle lens and these convex dips are filled with a material of a different refractive index from the refractive index of the material of the spectacle lens in order to form the lenslets. This embodiment is not shown in FIG. 3C. The present disclosure also contemplates a spectacle lens where concave dips are molded or machined on the anterior surface of the spectacle lens and where convex dips are molded or machined on the posterior surface of the spectacle lens. The dips on both sides of the spectacle lens are filed with materials in order to create the micro lenslets and the spectacle lens. The material used to fill the dips may have substantially the same refractive index or different refractive indexes. However, the refractive index of the material (or materials) used to fill the dips will typically be different from the refractive index of the spectacle lens material. This embodiment is not shown in FIG. 3C. The dips may be formed using a number of suitable techniques, for example, molding, photochemical processes, embossing, electro discharge manufacturing or combinations thereof.

Figure 3D:
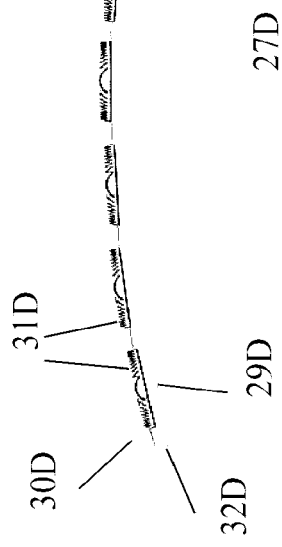
FIG. 3D is a schematic side view of a spectacle lens with lenslets made of DOEs according to certain embodiments.

FIG. 3D illustrates a spectacle lens system wherein the convex shaped micro lenslets 36 are printed onto the spectacle lens 37 in order to form the spectacle lens 38, either on the anterior or posterior surface. FIG. 3D illustrates micro lenslets 36 that are printed on the anterior portion of the spectacle lens 37. Micro lenslets printed on the posterior surface of the spectacle lens are not shown in FIG. 3D, however, such a design is contemplated in the present disclosure. Micro lenslets printed on the posterior and the anterior surface of the spectacle lens are not shown in FIG. 3D, however, such a design is contemplated in the present disclosure. The printed micro lenslets will have a different refractive index from the spectacle lens 37.

Figure 3E:
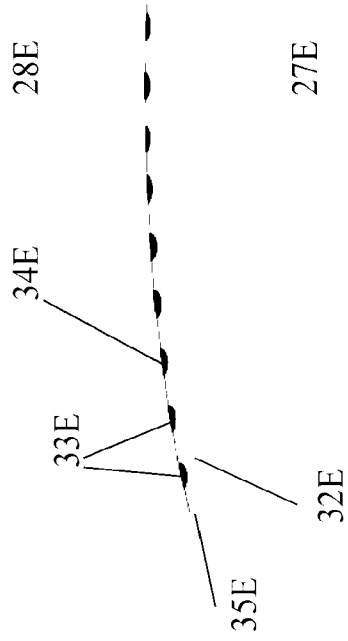
FIG. 3E is a schematic side view of a spectacle lens with lenslets made of ROEs according to certain embodiments.
Figure 3F:
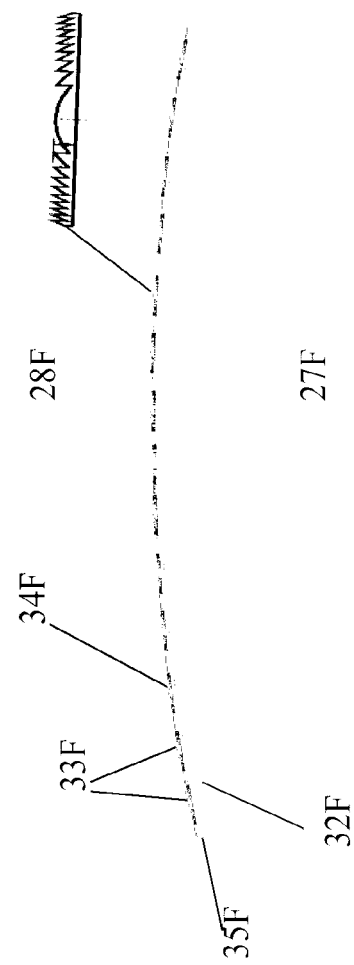
FIG. 3F is a schematic side view of a spectacle lens with lenslets made of DOEs according to certain embodiments.
Figure 3G:
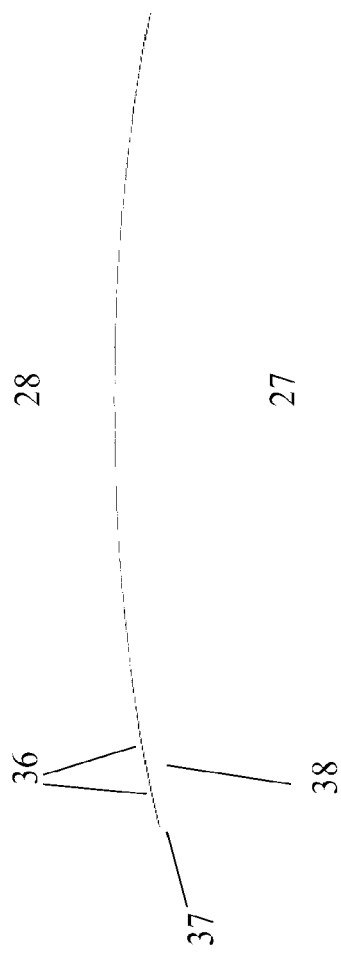
FIGS. 3G and 3H show a schematic side view of spectacle lenses with lenslets made of ROEs according to certain embodiments.
Figure 3H:
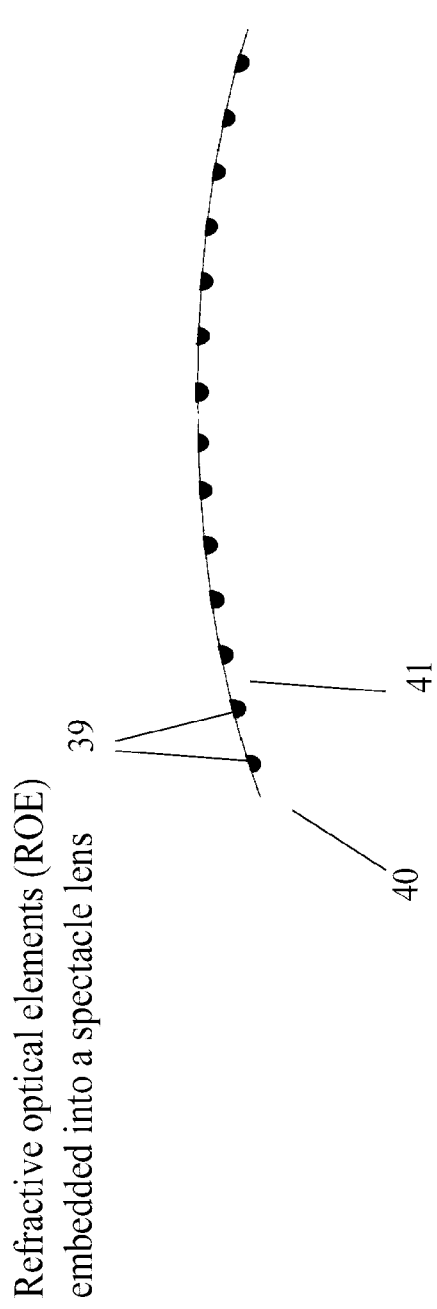

FIG. 3E illustrates a spectacle lens system wherein the concave shaped micro lenslet portions 39 are formed in the spectacle lens 40 by using a thermal and/or chemical process to locally alter the refractive index of the micro lenslet portions 39 in the blank 40 to form a spectacle lens 41, either on the anterior or posterior surface. This process will create local gradient index lenses to focus the light. FIG. 3E illustrates micro lenslet 39 that are formed by altering the refractive index on portions of the spectacle lens 40 in the anterior portion of the spectacle lens 40 to form a spectacle lens 41. Convex micro lenslet portion formed in the posterior portion of the spectacle lens to form a spectacle lens are not shown in FIG. 3E, however, such a design is contemplated in the present disclosure. The present disclosure also contemplates a spectacle lens where concave micro lenslet portions are formed in the anterior portion of the spectacle lens and where convex micro lenslet portions are formed on the posterior portion of the spectacle lens. The concave and convex micro lenslet portions are formed such that they have substantially the same refractive index or different refractive indexes; however, the index of refraction of concave and convex formed micro lenslet portions is typically going to be different from the index of refraction of the other areas of the spectacle lens not affected by the thermal and/or chemical process. This embodiment is not shown in FIG. 3E.

Example 4: Use of Micro Lenslet Array with Spectacles in Model Eye for Myopia

The following exemplary embodiment is directed to methods of modifying the incoming light through spectacle lens system that offer conflicting chromatic cues at the retinal plane of the corrected eye. This may be achieved by using a micro lenslet array system in conjunction with spectacle lenses used for correction of myopia. In short, the use of micro lenslet arrays, in conjunction with spectacle lenses, may be used to reduce the rate of myopia progression by introducing conflicting chromatic cues/signals at the retinal level. In certain embodiments, the use of micro lenslet arrays, in conjunction with spectacle lenses, may be used to reduce the rate of myopia progression by introducing a focal pattern on the retina of the wearer's eye that is spectrally and/or spatially variant (serving as a stop signal).

Introduction

Figure 18A:
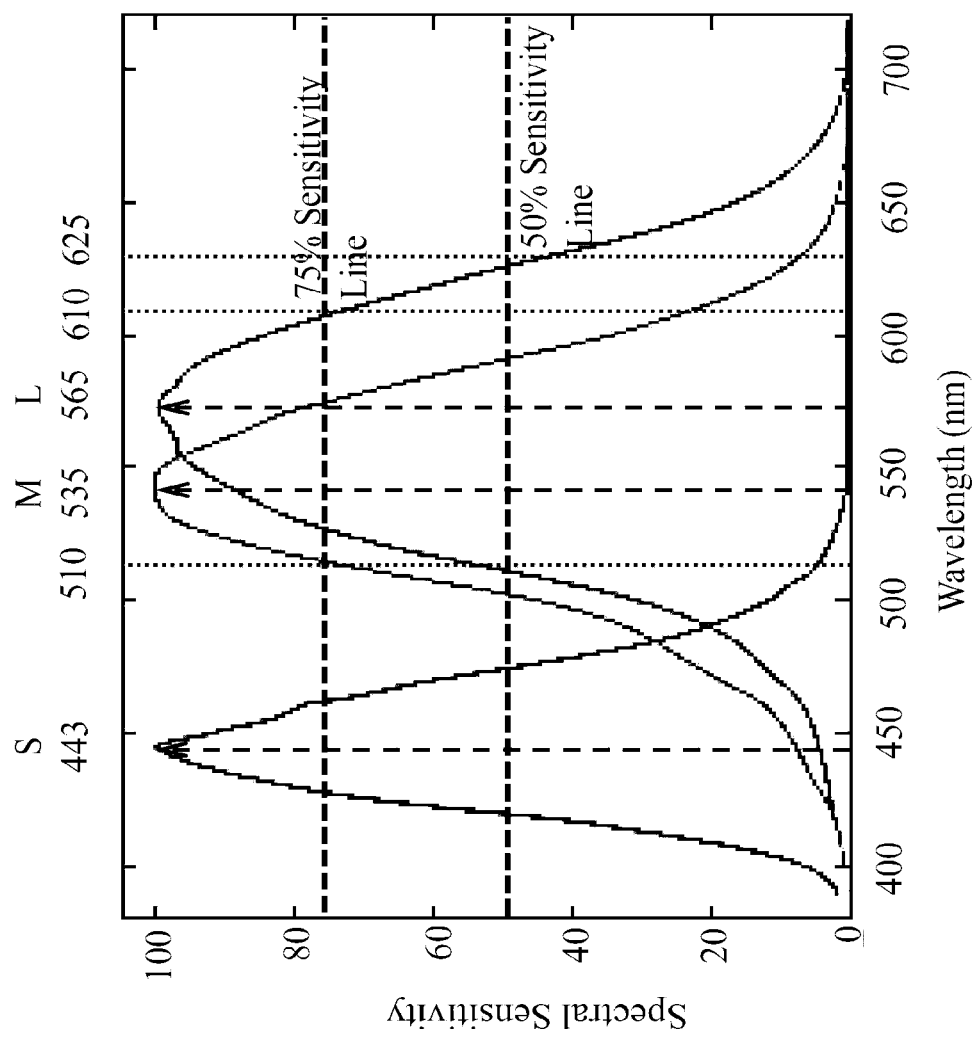
FIG. 18A illustrates the spectral sensitivity curves for short (S), medium (M) and long (L) sensitive photoreceptors of a human retina.
Figure 18B:
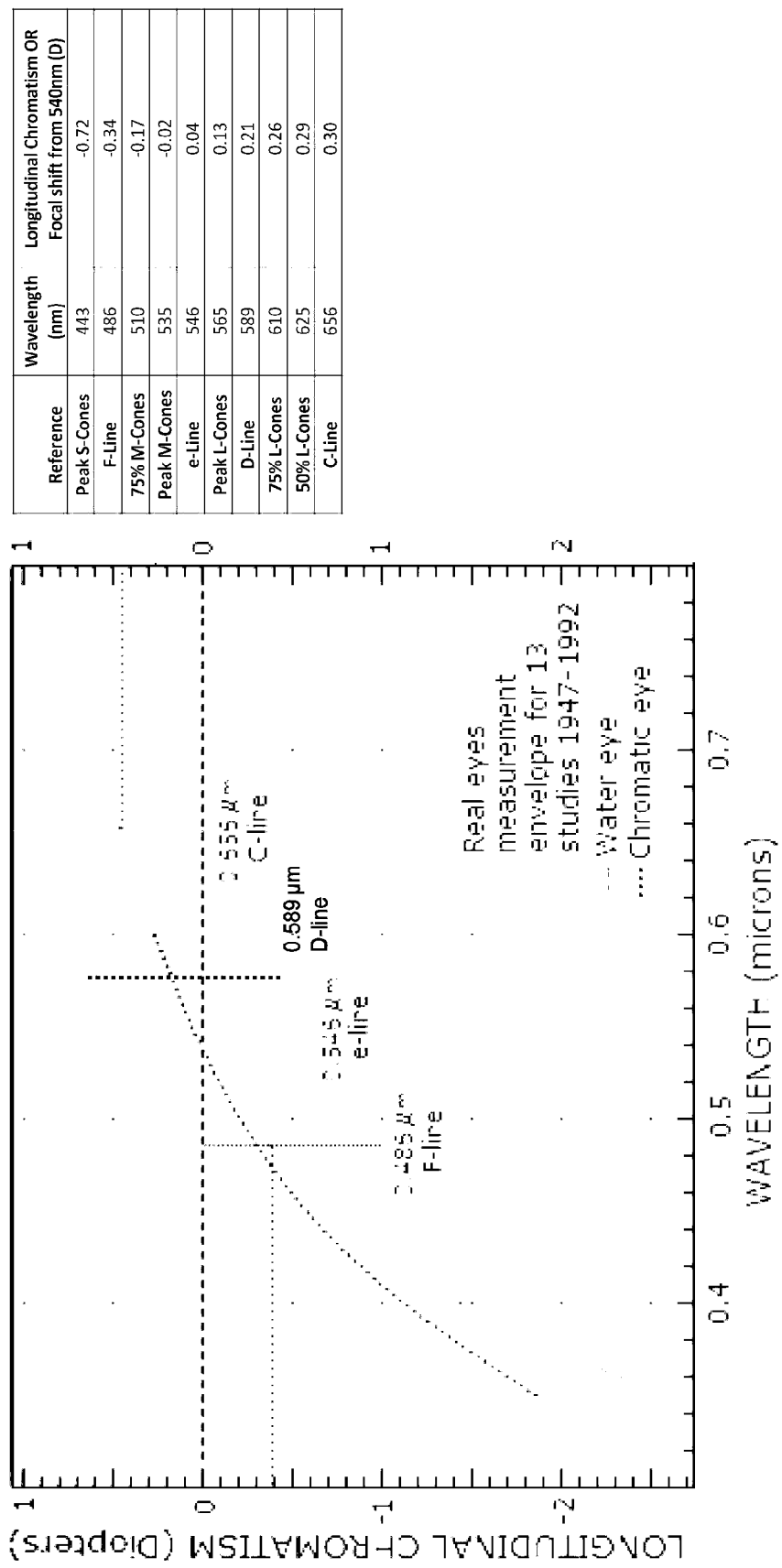
FIG. 18B illustrates the longitudinal chromatic aberration of a human eye. The longitudinal chromatism in Diopters is plotted as a continuous function of visible wavelengths. The figure also shows a table of focal shifts in Diopters for various reference points/wavelengths relevant to the human eye. The focal shift is calculated with respect to the 540 nm wavelength of light.

Photoreceptors contain chemicals that react when they are exposed to light. This causes an electrical signal, which is then sent to the brain along the optic nerve. Different types of photoreceptor allow us to see an enormous range of light intensities: twinkling stars to bright sunshine, and of course the colors of a rainbow. There are two basic types of photoreceptors in the human retina: rods and cones. The rods aid in visual detection, as they are most sensitive to light and dark changes, shape/morphology and movement. They contain only one type of light-sensitive pigment. There are around 120 million rods on the human retina. On the other hand, cones aid in colour vision and visual resolution. There are around 6 million cones on the human retina. The human retinal cones may be further classified into three types based, at least in part, on the sensitivity to the wavelength of incident light: namely, the S cones (short-wavelength sensitive), M cones (medium-wavelength sensitive) and L cones (long-wavelength sensitive). The S, M and L cones have peak sensitivities at approximately 444 nm, 535 nm and 565 nm, respectively, as exemplified in FIG. 18. The population of S cones in the human retina constitute about 5-10% of total cones. The remaining 90-95% of the cones are either M or L types. There are approximately 2 to 3 times more L cones than M cones. The S cones are different from the L and M cones. The S cone's sensitivity curve (which peaks at approximately 430-435 nm) is different from the sensitivity curves of the M and L cones. The sensitivity curves of M and L type cones are quite similar (in other words, they overlap over a wide range of the visible wavelengths) with their peaks being close to each other, at approximately 530 to 535 nm, and approximately 555 to 560 nm, respectively. A wavelength of 555 nm is often used to derive ocular refraction status for modelling purposes, as this falls at the intersection of L and M cone sensitivity curves. The geographical distribution of rods and cones on the retina is known. Rods are concentrated in the peripheral retina, while the cones are dense in the macular region. The S cones are typically absent in the foveal region. Peripheral retina is relatively cone free, on the other hand, the macular area is typically completely rod free.

Figure 4:
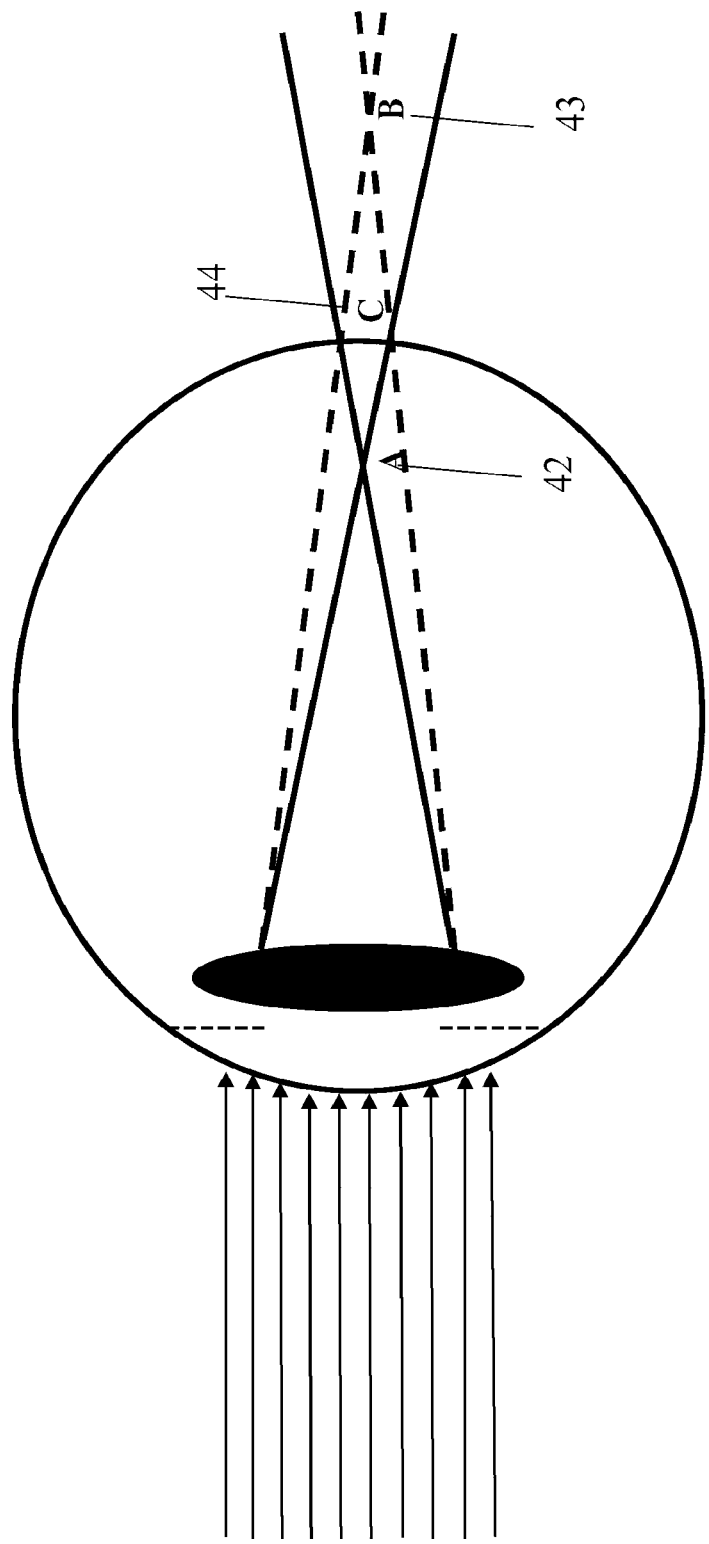
FIG. 4 illustrates monochromatic light entering an emmetropic eye imposed with equal or substantially magnitudes of positive or negative defocus.

In a monochromatic world (FIG. 4), an emmetropic eye imposed with equal (or substantially equal) magnitudes of positive or negative defocus, results in a myopic defocus 42 and hyperopic defocus 43, on the retina, respectively. In both instances, the intensity of blur produced at the retina 44 is substantially indistinguishable from each other, provided the considered emmetropic eye has no other higher order perturbations or aberrations. In other words, the eye cannot decode, if the blur on retina 44 is resulting from myopic defocus 42 (solid line) or hyperopic defocus 43 (dotted line). However, the real world is polychromatic in nature and the wavelengths of visible light we routinely perceive ranges from 420 nm to 700 nm.

Assume an emmetropic human eye, which is defined for an arbitrary wavelength, for example 555 nm, that is approximately halfway in the visible spectrum (420 nm to 700 nm). The same eye would be relatively more hyperopic for long-wavelength light (for example 610 nm) and more myopic for medium-wavelength light (for example 510 nm). The arbitrary wavelength examples representing the medium and long-wavelengths (510 nm and 610 nm) are at 75% of the peak sensitivity of medium and long-wavelength cones. Recent research supports the argument that the ocular system uses chromatic signals from the longitudinal chromatic aberration to decode the sign of defocus to guide the emmetropization process.

Figure 5:
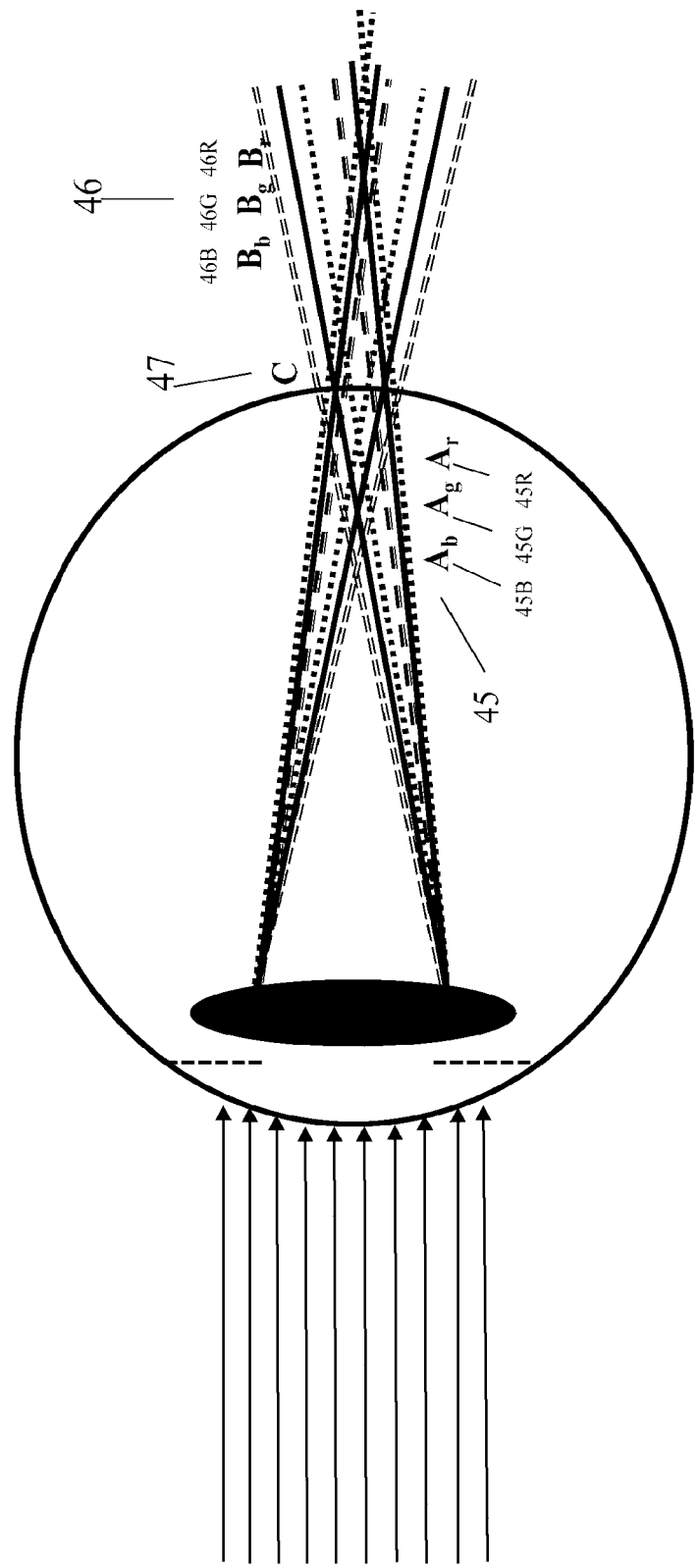
FIG. 5 illustrates polychromatic light entering an emmetropic eye imposed with equal or substantially equal magnitudes of positive or negative defocus.

When an emmetropic eye imposed with equal (or substantially equal) magnitudes of positive or negative defocus in a polychromatic world, it produces a different scenario. As shown in FIG. 5, here, the incoming light signal is polychromatic, and hence the output pattern results in two chromatic conoids A (45) and B (46). In each of the conoids in this example, either A (45) or B (46), the foci for short, medium and long incident wavelengths form at $A_b$ (45B), $A_g$ (45G) and $A_r$ (45R); and $B_b$ (46B), $B_g$ (46G) and $B_r$ (46R); respectively. These multiple foci act as additional cues to the visual system. Now although the blur on the retina C (47) resulting from myopic and hyperopic defocus, $A_g$ (45G) and $B_g$ (46G) are no different (or substantially not different) from each other. The eye may decode the sign of defocus (i.e. differentiate between myopia and hyperopic defocus) by considering chromatic signals offered by $A_r$ (45R) and $B_r$ (46R) in conjunction with foci $A_b$ (45B) and $B_b$ (46B). The variants of the cones that have sensitivities to different wavelengths facilitate this process.

Certain embodiments of the present disclosure are directed to exploiting devices, methods and/or system that detect chromatic cues and produce conflicting signals at the retinal level, which in turn may aid to facilitate reduction in rate of change of eye growth in progressive myopia. Certain embodiments of the present disclosure are directed to devices, methods and/or systems that introduce contradictory optical signals to the neighboring M cone receptors at the retinal level, which play a crucial role in controlling the growth of a myopic eye. Certain other embodiments of the present disclosure are directed to devices, methods and/or systems that introduce conflicting optical signals to the neighboring L cone receptors at the retinal level that hold cues to the direction of eye growth. Certain other embodiments of the present disclosure are directed to devices, methods and/or systems that alter the longitudinal chromatic aberration across the wavelengths that correspond to approximately the peak sensitivities of the M and L cone receptors of the retina of the wearer. Certain embodiments are directed to exploiting devices and/or system that introduce a focal pattern on the retina of the wearer's eye that is spectrally and/or spatially variant (to serve as a stop signal for a progressing myopic eye).

Description of Model Eye Used for Simulation:

The prescription parameters of the eye model used for simulation of the results in this exemplary embodiment are provided in the below Table 1. These parameter values offer a −2 Diopter D myopic eye defined for a monochromatic wavelength of 555 nm.

TABLE 1

Parameter values of the −2D myopic model eye.

| SNo | Parameter Details | Parameter value |
| --- | --- | --- |
| 1 | Anterior Corneal Radius/Asphericity | 7.75 mm/−0.25 |
| 2 | Posterior Corneal Radius/Asphericity | 6.4 mm/−0.4 |
| 3 | Corneal Central Thickness/Refractive Index/Abbe number | 0.55 mm/1.376/50.2 |
| 4 | Anterior Chamber Depth/Aqueous Refractive Index/Abbe number | 3.45 mm/1.334/50.2 |
| 5 | Anterior Lens Radius/Asphericity | 10.8 mm/−4.5 |
| 6 | Posterior Lens Radius/Asphericity | −6.25 mm/−4.1 |
| 7 | Lens Central Thickness/Refractive Index of Lens/Abbe number | 3.80 mm/1.423/50.2 |
| 8 | Vitreous Depth/Refractive Index of Vitreous/Abbe number | 17.246 mm/1.334/50.2 |
| 9 | Retinal Radius/Asphericity | −12.8 mm/0.26 |
| 10 | Refractive state: Sphere/Cylinder/Axis at Pupil | −2 D/0 D/0 at 5 mm |

The parameter values described in Table 1 are by no means imperative to demonstrate the effect being described. This is just one of the many models that may use for simulation purposes. For example, in other exemplary embodiments, model eyes like Liou-Brennan, Escudero-Navarro, Atchison, etc. may be used instead of the above model eye. One may also alter the parameters of the cornea, lens, retina, ocular media, or combinations thereof, to aid simulation.

Results from the Model Eye Simulation

Figure 6A:
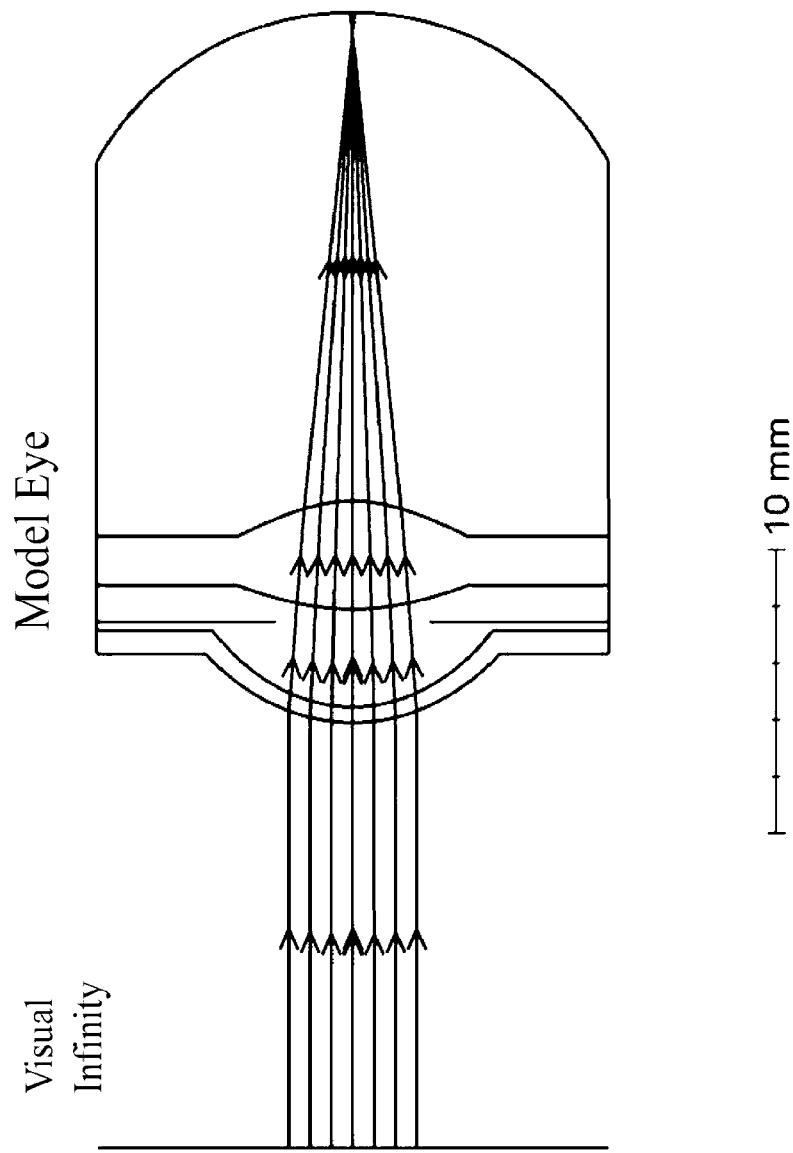
FIG. 6A is a schematic diagram representing an uncorrected 2 Diopter Myopic Model eye. The incoming, monochromatic (555 nm) light has a vergence of zero diopters.
Figure 6B:
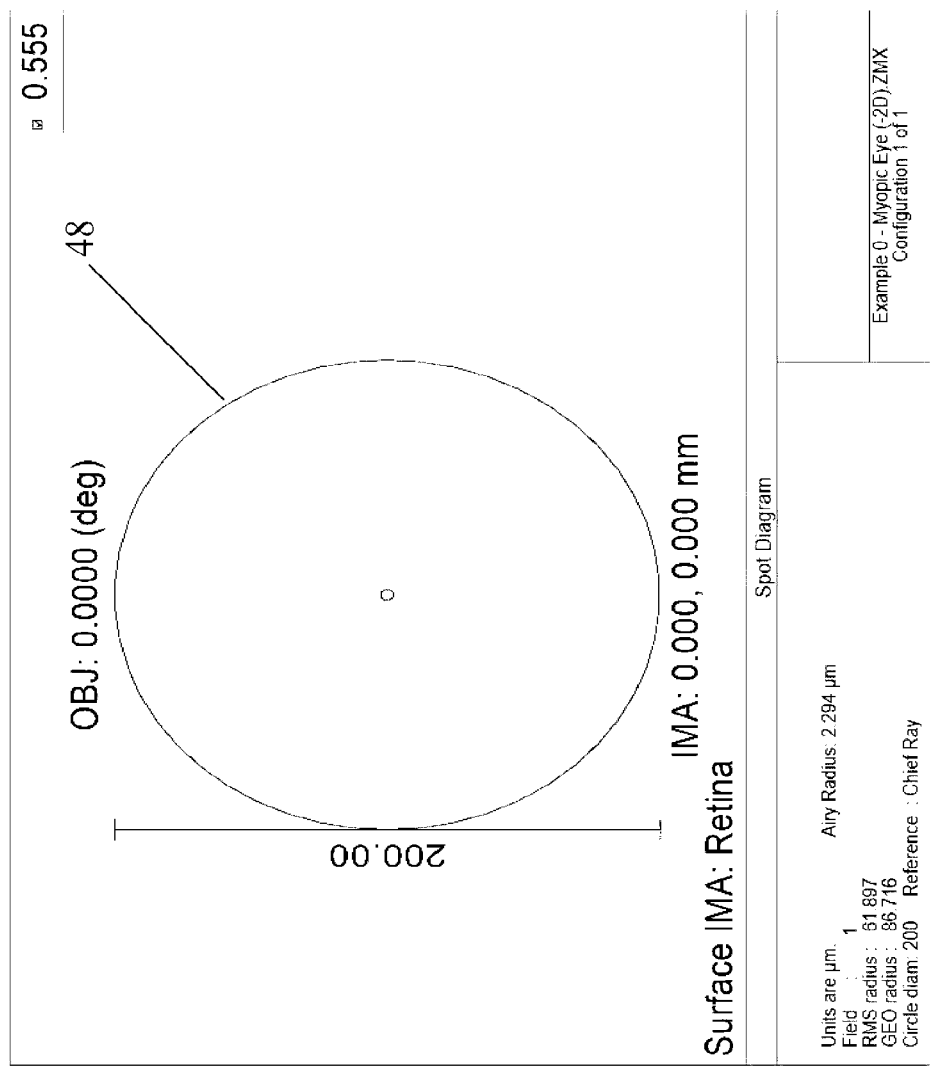
FIG. 6B illustrates the on-axis, geometric spot diagram analysis at the retinal plane, when the incoming, monochromatic (555 nm), light with a vergence of zero diopters is incident on an uncorrected, 2 Diopter Myopic Model eye.
Figure 7:
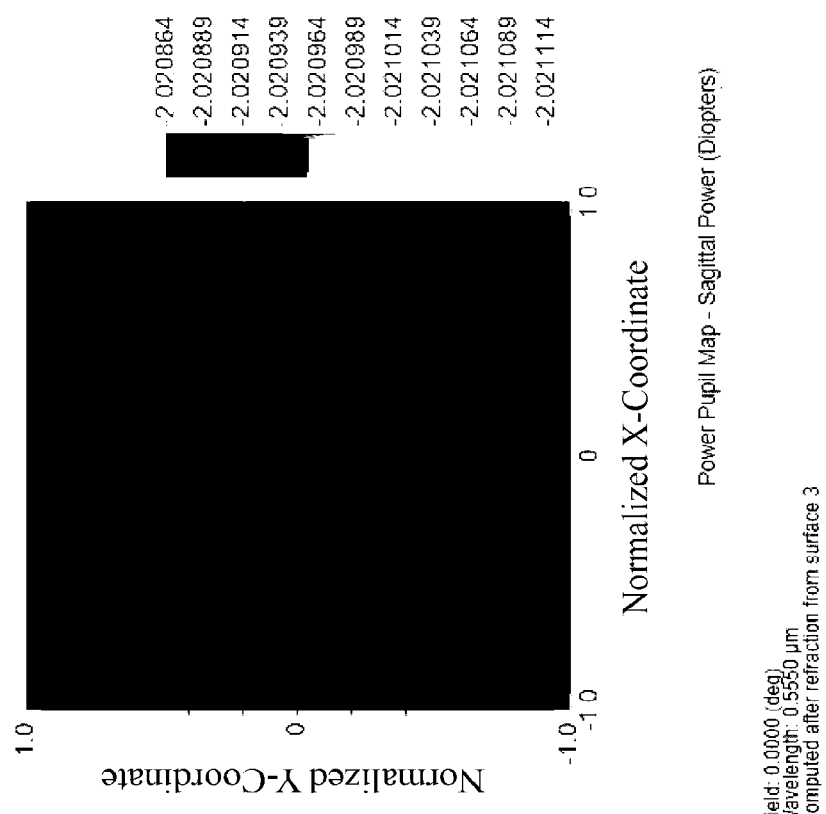
FIG. 7 shows a color coded, two-dimensional, sagittal power profile of a single vision spectacle with −2 Diopter power.
Figure 8A:
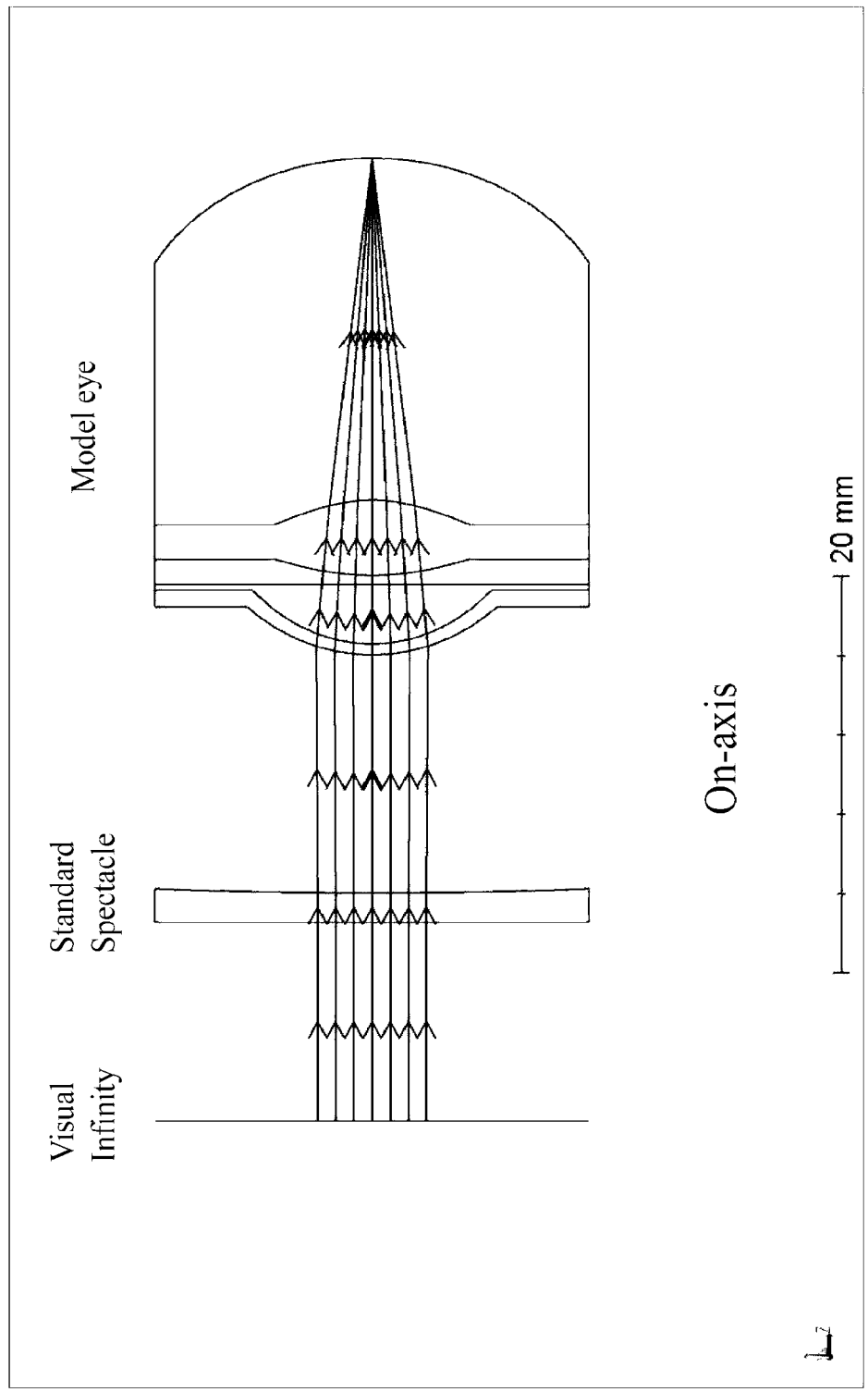
FIG. 8A is a schematic diagram representing a 2 Diopter Myopic Model eye that has been corrected with a spectacle lens described in FIG. 7. The incoming, monochromatic (555 nm) light has a vergence of zero diopters. The incoming beam is on-axis (0 degrees) or co-axial to the model eye.
Figure 8B:
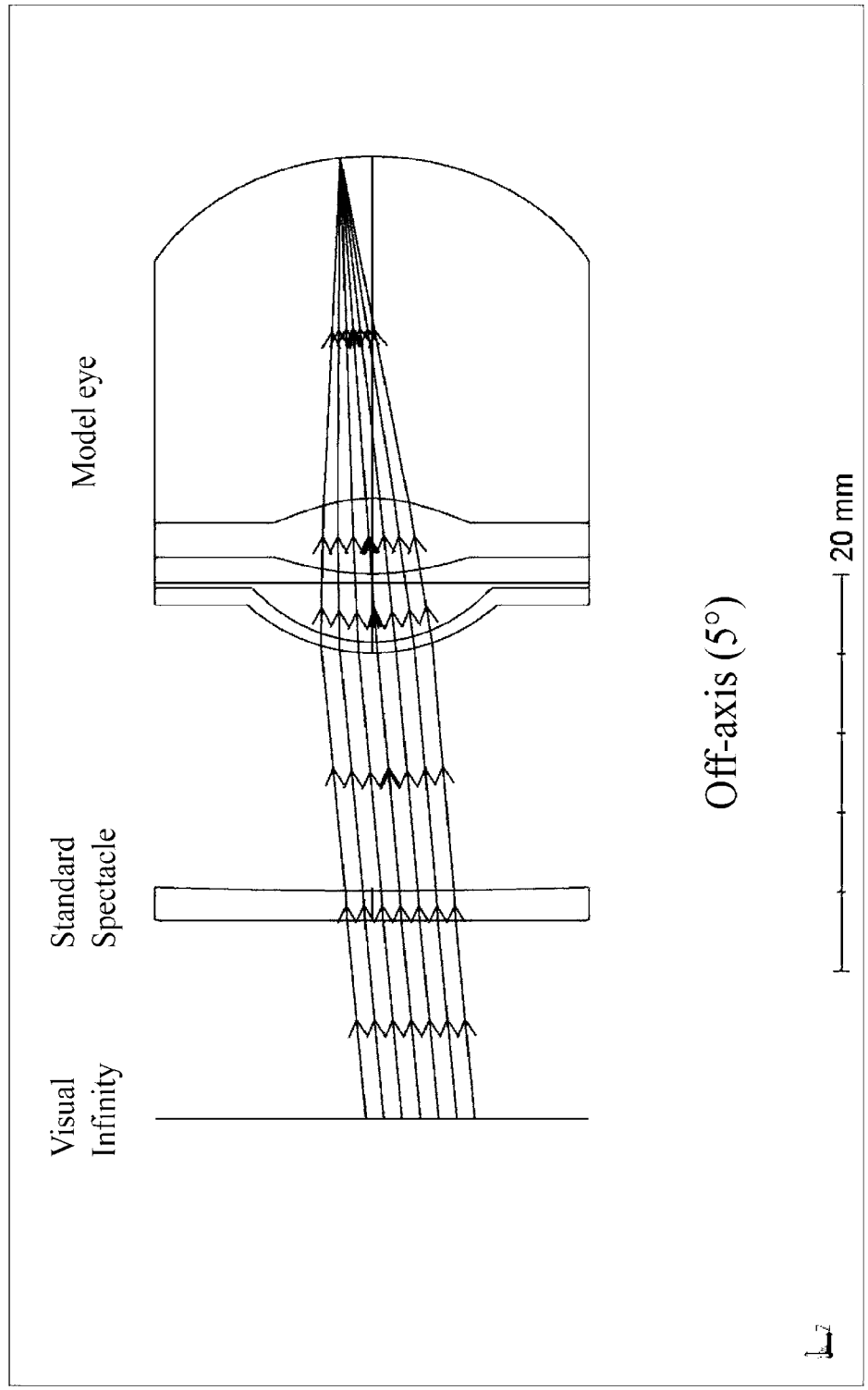
FIG. 8B is a schematic diagram representing a 2 Diopter Myopic Model eye that has been corrected with a spectacle lens described in FIG. 7. The incoming, monochromatic (555 nm) light has a vergence of zero diopters. The incoming beam is off-axis (5 degrees), a non-co-axial beam into the model eye.
Figure 8C:
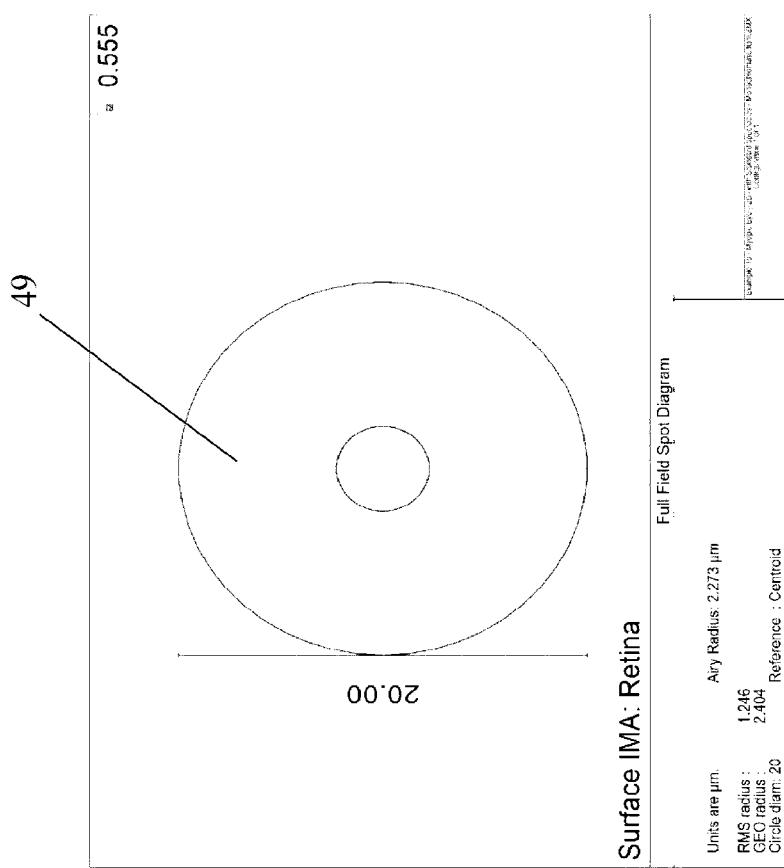
FIG. 8C illustrates the on-axis, geometric spot diagram analysis at the retinal plane, when the incoming, monochromatic (555 nm), light with a vergence of zero diopters is incident on a 2 Diopter Myopic Model eye that has been corrected with a spectacle lens, described in FIG. 7.
Figure 9:
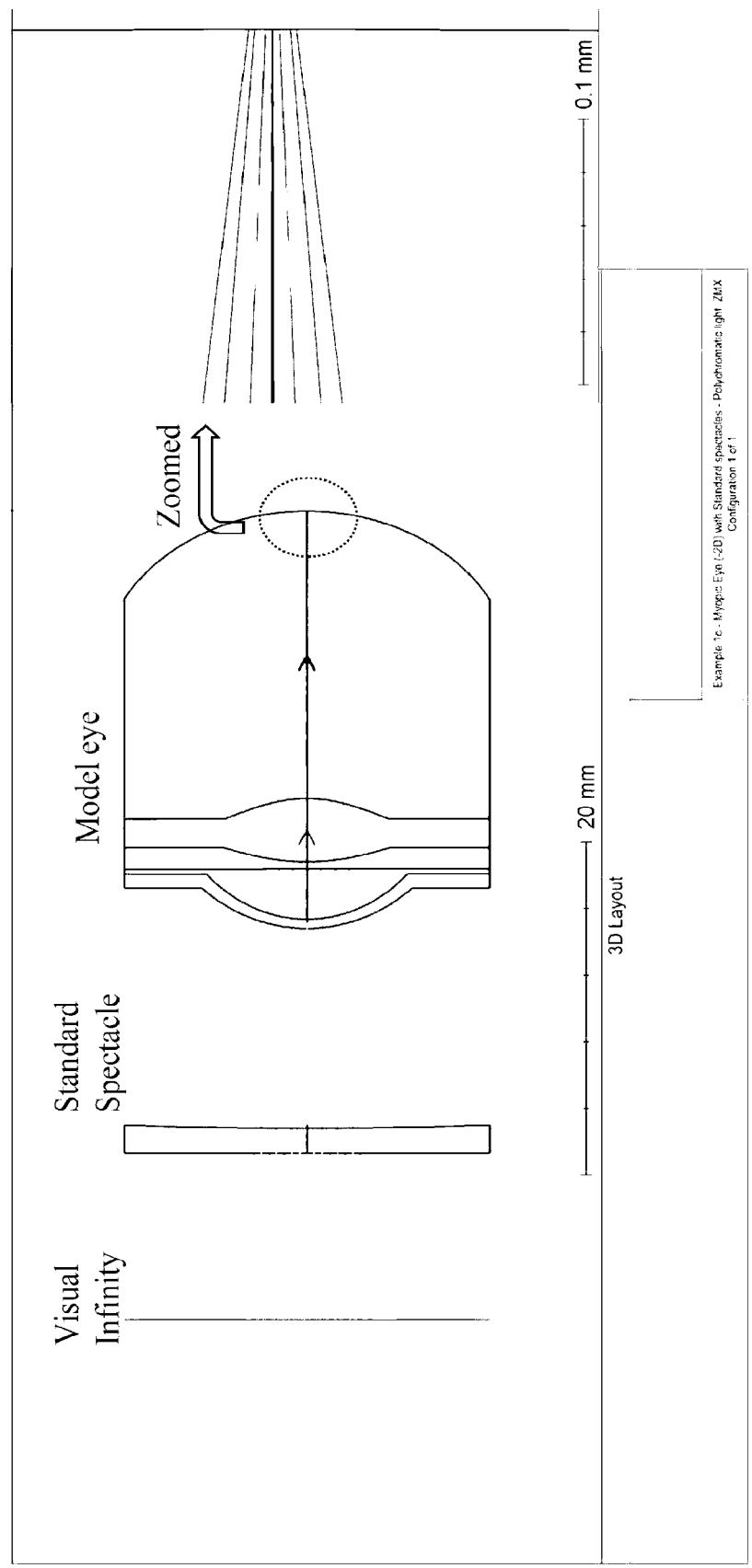
FIG. 9 is a schematic diagram representing a 2 Diopter Myopic Model eye that has been corrected with spectacle lens described in FIG. 7. The incoming polychromatic light has a vergence of zero diopters. However, for representation only two wavelengths (555 nm and 610 nm) are used. The zoomed in figure represents how the two wavelengths focus at different planes.
Figure 10A:
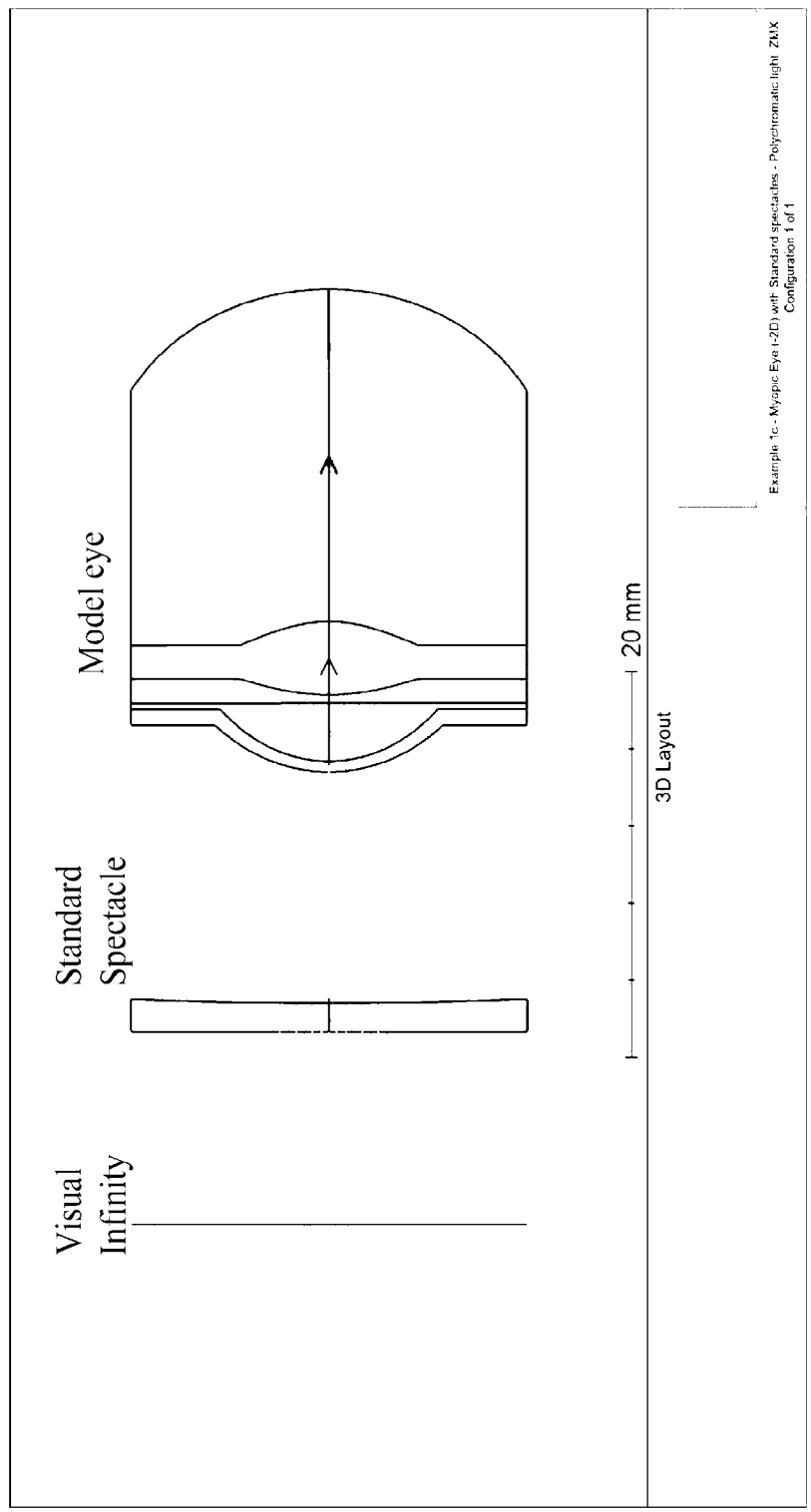
FIG. 10A is a schematic diagram representing a 2 Diopter Myopic Model eye that has been corrected with spectacle lens described in FIG. 7. The incoming polychromatic light has a vergence of zero diopters.
Figures 10B, 10C:
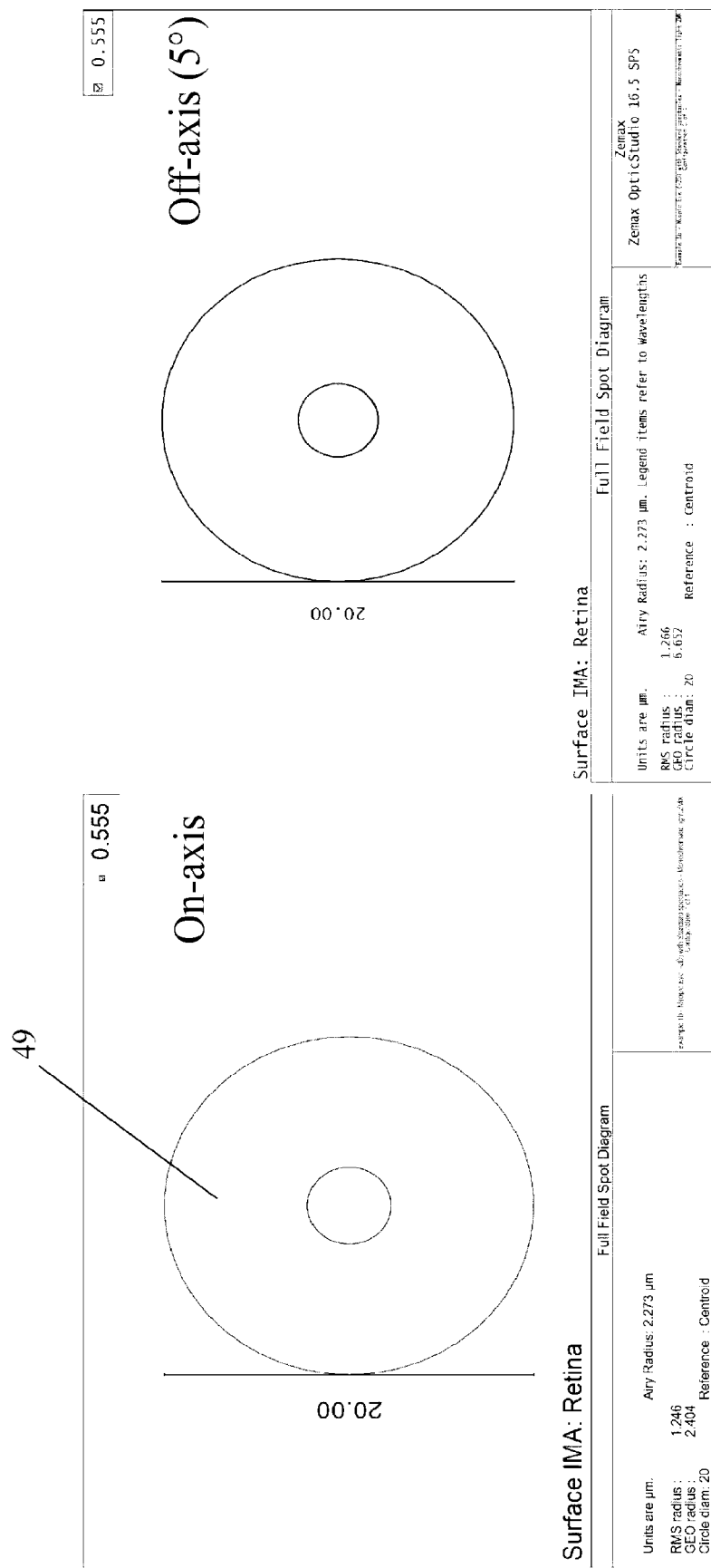
FIG. 10B shows additional data related to FIG. 10A. It illustrates the on-axis, geometric spot diagram analysis at the retinal plane, when the incoming light, with one of the two wavelengths of the polychromatic source (555 nm), with a vergence of zero diopters, is incident on a 2 Diopter Myopic Model eye that has been corrected with a spectacle lens, described in FIG. 7.
FIG. 10C shows additional data related to FIG. 10A. It illustrates the 5 degrees off-axis, geometric spot diagram analysis at the retinal plane, when the incoming light, with one of the two wavelengths of the polychromatic source (555 nm), with a vergence of zero diopters, is incident on a 2 Diopter Myopic Model eye that has been corrected with a spectacle lens, described in FIG. 7.
Figures 10D, 10E:
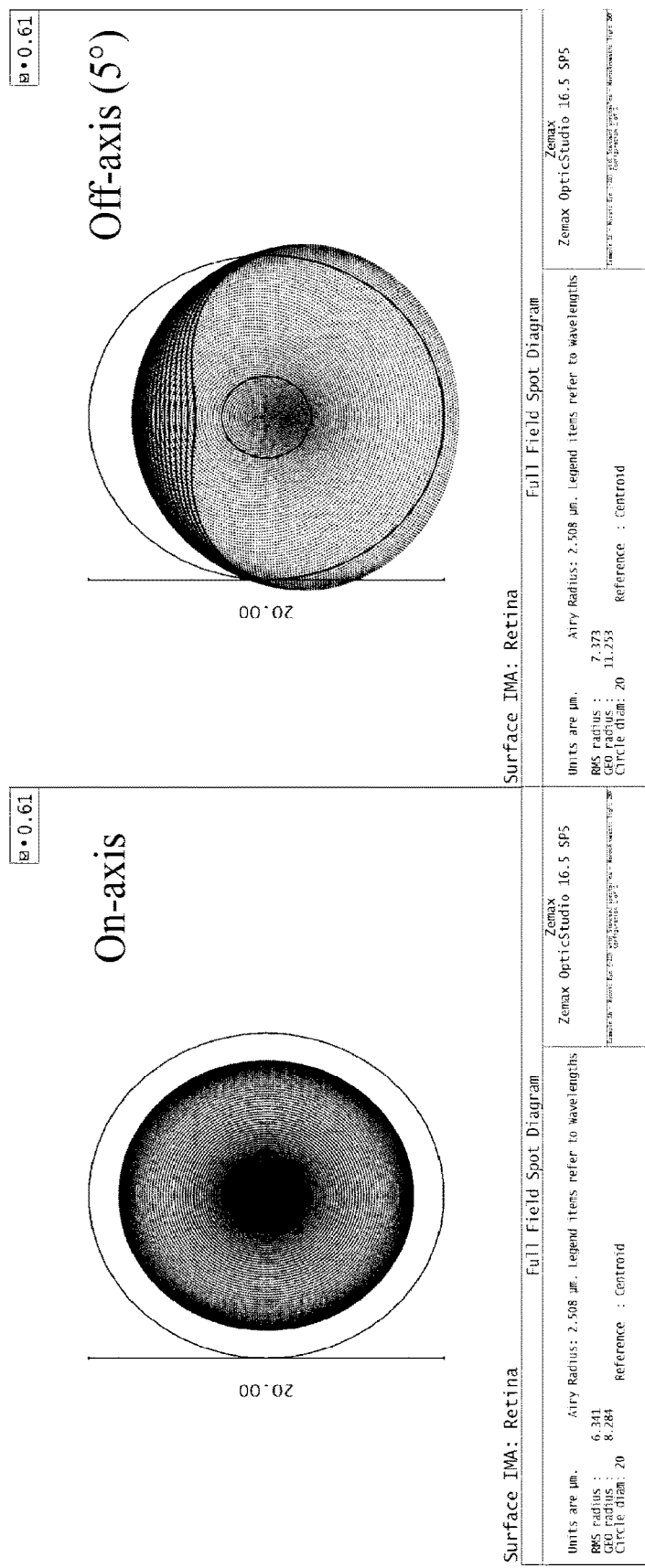
FIG. 10D shows additional data related to FIG. 10A. It illustrates the on-axis, geometric spot diagram analysis at the retinal plane, when the incoming light, with one of the two wavelengths of the polychromatic source (610 nm), with a vergence of zero diopters, is incident on a 2 Diopter Myopic Model eye that has been corrected with a spectacle lens, described in FIG. 7.
FIG. 10E shows additional data related to FIG. 10A. It illustrates the 5 degrees off-axis, geometric spot diagram analysis at the retinal plane, when the incoming light, with one of the two wavelengths of the polychromatic source (610 nm), with a vergence of zero diopters, is incident on a 2 Diopter Myopic Model eye that has been corrected with a spectacle lens, described in FIG. 7.
Figure 10F:
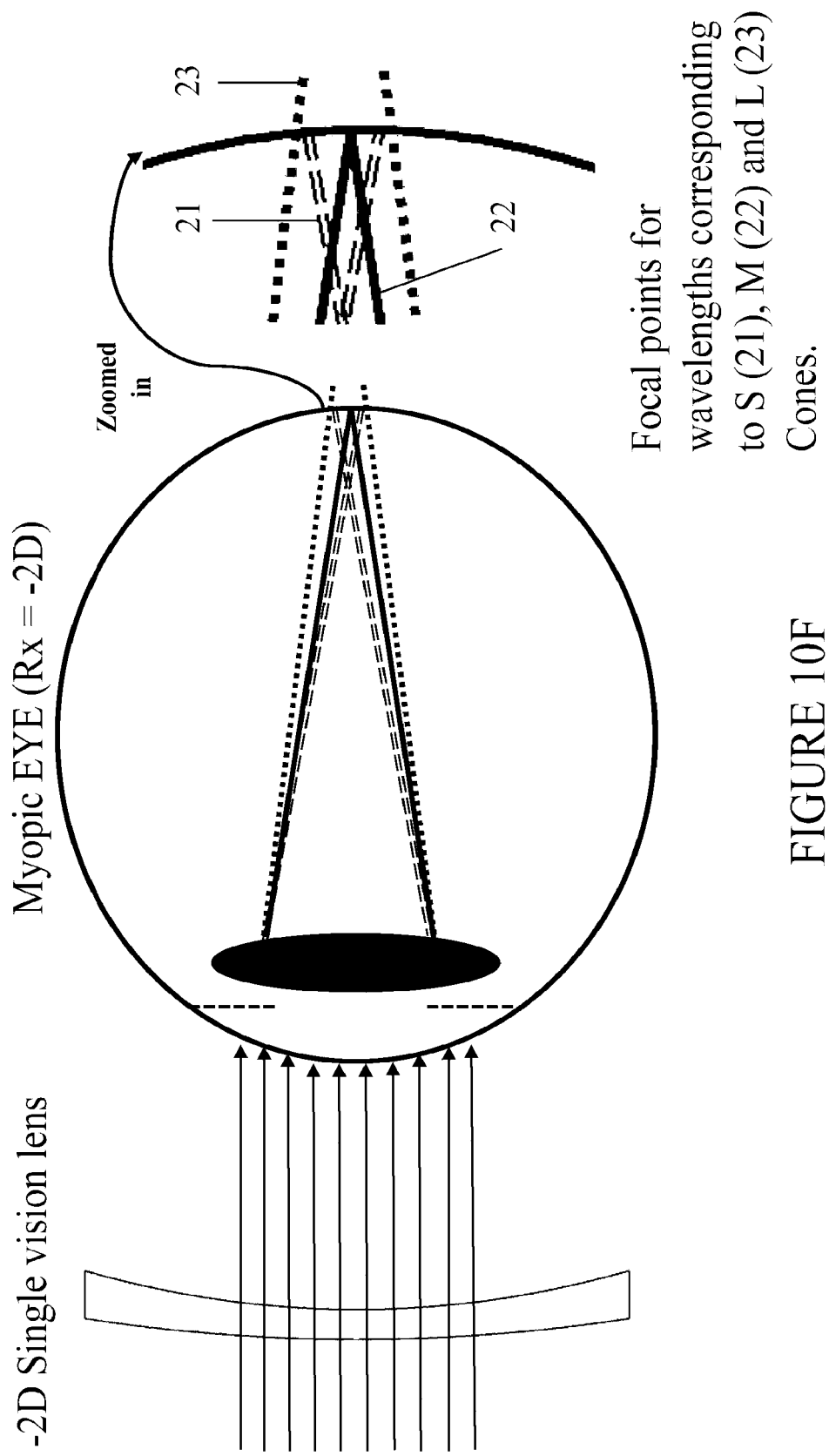
FIG. 10F shows a schematic representation where a simple myopic eye (Rx=−2D) is corrected with a single vision lens (Rx=−2D). The zoomed in part of the figure shows specific focal points for wavelengths corresponding to S, M and L cones.

FIG. 6A is a schematic diagram representing an uncorrected 2 Diopter Myopic Model eye. The incoming, monochromatic (555 nm) light has a vergence of zero diopters. FIG. 6B illustrates the on-axis, geometric spot diagram analysis at the retinal plane of the model described in FIG. 6A. As can be seen from FIG. 6B, the on-axis, geometric ray and spot analysis (48), on the uncorrected −2 Diopter myopic model eye shows that the retinal surface experiences myopic blur. This myopic blur may be corrected by using a single vision spectacle lens. For the simulation purpose, the spectacle lens with parameters described in Table 2 was used to correct the uncorrected −2 Diopter myopic model eye. FIG. 7 shows the two-dimensional power profile of a single vision spectacle, which indicates that the power distribution across the normalized coordinates is uniform (or substantially uniform) and has an approximate power of −2 Diopter. Following the correction of the −2 Diopter myopic model eye with the spectacle lens (FIG. 8A), the geometric and spot analysis was recomputed (FIG. 8B). As indicated, for monochromatic light (555 nm), the geometric blur (and FIG. 8B) has been reduced to small spot (49), whose size is comparable to the Airy disk. However, as seen in FIG. 9 and FIG. 10A, FIG. 10B and FIG. 10C, when the myopic model eye plus the single vision spectacle lens system encounters another wavelength (610 nm that corresponds to some of the L cones), the retina experiences hyperopic blur. While not wanting to be bound by a particular theory, the underlying hypothesis of this example (and certain embodiments) assumes that the L cones that detect the hyperopic blur resulting from a correction technique (in this example, a single vision correction) may trigger the grow signal, thus resulting in myopia progression. FIG. 10F is a schematic diagram representing a simple myopic eye (Rx=−2D) corrected with a single vision lens (Rx=−2D). The incoming polychromatic light is focused at the retinal level. The zoomed in part of the FIG. 10F shows specific focal points for the wavelengths of light that corresponds to S, M and L cones.

Figure 11A:
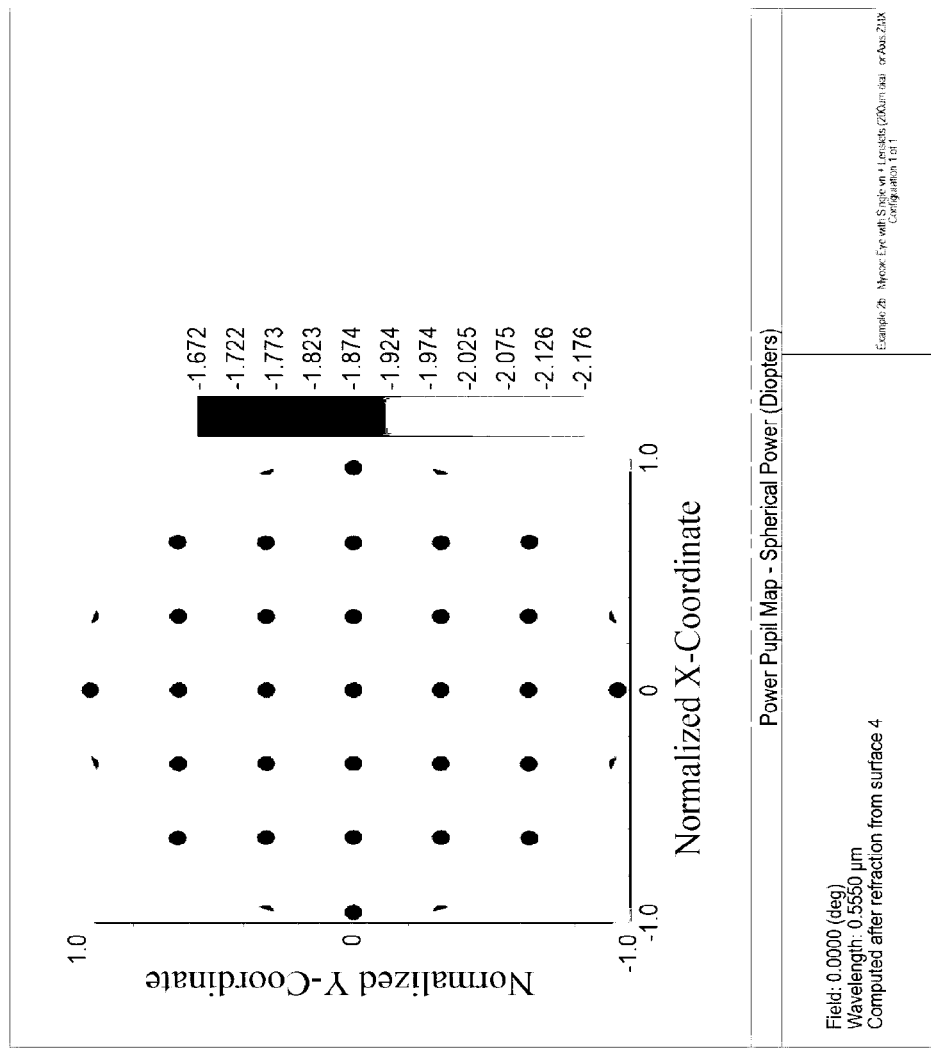
FIG. 11A illustrates a two-dimensional power profile a spectacle lens embedded with a micro lenslet array, according to certain embodiments. The power profile in this figure is described over normalized coordinates, over 5 mm optic zone diameter.
Figure 11B:
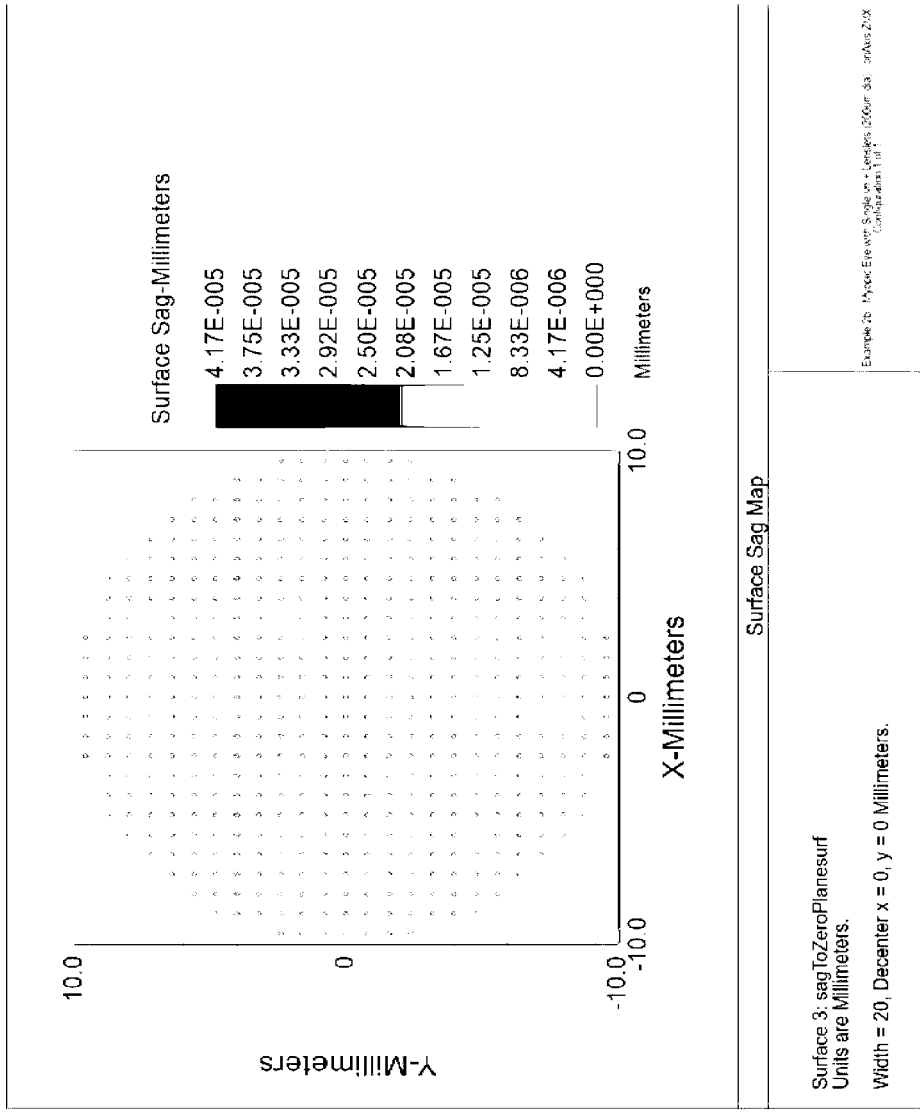
FIG. 11B illustrates a sag profile of a spectacle lens embedded with a micro lenslet array, according to certain embodiments. The Sag profile in this figure is described over the spectacle lens blank diameter of 25 mm.

As an alternative method of correction of the exemplary −2 Diopter myopic model eye. This exemplary embodiment describes use of a micro lenslet array in conjunction with a single vision spectacle lens (FIG. 11A and FIG. 11B). FIG. 11A illustrates a power profile of a −2 Diopter spectacle lens embedded with a micro lenslet array. The field coordinates of the exemplified power profile in FIG. 11A are normalized and they represent the −2 Diopter power distribution over a 5 mm zone diameter. FIG. 11B illustrates a sag profile of a −2 Diopter spectacle lens embedded with a micro lenslet array. The field coordinates of the exemplified sag profile in FIG. 11B are not normalized and they represent the two-dimensional sag distribution over a 20 mm zone diameter.

Figure 12A:
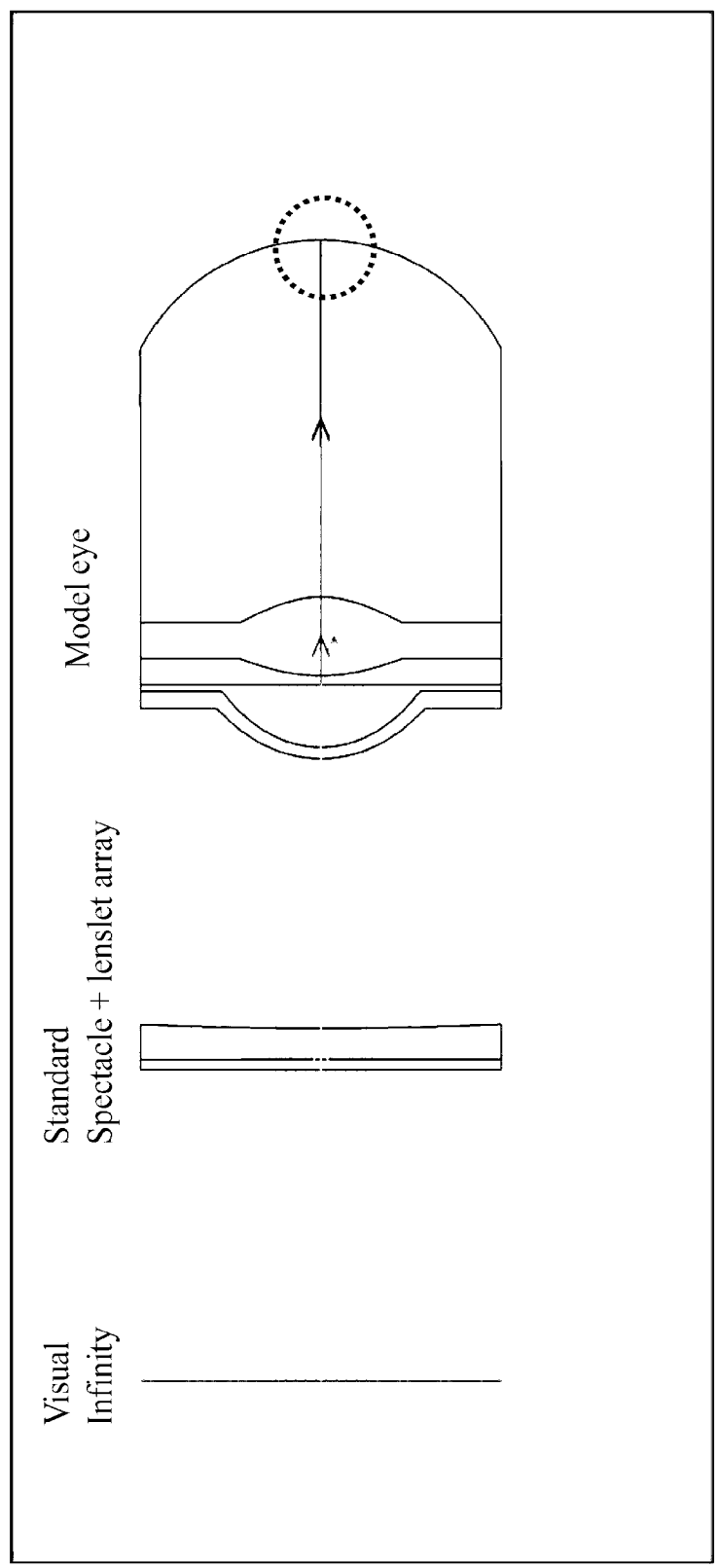
FIG. 12A is a schematic diagram representing a 2 Diopter Myopic Model eye that has been corrected with spectacles embedded with a micro lenslet array described in FIGS. 11A and 11A. The incoming polychromatic light has a vergence of zero diopters. However, for representation only two wavelengths (555 nm and 610 nm) are used.
Figure 12B:
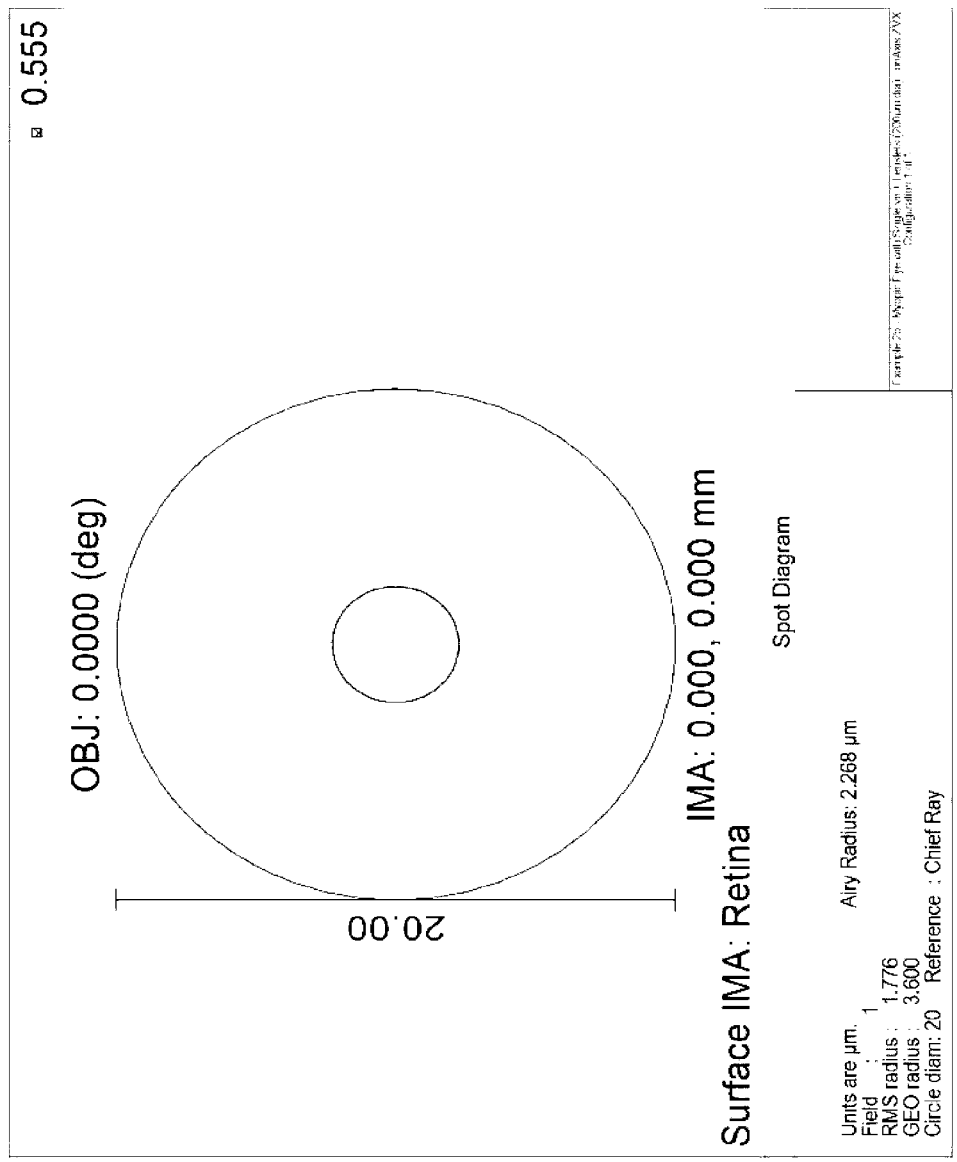
FIG. 12B shows additional data related to FIG. 12A. It illustrates the on-axis, geometric spot diagram analysis at the retinal plane, when the incoming light, with one of the two wavelengths of the polychromatic source (555 nm), with a vergence of zero diopters, is incident on a 2 Diopter Myopic Model eye that has been corrected with a spectacle lens embedded with a micro lenslet array, described in FIGS. 11A and 11B.
Figure 12C:
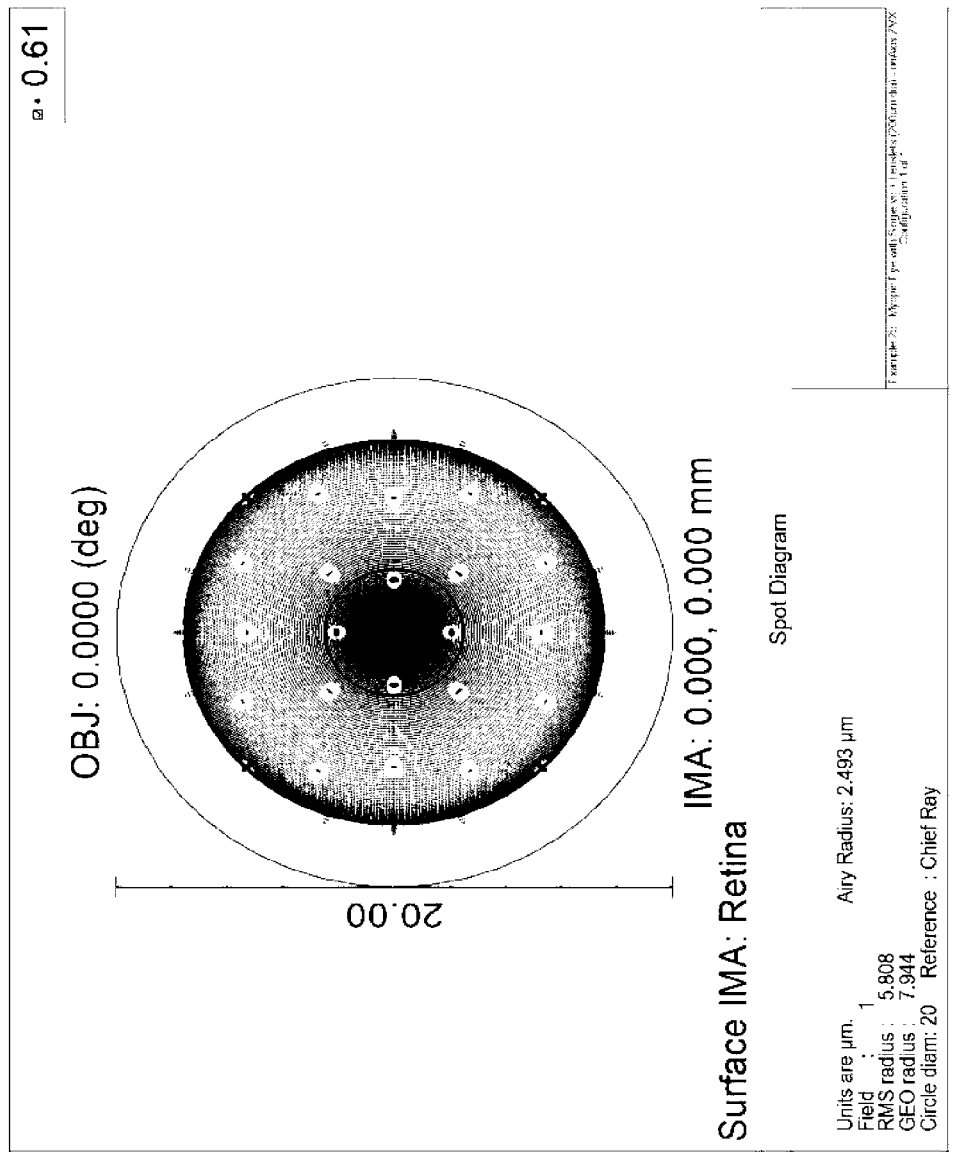
FIG. 12C shows additional data related to FIG. 12A. It illustrates the on-axis, geometric spot diagram analysis at the retinal plane, when the incoming light, with one of the two wavelengths of the polychromatic source (610 nm), with a vergence of zero diopters, is incident on a 2 Diopter Myopic Model eye that has been corrected with a spectacle lens embedded with a micro lenslet array, described in FIG. 11A and FIG. 11B.

The parameters of the micro lenslet array that were used for simulation are provided in the Table 2. As can be seen, just like the single vision test case, for monochromatic wavelength 555 nm, the geometrical blur is comparable to the Airy disk. However, for the 610 nm test case, unlike the single vision lens test case, use of the micro lenslet array produces two distinct types of blur (FIG. 12A, FIG. 12B and FIG. 12C), although majority of the blur is still hyperopic there are regions on the retina, where light is in focus. This situation produces a conflicting signal to the L cones, where some of the L cones detect hyperopic defocus while others in the same retinal region experience an in-focus image. This exemplary shows that when such a correction is put in place that offers conflicting signals to the retina, the ocular system chooses to favor the in-focus images. Thus, decelerating the rate of eye growth and/or myopia progression.

TABLE 2

Parameter values of the micro lenslet array used in combination with spectacle lenses

| Parameter details | Spectacle lens | Spectacle with Micro Lenslet Array |
|---|---|---|
| Anterior surface radius (mm)/asphericity | 4000/0 | Micro Lenslet Array |
| Posterior surface radius (mm)/asphericity | 260/−1 | 280/−1 |
| Central thickness (mm) | 1.5 | 1.5 |
| Refractive index/Abbe number | 1.56/50.2 | 1.56/50.2 |
| Vertex distance (mm) | 12 | 12 |

The simulated micro lenslet array comprised of two-layers: a substrate layer and the front surface of the spectacle lens itself. The actual micro lenslets were designed on the front surface of the spectacle lens by varying the sagittal depth to create undulations across the spectacle lens. In this example, the radius of curvature of each micro lenslet was kept to 160 mm, however other variations are contemplated in the present disclosure. In this exemplary all micro lenslets were circular in nature and the diameter were chosen to be 200 μm each, however, other variations are contemplated in the present disclosure. The total number of micro lenslets designed on a 20 mm spectacle blank was 100×100 grid array, however, other variations are contemplated in the present disclosure. The separation between any two micro lenslets was approximately 800 μm, however, other variations are contemplated in the present disclosure. To achieve the power profile shown in FIG. 11A, the refractive index of the substrate material was selected to be 1.52, with same Abbe as the spectacle lens material. However, other variations in the refractive index are contemplated in the present disclosure.

Example 4b: Use of a DOE Array in Conjunction with Spectacle Lenses for Myopia

Figure 12D:
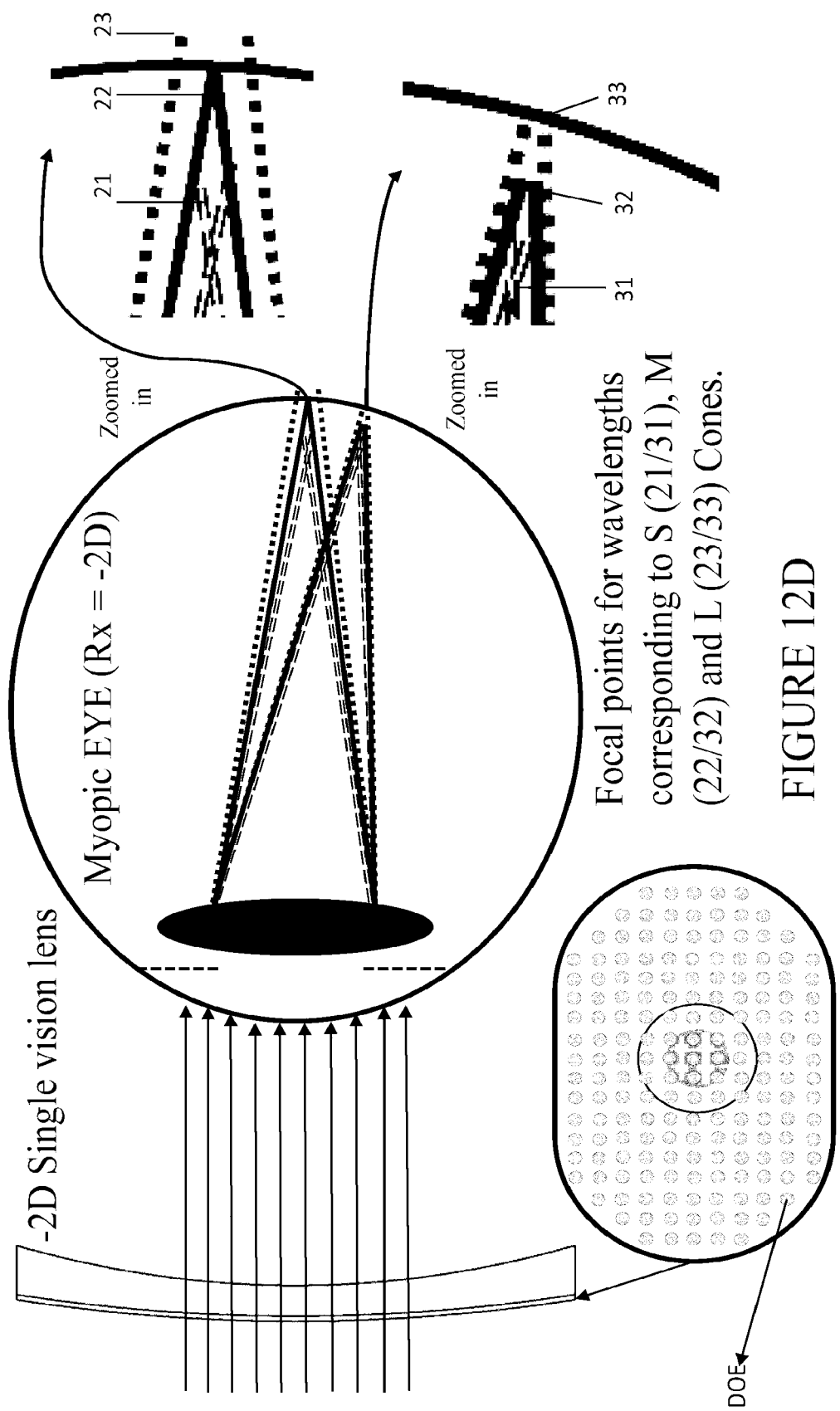
FIG. 12D shows a schematic representation, where a simple myopic eye (Rx=−2D) is corrected with a single vision lens (Rx=−2D) embedded with multiple DOEs. The zoomed in part of the figure shows specific focal points at two different retinal locations for three wavelengths corresponding to S, M and L cones.

FIG. 12D is an alternative method of correction of the exemplary −2 Diopter myopic model eye. This exemplary embodiment describes the use of an optical film constituting a DOE array applied to the front surface of a single vision spectacle lens (−2D) for the correction of the exemplary −2Diopter myopic model eye. This exemplary highlights the two neighboring regions of the retina where the incoming polychromatic parallel beam of light is focused. The focal points for wavelengths corresponding to S, M and L cones at two different yet neighboring retinal points (21, 22 and 23) and (31, 32 and 33) are highlighted. As can be seen from the two zoomed in diagrams at the neighboring retinal points, some of the L cones (33) experience an in-focus image, while some other L cones of the neighboring retinal region (33) experience a hyperopic signal. This situation is referred to as a conflicting, contradictory and/or disagreeing optical signals at the L cone receptor level. While not wanting to be bound by a particular theory, the underlying hypothesis of this example (and certain embodiments) assumes that the conflicting, contradictory or disagreeing optical signals between the neighboring L cones may trigger the stop signal, thus resulting reduction in the rate of myopia progression.

Figure 13A:
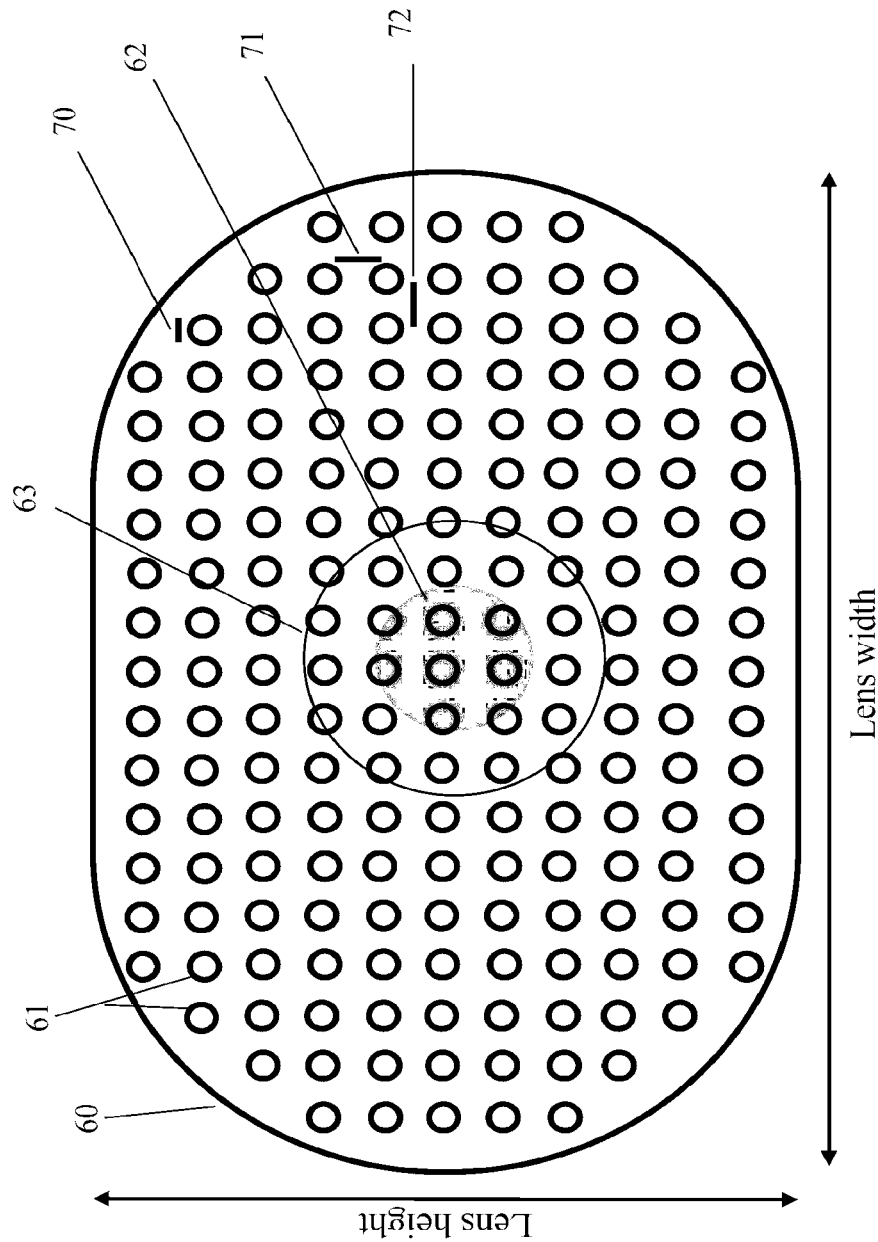
FIG. 13A illustrates in a frontal view of a device with a micro lenslet array configured with ROEs, according to certain embodiments. This may be a lenslet array formed in (or as part of) a sheet, a spectacle lens incorporating a lenslet array or a combination of a lenslet sheet and a spectacle lens.

The simulated DOE array comprised of two-layers: a coating layer and substrate (DOE) layer glued onto the front surface of the spectacle lens. However other variations including three, four or five layers are contemplated in the present disclosure. In this exemplary 4b, all DOEs were circular in nature, however, other variations are contemplated in the present disclosure. In some other embodiments (FIGS. 31 to 35), DOE and ROE strips are contemplated that are aimed to introduce conflicting optical signals at the retinal level, particularly at the M and/or L cone receptors Example 5: Complete Grid Micro Lenslet or ROE Array FIG. 13A illustrates in a frontal view of a device with a complete grid micro lenslet or ROE array 60 that may be used as an overlay on a spectacle lens or incorporated into a spectacle lens, according to certain embodiments. The grid of the array is substantially populated with micro lenslets or ROE 61. The spectacle embodiment is fitted over the pupil of the wearer as illustrated in 62 and 63. The physical dimensions of the micro lenslets or ROE and optical properties may be varied as disclosed herein. In this example, each micro lenslet or ROE could have a diameter ranging from 50 to 500 μm and a focal length ranging from 250 to 4000 mm as disclosed elsewhere in this specification. In this example, the diameter of each micro lenslet or ROE (or a substantial portion of the micro lenslets or ROEs) is the same or substantially the same. In this example, the focal length of each micro lenslet or ROE (or a substantial portion of the micro lenslets or ROEs) is the same or substantially the same. However, variations in the width and/or focal length of the micro lenslets or ROEs within an array are contemplated by the present disclosure. In this exemplary embodiment, the fill ration means the proportion of area covered by the micro lenslets or ROE according to the following equation:

$$\text{Fill Ratio} = \frac{d^2 * \pi}{4 * s^2} * 100$$

Where $d^2$ is the squared diameter of the individual micro lenslet or ROE 70 and s is the distance between adjacent individual micro lenslets or ROEs 71 and 72 as measured from the center of each of the micro lenslets or ROEs. A generalized fill ratio of the micro lenslets or ROEs can be calculated using the following equation.

$$\text{Generalized Fill Ratio} = \frac{\text{Lenslet Area}}{\text{Total Spectacle area}} * 100$$

Example 5b: Complete Grid DOE Array

Figure 13B:
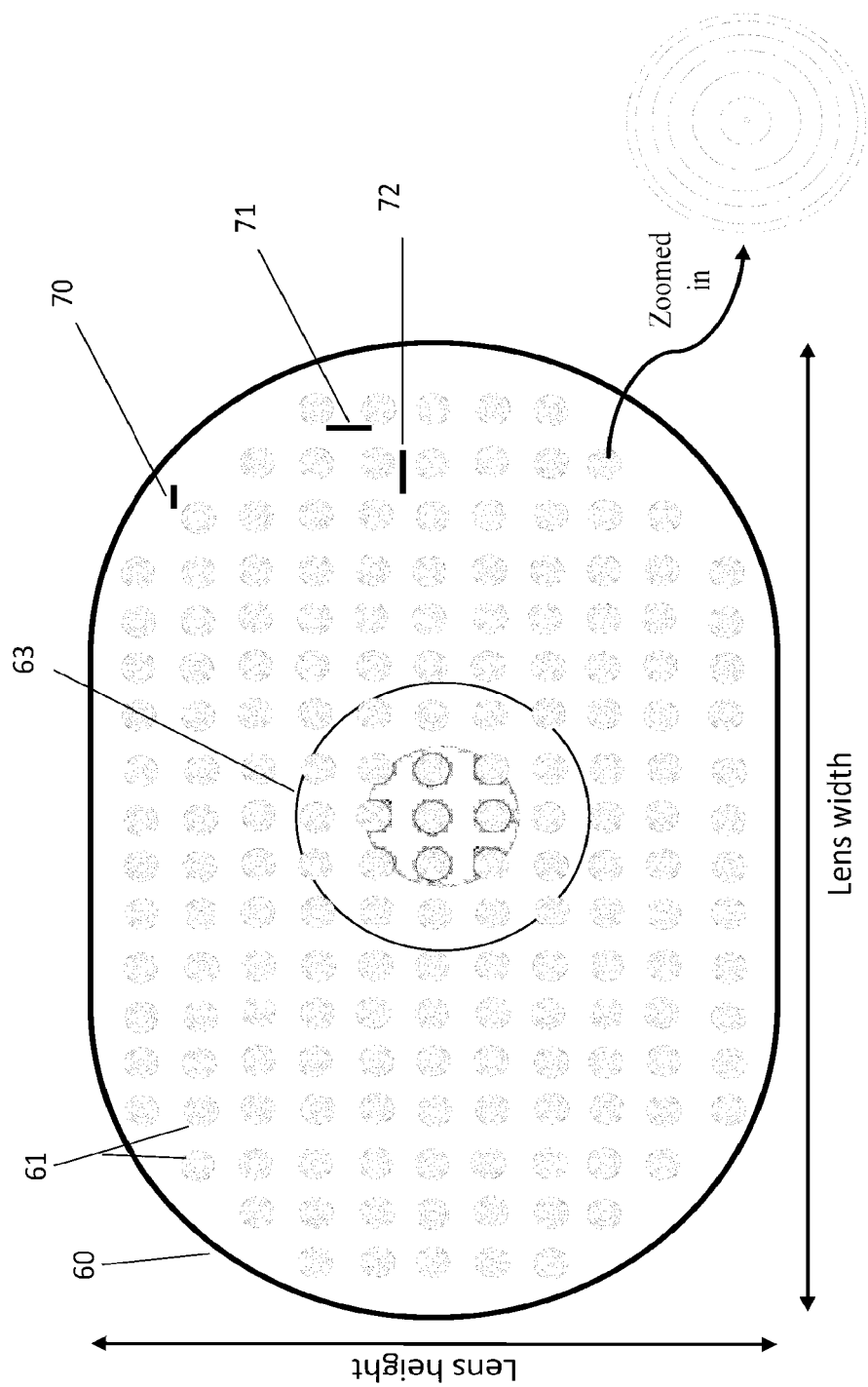
FIG. 13B illustrates in a frontal view of a device configured with DOEs, according to certain embodiments. This may be array of DOEs formed in (or as part of) a sheet, a spectacle lens incorporating a lenslet array or a combination of a lenslet sheet and a spectacle lens.

FIG. 13B illustrates in a frontal view of a device with a complete grid DOE array 60 that may be used as an overlay on a spectacle lens or incorporated into a spectacle lens, according to certain embodiments. The grid of the array is substantially populated with DOE 61. The spectacle embodiment is fitted over the pupil of the wearer as illustrated in 63. The physical dimensions of the DOE and optical properties may be varied as disclosed herein. In this example, the diameter of each DOE is the same or substantially the same. In this example, the focal length of each DOE is the same or substantially the same. However, variations in the width and/or focal length of the DOEs within an array are contemplated by the present disclosure. The fill ratios of such a DOE array is given by equations in Example 5. One of the DOE is zoomed to enhance the appearance of the diffractive groove features.

Figure 14A:
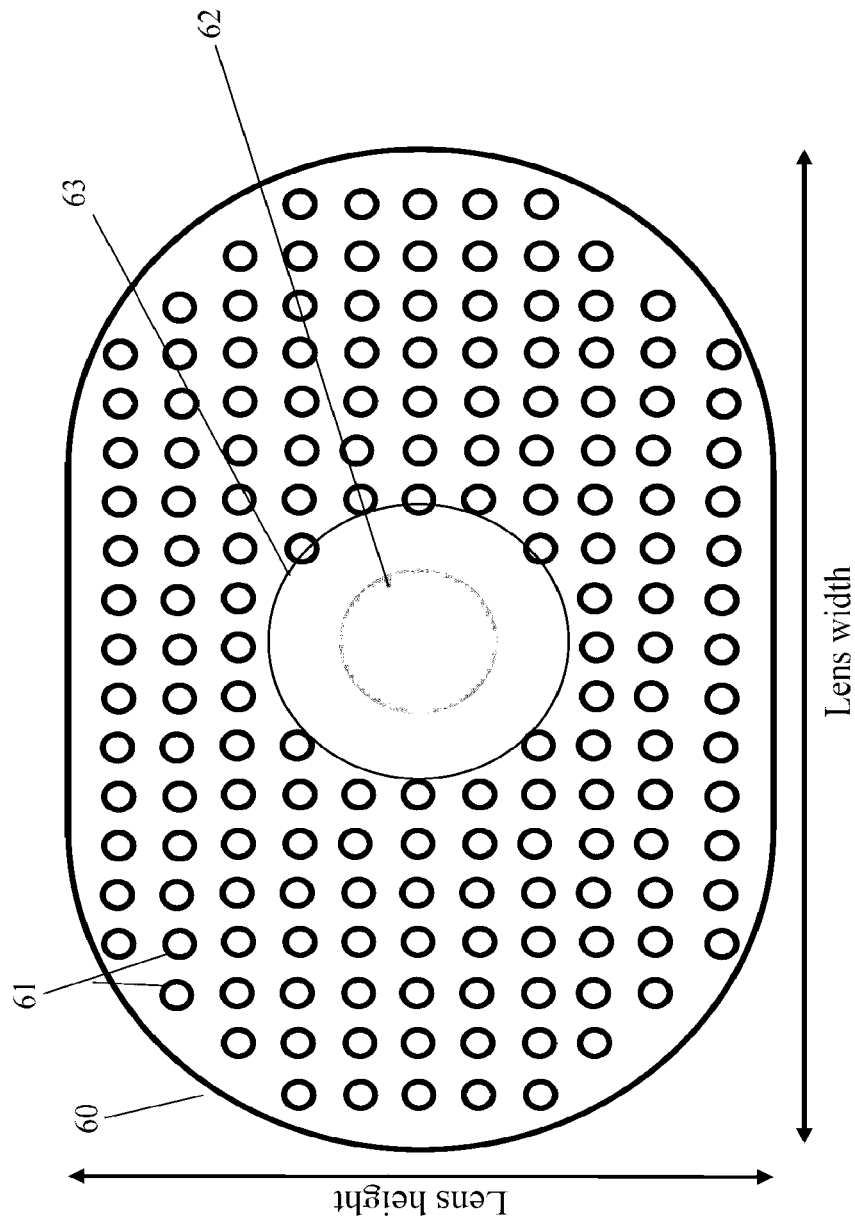
FIG. 14A illustrates in a frontal view of a device with a micro lenslet array configured with ROEs 60 wherein a central portion of the lens is devoid or substantial devoid of lenslet or ROEs, according to certain embodiments. This may be a lenslet array formed in (or as part of) a sheet, a spectacle lens incorporating a lenslet array, ROE array or a combination of a lenslet sheet and a spectacle lens.
Figure 14B:
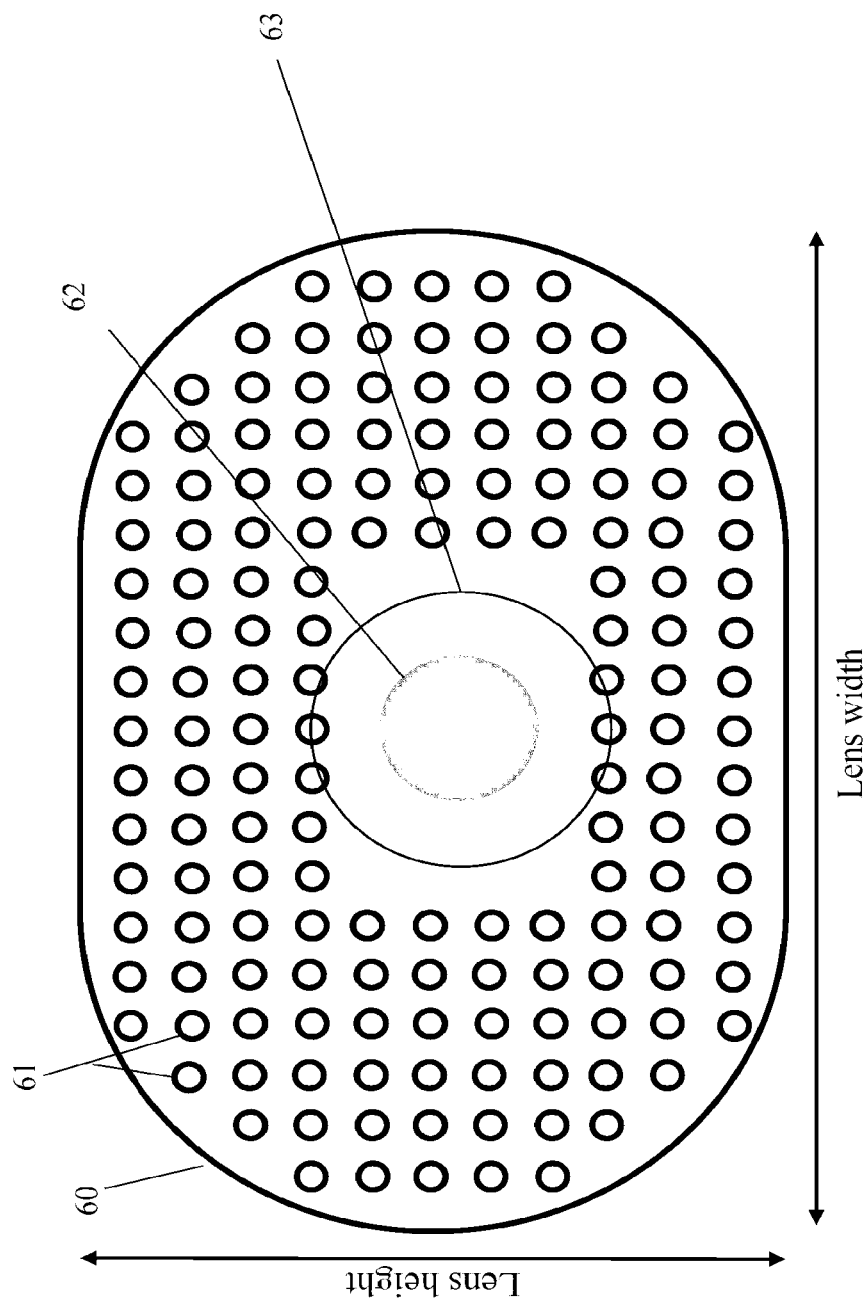
FIG. 14B illustrates a device wherein a horizontal central portion of the device is devoid or substantially devoid of lenslets or ROEs, according to certain embodiments. This may be a lenslet array or ROE array formed in (or as part of) a sheet, a spectacle lens incorporating a lenslet array, ROE array or a combination of a lenslet sheet and a spectacle lens.
Figure 14C:
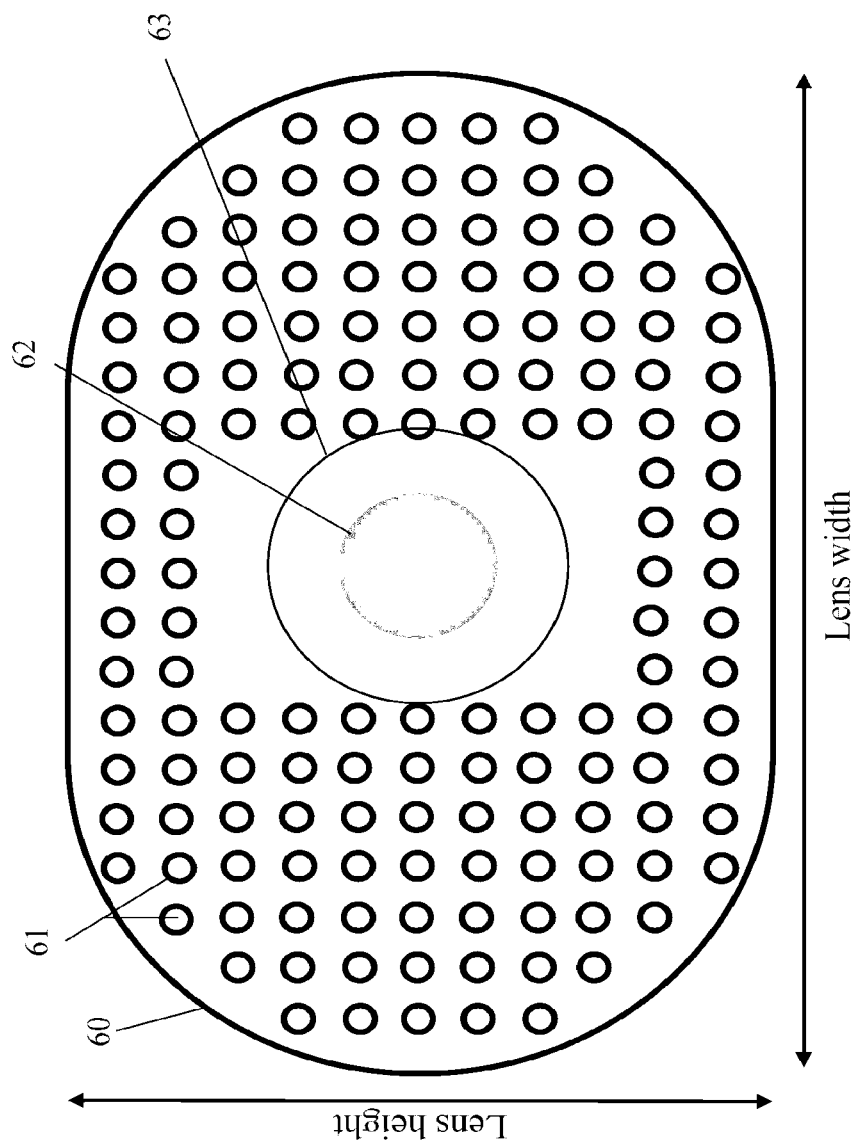
FIG. 14C illustrates a device wherein a vertical central portion of the device is devoid or substantially devoid of lenslets or ROEs, according to certain embodiments. This may be a lenslet array or ROE array formed in (or as part of) a sheet, a spectacle lens incorporating a lenslet array, ROE array or a combination of a lenslet sheet and a spectacle lens.

Example 6: Micro Lenslet or ROE Array with a Central Portion as a Micro Lenslet or ROE Free Area FIGS. 14A, FIG. 14B and FIG. 14C illustrate in a frontal view of a device with a micro lenslet or ROE array 60 wherein a central portion of the device is devoid or substantially devoid of micro lenslets or ROEs, according to certain embodiments. FIG. 14A illustrates a device wherein a circular central portion of the device is devoid or substantially devoid of micro lenslets or ROEs. The central circular opening (area free of micro lenslets of ROEs) shown in FIG. 14A could be of a diameter ranging from 3 to 15 mm, 3 to 10 mm, 5 to 12 mm or 7 to 15 mm. In certain embodiments, the central portion may be understood to mean that portion of the device that is centered or substantially centered on the pupil of the eye shown in 62 and 63. In certain embodiments, the central portion may be understood to mean that portion of the device that is centered or substantially centered on the primary line of sight of the eye.

FIG. 14B illustrates a device wherein a horizontal central portion of the device is devoid or substantially devoid of micro lenslets or ROEs. The non-circular opening in this example has wider micro lenslet or ROE free area in the horizontal dimension. The horizontal opening (area free of lenslets or ROEs) shown in FIG. 14B could be of a diameter ranging from 3 to 15 mm, 3 to 10 mm, 5 to 12 mm or 7 to 15 mm.

FIG. 14C illustrates a device wherein a vertical central portion of the device is devoid or substantially devoid of micro lenslets or ROEs. The non-circular opening in this example has wider micro lenslet or ROE free area in the vertical dimension. The vertical opening (area free of micro lenslets) shown in FIG. 14C could be of a diameter ranging from 3 to 15 mm, 3 to 10 mm, 5 to 12 mm or 7 to 15 mm.

These micro lenslet or ROE arrays in this example may be used as an overlay on a spectacle lens or incorporated into a spectacle lens. The array examples are populated with micro lenslets or ROEs 61. The physical dimensions of the micro lenslets or ROEs and optical properties may be varied as disclosed herein. In these examples, each micro lenslet or ROE (or a substantial portion of the micro lenslets or ROEs) may have a width ranging from 25 to 250 µm and a focal length ranging from 250 to 4000 mm as disclosed in this specification. In these examples, the diameter of each micro lenslet or ROE (or a substantial portion of the micro lenslets or ROEs) is the same or substantially the same. In this example, the focal length of each micro lenslet or ROE (or a substantial portion of the micro lenslets or ROEs) is the same or substantially the same. However, variations in the width and/or focal length of the micro lenslets or ROEs within an array are contemplated by the present disclosure.

Example 6a: DOE Array with a Central Portion as a DOE Free Area

Figure 14D:
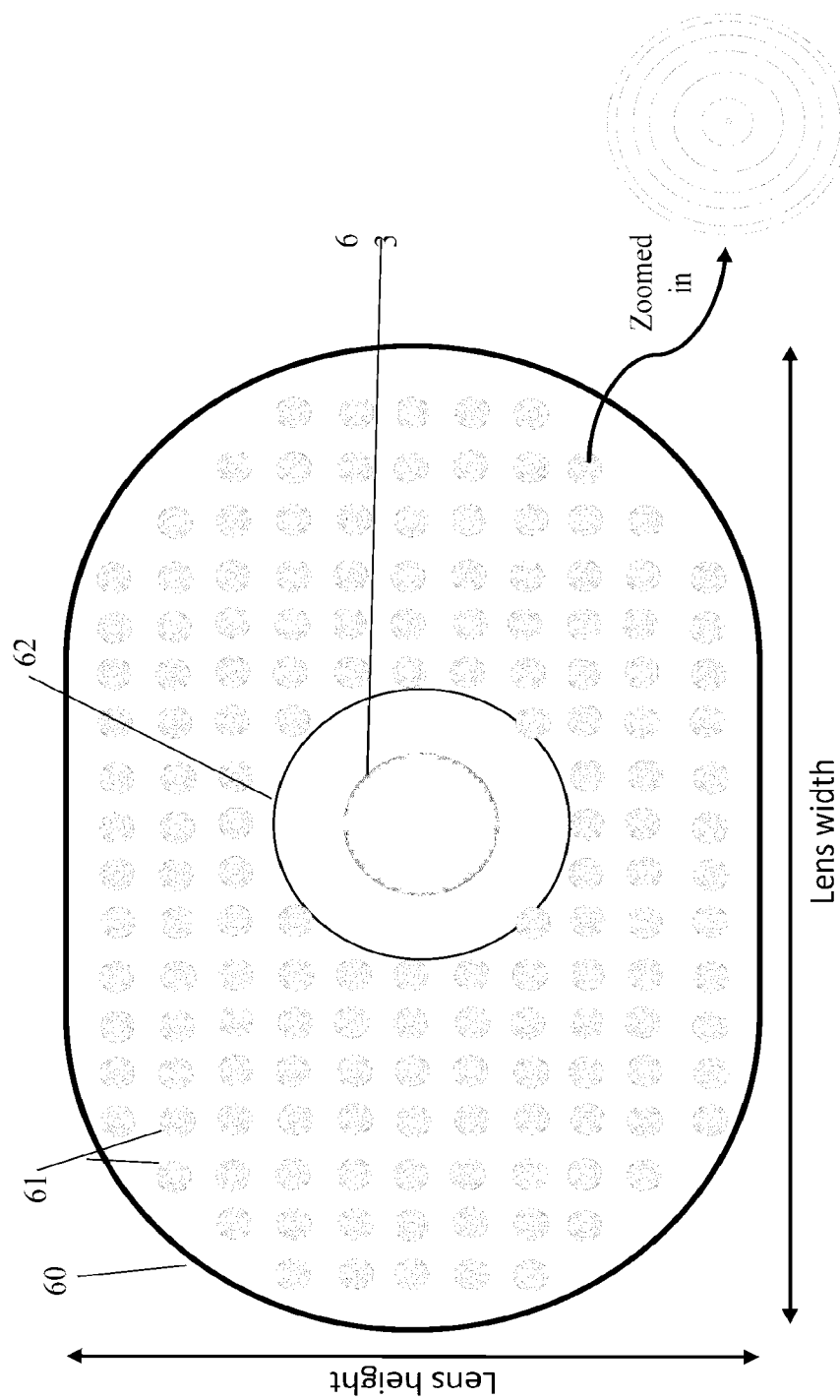
FIG. 14D illustrates in a frontal view of a device with a micro lenslet array configured with DOEs 60 wherein a central portion of the lens is devoid or substantial devoid of lenslet or DOEs, according to certain embodiments. This may be a lenslet array formed in (or as part of) a sheet, a spectacle lens incorporating a lenslet array, DOE array or a combination of a lenslet sheet and a spectacle lens.
Figure 14E:
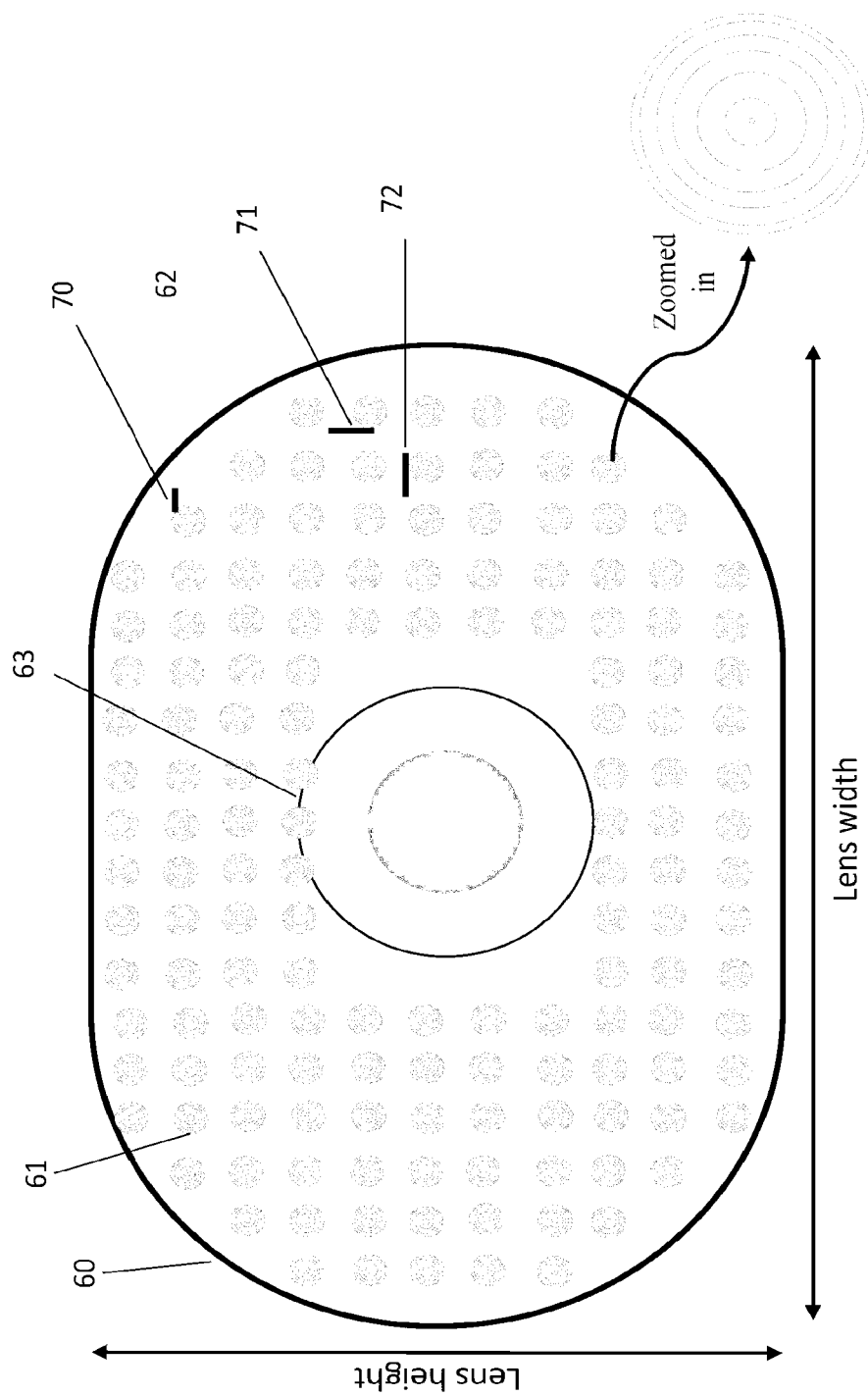
FIG. 14E illustrates a device wherein a horizontal central portion of the device is devoid or substantially devoid of lenslets or DOEs. This may be a lenslet array or DOE array formed in (or as part of) a sheet, a spectacle lens incorporating a lenslet array, DOE array or a combination of a lenslet sheet and a spectacle lens.
Figure 14F:
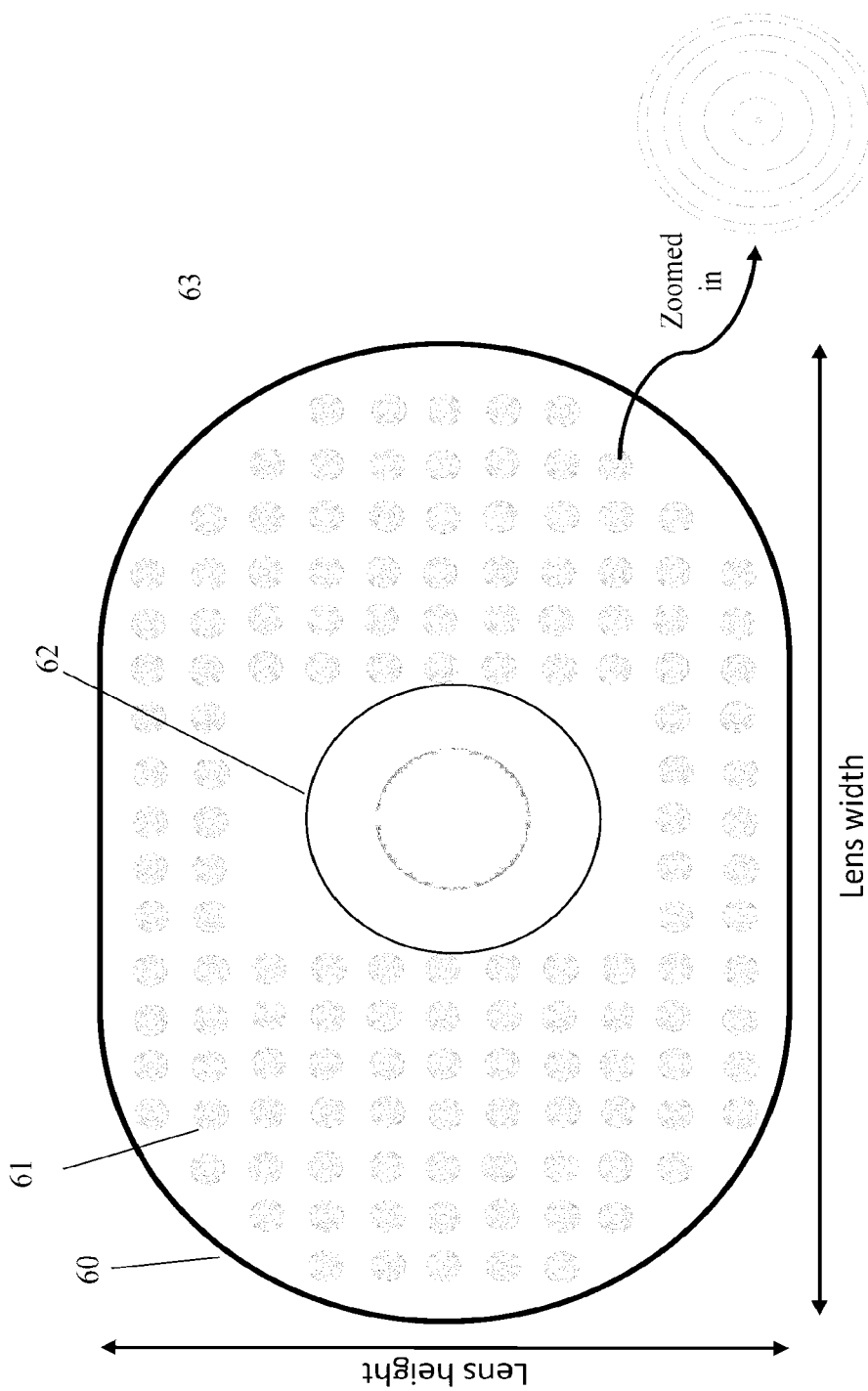
FIG. 14F illustrates a device wherein a vertical central portion of the device is devoid or substantially devoid of lenslets or DOEs, according to certain embodiments. This may be a lenslet array or DOE array formed in (or as part of) a sheet, a spectacle lens incorporating a lenslet array, DOE array or a combination of a lenslet sheet and a spectacle lens.

FIGS. 14D, FIG. 14E and FIG. 14F illustrate in a frontal view of a device with a DOE array 60 wherein a central portion of the device is devoid or substantially devoid of DOEs, according to certain embodiments. FIG. 14D illustrates a device wherein a circular central portion of the device is devoid or substantially devoid of DOEs. The central circular opening (area free of DOEs) shown in FIG. 14D could be of a diameter ranging from 3 to 15 mm, 3 to 10 mm, 5 to 12 mm, or 7 to 15 mm. In certain embodiments, the central portion may be understood to mean that portion of the device that is centered or substantially centered on the pupil of the eye shown in 62 and 63. In certain embodiments, the central portion may be understood to mean that portion of the device that is centered or substantially centered on the primary line of sight of the eye.

FIG. 14E illustrates a device wherein a horizontal central portion of the device is devoid or substantially devoid of DOEs. The non-circular opening in this example has wider DOE free area in the horizontal dimension. The horizontal opening (area free of DOEs) shown in FIG. 14E may be of a diameter ranging from 3 to 15 mm, 3 to 10 mm, 5 to 12 mm, or 7 to 15 mm.

FIG. 14F illustrates a device wherein a vertical central portion of the device is devoid or substantially devoid of DOEs. The non-circular opening in this example has wider micro lenslet or DOE free area in the vertical dimension. The vertical opening (area free of DOEs) shown in FIG. 14F may be of a diameter ranging from 3 to 15 mm, 3 to 10 mm, 5 to 12 mm, or 7 to 15 mm.

These DOE arrays in this example may be used as an overlay on a spectacle lens or incorporated into a spectacle lens. The array examples are populated with DOEs 61. The physical dimensions of the DOEs and optical properties may be varied as disclosed herein. In these examples, each DOE may have a width ranging from 25 to 500 µm and a focal length ranging from 250 to 4000 mm as disclosed in this specification. In these examples, the diameter of each DOE is the same or substantially the same. In this example, the focal length of each DOE is the same or substantially the same. However, variations in the width and/or focal length of the DOE within an array are contemplated by the present disclosure.

Example 7: Non-Uniform Micro Lenslet or ROE Array

Figure 15A:
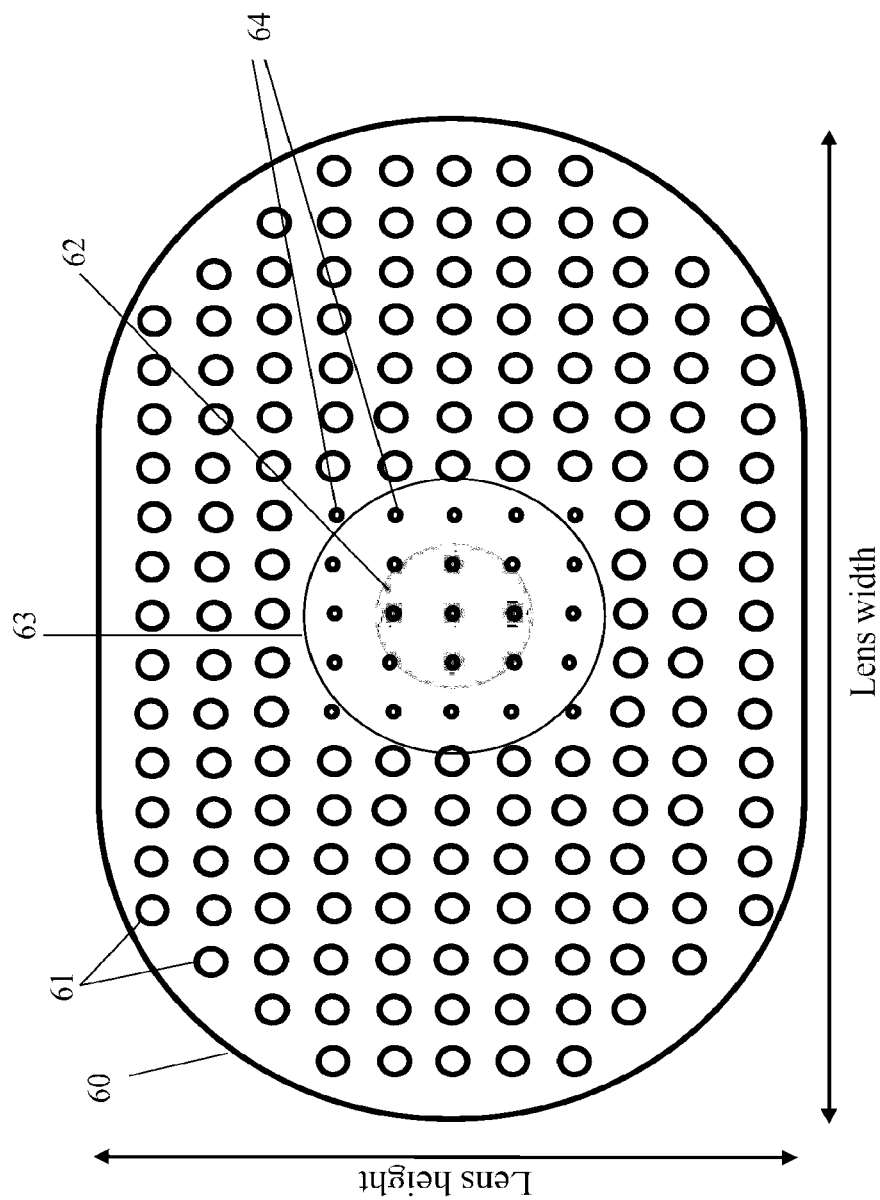
FIG. 15A illustrates a device wherein the ROEs in the central portion of the device area are smaller in diameter than the ROEs in peripheral area of the device, according to certain embodiments. This may be a ROE array formed in (or as part of) a sheet, a spectacle lens incorporating a ROE array or a combination of a ROE sheet and a spectacle lens.
Figure 15B:
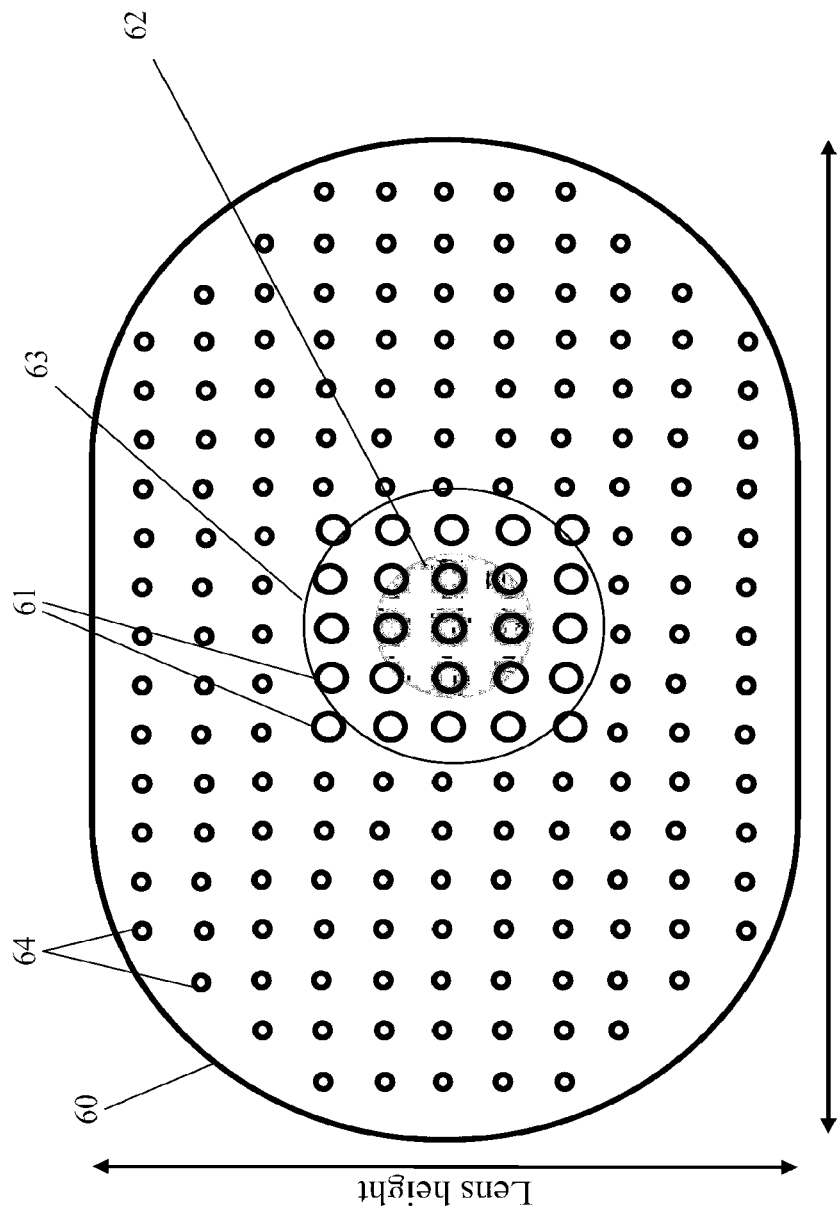
FIG. 15B illustrates a device wherein the ROEs in the central area of the device are larger in diameter than the ROEs in peripheral area of the device, according to certain embodiments. This may be a ROE array formed in (or as part of) a sheet, a spectacle lens incorporating a ROE array or a combination of a ROE sheet and a spectacle lens.

FIG. 15A and FIG. 15B illustrate in a frontal view of a device with a micro lenslet or ROE array 60 wherein the central portion and the peripheral portion of the device is populated with micro lenslets or ROEs that have different diameters, according to certain embodiments. FIG. 15A illustrates a device wherein the micro lenslets or ROEs in the central device area are smaller in diameter than the micro lenslets or ROEs in peripheral area of the device. FIG. 15B illustrates a device lens wherein the micro lenslets or ROEs in the central device area are larger in diameter than the micro lenslets or ROEs in peripheral area of the device. The diameter of the smaller diameter micro lenslets or ROEs 64 may be 50, 60, 70, 80, 90 or 100 μm. The diameter of the larger micro lenslets or ROEs 61 may be 180, 190, 200, 210, 220, 230, 240 or 250 μm. The portion of the device that may be populated with smaller diameter micro lenslets or ROEs may be from 3, 4, 5, 6, 7, 8, 9 or 10 mm square or diameter. The portion of the device that may be populated with larger diameter micro lenslets or ROEs may be from 11, 12, 13, 14, 15, or 18 mm square or diameter. The ratio of the diameter of the larger micro lenslets or ROEs to smaller micro lenslets may range from 1.5, 1.8, 2.1, or 2.5.

These micro lenslet or ROE arrays in this example may be used as an overlay on a spectacle lens or incorporated into a spectacle lens. The array examples are populated with micro lenslets or ROEs 61 have a first diameter and micro lenslets or ROEs 64 have a second diameter. Not illustrated in the figures of this example but contemplated by the present disclosure are micro lenslet or ROE arrays wherein the array is populated with micro lenslets or ROEs that have at least 1, 2, 3, 4, 5 or 6 different diameters. The physical dimensions of the micro lenslets or ROEs and optical properties may be varied as disclosed herein. In these examples, each micro lenslet or ROE (or a substantial portion of the micro lenslets or ROEs) may have a width ranging from 50 to 250 μm and a focal length ranging from 250 to 4000 mm as disclosed in this specification. In these examples, the diameter of each micro lenslet or ROE (or a substantial portion of the micro lenslets or ROEs) is the same or substantially the same. In this example, the focal length of each micro lenslet or ROE (or a substantial portion of the micro lenslets or ROEs) is the same or substantially the same. However, variations in the width and/or focal length of the micro lenslets or ROEs within an array are contemplated by the present disclosure.

Example 7b: Non-Uniform DOE Array

Figure 15C:
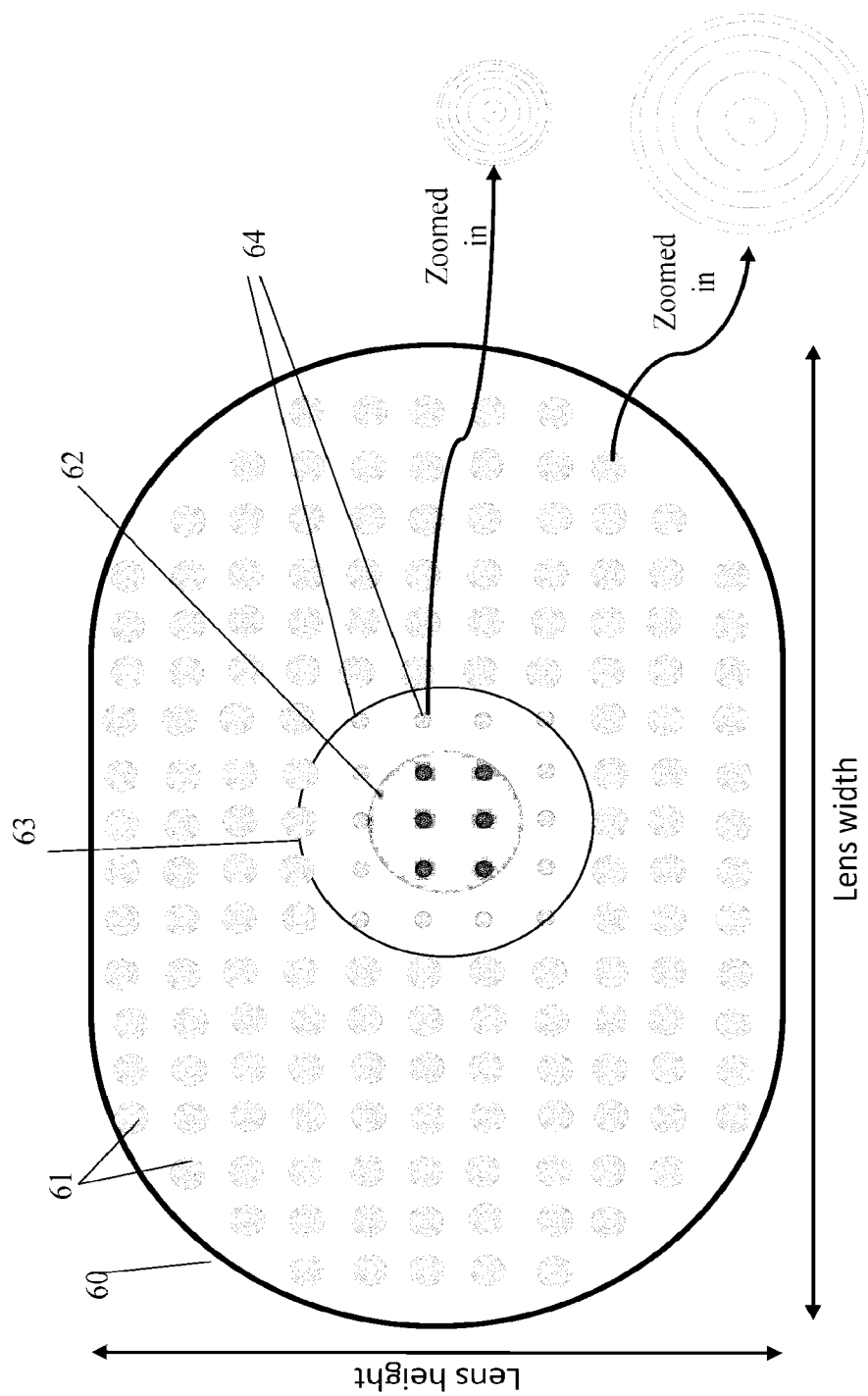
FIG. 15C illustrates a device wherein the DOEs in the central portion of the device area are smaller in diameter than the DOEs in peripheral area of the device, according to certain embodiments. This may be a DOE array formed in (or as part of) a sheet, a spectacle lens incorporating a DOE array or a combination of a DOE sheet and a spectacle lens.
Figure 15D:
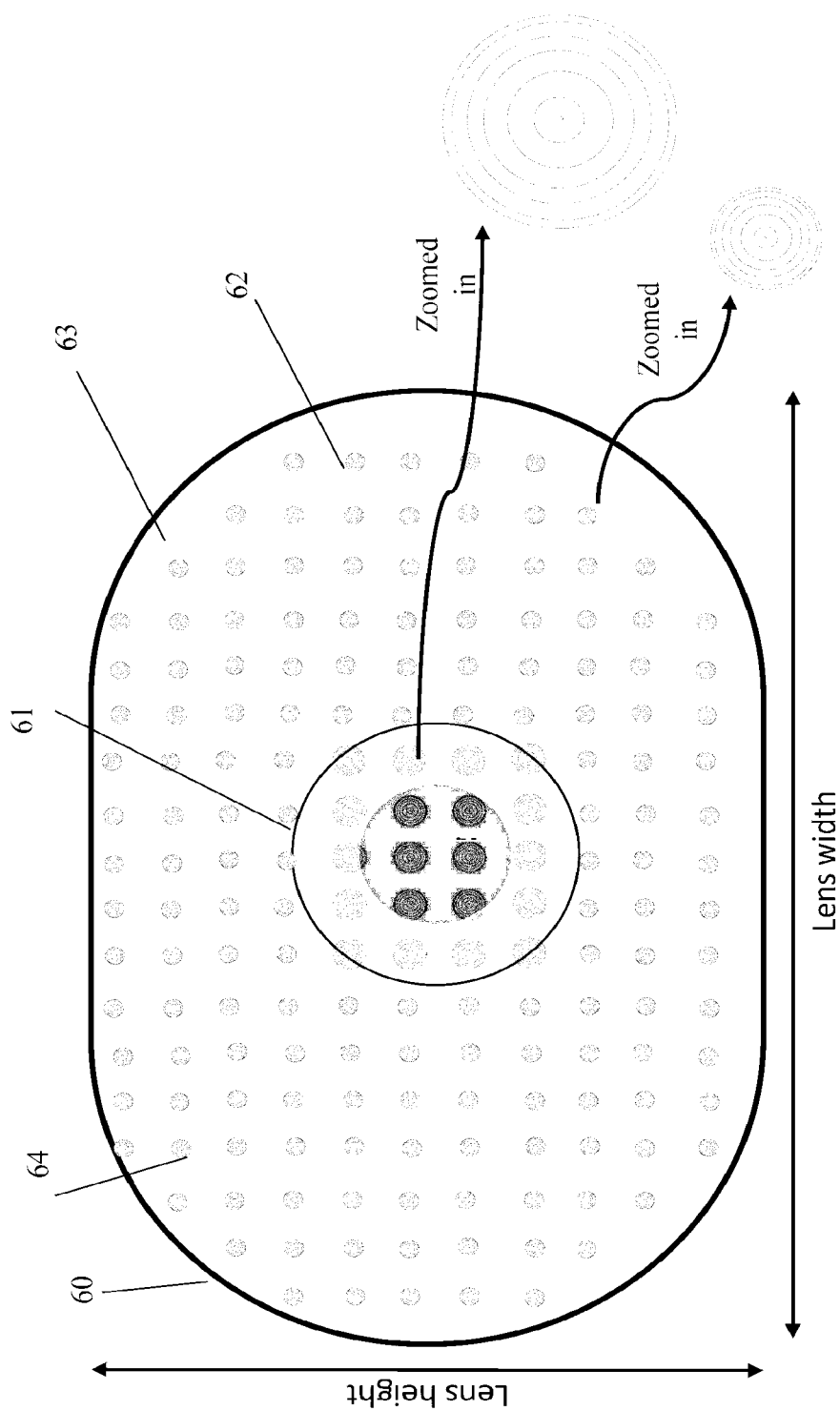
FIG. 15D illustrates a device wherein the DOEs in the central area of the device are larger in diameter than the DOEs in peripheral area of the device, according to certain embodiments. This may be a DOE array formed in (or as part of) a sheet, a spectacle lens incorporating DOE array or a combination of a DOE sheet and a spectacle lens.

FIG. 15C and FIG. 15D illustrate in a frontal view of a device with a DOE array 60 wherein the central portion and the peripheral portion of the device is populated with DOEs that have different diameters, according to certain embodiments. FIG. 15A illustrates a device wherein the DOEs in the central device area are smaller in diameter than the DOEs in peripheral area of the device. FIG. 15B illustrates a device lens wherein the DOEs in the central device area are larger in diameter than the DOEs in peripheral area of the device. The diameter of the smaller diameter DOEs 64 may be 50, 60, 70, 80, 90 or 100 μm. The diameter of the larger DOEs 61 may be 180, 190, 200, 210, 220, 230, 240 or 250 μm. The portion of the device that may be populated with smaller diameter DOEs may be from 3, 4, 5, 6, 7, 8, 9 or 10 mm square or diameter. The portion of the device that may be populated with larger diameter DOEs may be from 11, 12, 13, 14, 15, or 18 mm square or diameter. The ratio of the diameter of the larger DOEs to smaller DOEs may range from 1.5, 1.8, 2.1, or 2.5.

These DOE arrays in this example may be used as an overlay on a spectacle lens or incorporated into a spectacle lens. The array examples are populated with DOEs 61 have a first diameter and DOEs 64 have a second diameter. Not illustrated in the figures of this example but contemplated by the present disclosure are DOEs wherein the array is populated with DOEs that have at least 1, 2, 3, 4, 5 or 6 different diameters. The physical dimensions of the DOEs and optical properties may be varied as disclosed herein. In these examples, each DOE may have a width ranging from 50 to 500 μm and a focal length ranging from 250 to 4000 mm as disclosed in this specification. In these examples, the diameter of each DOE is the same or substantially the same. In this example, the focal length of each DOE is the same or substantially the same. However, variations in the width and/or focal length of the DOEs within an array are contemplated by the present disclosure.

Figure 16A:
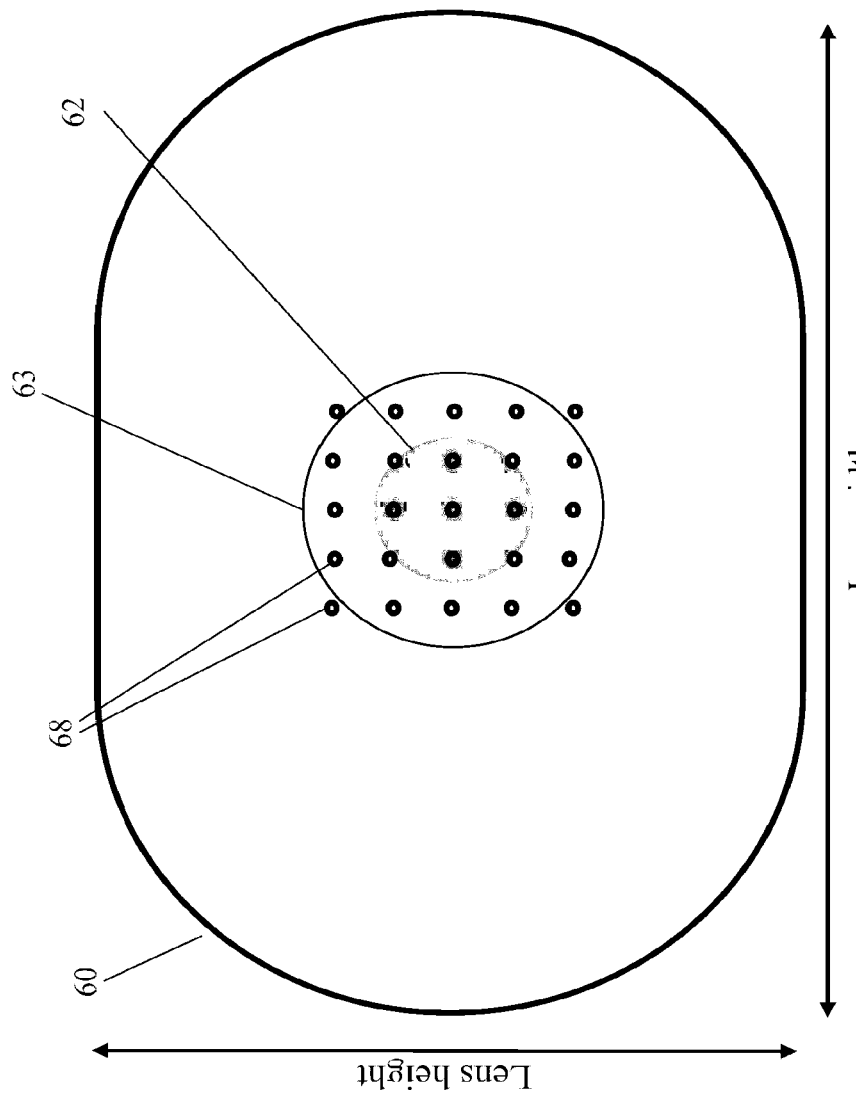
FIG. 16A illustrates in a frontal view of a device with a ROE array wherein the central portion is populated with smaller diameter ROEs, according to certain embodiments. This may be a ROE array formed in (or as part of) a sheet, a spectacle lens incorporating a ROE array or a combination of a ROE sheet and a spectacle lens.

Example 8: Micro Lenslet or ROE Array with a Peripheral Portion as a Micro Lenslet or ROE Free Area FIG. 16A illustrates in a frontal view of a device with a micro lenslet or ROE array 60 wherein a peripheral portion of the device is devoid or substantially devoid of micro lenslets or ROEs, according to certain embodiments. A micro lenslet or ROE array is present in the central area 63, which, if circular, may have a diameter ranging from 3 to 15 mm, 3 to 10 mm, 5 to 12 mm, or 7 to 15 mm. Other non-circular areas of similar size are also envisaged. In certain embodiments, the central portion may be understood to mean that portion of the device that is centered or substantially centered on the pupil of the eye 62 and 63. In certain embodiments, the central portion may be understood to mean that portion of the device that is centered or substantially centered on the primary line of sight of the eye 62 and 63.

These micro lenslet or ROE array in this example may be used as an overlay on a spectacle lens or incorporated into a spectacle lens. The array examples are populated with micro lenslets or ROEs 68. The physical dimensions of the micro lenslets or ROEs and optical properties may be varied as disclosed herein. In these examples, each micro lenslet or ROE (or a substantial portion of the micro lenslets or ROEs) may have a width ranging from 25 to 500 μm and a focal length ranging from 250 to 4000 mm as disclosed in this specification. In these examples, the diameter of each micro lenslet or ROE (or a substantial portion of the micro lenslets or ROEs) is the same or substantially the same. In this example, the focal length of each micro lenslet or ROE (or a substantial portion of the micro lenslets or ROEs) is the same or substantially the same. However, variations in the width and/or focal length of the micro lenslets or ROEs within an array are contemplated by the present disclosure.

Example 8b: DOE Array with a Peripheral Portion as a DOE Free Area

Figure 16B:
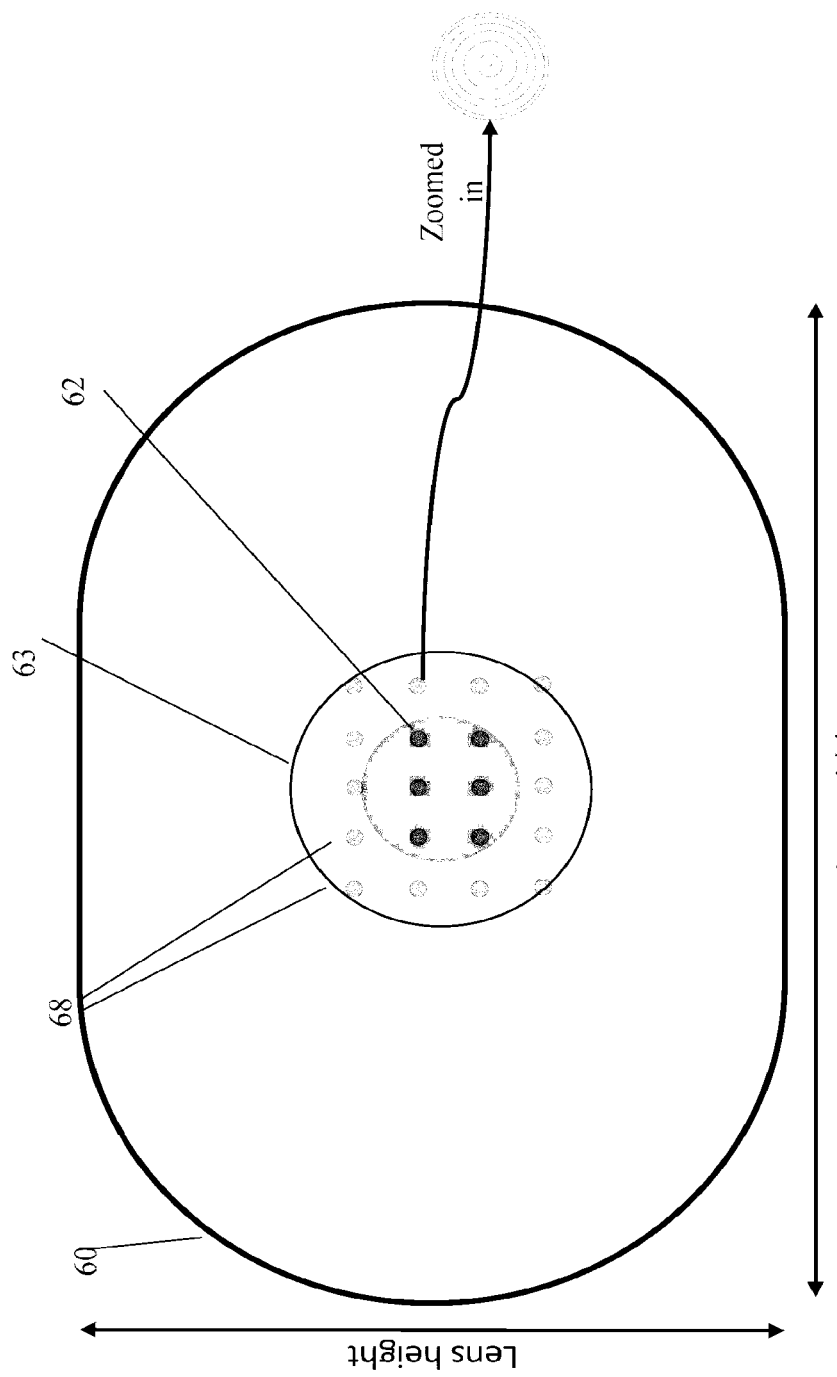
FIG. 16B illustrates in a frontal view of a device with a DOE array wherein the central portion is populated with smaller diameter DOEs, according to certain embodiments. This may be a DOE array formed in (or as part of) a sheet, a spectacle lens incorporating a DOE array or a combination of a DOE sheet and a spectacle lens.

FIG. 16B illustrates in a frontal view of a device with a DOE array 60 wherein a peripheral portion of the device is devoid or substantially devoid of DOEs, according to certain embodiments. A DOE array is present in the central area 63, which, if circular, may have a diameter ranging from 3 to 15 mm, 3 to 10 mm, 5 to 12 mm, or 7 to 15 mm. Other non-circular areas of similar size are also envisaged. In certain embodiments, the central portion may be understood to mean that portion of the device that is centered or substantially centered on the pupil of the eye 62 and 63. In certain embodiments, the central portion may be understood to mean that portion of the device that is centered or substantially centered on the primary line of sight of the eye 62 and 63.

These DOE array in this example may be used as an overlay on a spectacle lens or incorporated into a spectacle lens. The array examples are populated with DOEs 68. The physical dimensions of the DOEs and optical properties may be varied as disclosed herein. In these examples, each DOE may have a width ranging from 25 to 500 µm and a focal length ranging from 250 to 4000 mm as disclosed in this specification. In these examples, the diameter of each DOE is the same or substantially the same. In this example, the focal length of each DOE is the same or substantially the same. However, variations in the width and/or focal length of the DOEs within an array are contemplated by the present disclosure. One of the DOE is zoomed to enhance the appearance of the diffractive groove features.

Figure 17A:
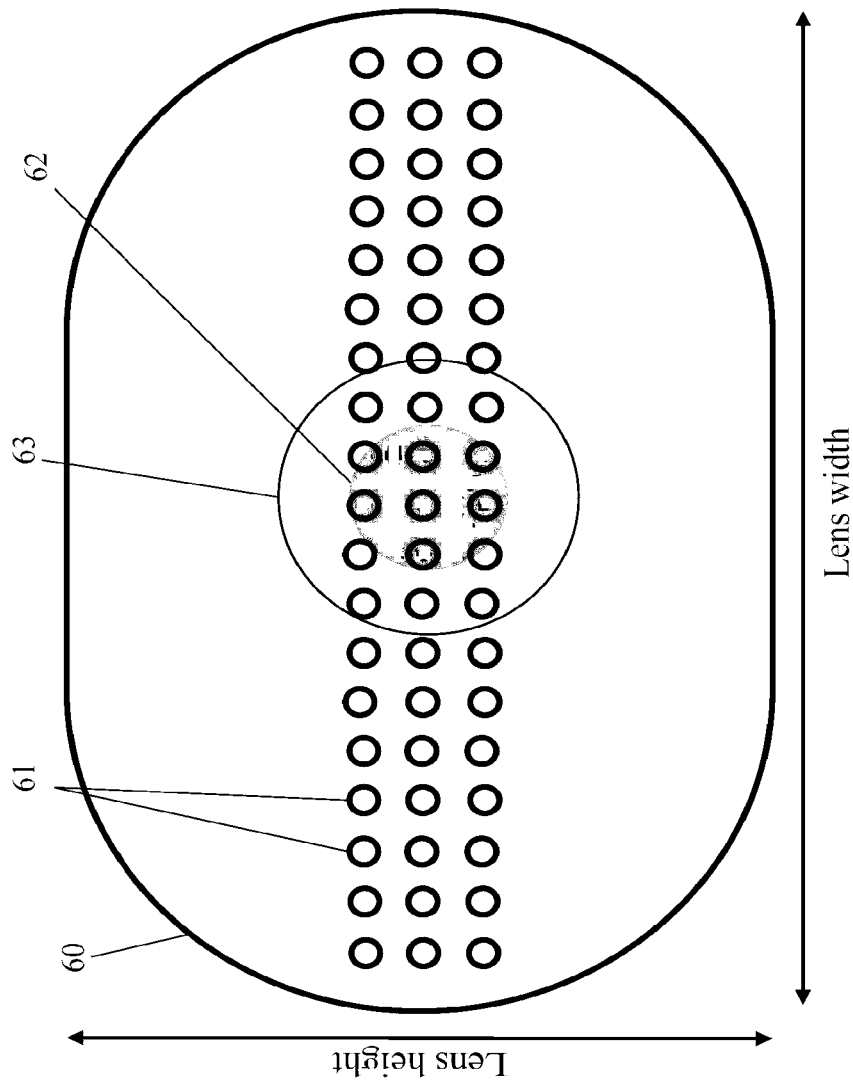
FIG. 17A illustrates a device wherein the ROEs 61 are arranged on a horizontal meridian zone and the other portions of the array are devoid or substantially devoid of ROEs, according to certain embodiments. This may be a ROE array formed in (or as part of) a sheet, a spectacle lens incorporating a ROE array or a combination of a ROE sheet and a spectacle lens.
Figure 17B:
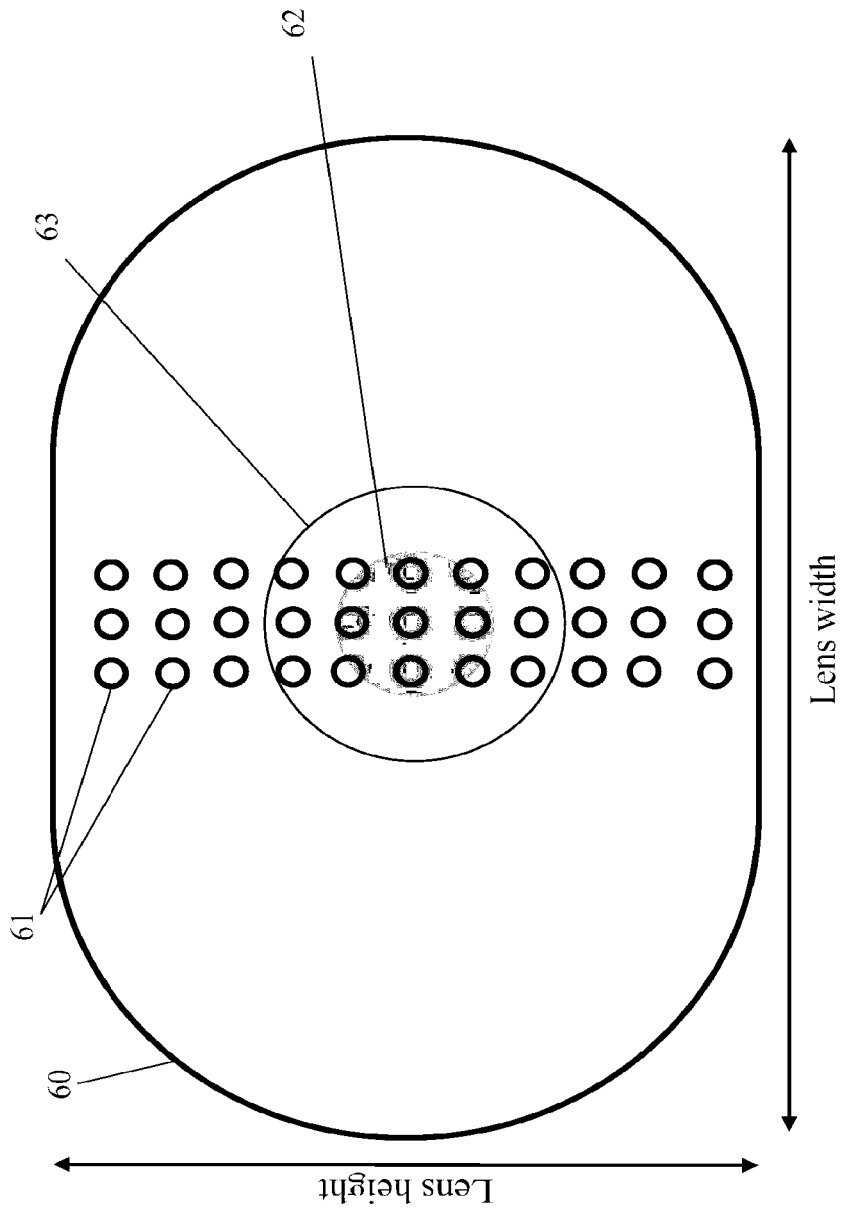
FIG. 17B illustrates a device wherein the ROEs are arranged on a vertical meridian zone and the other portions of the array are devoid or substantially devoid of ROEs, according to certain embodiments. This may be a ROE array formed in (or as part of) a sheet, a spectacle lens incorporating a ROE array or a combination of a ROE sheet and a spectacle lens.
Figure 17C:
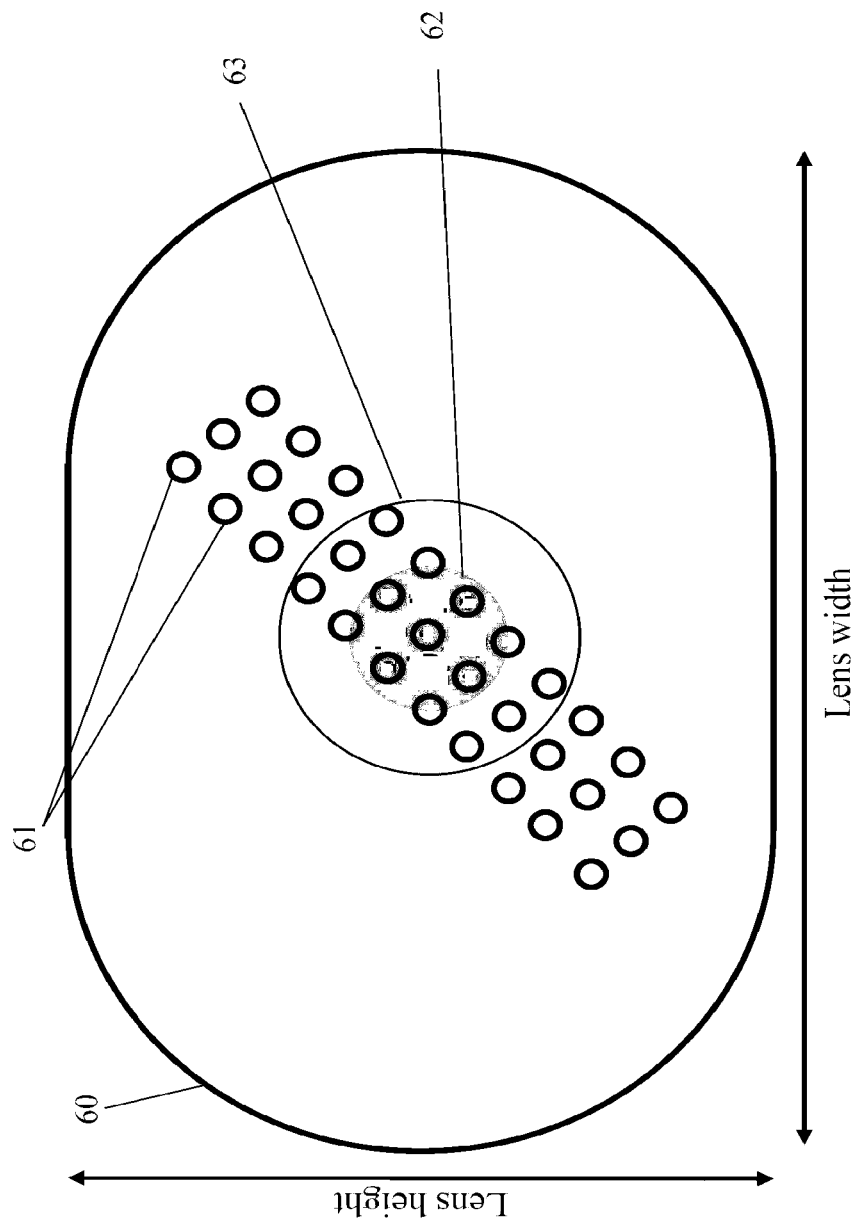
FIG. 17C illustrates a device wherein the ROEs are arranged on an oblique meridian zone and the other portions of the array are devoid or substantially devoid of ROEs, according to certain embodiments. This may be a ROE array formed in (or as part of) a sheet, a spectacle lens incorporating a ROE array or a combination of a ROE sheet and a spectacle lens.

Example 9: Micro Lenslet or ROE Array with Micro Lenslet or ROEs Populated Along Different Meridians FIGS. 17A, FIG. 17B and FIG. 17C illustrate in a frontal view devices with a micro lenslet or ROE array 60 wherein the micro lenslets or ROEs are populated or arranged along certain meridian zones and the other portions of the array are devoid or substantial devoid of micro lenslets or ROEs, according to certain embodiments. FIG. 17A illustrates a device wherein the micro lenslets or ROEs 61 are arranged on a horizontal meridian zone and the other portions of the array are devoid or substantially devoid of micro lenslets or ROEs. The horizontal meridian zone in which micro lenslets or ROEs are located may cover at least 10% of the total surface area the array. The ratio between the total surface area of the meridian zone to the total surface area devoid or substantially devoid of micro lenslets or Roes may range from 0.1, 0.2, 0.3, 0.4 or 0.5.

FIG. 17B illustrates a device wherein the micro lenslets or ROEs 61 are arranged on a vertical meridian zone and the other portions of the array are devoid or substantially devoid of micro lenslets or ROEs. The vertical meridian zone in which micro lenslets or ROEs are located may cover at least 10% of the total surface area the array. The ratio between the total surface area of the meridian zone to the total surface area devoid or substantially devoid of micro lenslets or ROEs may range from 0.1, 0.2, 0.3, 0.4 or 0.5.

FIG. 17C illustrates a device wherein the micro lenslets or ROEs 61 are arranged on an oblique meridian zone and the other portions of the array are devoid or substantially devoid of micro lenslets or ROEs. The oblique meridian zone in which micro lenslets or ROEs are located may cover at least 10% of the total surface area the array. The ratio between the total surface area of the meridian zone to the total surface area devoid or substantially devoid of micro lenslets or ROEs may range from 0.1, 0.2, 0.3, 0.4 or 0.5. Not shown in FIG. 17C are other oblique meridians but these are contemplated by the present disclosure. These micro lenslet or ROE arrays in this example may be used as an overlay on a spectacle lens or incorporated into a spectacle lens. The array examples are populated with micro lenslets or ROEs 61. The physical dimensions of the micro lenslets or ROEs and optical properties may be varied as disclosed herein. In these examples, each micro lenslet or ROE (or a substantial portion of the micro lenslets or ROEs) may have a width ranging from 50 to 250 µm and a focal length ranging from 250 to 4000 mm as disclosed in this specification. In these examples, the diameter of each micro lenslet or ROE (or a substantial portion of the micro lenslets or ROEs) is the same or substantially the same. In this example, the focal length of each micro lenslet or ROE (or a substantial portion of the micro lenslets or ROEs) is the same or substantially the same. However, variations in the width and/or focal length of the micro lenslets or ROEs within an array are contemplated by the present disclosure.

Example 9A: DOE Array with DOEs Populated Along Different Meridians

Figure 17D:
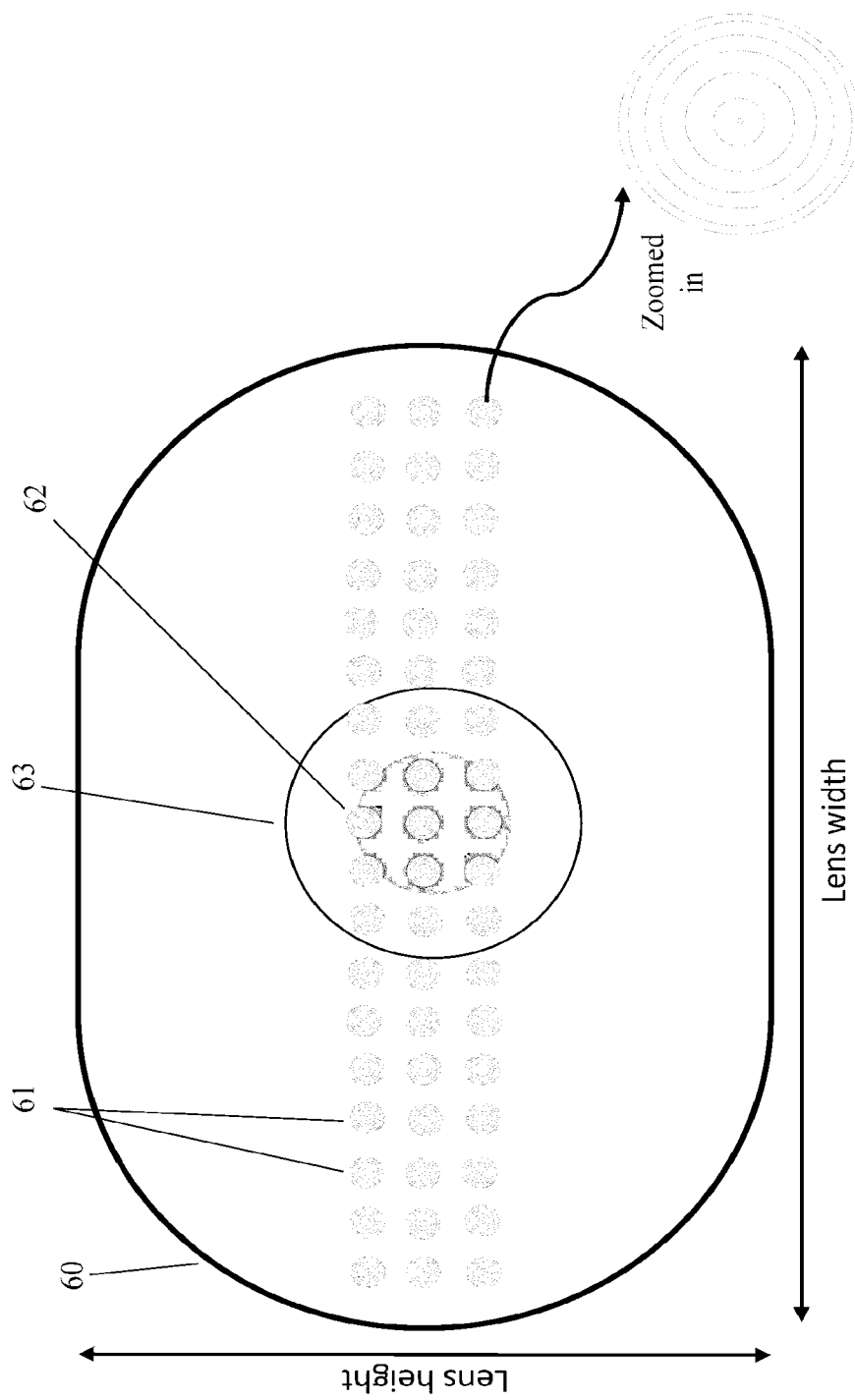
FIG. 17D illustrates a device wherein the DOEs 61 are arranged on a horizontal meridian zone and the other portions of the array are devoid or substantially devoid of DOEs, according to certain embodiments. This may be a DOE array formed in (or as part of) a sheet, a spectacle lens incorporating a DOE array or a combination of a DOE sheet and a spectacle lens.
Figure 17E:
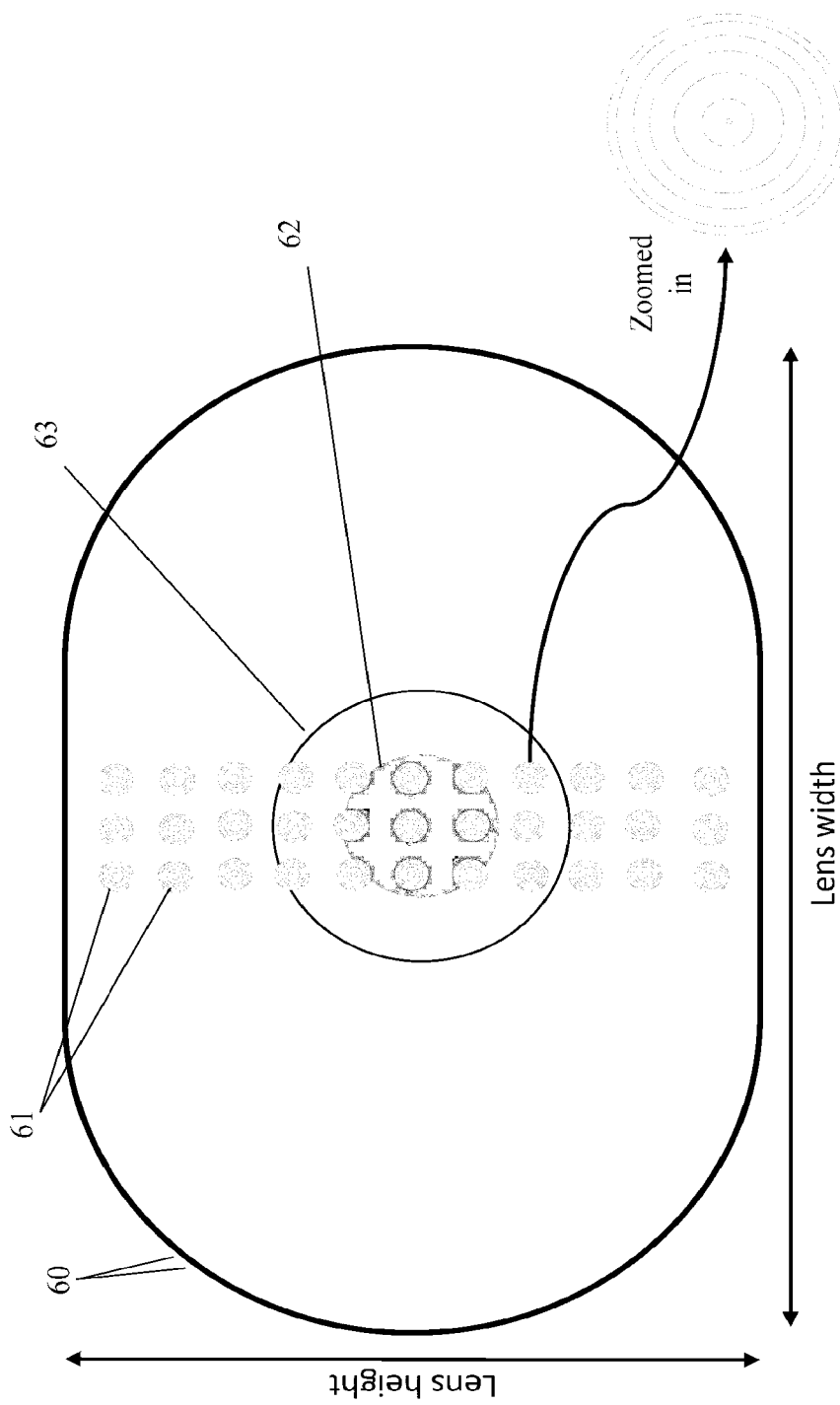
FIG. 17E illustrates a device wherein the DOEs are arranged on a vertical meridian zone and the other portions of the array are devoid or substantially devoid of DOEs, according to certain embodiments. This may be a DOE array formed in (or as part of) a sheet, a spectacle lens incorporating a DOE array or a combination of a DOE sheet and a spectacle lens.
Figure 17F:
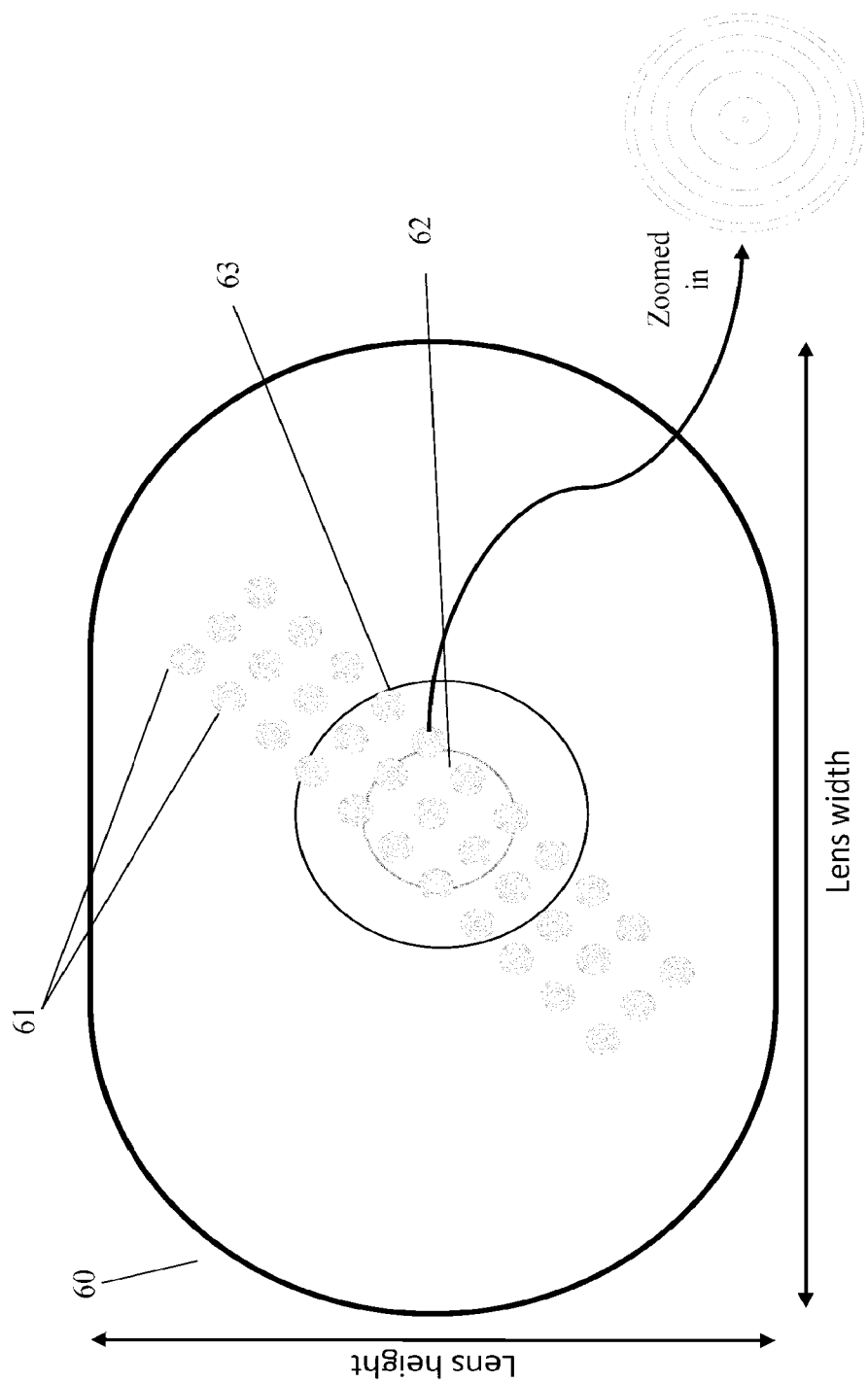
FIG. 17F illustrates a device wherein the DOEs are arranged on an oblique meridian zone and the other portions of the array are devoid or substantially devoid of DOEs, according to certain embodiments. This may be a DOE array formed in (or as part of) a sheet, a spectacle lens incorporating a DOE array or a combination of a DOE sheet and a spectacle lens.

FIGS. 17D to F illustrate in a frontal view devices with a DOE 60 wherein the DOEs are populated or arranged along certain meridian zones and the other portions of the array are devoid or substantial devoid of DOEs, according to certain embodiments. FIG. 17D illustrates a device wherein the DOEs 61 are arranged on a horizontal meridian zone and the other portions of the array are devoid or substantially devoid of DOEs. The horizontal meridian zone in which DOEs are located may cover at least 10% of the total surface area the array. The ratio between the total surface area of the meridian zone to the total surface area devoid or substantially devoid of DOEs may range from 0.1, 0.2, 0.3, 0.4 or 0.5.

FIG. 17E illustrates a device wherein the DOEs 61 are arranged on a vertical meridian zone and the other portions of the array are devoid or substantially devoid of DOEs. The vertical meridian zone in which DOEs are located may cover at least 10% of the total surface area the array. The ratio between the total surface area of the meridian zone to the total surface area devoid or substantially devoid of DOEs may range from 0.1, 0.2, 0.3, 0.4 or 0.5.

FIG. 17F illustrates a device wherein the DOEs 61 are arranged on an oblique meridian zone and the other portions of the array are devoid or substantially devoid of DOEs. The oblique meridian zone in which DOEs are located may cover at least 10% of the total surface area the array. The ratio between the total surface area of the meridian zone to the total surface area devoid or substantially devoid of DOEs may range from 0.1, 0.2, 0.3, 0.4 or 0.5. Not shown in FIG. 17F are other oblique meridians but these are contemplated by the present disclosure. These DOE arrays in this example may be used as an overlay on a spectacle lens or incorporated into a spectacle lens. The array examples are populated with DOEs 61. The physical dimensions of the DOEs and optical properties may be varied as disclosed herein. In these examples, each DOE may have a width ranging from 50 to 500 µm and a focal length ranging from 250 to 4000 mm as disclosed in this specification. In these examples, the diameter of each DOE is the same or substantially the same. In this example, the focal length of each DOE is the same or substantially the same. However, variations in the width and/or focal length of the DOEs within an array are contemplated by the present disclosure. One of the DOE is zoomed to enhance the appearance of the diffractive groove features.

Figure 19B:
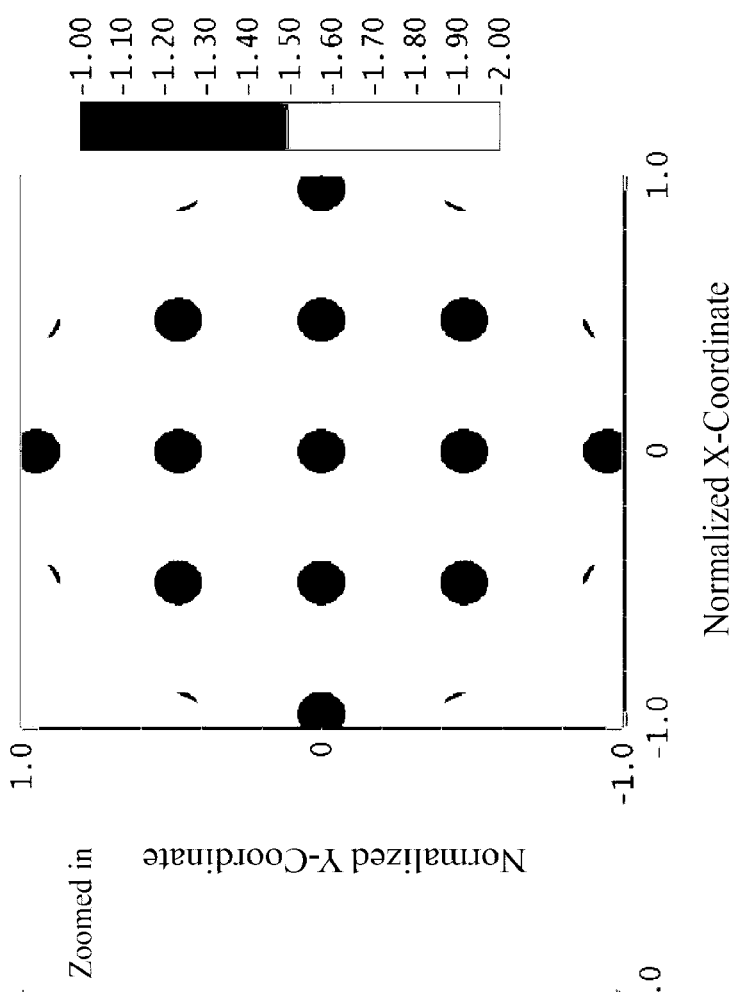
FIG. 19B illustrates the zoomed in version of the two-dimensional power profile a spectacle lens embedded with a ROE array shown in FIG. 19A, according to certain embodiments. The power profile in this figure is described over normalized coordinates, over 1 mm optic zone diameter to highlight the actual power of the ROE element (+1D).
Figure 19A:
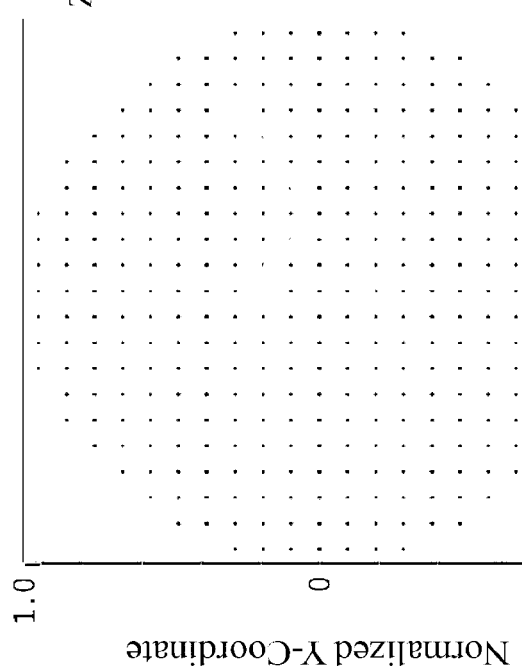
FIG. 19A illustrates a two-dimensional power profile a spectacle lens embedded with a ROE array, according to certain embodiments. The power profile in this figure is described over normalized coordinates, over 5 mm optic zone diameter.

Example 10: A ROE Array (Described in Example 5) on a Single Vision Spectacle Lens This exemplary embodiment describes use of a ROE array (similar to example 5) used in conjunction with a single vision spectacle lens. FIG. 19A illustrates a two-dimensional power profile map of a −2 Dioptre spectacle lens incorporated with a ROE array. FIG. 19B illustrates a magnified view of the two dimensional power distribution to enhance the appearance of the ROEs. The field coordinates of the exemplified power profiles in FIGS. 19A and 19B are normalized and they represent the spherical power distribution over a 5 mm and a 1 mm zone diameter, respectively. In this example, the power of each individual ROE is +1.00 D (i.e. focal length of 1000 mm). To compare the geometrical blur, the primary wavelength was set to 555 nm (representing the medium-wavelength cones in this test case) and the secondary wavelength was set to 610 nm, which corresponds to approximately 75% of the peak sensitivity of long-wavelength cones. The parameters of the spectacle lens embedded with a ROE array that were used for simulation are provided in Table 3.

TABLE 3

Parameter values of the ROE array used in combination with spectacle lenses

| Parameter Details | Spectacle lens with Micro Lenslet Array |
|---|---|
| Radius (mm)/asphericity | 265.00/−1.00 |
| Central thickness (mm) | 1.5 |
| Refractive index/Abbe Number | 1.56/50.2 |
| Vertex distance (mm) | 13 |

Figure 19C:
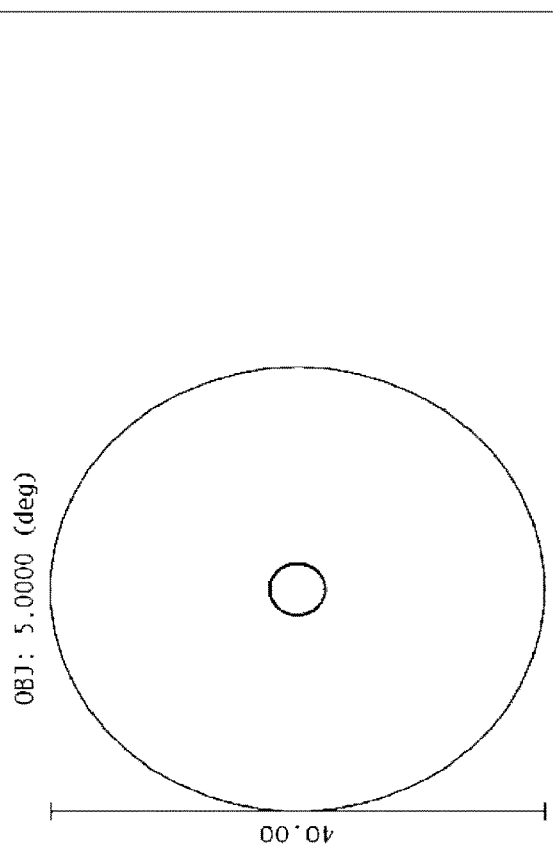
FIG. 19C shows additional data related to FIG. 19A. It illustrates the on-axis, geometric spot diagram analysis at the retinal plane, when the incoming light, with one of the two wavelengths of the polychromatic source (555 nm), with a vergence of zero diopters, is incident on a 2 Diopter Myopic Model eye that has been corrected with a spectacle lens embedded with a ROE array, described in FIGS. 19A and 19B.
Figure 19D:
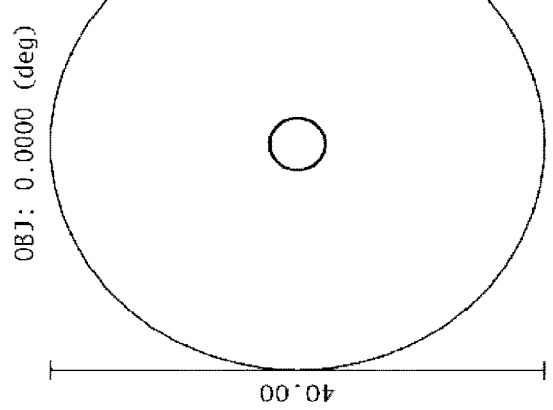
FIG. 19D shows additional data related to FIG. 19A. It illustrates the 5 degrees off-axis, geometric spot diagram analysis at the retinal plane, when the incoming light, with one of the two wavelengths of the polychromatic source (555 nm), with a vergence of zero diopters, is incident on a 2 Diopter Myopic Model eye that has been corrected with a spectacle lens, described in FIGS. 19A and 19B.
Figure 19E:
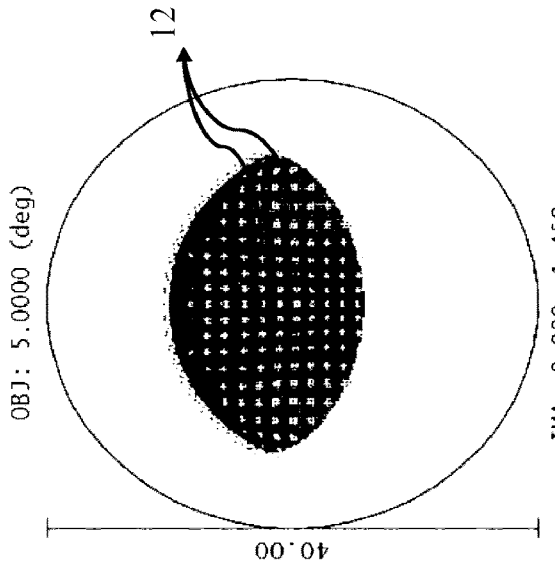
FIG. 19E shows additional data related to FIG. 19A. It illustrates the on-axis, geometric spot diagram analysis at the retinal plane, when the incoming light, with one of the two wavelengths of the polychromatic source (610 nm), with a vergence of zero diopters, is incident on a 2 Diopter Myopic Model eye that has been corrected with a spectacle lens embedded with a ROE array, described in FIG. 19A and FIG. 19B.
Figure 19F:
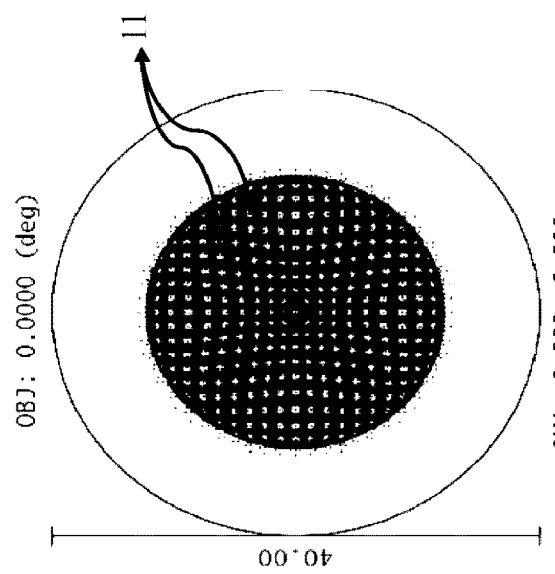
FIG. 19F shows additional data related to FIG. 19A. It illustrates the 5 degrees off-axis, geometric spot diagram analysis at the retinal plane, when the incoming light, with one of the two wavelengths of the polychromatic source (610 nm), with a vergence of zero diopters, is incident on a 2 Diopter Myopic Model eye that has been corrected with a spectacle lens, described in FIGS. 19A and 19B.

FIGS. 19C and 19D shows the geometrical blur circle for on-axis and off-axis (5° viewing angle) optical performance simulation at 555 nm working wavelength. FIGS. 19E and 19F show the geometric blur circle for on-axis and off-axis optical performance simulations (5° viewing angle) at 610 nm working wavelength. As can be seen in FIGS. 19C and 19D, just like the single vision test case (FIGS. 10B and 10C), for monochromatic light with a wavelength of 555 nm, the geometrical blur is comparable to the Airy disk, indicating in-focused light well contained within the Airy disk and thus expected to deliver good visual performance. However, for the 610 nm working wavelength test case, unlike the single vision lens test case, use of the ROE array in combination with the single vision spectacle lens produces two distinct types of blur (seen in FIGS. 19E and 19F); although majority of the blur is still hyperopic; there are regions on the retina (white pockets 11 and 12), where incoming light falls either in focus or before the retina. This situation produces a conflicting optical signal to the L cones of the retina, where some of the L cones detect hyperopic defocus, while others in the same retinal region experience an in-focus or myopic image. This exemplary shows that when such a correction is put in place that offers conflicting optical signals to the retina, the ocular system chooses to favour the in-focus images or the images in front of the retina. Thus, decelerating the rate of eye growth and/or myopia progression. This exemplary shows that when such a correction is put in place that offers spatially varying focal pattern at the retina, the ocular system chooses to favour the in-focus images or the images in front of the retina.

The simulated ROE array described and discussed in FIGS. 19A and 19B comprised of two-layers: a substrate layer and the front surface of the spectacle lens itself. The actual ROEs were designed on the front surface of the spectacle lens by varying the sagittal depth to create undulations across the spectacle lens. In this example, the radius of curvature of each ROE was kept to 40 mm, however other variations are contemplated in the present disclosure. In this exemplary all ROEs were circular in nature and the diameter were chosen to be 100 µm each, however, other variations are contemplated in the present disclosure. The total number of micro lenslets designed over a 5 mm pupil was 21×21 grid array with the micro lenslet pupil fill ratio being approximately 14%, however, other variations are contemplated in the present disclosure. In this example, the separation between any two micro lenslets was approximately 138 µm, however, other variations are contemplated in the present disclosure. To achieve the power profile shown in FIGS. 19A & 19B, the refractive index of the substrate material was selected to be 1.52, with same Abbe as the spectacle lens material. However, other variations in the refractive index and Abbe numbers are contemplated in the present disclosure. In other embodiments, a device that has a similar performance as described in FIGS. 19A and 19B may also be obtained by using DOEs instead of ROEs. In other embodiments, a device designed to deliver conflicting optical signals for the L cones (or a substantial portion of the L cones) while continuing to correct the eye for M cones (or a substantial portion of the M cones) may be achieved by using a combination ROEs and DOEs.

Example 11: A ROE Array Used in Conjunction with Single Vision Spectacle Lens

Figures 20A, 20B:
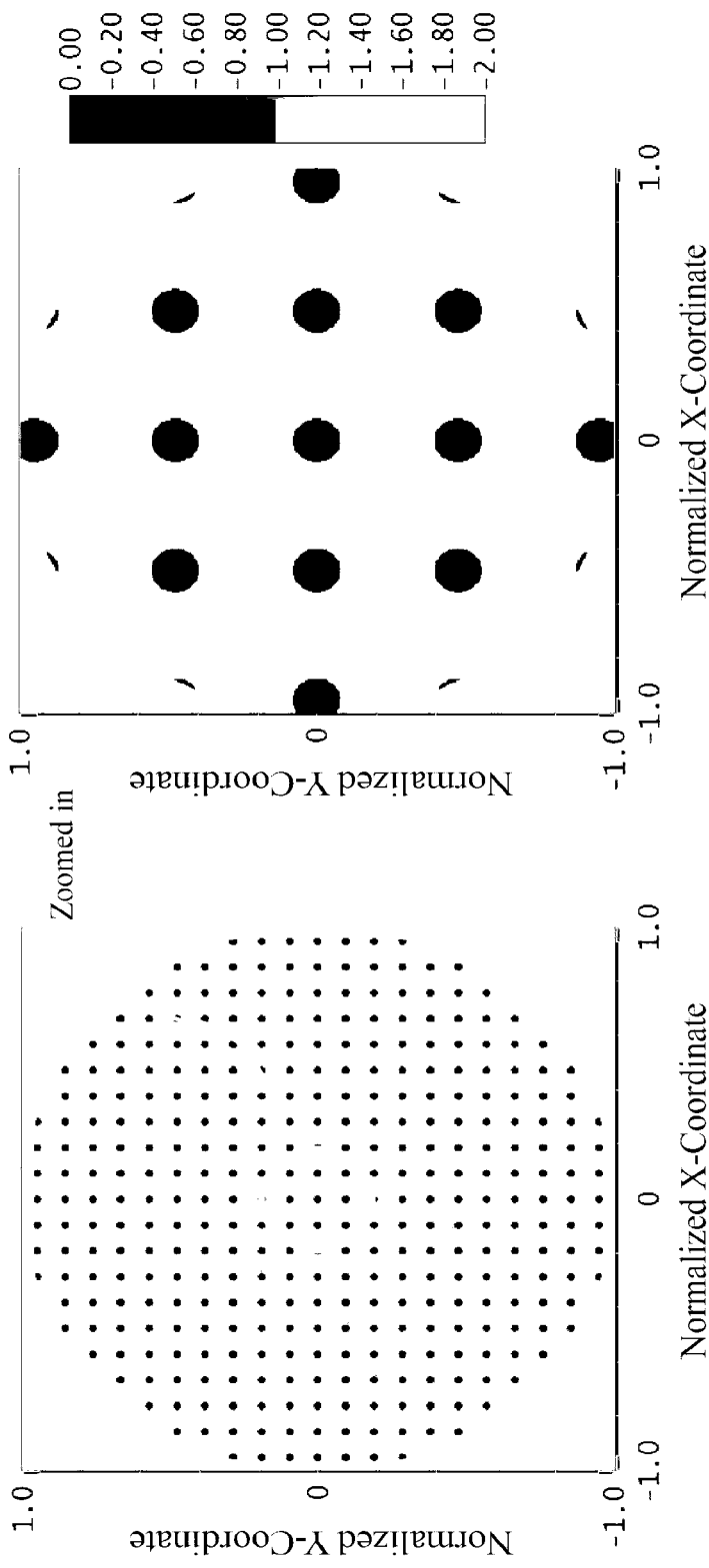
FIG. 20A illustrates a two-dimensional power profile a spectacle lens embedded with a ROE array, according to certain embodiments. The power profile in this figure is described over normalized coordinates, over 5 mm optic zone diameter.
FIG. 20B illustrates the zoomed in version of the two-dimensional power profile a spectacle lens embedded with a ROE array shown in FIG. 20A, according to certain embodiments. The power profile in this figure is described over normalized coordinates, over 1 mm optic zone diameter to highlight the actual power of the ROE element (+2D).
Figures 20C, 20D:
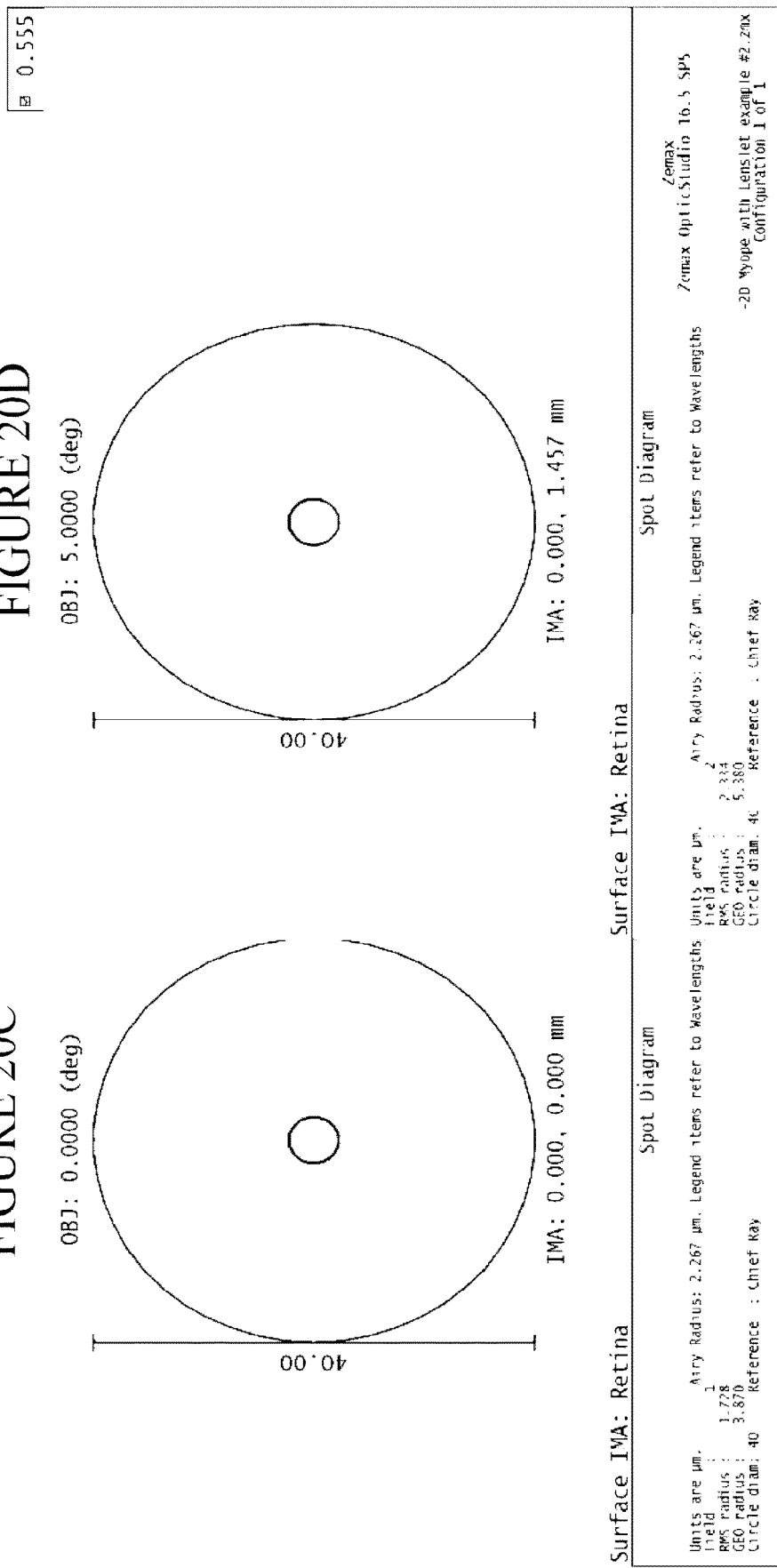
FIG. 20C shows additional data related to FIG. 20A. It illustrates the on-axis, geometric spot diagram analysis at the retinal plane, when the incoming light, with one of the two wavelengths of the polychromatic source (555 nm), with a vergence of zero diopters, is incident on a 2 Diopter Myopic Model eye that has been corrected with a spectacle lens embedded with a ROE array, described in FIGS. 20A and 20B.
FIG. 20D shows additional data related to FIG. 20A. It illustrates the 5 degrees off-axis, geometric spot diagram analysis at the retinal plane, when the incoming light, with one of the two wavelengths of the polychromatic source (555 nm), with a vergence of zero diopters, is incident on a 2 Diopter Myopic Model eye that has been corrected with a spectacle lens, described in FIGS. 20A and 20B.
Figures 20E, 20F:
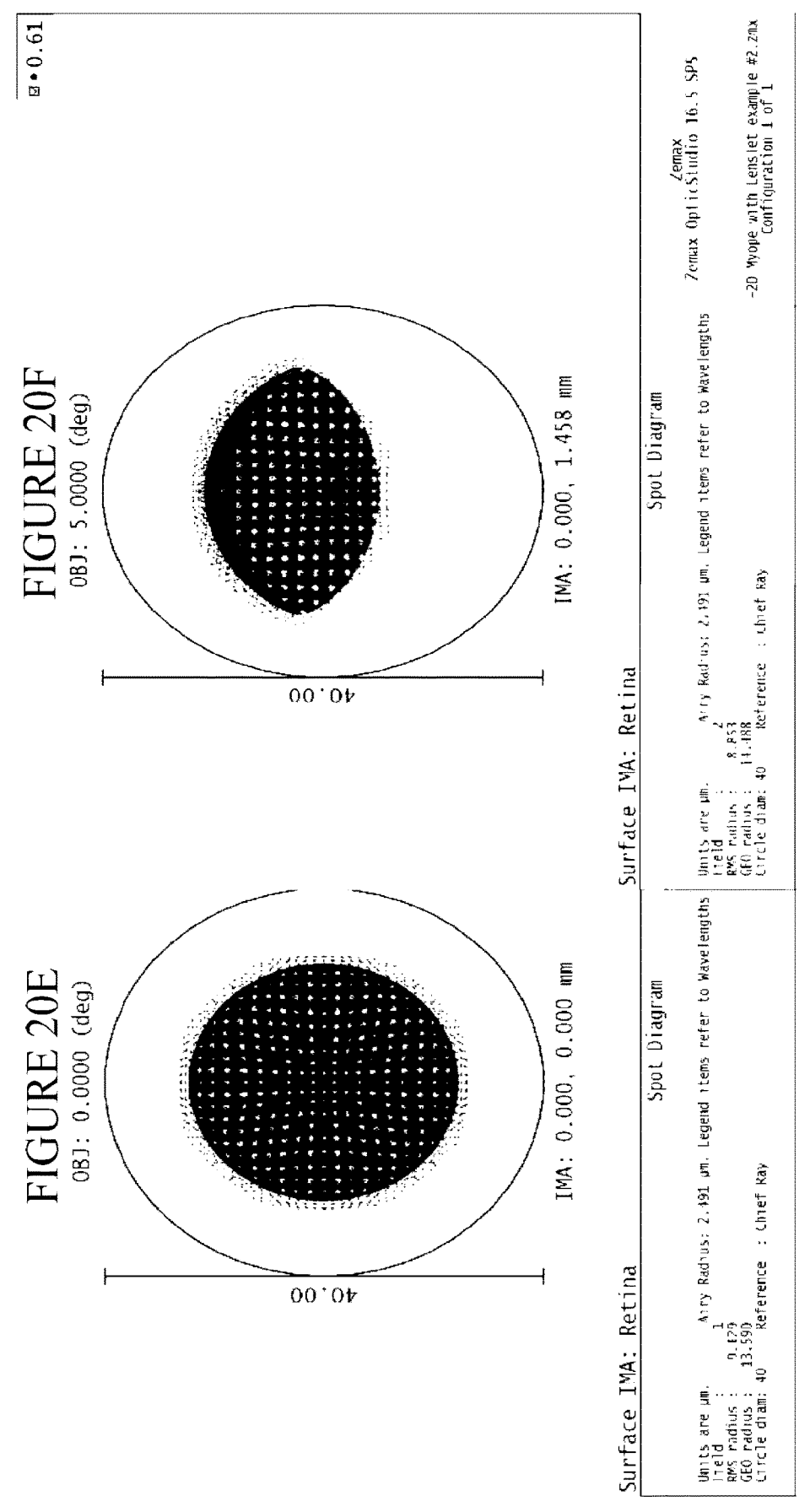

In this example (see FIGS. 20A-F) the ROE array, according to exemplary embodiments, is the same as seen in Example 10, however the power of each ROE in this case is +2.00 D (i.e. focal length is 500 mm), providing a greater shift in terms of longitudinal chromatic aberration over the region of interest on the retina, when compared to Example 10. The radius of curvature of each ROE was kept to 20 mm. FIG. 20B was magnified to showcase the central 1 mm region of the spectacle+ROE array combination. ROE fill ratio: approximately 14%.

Figure 21D:
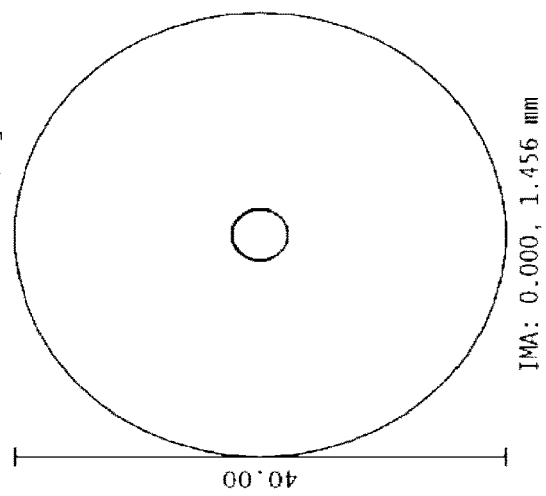
FIG. 21D shows additional data related to FIG. 21A. It illustrates the 5 degrees off-axis, geometric spot diagram analysis at the retinal plane, when the incoming light, with one of the two wavelengths of the polychromatic source (555 nm), with a vergence of zero diopters, is incident on a 2 Diopter Myopic Model eye that has been corrected with a spectacle lens, described in FIGS. 21A and 21B.
Figure 21C:
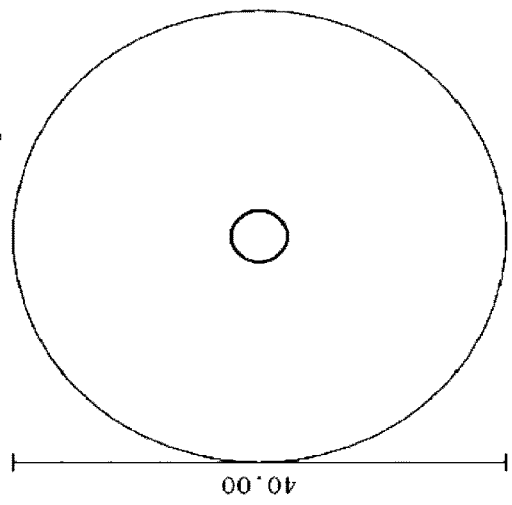
FIG. 21C shows additional data related to FIG. 21A. It illustrates the on-axis, geometric spot diagram analysis at the retinal plane, when the incoming light, with one of the two wavelengths of the polychromatic source (555 nm), with a vergence of zero diopters, is incident on a 2 Diopter Myopic Model eye that has been corrected with a spectacle lens embedded with a ROE array, described in FIGS. 21A and 21B.
Figure 21E:
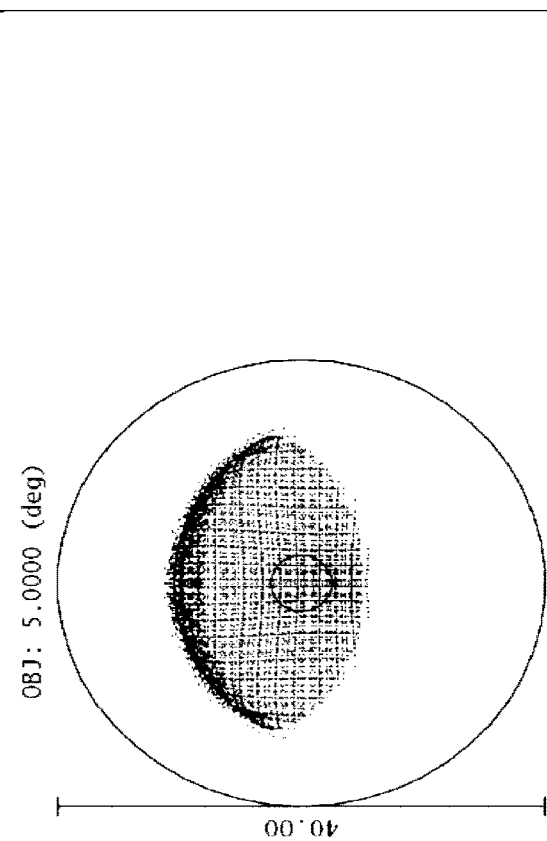
FIG. 21E shows additional data related to FIG. 21A. It illustrates the on-axis, geometric spot diagram analysis at the retinal plane, when the incoming light, with one of the two wavelengths of the polychromatic source (610 nm), with a vergence of zero diopters, is incident on a 2 Diopter Myopic Model eye that has been corrected with a spectacle lens embedded with a ROE array, described in FIG. 21A and FIG. 21B.
Figure 21F:
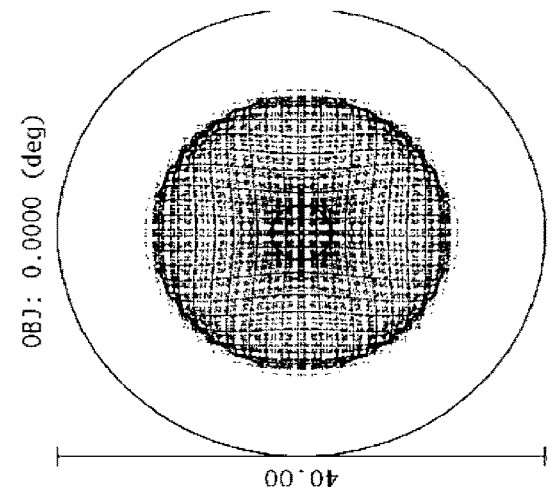
FIG. 21F shows additional data related to FIG. 21A. It illustrates the 5 degrees off-axis, geometric spot diagram analysis at the retinal plane, when the incoming light, with one of the two wavelengths of the polychromatic source (610 nm), with a vergence of zero diopters, is incident on a 2 Diopter Myopic Model eye that has been corrected with a spectacle lens, described in FIGS. 21A and 21B.

Example 12: A ROE Array (Described in Example 5) on a Single Vision Spectacle Lens In this example, (see FIGS. 21A-F) the ROE array, according to certain exemplary embodiments, is the same as example 10, but the power of each ROE is +2.00 D (i.e. focal length is 500 mm). The radius of curvature of each ROE was kept to 20 mm. The total number of ROEs designed over a 5 mm pupil was 41×41 grid array. The separation between any two ROEs was FIG. 21B was magnified to highlight the central 1 mm of the spectacle+ROE combination. Micro lenslet fill ratio: approximately 50%. Due to the greater ROE fill ratio when compared to Examples 10 and 11, more regions on the retina are experience a conflicting optical signal at the L cone receptor level on the retina i.e. for 610 nm long-wavelength light (FIGS. 21E and 21F). However, the size of the geometric blur circles for 555 nm working wavelength (FIGS. 21C and 21D) is similar to the geometric blur circles in Example 10 (FIGS. 19C and 19D) and with the single vision lens (FIGS. 10B and 10C), indicating similar visual performance.

In other exemplary embodiments relating to examples 10, 11 and 12, one or more of the following may vary: the size of the ROEs may be smaller and/or larger across the array/pupil and the size of the ROEs may vary in size across the array and/or pupil, and the radius of each ROE, a substantial portion of the ROEs and/or a portion of the ROEs may be smaller and/or larger, and the radius of the ROEs may vary across the array and/or pupil, and the separation between micro lenslets may be smaller and/or larger, and the separation of the ROEs may vary across the array and/or pupil, and the arrangement of the ROEs may be different to the 'squared' grid-array arrangement shown, e.g., hexagonal arrangement. The pupil size may be smaller or larger. In other exemplary embodiments relating to examples 10, 11 and 12, the ROEs may be replaced by DOEs or a combination of ROEs and DOEs.

Example 13: A ROE Array (Described in Example 6) on a Single Vision Spectacle Lens In this example, (see FIGS. 22A-E) the ROE array, according to certain exemplary embodiments, is the same as example 10, but the power of each ROE is +2.00 D. The radius of curvature of each ROE was kept to 20 mm. The total number of ROEs designed over a 5 mm pupil was 9×9 grid array, but in the center was a horizontal ROE free zone with the width being 0.5 mm. The separation between the ROEs above and below the ROE free zone was zero. The ROE pupil fill ratio over a 5 mm pupil is approximately 64% and the ROE fill ratio across a 50 mm spectacle lens blank is approximately 78%

Figure 22A:
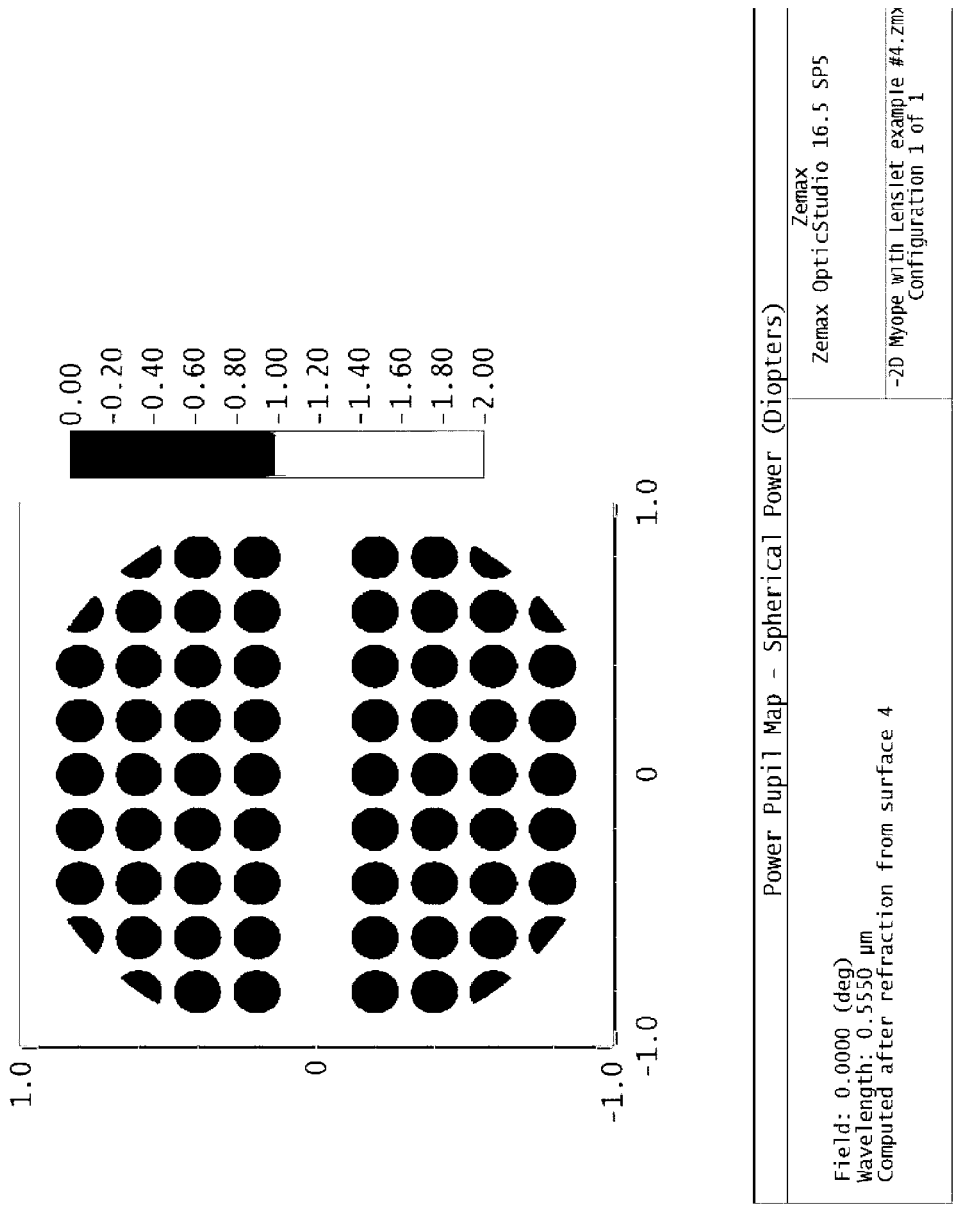
FIG. 22A illustrates a two-dimensional power profile a spectacle lens embedded with a ROE array, according to certain embodiments. The power profile in this figure is described over normalized coordinates, over 5 mm optic zone diameter. The power of individual element is +2D.
Figure 22C:
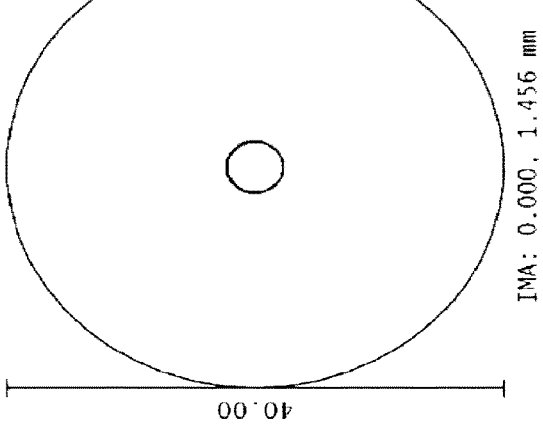
FIG. 22C shows additional data related to FIG. 22A. It illustrates the on-axis, geometric spot diagram analysis at the retinal plane, when the incoming light, with one of the two wavelengths of the polychromatic source (555 nm), with a vergence of zero diopters, is incident on a 2 Diopter Myopic Model eye that has been corrected with a spectacle lens embedded with a ROE array, described in FIG. 22A.
Figure 22D:
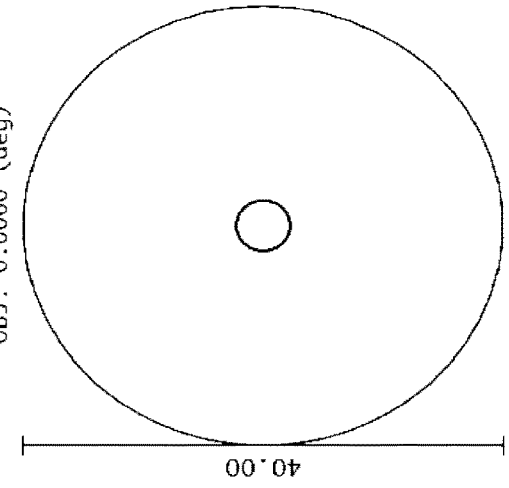
FIG. 22D shows additional data related to FIG. 22A. It illustrates the 5 degrees off-axis, geometric spot diagram analysis at the retinal plane, when the incoming light, with one of the two wavelengths of the polychromatic source (555 nm), with a vergence of zero diopters, is incident on a 2 Diopter Myopic Model eye that has been corrected with a spectacle lens, described in FIG. 22A.
Figure 22E:
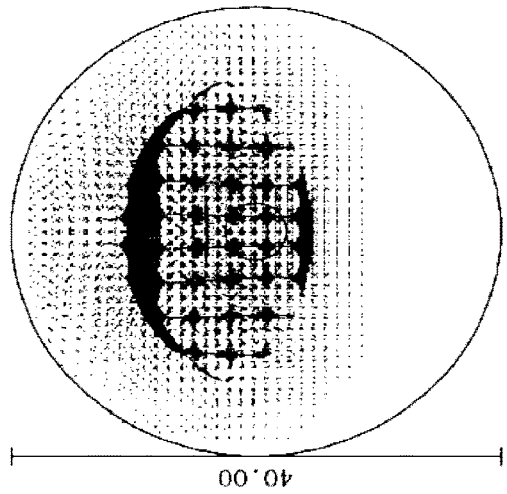
FIG. 22E shows additional data related to FIG. 22A. It illustrates the on-axis, geometric spot diagram analysis at the retinal plane, when the incoming light, with one of the two wavelengths of the polychromatic source (610 nm), with a vergence of zero diopters, is incident on a 2 Diopter Myopic Model eye that has been corrected with a spectacle lens embedded with a ROE array, described in FIG. 22A.
Figure 22F:
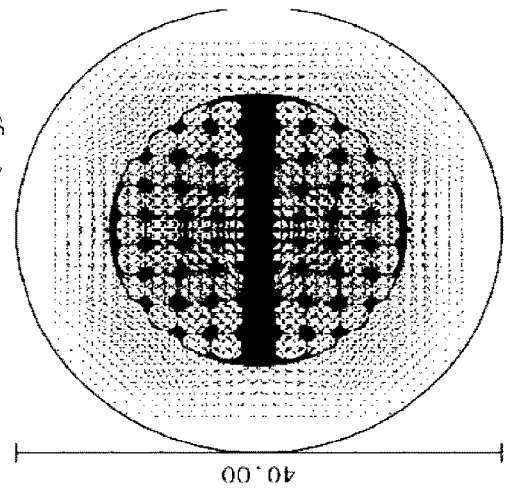
FIG. 22F shows additional data related to FIG. 22A. It illustrates the 5 degrees off-axis, geometric spot diagram analysis at the retinal plane, when the incoming light, with one of the two wavelengths of the polychromatic source (610 nm), with a vergence of zero diopters, is incident on a 2 Diopter Myopic Model eye that has been corrected with a spectacle lens, described in FIG. 22A.

Overall, the ROE fill ratio is even greater when compared to Example 10, and thus more regions on the retina are experience a conflicting optical signal at the L cone receptor level on the retina i.e. for 610 nm long-wavelength light (see FIGS. 22E and 22F). The conflicting optical signals are offered over a region of the retina that corresponds to the ROE free zone of the spectacle lens system. Greater ROE fill ratio and increased diameter of the individual ROE corresponds to the increased size of the blur circles (FIGS. 22B and 22C) in the example compared to the blur circles in Examples 11, 12, and 13 and with the single vision lens, indicating reduced visual performance. In certain exemplary embodiments, if the anticipated reduction in visual performance is not acceptable, one or more of the following the parameters may be modified varied to improve the wearability of the micro lenslet array plus spectacle lens combination: the size of the lenslet, shape of the lenslet, separation between the lenslet, and power of the micro lenslets In other examples, the size of the clear horizontal line may be smaller and/or larger, the size of the ROEs may be smaller and/or larger across the array and/or pupil and the size of the ROEs may vary in size across the array/pupil, and the radius of each ROEs, a substantial portion of the ROEs and/or a portion of the ROEs may be smaller and/or larger, and the radius of the ROEs may vary across the array and/or pupil, and the separation between ROEs may be larger, and the separation of the ROEs may vary across the array and/or pupil, and the arrangement of the ROEs may be different to the 'squared' grid-array arrangement shown in Example 16, e.g. hexagonal arrangement. The pupil size may be smaller or larger. The direction of the clear (no ROEs) line may also be vertical or in an oblique direction. In other exemplary embodiments relating to examples 11, 12 and 13, the ROEs may be replaced by DOEs or a combination of ROEs and DOEs.

Figure 23B:
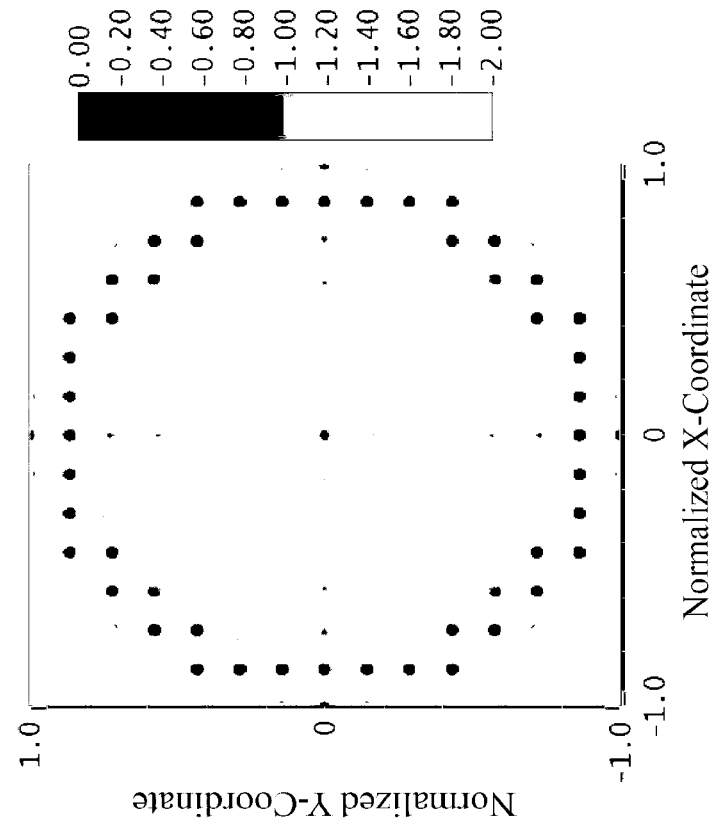
FIG. 23B illustrates the zoomed in version of the two-dimensional power profile a spectacle lens embedded with a ROE array shown in FIG. 23A, according to certain embodiments. The power profile in this figure is described over normalized coordinates, over 2.5 mm optic zone diameter to highlight the actual power of the ROE element (+2D).
Figure 23A:
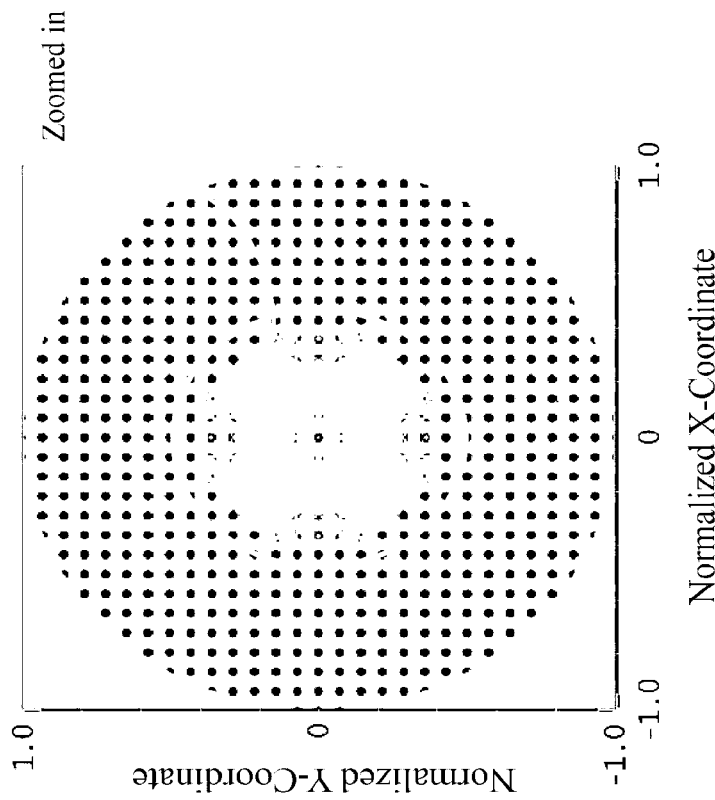
FIG. 23A illustrates a two-dimensional power profile a spectacle lens embedded with a ROE array, according to certain embodiments. The power profile in this figure is described over normalized coordinates, over 5 mm optic zone diameter.
Figure 23C:
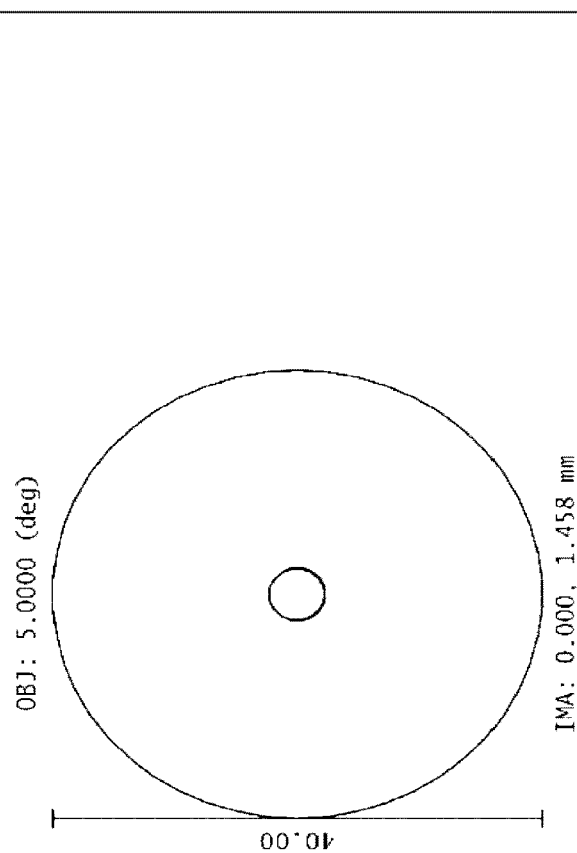
FIG. 23C shows additional data related to FIG. 23A. It illustrates the on-axis, geometric spot diagram analysis at the retinal plane, when the incoming light, with one of the two wavelengths of the polychromatic source (555 nm), with a vergence of zero diopters, is incident on a 2 Diopter Myopic Model eye that has been corrected with a spectacle lens embedded with a ROE array, described in FIGS. 23A and 23B.
Figure 23D:
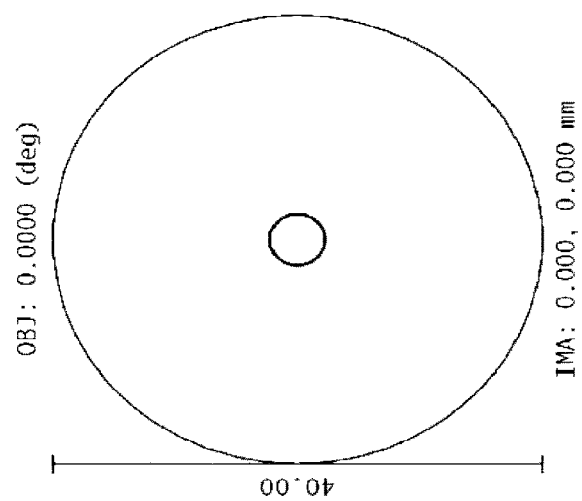
FIG. 23D shows additional data related to FIG. 23A. It illustrates the 5 degrees off-axis, geometric spot diagram analysis at the retinal plane, when the incoming light, with one of the two wavelengths of the polychromatic source (555 nm), with a vergence of zero diopters, is incident on a 2 Diopter Myopic Model eye that has been corrected with a spectacle lens, described in FIGS. 23A and 23B.
Figure 23E:
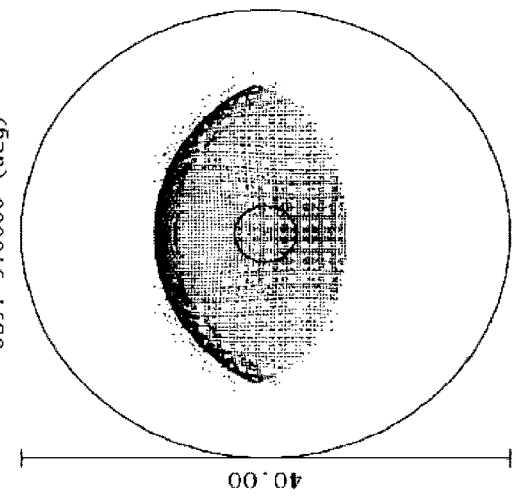
FIG. 23E shows additional data related to FIG. 23A. It illustrates the on-axis, geometric spot diagram analysis at the retinal plane, when the incoming light, with one of the two wavelengths of the polychromatic source (610 nm), with a vergence of zero diopters, is incident on a 2 Diopter Myopic Model eye that has been corrected with a spectacle lens embedded with a ROE array, described in FIG. 23A and FIG. 23B.
Figure 23F:
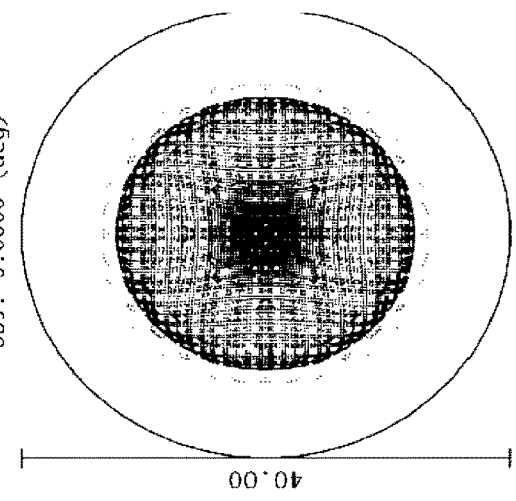
FIG. 23F shows additional data related to FIG. 23A. It illustrates the 5 degrees off-axis, geometric spot diagram analysis at the retinal plane, when the incoming light, with one of the two wavelengths of the polychromatic source (610 nm), with a vergence of zero diopters, is incident on a 2 Diopter Myopic Model eye that has been corrected with a spectacle lens, described in FIGS. 23A and 23B.

Example 14: A ROE Array (Described in Example 6) on a Single Vision Spectacle Lens In this example, (see FIGS. 23A-F) the ROE, according to certain exemplary embodiments, is the same as example 10, but the power of each ROE is +2.00 D. The radius of curvature of each ROE was kept to 20 mm. Further, the ROE array comprises of two circular zones, i.e. an inner and an outer circle. The diameter of the inner circle is 2 mm and consists of 3×3 ROEs in a grid array, which each ROE having a diameter of 0.080 mm. The outer circle diameter is 5 mm with the ROE resolution being 29×29 in a grid array. The diameter of the outer circle ROEs are 0.100 mm with a separation between ROE borders of 0.080 mm. FIG. 23B was magnified to illustrate the central 2.5 mm region of the spectacle plus ROE array combination. The ROE pupil fill ratio over a 5 mm pupil is approximately 21% and the ROE fill ratio across a 50 mm spectacle lens blank is approximately 25%. The ROE fill ratio of the outer circle is greater than the ratio of the inner circle and thus more conflicting optical signals to the retina are provided peripherally. The size of the blur circles (FIGS. 23C and 23D) in the example are better than the blur circles in Examples 12 and 13 and comparable with the single vision lens, indicating acceptable visual performance.

Example 15: A ROE Array Used in Conjunction with Single Vision Spectacle Lens

In this example, (see FIGS. 24A-F) the ROE array, according to certain exemplary embodiments, is the same as example 14, but the power of each micro lenslet is +2.00 D. The radius of curvature of each ROE was kept to 20 mm. The ROE array comprises of two circular zones, i.e. an inner and an outer circle. The diameter of the inner circle is 3 mm and consists of 11×11 ROEs in a grid array, which each ROE having a diameter of 0.150 mm with a separation between ROE borders of 0.150 mm. The outer circle diameter is 5 mm with the ROE resolution being 15×15 in a grid array. The diameter of the outer circle ROEs are 0.300 mm with a separation between ROE borders of 0.02 mm.

Figure 24C:
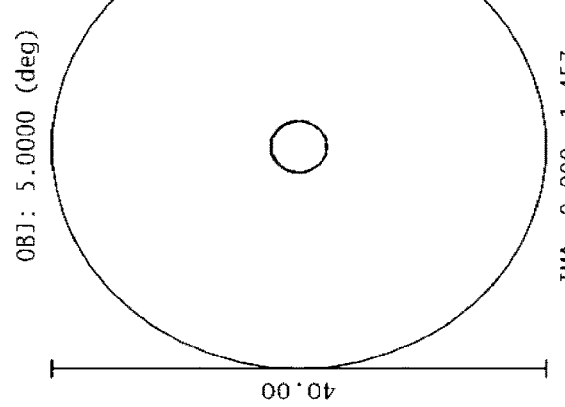
FIG. 24C shows additional data related to FIG. 24A. It illustrates the on-axis, geometric spot diagram analysis at the retinal plane, when the incoming light, with one of the two wavelengths of the polychromatic source (555 nm), with a vergence of zero diopters, is incident on a 2 Diopter Myopic Model eye that has been corrected with a spectacle lens embedded with a ROE array, described in FIGS. 24A and 24B.
Figure 24D:
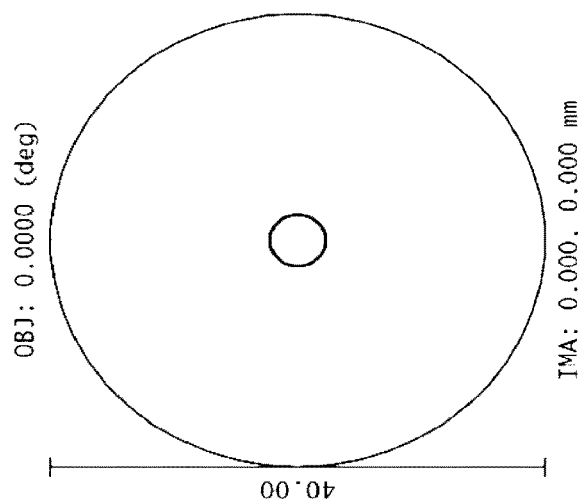
FIG. 24D shows additional data related to FIG. 24A. It illustrates the 5 degrees off-axis, geometric spot diagram analysis at the retinal plane, when the incoming light, with one of the two wavelengths of the polychromatic source (555 nm), with a vergence of zero diopters, is incident on a 2 Diopter Myopic Model eye that has been corrected with a spectacle lens, described in FIGS. 24A and 24B.
Figure 24E:
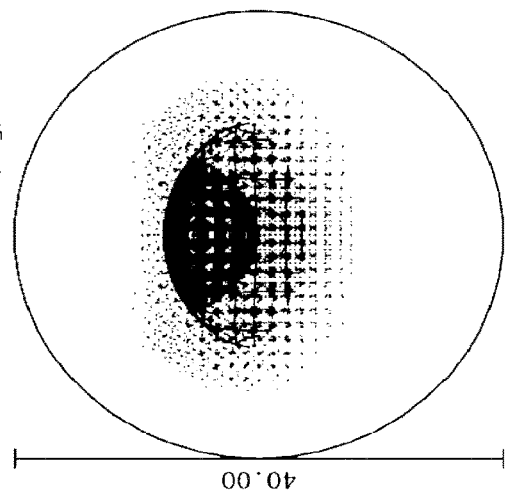
FIG. 24E shows additional data related to FIG. 24A. It illustrates the on-axis, geometric spot diagram analysis at the retinal plane, when the incoming light, with one of the two wavelengths of the polychromatic source (610 nm), with a vergence of zero diopters, is incident on a 2 Diopter Myopic Model eye that has been corrected with a spectacle lens embedded with a ROE array, described in FIG. 24A and FIG. 24B.
Figure 24F:
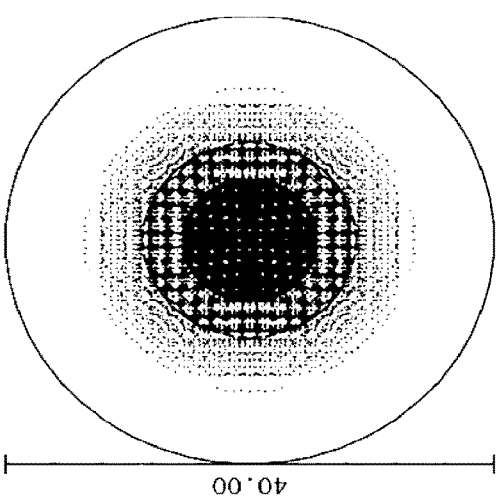
FIG. 24F shows additional data related to FIG. 24A. It illustrates the 5 degrees off-axis, geometric spot diagram analysis at the retinal plane, when the incoming light, with one of the two wavelengths of the polychromatic source (610 nm), with a vergence of zero diopters, is incident on a 2 Diopter Myopic Model eye that has been corrected with a spectacle lens, described in FIGS. 24A and 24B.

FIG. 24B was magnified to illustrate the central 3.5 mm region of the spectacle plus ROE array combination. The ROE pupil fill ratio over a 5 mm pupil is approximately 64% and the ROE fill ratio across a 50 mm spectacle lens blank is approximately 78%. The secondary wavelength was set to 590 nm, which corresponds to the peak sensitivity of long-wavelength cones. The ROE fill ratios of the outer and inner circles are greater than the ratios of the circles in Example 14 and thus more conflicting optical signals to the retina are provided centrally and peripherally (24E and 24F). The size of the blur circles (FIGS. 24C and 24D) in the example are greater when compared to the blur circles in Example 14, indicating reduced visual performance.

Figure 25B:
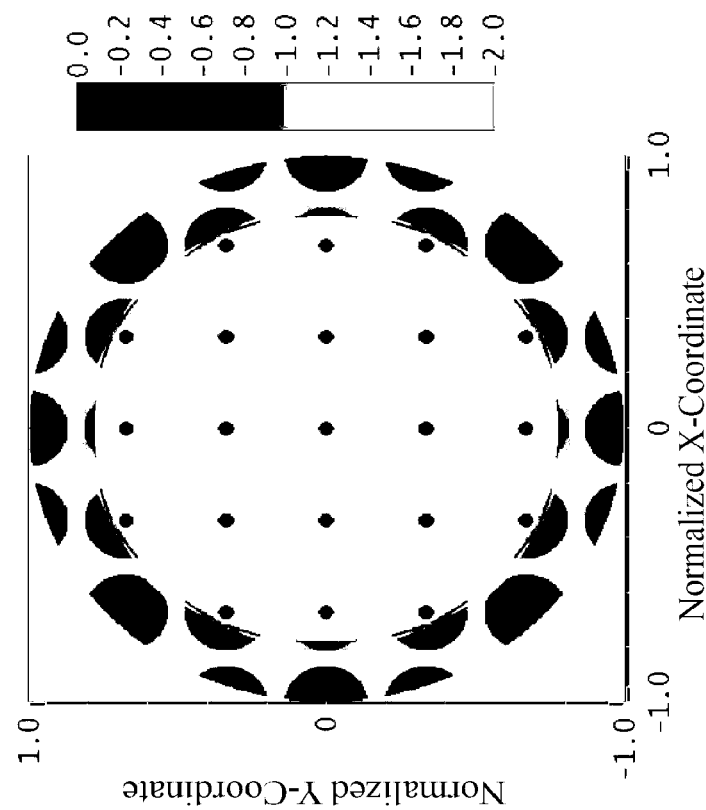
FIG. 25B illustrates the zoomed in version of the two-dimensional power profile a spectacle lens embedded with a ROE array shown in FIG. 25A, according to certain embodiments. The power profile in this figure is described over normalized coordinates, over 2.5 mm optic zone diameter to highlight the actual power of the ROE element (+2D).
Figure 25A:
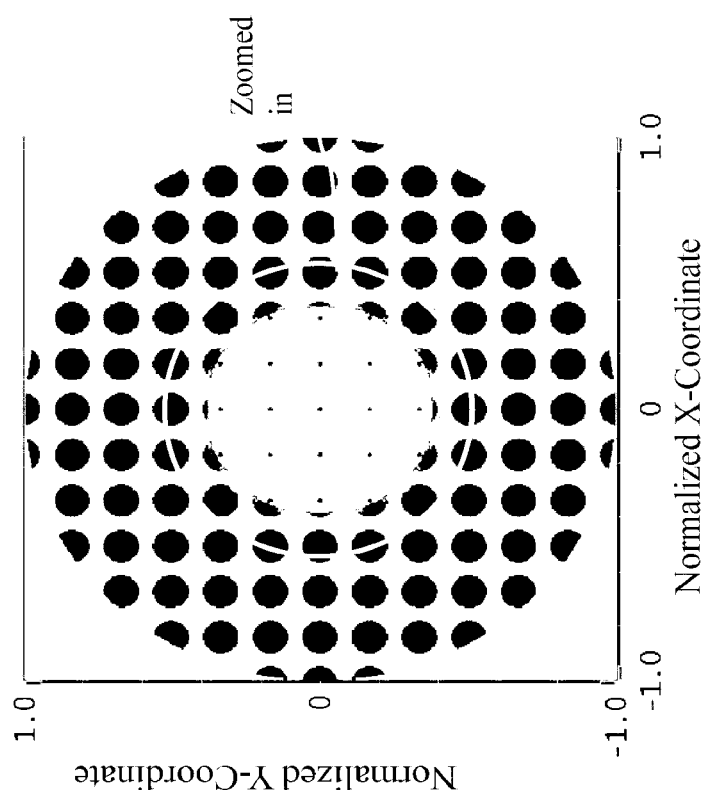
FIG. 25A illustrates a two-dimensional power profile a spectacle lens embedded with a ROE array, according to certain embodiments. The power profile in this figure is described over normalized coordinates, over 5 mm optic zone diameter.
Figure 25D:
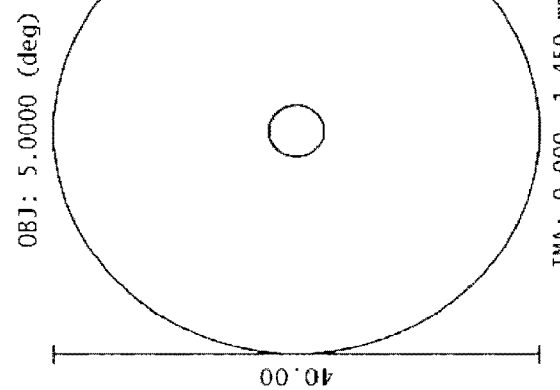
FIG. 25D shows additional data related to FIG. 25A. It illustrates the 5 degrees off-axis, geometric spot diagram analysis at the retinal plane, when the incoming light, with one of the two wavelengths of the polychromatic source (555 nm), with a vergence of zero diopters, is incident on a 2 Diopter Myopic Model eye that has been corrected with a spectacle lens, described in FIGS. 25A and 25B.
Figure 25C:
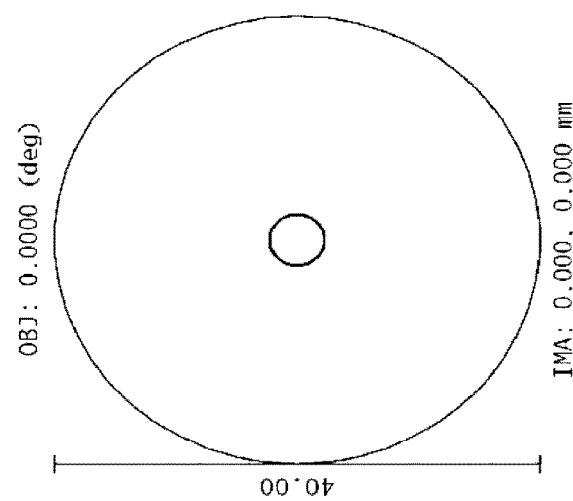
FIG. 25C shows additional data related to FIG. 25A. It illustrates the on-axis, geometric spot diagram analysis at the retinal plane, when the incoming light, with one of the two wavelengths of the polychromatic source (555 nm), with a vergence of zero diopters, is incident on a 2 Diopter Myopic Model eye that has been corrected with a spectacle lens embedded with a ROE array, described in FIGS. 25A and 25B.
Figure 25E:
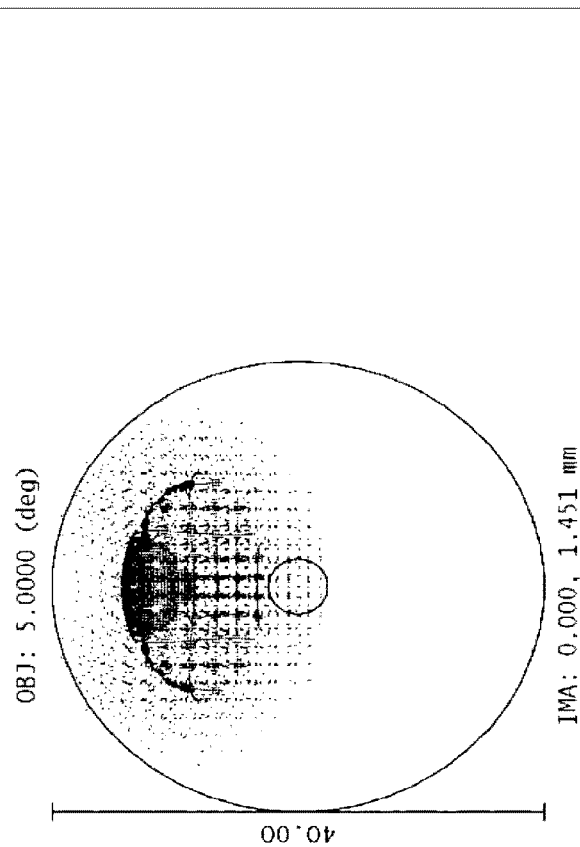
FIG. 25E shows additional data related to FIG. 25A. It illustrates the on-axis, geometric spot diagram analysis at the retinal plane, when the incoming light, with one of the two wavelengths of the polychromatic source (610 nm), with a vergence of zero diopters, is incident on a 2 Diopter Myopic Model eye that has been corrected with a spectacle lens embedded with a ROE array, described in FIG. 25A and FIG. 25B.
Figure 25F:
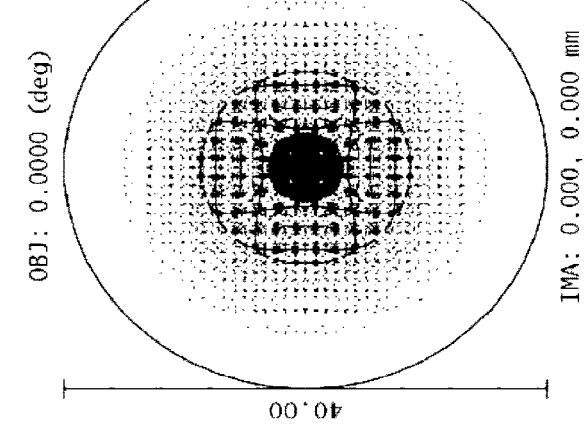
FIG. 25F shows additional data related to FIG. 25A. It illustrates the 5 degrees off-axis, geometric spot diagram analysis at the retinal plane, when the incoming light, with one of the two wavelengths of the polychromatic source (610 nm), with a vergence of zero diopters, is incident on a 2 Diopter Myopic Model eye that has been corrected with a spectacle lens, described in FIGS. 25A and 25B.

Example 16: A ROE Array (Described in Example 6) on a Single Vision Spectacle Lens In this example, (see FIGS. 25A-F) the ROE, according to certain exemplary embodiments, is the same as example 14, but the power of each ROE is +2.00 D. The radius of curvature of each ROE was kept to 20 mm. The ROE array comprises of two circular zones, i.e. an inner and an outer circle. The diameter of the inner circle is 2 mm and consists of 5×5 ROEs in a grid array, which each ROE having a diameter of 0.110 mm with a separation between ROE borders of 0.100 mm. The outer circle diameter is 5 mm with the ROE resolution being 13×13 in a grid array. The diameter of the outer circle ROEs are 0.400 mm with a separation between ROE borders of 0.020 mm. FIG. 25B was magnified to showcase the central 2.5 mm zone of the spectacle lens system. The ROE pupil fill ratio over a 5 mm pupil is approximately 65% and the ROE fill ratio across a 50 mm spectacle lens blank is approximately 69%. The secondary wavelength was set to 590 nm, which corresponds to the peak sensitivity of long-wavelength cones. The ROE fill ratios of the outer and inner circles are even greater than the ratios of the circles in Example 15 and thus even more conflicting optical signals to the retina are provided centrally and peripherally. However, the size of the blur circles (FIGS. 25C and 25D) in this example are greater when compared to the blur circles in Example 14, and the off-axis blur circles (FIGS. 25E and 25F) are shifted away from the airy disc indicating even lower visual performance.

Example 17: A ROE Array in Conjunction with Single Vision Spectacle Lens

Figure 26A:
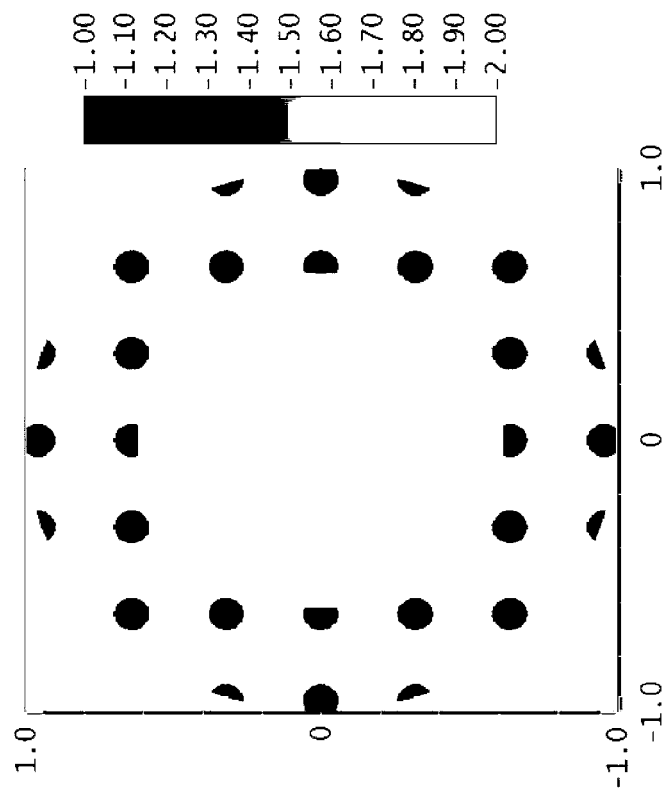
FIG. 26A illustrates a two-dimensional power profile a spectacle lens embedded with a ROE array, according to certain embodiments. The power profile in this figure is described over normalized coordinates, over 5 mm optic zone diameter. The power of individual element is +1D.
Figure 26A:
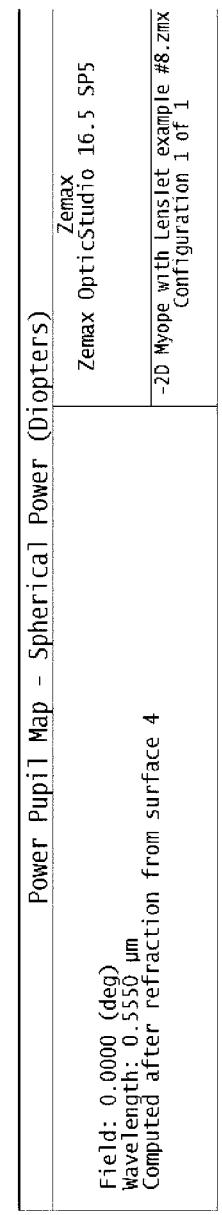
Figure 26C:
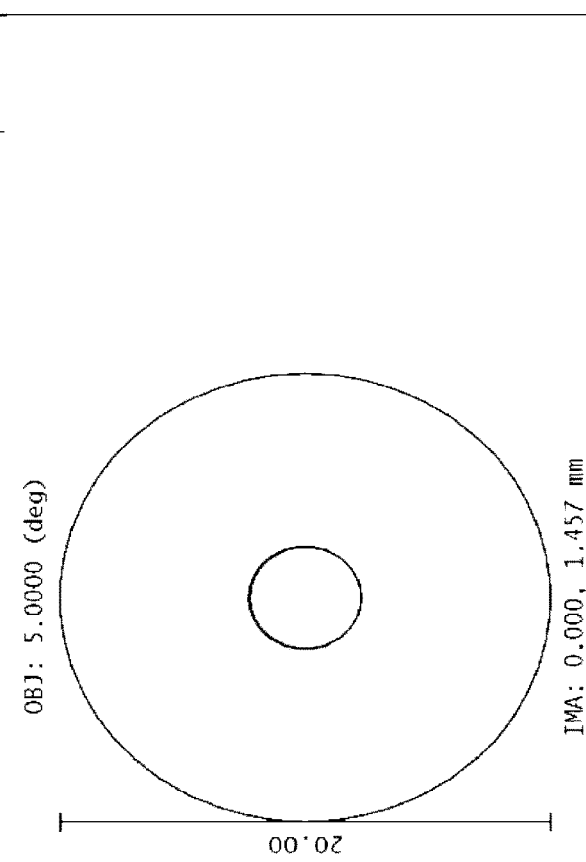
FIG. 26C shows additional data related to FIG. 26A. It illustrates the on-axis, geometric spot diagram analysis at the retinal plane, when the incoming light, with one of the two wavelengths of the polychromatic source (555 nm), with a vergence of zero diopters, is incident on a 2 Diopter Myopic Model eye that has been corrected with a spectacle lens embedded with a ROE array, described in FIG. 26A.
Figure 26D:
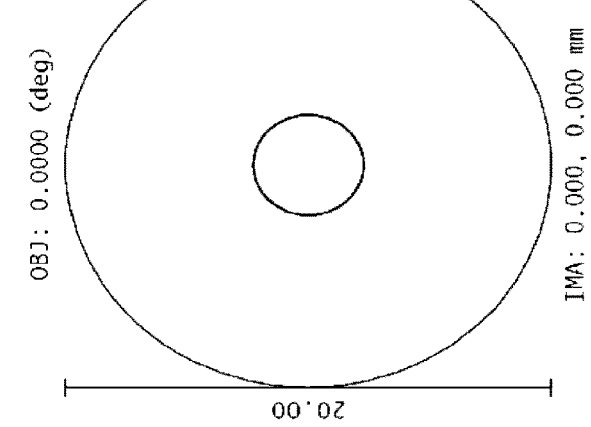
FIG. 26D shows additional data related to FIG. 26A. It illustrates the 5 degrees off-axis, geometric spot diagram analysis at the retinal plane, when the incoming light, with one of the two wavelengths of the polychromatic source (555 nm), with a vergence of zero diopters, is incident on a 2 Diopter Myopic Model eye that has been corrected with a spectacle lens, described in FIG. 26A.
Figure 26E:
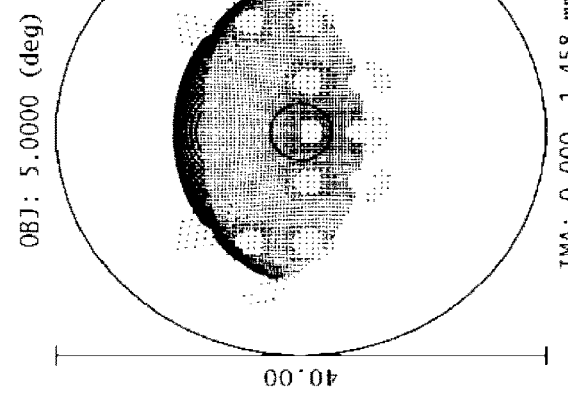
FIG. 26E shows additional data related to FIG. 26A. It illustrates the on-axis, geometric spot diagram analysis at the retinal plane, when the incoming light, with one of the two wavelengths of the polychromatic source (610 nm), with a vergence of zero diopters, is incident on a 2 Diopter Myopic Model eye that has been corrected with a spectacle lens embedded with a ROE array, described in FIG. 26A.
Figure 26F:
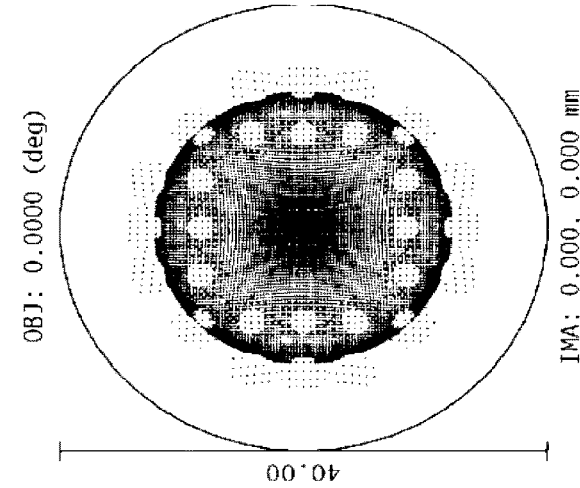
FIG. 26F shows additional data related to FIG. 26A. It illustrates the 5 degrees off-axis, geometric spot diagram analysis at the retinal plane, when the incoming light, with one of the two wavelengths of the polychromatic source (610 nm), with a vergence of zero diopters, is incident on a 2 Diopter Myopic Model eye that has been corrected with a spectacle lens, described in FIG. 26A.

In this example, (see FIGS. 26A-E) the ROE array, according to certain exemplary embodiments, is the same as example 14. The ROE array comprises of two circular zones, i.e. an inner and an outer circle. The diameter of the inner circle is 3 mm and has no ROEs. The outer circle diameter is 5 mm with the ROE resolution being 7×7 in a grid array. The diameter of the outer circle ROEs are 0.400 mm with a separation between ROE borders of 0.31 mm. The ROE pupil fill ratio over a 5 mm pupil is approximately 19% and the ROE fill ratio across a 50 mm spectacle lens blank is approximately 25%. In this example, the overall ROE fill ratio is greater when compared to Examples 14, and thus more regions on the retina introduce conflicting optical signals. As seen from FIGS. 26E and 26F, significant number of L cones receptors on the retina experience myopic defocus while the rest experience a hyperopic defocus. Due to the ROEs being only located in the outer circle, the size of the blur circles (FIGS. 26C and 26D) in the example are similar to the blur circles in Examples 12 and 13 but with more scatter outside of the airy disc, indicating slightly reduced visual performance.

Figures 27C, 27D:
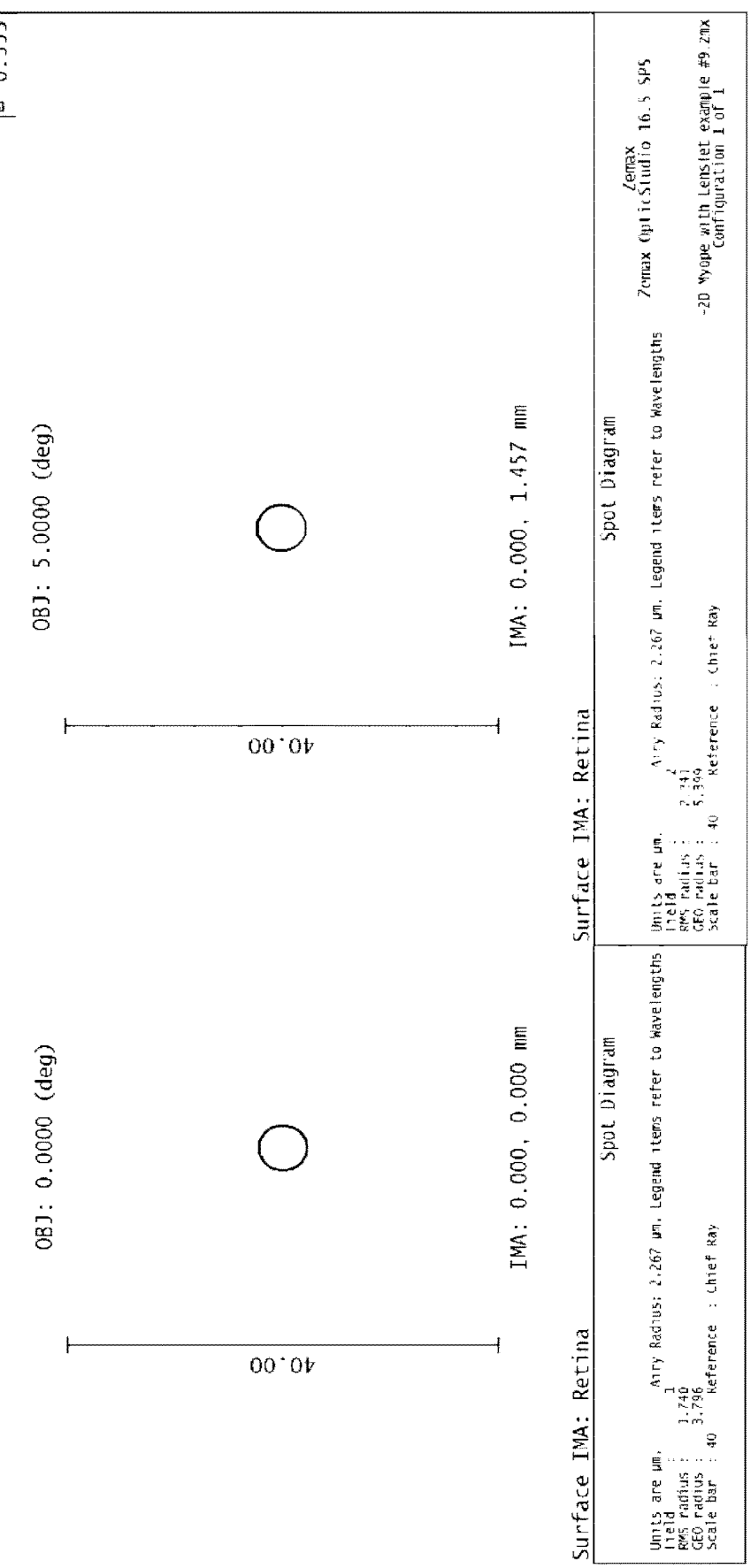
FIG. 27C shows additional data related to FIG. 27A. It illustrates the on-axis, geometric spot diagram analysis at the retinal plane, when the incoming light, with one of the two wavelengths of the polychromatic source (555 nm), with a vergence of zero diopters, is incident on a 2 Diopter Myopic Model eye that has been corrected with a spectacle lens embedded with a ROE array, described in FIGS. 27A and 27B.
FIG. 27D shows additional data related to FIG. 27A. It illustrates the 5 degrees off-axis, geometric spot diagram analysis at the retinal plane, when the incoming light, with one of the two wavelengths of the polychromatic source (555 nm), with a vergence of zero diopters, is incident on a 2 Diopter Myopic Model eye that has been corrected with a spectacle lens, described in FIGS. 27A and 27B.
Figures 27E, 27F:
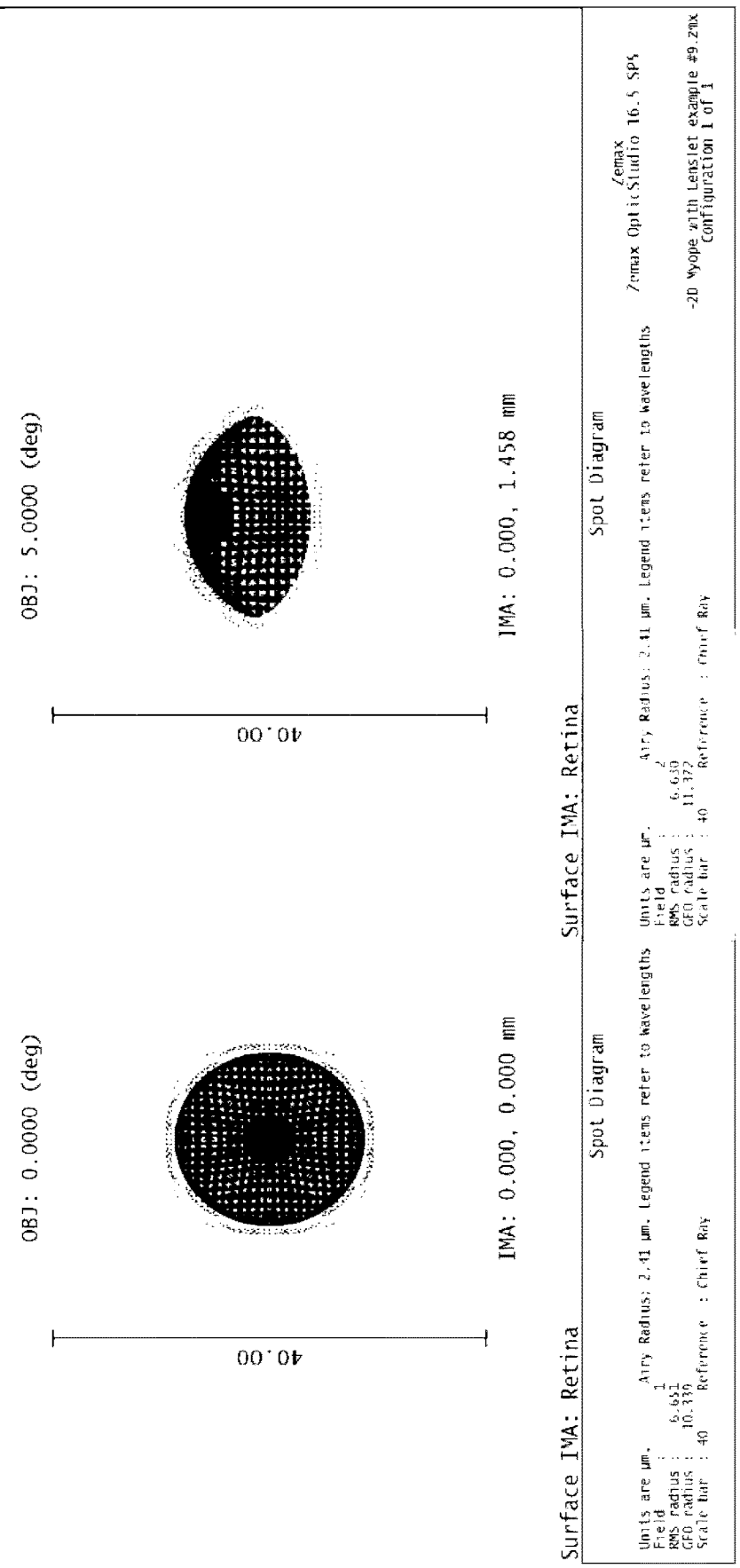
FIG. 27E shows additional data related to FIG. 27A. It illustrates the on-axis, geometric spot diagram analysis at the retinal plane, when the incoming light, with one of the two wavelengths of the polychromatic source (610 nm), with a vergence of zero diopters, is incident on a 2 Diopter Myopic Model eye that has been corrected with a spectacle lens embedded with a ROE array, described in FIG. 27A and FIG. 27B.
FIG. 27F shows additional data related to FIG. 27A. It illustrates the 5 degrees off-axis, geometric spot diagram analysis at the retinal plane, when the incoming light, with one of the two wavelengths of the polychromatic source (610 nm), with a vergence of zero diopters, is incident on a 2 Diopter Myopic Model eye that has been corrected with a spectacle lens, described in FIGS. 27A and 27B.

Example 18: A ROE Array (Described in Example 6) on a Single Vision Spectacle Lens In this example, (see FIGS. 27A-F) the ROE array, according to certain exemplary embodiments, is the same as example 14, but the power of each ROE is +2.00 D. The radius of curvature of each ROE was kept to 20 mm. The ROE array comprises of two circular zones, i.e. an inner and an outer circle. The diameter of the inner circle is 1.5 mm and has no ROE. The outer circle diameter is 5 mm with the ROE resolution being 25×25 in a grid array. The diameter of the outer circle ROEs are 0.100 mm with a separation between ROE borders of 0.100 mm. FIG. 27B was magnified to central 2 mm of the spectacle lens system. The ROE pupil fill ratio over a 5 mm pupil is approximately 18% and the ROE fill ratio across a 50 mm spectacle lens blank is approximately 19%. The secondary wavelength was set to 590 nm, which corresponds to the peak sensitivity of long-wavelength cones. In this example the overall micro lenslet fill ratio is lower when compared to Example 14, and thus less regions on the retina are in focus for long-wavelength light and thus less conflicting signals to the retina are provided. Due to the micro lenslets being only located in the outer circle, the size of the blur circles (FIGS. 27C and 27D) in the example are similar or smaller to the blur circles in Example 14, indicating better visual performance.

In other exemplary embodiments, the size of the two zones (circles) may be smaller and/or larger, it may be more than two zones, the size of the ROEs may be smaller and/or larger across the array and/or pupil and/or zones and the size of the ROEs may vary in size across the array and/or pupil and/or zones, and the radius of each ROE, a substantial portion of the ROEs and/or a portion of the ROEs may be smaller and/or larger, and the radius of the ROEs may vary across the array and/or pupil and/or zones, and the separation between ROEs may be larger, and the separation of the ROEs may vary across the array and/or pupil and/or zones, and the arrangement of the ROEs may be different to the 'squared' grid-array arrangement shown, e.g., hexagonal arrangement. The pupil size may be smaller or larger. The inner circle may be clear and have no ROEs. If more than two zones, some zones may be clear and others may comprise ROEs. The inner zone or zones may be an oval shape or similar, with the major axis along the horizontal meridian or the vertical meridian or an oblique meridian. In other exemplary embodiments relating to examples 14, 15, 16, 17 and 18, the ROEs may be replaced by DOEs or a combination of ROEs and DOEs.

Figures 28C, 28D:
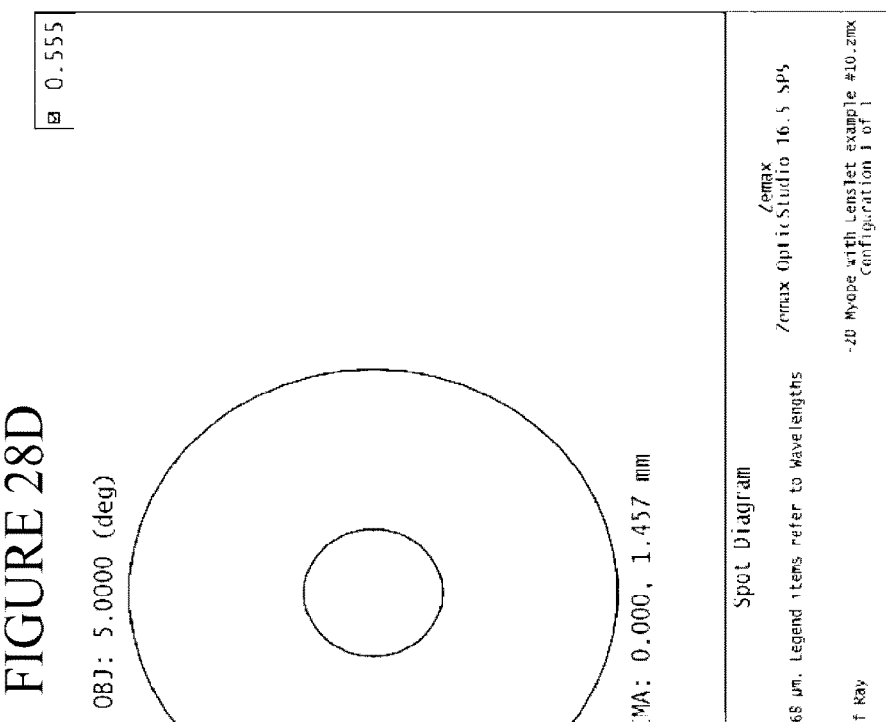
FIG. 28C shows additional data related to FIG. 28A. It illustrates the on-axis, geometric spot diagram analysis at the retinal plane, when the incoming light, with one of the two wavelengths of the polychromatic source (555 nm), with a vergence of zero diopters, is incident on a 2 Diopter Myopic Model eye that has been corrected with a spectacle lens embedded with a ROE array, described in FIGS. 28A and 28B.
FIG. 28D shows additional data related to FIG. 28A. It illustrates the 5 degrees off-axis, geometric spot diagram analysis at the retinal plane, when the incoming light, with one of the two wavelengths of the polychromatic source (555 nm), with a vergence of zero diopters, is incident on a 2 Diopter Myopic Model eye that has been corrected with a spectacle lens, described in FIGS. 28A and 28B.

Example 19: A ROE Array (Described in Example 5) on a Single Vision Spectacle Lens In this example, (see FIGS. 28A-F) the ROE array, according to certain exemplary embodiments, is the same as example 13, but the power of each ROE is +2.00 D. The radius of curvature of each ROE was kept to 20 mm. The ROE array comprises of two zones, i.e. an inner ROE-free rectangular zone and an outer circle corresponding to the pupil size of 5 mm. The length of the rectangle is 3 mm and the height is 1 mm. The ROE resolution of the outer circle is 25×25 in a grid array. The diameter of the outer circle micro lenslets are 0.100 mm with a separation between ROE borders of 0.100 mm. FIG. 28B was magnified to 2 mm. The ROE pupil fill ratio over a 5 mm pupil is approximately 18% and the ROE fill ratio across a 50 mm spectacle lens blank is approximately 19%.

Figure 28E:
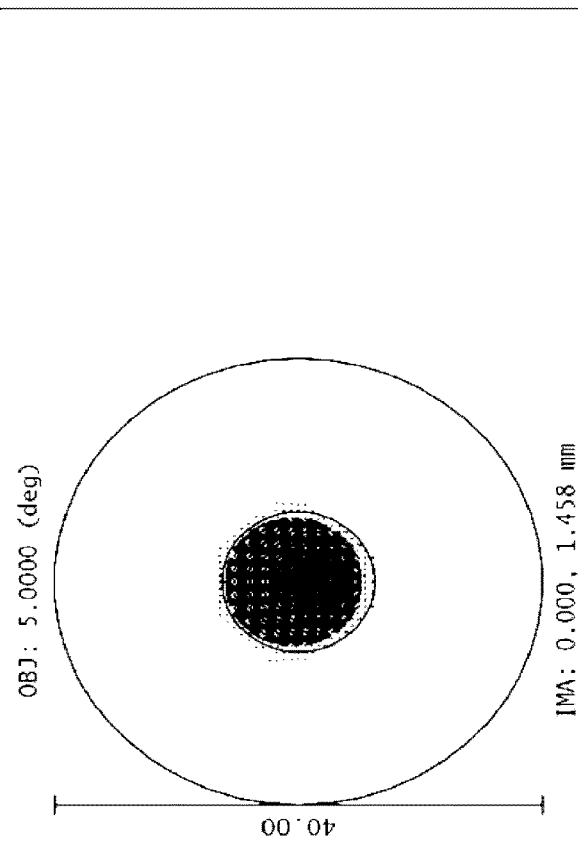
FIG. 28E shows additional data related to FIG. 28A. It illustrates the on-axis, geometric spot diagram analysis at the retinal plane, when the incoming light, with one of the two wavelengths of the polychromatic source (610 nm), with a vergence of zero diopters, is incident on a 2 Diopter Myopic Model eye that has been corrected with a spectacle lens embedded with a ROE array, described in FIG. 28A and FIG. 28B.
Figure 28F:
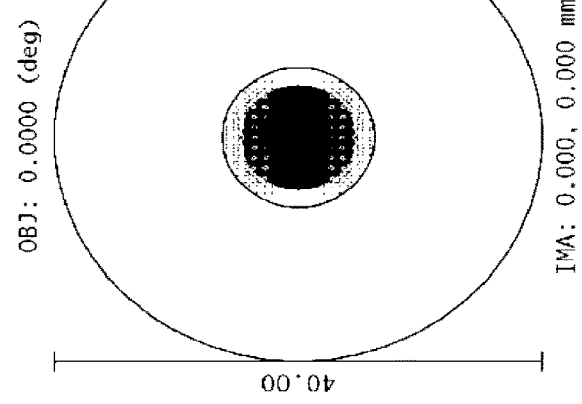
FIG. 28F shows additional data related to FIG. 28A. It illustrates the 5 degrees off-axis, geometric spot diagram analysis at the retinal plane, when the incoming light, with one of the two wavelengths of the polychromatic source (610 nm), with a vergence of zero diopters, is incident on a 2 Diopter Myopic Model eye that has been corrected with a spectacle lens, described in FIGS. 28A and 28B.

In this example the overall ROE fill ratio is lower when compared to Example 3, and thus less regions on the retina are in focus for long-wavelength light and thus less conflicting optical signals to the retina are provided (FIGS. 28E and 28F). Due to the micro lenslets being only located in the outer circle, the size of the blur circles (FIGS. 28C and 28D) in the example are similar or smaller to the blur circles in Example 13, indicating better visual performance.

Example 20: A ROE Array in Conjunction with Single Vision Spectacle Lens

In this example, (see FIGS. 29A-E) the ROE array, according to certain exemplary embodiments, is the same as example 19, but the power of each micro lenslet is +2.00 D. The radius of curvature of each ROE was kept to 20 mm. The ROE array comprises of two zones, i.e. an inner ROE-free rectangular zone and an outer circle corresponding to the pupil size of 5 mm. The length of the rectangle is 3.5 mm and the height is 1.5 mm. The ROE resolution of the outer circle is 13×13 in a grid array. The diameter of the outer circle ROEs are 0.200 mm with a separation between ROE borders of 0.180 mm. The ROE pupil fill ratio over a 5 mm pupil is approximately 16% and the ROE fill ratio across a 50 mm spectacle lens blank is approximately 22%. The secondary wavelength was set to 590 nm, which corresponds to the peak sensitivity of long-wavelength cones. In this example the overall ROE fill ratio is greater when compared to Example 19, and thus more regions on the retina experience a conflicting optical signal for the long wavelength sensitive (FIGS. 29E and 29F). Due to the micro lenslets being only located in the outer circle, the size of the primary blur circles (FIGS. 29C and 29D) in this example are similar to the blur circles in Example 19 but due to the greater micro lenslet fill ratio there is more scatter peripherally, indicating reduced visual performance, in particular off-axis.

Example 21: A ROE Array (Described in Example 5) on a Single Vision Spectacle Lens In this example, (see FIGS. 30A-F) the ROE array, according to certain exemplary embodiments, is the same as example 19, but the power of each ROE is +0.50 D. The radius of curvature of each ROE was set to 70 mm. The ROE array comprises of two zones, i.e. an inner ROE-free rectangular zone and an outer circle corresponding to the pupil size of 5 mm. The length of the rectangle is 1.5 mm and the height is 3 mm. The ROE resolution of the outer circle is 25×25 in a grid array. The diameter of the outer circle ROE are 0.100 mm with a separation between ROE borders of 0.100 mm. FIG. 20B was magnified to showcase the central 2 mm optic of the spectacle lens system. The ROE pupil fill ratio over a 5 mm pupil is approximately 17% and the ROE fill ratio across a 50 mm spectacle lens blank is approximately 19%. In this example the overall ROE fill ratio is lower when compared to Example 19, and thus less regions on the retina, particularly the L cones, are experience conflicting optical signals (FIGS. 30E and 30F). Due to the ROEs being only located in the outer circle, the size of the blur circles (FIGS. 30B and 30C) in the example are similar or smaller to the blur circles in Example 19, indicating better visual performance.

In other exemplary embodiments, the shape of the clear zone may be a square and/or other suitable shapes, the clear zone(s) may have ROEs of different dimensions to the outer zone, there may be more than one zone of a certain shape across the array and/or pupil, the dimensions of the zones may be smaller and/or larger, the size of the ROEs may be smaller and/or larger across the array and/or pupil and/or zones and the size of the micro lenslets may vary in size across the array and/or pupil and/or zones, and the radius of each, a substantial portion of the ROEs and/or a portion of the ROE may be smaller and/or larger, and the radius of the ROEs may vary across the array and/or pupil and/or zones, and the separation between ROEs may smaller and/or larger, and the separation of the ROEs may vary across the array and/or pupil and/or zones, and the arrangement of the ROEs may be different to the 'squared' grid-array arrangement shown, e.g., hexagonal arrangement. The pupil size may be smaller or larger. The direction of the zones (no ROE or ROE arrays of different dimensions) may also be in an oblique direction. In other exemplary embodiments relating to examples 19, 20, and 21, the ROEs may be replaced by DOEs or a combination of ROEs and DOEs.

Example 22: Various Other Exemplary Including ROE and/or DOE Strips on a Thin Film FIGS. 31 to 35 illustrates the frontal views of devices embedded with various types of optical patterns that may be used as an overlay on a spectacle lens or incorporated into a spectacle lens, according to certain embodiments. In some embodiments, these optical patterns may be included as ROEs, DOEs or in combination of ROEs and DOEs.

Example 23: A DOE Array Used in Conjunction with a Single Vision Spectacle Lens

In this example, an alternate method of correction of the exemplary −2D myopic model eye is discussed using various DOE and/or ROE devices. FIGS. 31 to 35 showcase examples of various exemplary ROE or DOE strips that could be used in conjunction with a single vision spectacle lens. FIG. 37 is one such variation applied to the front surface of a single vision spectacle lens (−2D) for the correction of the exemplary −2D myopic model eye. This exemplary highlights the magnified region of the retina where the incoming polychromatic parallel beam of light is focused. The focal planes for the wavelengths corresponding to 510 nm (approximately 75% of the peak sensitivity of M cones), 555 nm (central reference wavelength for correction of refractive errors) and 610 nm (approximately 75% of the peak sensitivity of L cone receptors) are presented. As can be seen from the zoomed in diagram, the photoreceptors at M and L-plane experience a conflicting optical signal. Unlike this test case, the exemplary that considers a single vision spectacle lens (−2D) to correct the exemplary −2D model eye (FIG. 36) produces a clean optical signal. This situation is referred to as a conflicting, contradictory and/or disagreeing optical signals at the M and/or L cone receptor level. While not wanting to be bound by a particular theory, the underlying hypothesis of this example (and certain embodiments) assumes that the conflicting, contradictory or disagreeing optical signals between the neighboring L cones may trigger the stop signal, thus resulting reduction in the rate of myopia progression.

Example 24: Exemplary Descriptions of Lens Combinations to Introduce a Temporal Variation In this example, an alternate method of correction of the exemplary −2D myopic model eye is provided using two pairs of spectacle lenses (FIG. 36 and FIG. 37). By alternating the pairs of these spectacle lenses over a defined time period, the prescription introduces a temporal variation in the longitudinal and/or transverse chromatic aberration experienced at the M and/or L cone receptors, which contribute towards contradictory optical signals at the retinal level that may inhibit/control the progression of myopia. In other exemplary embodiments, the defined time period may be 1 hour, 6 hours, 12 hours, 24 hours or 48 hours.

Other exemplary embodiments are set forth in the following examples.

SET OF 'A' EXAMPLES

A1. A spectacle lens system for reducing myopia progression in a person comprising: a spectacle lens; and a micro lenslet array comprising a plurality of micro lenslets.

A2. The spectacle lens system of example A1, wherein the micro lenslet array is an overlay that may be applied to the anterior surface of the lens blank, the posterior surface of the lens blank or both.

A3. The spectacle lens system of examples A1 or A2 wherein the micro lenslet array is formed integral with the spectacle lens.

A4. The spectacle lens system of examples A1 or A3, wherein the micro lenslet array is at least substantial located on the anterior surface of the spectacle lens, the posterior surface of the spectacle lens or both.

A5. The spectacle lens system of one or more of examples A1 to A4, wherein the micro lenslet array is at least substantial located in the interior of the spectacle lens.

A6. The spectacle lens system of one or more of examples A1 to A5, wherein the micro lenslet array is at least 5%, 8% 10%, 12%, 15%, 18%, 20%, 25%, 30%, 40% or 50% of the surface area of the spectacle lens.

A7. The spectacle lens system of one or more of examples A1 to A6, wherein the micro lenslet array zone is at least 10%, 15%, 20%, 25%, 30%, 40% 50%, 60%, 70%, 80%, 90% or 95% of the surface area of the spectacle lens.

A8. The spectacle lens system of one or more of examples A1 to A7, wherein the micro lenslet array is capable of providing defocus to a wearer over 10%, 15%, 20%, 25%, 30%, 40% 50%, 60%, 70%, 80%, 90% or 95% of the viewing angles available to the wearer.

A9. The spectacle lens system of one or more of examples A1 to A8, wherein the spectacle lens system is comprised of 1, 2, 3 or 4 layers.

A10. The spectacle lens system of one or more of examples A1 to A9, wherein the refractive index of the material used to form the at least one micro lenslet of the plurality of micro lenslet is different from the refractive index of the material used to form the spectacle lens.

A11. The spectacle lens system of one or more of examples A1 to A10, wherein the refractive index of the material used to form the at least 50%, 60%, 70%, 80% or 90% of the micro lenslets of the plurality of micro lenslet is different from the refractive index of the material used to form the spectacle lens.

A12. The spectacle lens system of one or more of examples A1 to A11, wherein the micro lenslets of the plurality of micro lenslets have 1, 2, 3, 4 or 5 different diameters.

A13. The spectacle lens system of one or more of examples A1 to A12, wherein the micro lenslets of the plurality of micro lenslets have 1, 2, 3, 4 or 5 different focal lengths.

A14. The spectacle lens system of one or more of examples A1 to A13, wherein the spectacle lens system is capable of modifying incoming light through spectacle lenses and utilizes chromatic cues to decelerate the rate of myopia progression.

A15. The spectacle lens system of one or more of examples A1 to A14, wherein the spectacle lens system is capable of providing a stop signal to a progressing eye for a substantial portion of the viewing angles of the spectacle lens system.

A16. The spectacle lens system of one or more of examples A1 to A15, wherein the spectacle lens system is capable of providing a stop signal to a progressing eye for at least 95% of the total of the viewing angles of the spectacle lens system.

A17. The spectacle lens system of one or more of examples A1 to A16, wherein the spectacle lens system is capable of providing a stop signal to a progressing eye for a substantial portion of the viewing angles of the region of the spectacle lens system that contains the micro lenslet array.

A18. The spectacle lens system of one or more of examples A1 to A17, wherein the spectacle lens system is capable of providing a stop signal to a progressing eye for at least 95% of the total of the viewing angles of the region of the spectacle lens system that contains the micro lenslet array.

A19. The spectacle lens system of one or more of examples A1 to A18, wherein the spectacle lens system is cosmetically substantially indistinguishable or indistinguishable from a commercial single vision spectacle lens.

A20. The spectacle lens system of one or more of examples A1 to A19, wherein the spectacle lens system in normal use on a wearer's face and viewed by another person is cosmetically substantially indistinguishable or indistinguishable from a commercial single vision spectacle lens.

A21. The spectacle lens system of one or more of examples A1 to A20, wherein the spectacle lens system is capable of providing the wearer with visual performance that is substantially indistinguishable or in or indistinguishable from a commercial single vision spectacle lens.

A22. The spectacle lens system of one or more of examples A1 to A21, wherein the spectacle lens system in normal use on a wearer's face is capable of providing the wearer with visual performance that is substantially indistinguishable or indistinguishable from a commercial single vision spectacle lens.

A23. A method of reducing myopia progression in a person comprising: providing at least one spectacle lens system as set forth in one or more of examples A1 to A22.

A24. A spectacle lens system for correcting the refractive error and controlling the growth of the eye comprising: a spectacle lens with a refractive power selected to correct the refractive error of the eye; a micro lenslet array comprising a plurality of micro lenslets of predetermined shape and size, arranged in a predetermined pattern wherein a substantial portion of the micro lenslets are substantially transparent and comprises a contoured surface configured to focus light; wherein the micro lenslet array when positioned relative to the spectacle lens substantially alters the path of light to provide a directional signal to control eye growth.

SET OF 'B' EXAMPLES

B1. An ophthalmic lens for a myopic eye comprising: a base lens with a focal power to correct, at least in part, the refractive error of the eye; and at least one micro lenslet array comprising at least one micro lenslet; wherein the at least one micro lenslet array introduces a conflicting optical signal at a wavelength between 510 nm and 610 nm.

B2. An ophthalmic lens for a myopic eye comprising: a base lens with a focal power to correct, at least in part, the refractive error of the eye; and at least one micro lenslet array comprising at least one micro lenslet; wherein the at least one micro lenslet array introduces a conflicting optical signal at a wavelength corresponding to a peak sensitivity of one or more L cone receptors of a retina of the eye.

B3. An ophthalmic lens for a myopic eye comprising: a base lens with a focal power to correct, at least in part, the refractive error of the eye; and at least one micro lenslet array comprising at least one micro lenslet; wherein the at least one micro lenslet array introduces a conflicting optical signal at a wavelength within the 75% or greater sensitivity of one or more L cone receptors of a retina of the eye.

B4. An ophthalmic lens for a myopic eye comprising: a base lens with a focal power to correct, at least in part, the refractive error of the eye; and at least one micro lenslet array comprising at least one micro lenslet; wherein the at least one micro lenslet array introduces a conflicting optical signal at a wavelength corresponding to a peak sensitivity of one or more M cone receptors of a retina of the eye.

B5. An ophthalmic lens for a myopic eye comprising: a base lens with a focal power to correct, at least in part, the refractive error of the eye; and at least one micro lenslet array comprising at least one micro lenslet; wherein the at least one micro lenslet array introduces a conflicting optical signal at a wavelength within the 75% or greater sensitivity of one or more M cone receptors of a retina of the eye B6. An ophthalmic lens of one or more examples B1 to B5, wherein the at least one micro lenslet of the at least one micro lenslet array has an area 450,000 µm² or less.

B7. An ophthalmic lens of one or more of examples B1 to B6, wherein the at least one micro lenslet of the at least one micro lenslet array has a diameter 750 µm or less.

B8. An ophthalmic lens of one or more of examples B1 to B7, wherein the at least one micro lenslet of the at least one micro lenslet array has a fill ratio of 20% or less.

B9. An ophthalmic lens of one or more of examples B1 to B8, wherein the at least one micro lenslet of the at least one micro lenslet array has a pupil fill ratio of 20% or less.

B10. An ophthalmic lens of one or more of examples B1 to B8, wherein the at least one micro lenslet of the at least one micro lenslet array has a focal length between 500 mm and 2000 mm.

B11. An ophthalmic lens of one or more of examples B1 to B9, wherein the micro lenslet array comprises of micro lenslets with a centre-to-centre distance is less than 1 mm.

B12. An ophthalmic lens of one or more of examples B1 to B11, wherein the at least one micro lenslet of the at least one micro lenslet array has a focal length greater than 1000 mm.

B13. An ophthalmic lens of one or more of examples B1 to B12, wherein the micro lenslet array is on the anterior surface of the spectacle lens.

B14. An ophthalmic lens of one or more of examples B1 to B12, wherein the micro lenslet array is on the posterior surface of the spectacle lens.

B15. An ophthalmic lens of example B 1, wherein the micro lenslet array is embedded in the matrix of the base spectacle lens.

B16. The ophthalmic lens of one or more of examples B1 to B15, wherein the ophthalmic lens is comprised of 1, 2, 3 or 4 layers.

B17. The ophthalmic lens of one or more of examples B1 to B16, wherein the base lens is comprised of 1, 2, 3 or 4 layers.

B18. The ophthalmic lens of one or more of examples B1 to B17, wherein the at least one DOE array further comprises at least one refractive optical element configured to introduce a conflicting optical signal to the one or more L cone receptors of the retina of the wearer's eye.

B19. The ophthalmic lens of one or more of examples B1 to B18, wherein the ophthalmic lens further comprises at least one refractive optical element configured to introduce a conflicting optical signal to the one or more L cone receptors of the retina of the wearer's eye.

B20. The ophthalmic lens of one or more of examples B1 to B19, wherein the at least one refractive optical element (ROE) is at least one ROE array.

B21. The ophthalmic lens of one or more of examples B1 to B20, wherein the at least one refractive optical element array is configured to form one or more refractive optical element array zones.

B22. A method for reducing the progression of myopia by using the ophthalmic lens of examples B1 to B22.

B23. The ophthalmic lens of one or more of examples B1 to B22, wherein the ophthalmic lens is a spectacle lens.

B24. The ophthalmic lens of one or more of examples B1 to B23, wherein the at least one micro lenslet has one or more of the following shapes: circular, non-circular, oval, rectangular, hexagonal and square.

B25. The ophthalmic lens of one or more of examples B1 to B24, wherein the at least one micro lenslet has an area of less than 0.2, 0.3, 0.4, or 0.44 mm$^2$.

B26. The ophthalmic lens of one or more of examples B1 to B25, wherein the at least one micro lenslet has a diameter less than 400, 500, 600, 700 or 750 µm.

B27. The ophthalmic lens of one or more of examples B1 to B26, wherein the lens is configured to provide defocus in at least a portion of the peripheral region of the lens.

B28. The ophthalmic lens of one or more of examples B1 to B26, wherein the lens is configured to provide defocus in at least a substantial portion of the peripheral region of the lens.

B29. The ophthalmic lens of one or more of examples B1 to B26, wherein the lens is configured to provide defocus in a peripheral region of the lens.

SET OF 'C' EXAMPLES

C1. An ophthalmic lens for a myopic eye comprising: a base lens with a focal power to correct, at least in part, the refractive error of the eye; and at least one diffractive optical element array comprising at least one diffractive optical element; wherein the at least one diffractive optical element array is configured to introduce a conflicting optical signal at a wavelength between 510 nm and 610 nm.

C2. An ophthalmic lens for a myopic eye comprising: a base lens with a focal power and at least one diffractive optical element; wherein the base lens is configured to correct at least in part refractive error of a wearer's eye at approximately 555 nm wavelength of light; and the at least one diffractive optical element is configured to introduce a conflicting optical signal to one or more L cone receptors of a retina of the eye.

C3. An ophthalmic lens for a myopic eye of a wearer comprising: a base lens with a focal power to correct, at least in part, the refractive error of the eye; and at least one diffractive optical element; wherein the at least one diffractive optical element is configured to introduce a conflicting optical signal at a wavelength corresponding to a peak sensitivity of one or more L cone receptors of a retina of the eye.

C4. An ophthalmic lens for a myopic eye of a wearer comprising: a base lens with a focal power to correct, at least in part, the refractive error of the eye; and at least one diffractive optical element; wherein the at least one diffractive optical element is configured to introduce a conflicting optical signal at a wavelength within the 75% or greater sensitivity of one or more L cone receptors of a retina of the eye.

C5. An ophthalmic lens for a myopic eye of a wearer comprising: a base lens with a focal power to correct, at least in part, the refractive error of the eye; and at least one diffractive optical element; wherein the at least one diffractive optical element is configured to introduce a conflicting optical signal at a wavelength between 510 nm and 610 nm.

C6. An ophthalmic lens to slow growth of a myopic eye comprising: a base lens with a focal power to correct, at least in part, the refractive error of the eye; and at least one diffractive optical element; wherein the at least one diffractive optical element is configured to introduce a conflicting optical signal at a wavelength between 510 nm and 610 nm.

C7. An ophthalmic lens for a myopic eye of a wearer comprising: a base lens with a focal power to correct, at least in part, the refractive error of the eye; and at least one diffractive optical element; wherein the at least one diffractive optical element is configured to introduce a contradictory optical signal at a wavelength corresponding to a peak sensitivity of one or more L cone receptors of a retina of the eye.

C8. An ophthalmic lens for a myopic eye of a wearer comprising: a base lens with a focal power to correct, at least in part, the refractive error of the eye; and at least one diffractive optical element; wherein the at least one diffractive optical element is configured to introduce a contradictory optical signal at a wavelength within the 75% or greater sensitivity of one or more L cone receptors of a retina of the eye.

C9. An ophthalmic lens for an myopic eye of a wearer comprising: a base lens with a focal power to correct, at least in part, the refractive error of the eye; and at least one diffractive optical element; wherein the at least one diffractive optical element is configured to introduce a contradictory optical signal at a wavelength between 510 nm and 610 nm.

C10. An ophthalmic lens to slow growth of myopic eye comprising: a base lens with a focal power to correct, at least in part, the refractive error of the eye; and at least one diffractive optical element; wherein the at least one diffractive optical element is configured to introduce a contradictory optical signal at a wavelength between 510 nm and 610 nm.

C11. An ophthalmic lens for a myopic eye of a wearer comprising: a base lens with a focal power to correct, at least in part, the refractive error of the eye; and at least one diffractive optical element; wherein the at least one diffractive optical element is configured to introduce a conflicting optical signal at the wavelengths corresponding to peak sensitivities of one or more M cone receptors of a retina of the eye.

C12. An ophthalmic lens for an eye of a wearer comprising: a base lens with a focal power to correct, at least in part, the refractive error of the eye; and at least one diffractive optical element; wherein the at least one diffractive optical element is configured to introduce a contradictory optical signal at the wavelengths corresponding to 75% of a peak sensitivity of one or more L cone receptors of a retina of the eye.

C13. An ophthalmic lens for a myopic eye of a wearer comprising: a base lens with a focal power to correct, at least in part, the refractive error of the eye; and at least one diffractive optical element; wherein the at least one diffractive optical element is configured to introduce a contradictory optical signal at a wavelengths corresponding to peak sensitivities of one or more M cone receptors of a retina of the eye.

C14. An ophthalmic lens for a myopic eye comprising: a base lens with a focal power and at least one diffractive optical element; wherein the base lens is configured to correct at least in part refractive error of the eye between a peak sensitivity of one or more M cone receptors and one or more L cones receptors of a retina of the eye; and the at least one DOE is configured to introduce a conflicting optical signal to the one or more L cone receptors of a retina of the eye.

C15. An ophthalmic lens for a myopic eye comprising: a base lens with a focal power, the base lens configured to correct at least in part refractive error of the eye between a peak sensitivity of one or more M cone receptors and one or more L cone receptors of a retina of the eye; and at least one diffractive optical element configured to introduce a conflicting optical signal to the one or more L cone receptors of the retina of the eye.

C16. An ophthalmic lens for a myopic eye comprising: a base lens with a focal power, the base lens configured to correct at least in part refractive error of the eye at approximately 555 nm wavelength of light; and at least one diffractive optical element configured to introduce a conflicting optical signal to one or more L cone receptors of a retina of the eye.

C17. An ophthalmic lens of one or more of examples C1 to C16, wherein the at least one diffractive optical element of the at least one diffractive optical element array has an area 450,000 μm² or less.

C18. An ophthalmic lens of one or more of examples C1 to C17, wherein the at least one diffractive optical element of the at least one diffractive optical element array has a diameter 750 μm or less.

C19. An ophthalmic lens of one or more of examples C1 to C18, wherein the at least one diffractive optical element of the at least one diffractive optical element array has a fill ratio of 20% or less.

C20. An ophthalmic lens of one or more of examples C1 to C19, wherein the at least one diffractive optical element of the at least one diffractive optical element array has a pupil fill ratio of 20% or less.

C21. An ophthalmic lens of one or more of examples C1 to C20, wherein the at least one diffractive optical element of the at least one diffractive optical element array has a focal length between 500 mm and 2000 mm.

C22. An ophthalmic lens of one or more of examples C1 to C21, wherein the diffractive optical element array comprises of diffractive optical element s with a centre-to-centre distance is less than 1 mm.

C23. An ophthalmic lens of one or more of examples C1 to C22, wherein the at least one diffractive optical element of the at least one diffractive optical element array has a focal length greater than 1000 mm.

C24. An ophthalmic lens of one or more of examples C1 to C23, wherein the diffractive optical element array is on the anterior surface of the spectacle lens.

C25. An ophthalmic lens of one or more of examples C1 to C24, wherein the diffractive optical element array is on the posterior surface of the spectacle lens.

C26. An ophthalmic lens of one or more of examples C1 to C16, wherein the diffractive optical element array is embedded in the matrix of the base spectacle lens.

C27. The ophthalmic lens of one or more of examples C1 to C26, wherein the at least one diffractive optical element is applied to the anterior surface of the base lens, posterior surface of the base lens or both.

C28. The ophthalmic lens of one or more of examples C1 to C26, wherein the at least one diffractive optical element is formed at least in part in a matrix of the base lens.

C29. The ophthalmic lens of one or more of examples C1 to C26, wherein the at least one diffractive optical element is formed in the matrix of the base lens.

C30. The ophthalmic lens of one or more of examples C1 to C26, wherein at least one diffractive optical element is at least one diffractive optical element array.

C31. The ophthalmic lens of one or more of examples C1 to C26, wherein the at least one diffractive optical element array is at least substantial located on one or more of the following: the anterior surface of the base lens, the posterior surface of the base lens and both.

C32. The ophthalmic lens of one or more of examples C1 to C26, wherein the at least one diffractive optical element array is at least 5%, 8% 10%, 12%, 15%, 18%, 20%, 25%, 30%, 40% or 50% of the surface area of the base lens.

C33. The ophthalmic lens of one or more of examples C1 to C26, wherein the at least one diffractive optical element array is configured to form one or more diffractive optical element array zones.

C34. The ophthalmic lens of one or more of examples C1 to C26, wherein the one or more diffractive optical element array zones is at least 10%, 15%, 20%, 25%, 30%, 40% 50%, 60%, 70%, 80%, 90% or 95% of the surface area of the base lens.

C35. The ophthalmic lens of one or more of examples C1 to C34, wherein the ophthalmic lens is comprised of 1, 2, 3 or 4 layers.

C36. The ophthalmic lens of one or more of examples C1 to C35, wherein the base lens is comprised of 1, 2, 3 or 4 layers.

C37. The ophthalmic lens of one or more of examples C1 to C36, wherein the at least one diffractive optical element array further comprises at least one refractive optical element configured to introduce a conflicting optical signal to the one or more L cone receptors of the retina of the wearer's eye.

C38. The ophthalmic lens of one or more of examples C1 to C37, wherein the ophthalmic lens further comprises at least one refractive optical element configured to introduce a conflicting optical signal to the one or more L cone receptors of the retina of the wearer's eye.

C39. The ophthalmic lens of one or more of examples C1 to C38, wherein the at least one refractive optical element is at least one refractive optical element array.

C40. The ophthalmic lens of one or more of examples C1 to C39, wherein the at least one refractive optical element array is configured to form one or more refractive optical element array zones.

C41. A method for reducing the progression of myopia by using the ophthalmic lens of examples C1 to C48.

C42. The ophthalmic lens of one or more of examples C1 to C48, wherein the ophthalmic lens is a spectacle lens.

C43. The ophthalmic lens of one or more of examples C1 to C42, wherein the at least one micro lenslet has one or more of the following shapes: circular, non-circular, oval, rectangular, hexagonal and square.

C44. The ophthalmic lens of one or more of examples C1 to C43, wherein the at least one micro lenslet has an area of less than 0.2, 0.3, 0.4, or 0.44 mm$^2$.

C45. The ophthalmic lens of one or more of examples C1 to C44, wherein the at least one micro lenslet has a diameter less than 400, 500, 600, 700 or 750 µm.

C46. The ophthalmic lens of one or more of examples C1 to C45, wherein the lens is configured to provide defocus in at least a portion of the peripheral region of the lens.

C47. The ophthalmic lens of one or more of examples C1 to C46, wherein the lens is configured to provide defocus in at least a substantial portion of the peripheral region of the lens.

C48. The ophthalmic lens of one or more of examples C1 to C47, wherein the lens is configured to provide defocus in a peripheral region of the lens.

SET OF 'D' EXAMPLES

D1. An ophthalmic lens for a myopic eye comprising: a base lens with a focal power to correct, at least in part, the refractive error of the eye; and at least one refractive optical element array comprising at least one refractive optical element; wherein the at least one refractive optical element array is configured to introduce a conflicting optical signal at a wavelength between 510 nm and 610 nm when worn by a wearer with the myopic eye.

D2. An ophthalmic lens for an eye of a wearer comprising: a base lens with a focal power to correct, at least in part, the refractive error of the eye; and at least one refractive optical element; wherein the at least one refractive optical element is configured to introduce a conflicting optical signal at a wavelength corresponding to peak sensitivities of one or more L cone receptors of a retina of the eye.

D3. An ophthalmic lens for an eye of a wearer comprising: a base lens with a focal power and at least one refractive optical element; wherein the base lens is configured to correct at least in part refractive error of the eye at approximately 555 nm wavelength of light; and the at least one refractive optical element is configured to introduce a conflicting optical signal to one or more L cone receptors of a retina of the eye.

D4. An ophthalmic lens for an eye of a wearer comprising: a base lens with a focal power and at least one refractive optical element; wherein the base lens is configured to correct at least in part refractive error of the wearer's eye between the peak sensitivity of one or more M cone receptors and one or more L cones receptors of a retina of the eye; and the at least one refractive optical element is configured to introduce a conflicting optical signal to the one or more L cone receptors of a retina of the eye.

D5. An ophthalmic lens for an eye of a wearer comprising: a base lens with a focal power, the base lens configured to correct at least in part refractive error of the eye between the peak sensitivity of one or more M cone receptors and one or more L cone receptors of a retina of the eye; and at least one refractive optical element configured to introduce a conflicting optical signal to the one or more L cone receptors of a retina of the eye.

D6. An ophthalmic lens for an eye of a wearer comprising: a base lens with a focal power, the base lens configured to correct at least in part refractive error of the eye at approximately 555 nm wavelength of light; and at least one refractive optical element configured to introduce a conflicting optical signal to one or more L cone receptors of a retina of the eye.

D7. An ophthalmic lens of one or more of examples D1 to D6, wherein the at least one refractive optical element of the at least one refractive optical element array has an area 450,000 µm$^2$ or less.

D8. An ophthalmic lens of one or more of examples D1 to D7, wherein the at least one refractive optical element of the at least one refractive optical element array has a diameter 750 µm or less.

D9. An ophthalmic lens of one or more of examples D1 to D8, wherein the at least one refractive optical element of the at least one refractive optical element array has a fill ratio of 20% or less.

D10. An ophthalmic lens of one or more of examples D1 to D9, wherein the at least one refractive optical element of the at least one refractive optical element array has a pupil fill ratio of 20% or less.

D11. An ophthalmic lens of one or more of examples D1 to D10, wherein the at least one refractive optical element of the at least one refractive optical element array has a focal length between 500 mm and 2000 mm.

D12. An ophthalmic lens of one or more of examples D1 to D11, wherein the refractive optical element array comprises of refractive optical element s with a centre-to-centre distance is less than 1 mm.

D13. An ophthalmic lens of examples D1 to D12, wherein the at least one refractive optical element of the at least one refractive optical element array has a focal length greater than 1000 mm.

D14. An ophthalmic lens of one or more of examples D1 to D13, wherein the refractive optical element array is on the anterior surface of the spectacle lens.

D15. An ophthalmic lens of one or more of examples D1 to D14, wherein the refractive optical element array is on the posterior surface of the spectacle lens.

D16. An ophthalmic lens of one or more of examples D1 to D15, wherein the refractive optical element array is embedded in the matrix of the base spectacle lens.

D17. The ophthalmic lens of one or more of examples D1 to D16, wherein the ophthalmic lens is for reducing the rate of myopia progression of the wearer's eye.

D18. The ophthalmic lens of one or more of examples D1 to D17, wherein the base lens is configured to substantially correct refractive error of the wearer's eye.

D19. The ophthalmic lens of one or more of examples D1 to D18, wherein the base lens is configured to substantially correct refractive error of the wearer's eye.

D20. The ophthalmic lens of one or more of examples D1 to D19, wherein the base lens is configured to correct refractive error of the wearer's eye.

D21. The ophthalmic lens of one or more of examples D1 to D20, wherein the one or more L cone receptors is one or more of the following: a portion of L cone receptors and a substantial portion of the L cone receptors.

D22. The ophthalmic lens of one or more of examples D1 to D21, wherein the one or more L cone receptors is at least 30%, 40% 50%, 60%, 70%, 80%, 90% or 95% the L cone receptors.

D23. The ophthalmic lens of one or more of examples D1 to D22, wherein the one or more M cone receptors is one or more of the following: a portion of M cone receptors and a substantial portion of the M cone receptors.

D24. The ophthalmic lens of one or more of examples D1 to D23, wherein the one or more M cone receptors is at least 30%, 40% 50%, 60%, 70%, 80%, 90% or 95% the M cone receptors.

D25. The ophthalmic lens of one or more of examples D1 to D24, wherein the at least one refractive optical element is applied to the anterior surface of the base lens, posterior surface of the base lens or both.

D26. The ophthalmic lens of one or more of examples D1 to D25, wherein the at least one refractive optical element is formed at least in part in a matrix of the base lens.

D27. The ophthalmic lens of one or more of examples D1 to D26, wherein the at least one refractive optical element is formed in the matrix of the base lens.

D28. The ophthalmic lens of one or more of examples D1 to D27, wherein at least one refractive optical element is a refractive optical element array.

D29. The ophthalmic lens of one or more of examples D1 to D28, wherein the at least one refractive optical element array is at least substantial located on one or more of the following: the anterior surface of the base lens, the posterior surface of the base lens and both.

D30. The ophthalmic lens of one or more of examples D1 to D29, wherein the at least one refractive optical element array is at least 5%, 8% 10%, 12%, 15%, 18%, 20%, 25%, 30%, 40% or 50% of the surface area of the base lens.

D31. The ophthalmic lens of one or more of examples D1 to D30, wherein the at least one refractive optical element array is configures to form one or more refractive optical element array zones.

D32. The ophthalmic lens of one or more of examples D1 to D31, wherein the one or more refractive optical element array zones is at least 10%, 15%, 20%, 25%, 30%, 40% 50%, 60%, 70%, 80%, 90% or 95% of the surface area of the base lens.

D33. The ophthalmic lens of one or more of examples D11 to D32, wherein the ophthalmic lens is comprised of 1, 2, 3 or 4 layers.

D34. The ophthalmic lens of one or more of examples D1 to D33, wherein the base lens is comprised of 1, 2, 3 or 4 layers.

D35. The ophthalmic lens of one or more of examples D1 to D34, wherein the ophthalmic lens is comprised of 1, 2, 3 or 4 layers.

D36. The ophthalmic lens of one or more of examples D1 to D35, wherein the base lens is comprised of 1, 2, 3 or 4 layers.

D37. The ophthalmic lens of one or more of examples D1 to D36, wherein the at least one diffractive optical element array further comprises at least one refractive optical element configured to introduce a conflicting optical signal to the one or more L cone receptors of the retina of the wearer's eye.

D38. The ophthalmic lens of one or more of examples D1 to D37, wherein the ophthalmic lens further comprises at least one refractive optical element configured to introduce a conflicting optical signal to the one or more L cone receptors of the retina of the wearer's eye.

D39. The ophthalmic lens of one or more of examples D1 to D38, wherein the at least one refractive optical element is at least one refractive optical element array.

D40. The ophthalmic lens of one or more of examples D1 to D39, wherein the at least one refractive optical element array is configured to form one or more refractive optical element array zones.

D41. A method for reducing the progression of myopia by using the ophthalmic lens of examples D1 to D48.

D42. The ophthalmic lens of one or more of examples D1 to D48, wherein the ophthalmic lens is a spectacle lens.

D43. The ophthalmic lens of one or more of examples D1 to D42, wherein the at least one micro lenslet has one or more of the following shapes: circular, non-circular, oval, rectangular, hexagonal and square.

D44. The ophthalmic lens of one or more of examples D1 to D43, wherein the at least one micro lenslet has an area of less than 0.2, 0.3, 0.4, or 0.44 mm$^2$.

D45. The ophthalmic lens of one or more of examples D1 to D44, wherein the at least one micro lenslet has a diameter less than 400, 500, 600, 700 or 750 μm.

D46. The ophthalmic lens of one or more of examples D1 to D45, wherein the lens is configured to provide defocus in at least a portion of the peripheral region of the lens.

D47. The ophthalmic lens of one or more of examples D1 to D46, wherein the lens is configured to provide defocus in at least a substantial portion of the peripheral region of the lens.

D48. The ophthalmic lens of one or more of examples D1 to D47, wherein the lens is configured to provide defocus in a peripheral region of the lens.

SET OF 'E' EXAMPLES

E1. An ophthalmic lens for a myopic eye comprising: a base lens with a focal power to correct, at least in part, the refractive error of the eye; and at least an array comprising at least one refractive optical element and at least one diffractive optical element; wherein the at least one array introduces a conflicting optical signal at a wavelength between 510 nm and 610 nm.

E2. An ophthalmic lens of example E1, wherein the at least one of at least refractive optical element and at least one diffractive optical element has an area 450,000 µm$^2$ or less.

E3. An ophthalmic lens of one or more of examples E1 to E2, wherein the at least one of at least refractive optical element and at least one diffractive optical element has a diameter 750 µm or less.

E4. An ophthalmic lens of one or more of examples E1 to E3, wherein the at least one of at least refractive optical element and at least one diffractive optical element has a fill ratio of 20% or less.

E5. An ophthalmic lens of one or more of examples E1 to E4, wherein the at least one of at least refractive optical element and at least one diffractive optical element has a pupil fill ratio of 20% or less.

E6. An ophthalmic lens of one or more of examples E1 to E5, wherein the at least one of at least refractive optical element and at least one diffractive optical element has a focal length between 500 mm and 2000 mm.

E7. An ophthalmic lens of one or more of examples E1 to E6, wherein the micro lenslet array comprises of micro lenslets with a centre-to-centre distance is less than 1 mm.

E8. An ophthalmic lens of examples E1 to E7, wherein the at least one of at least refractive optical element and at least one diffractive optical element has a focal length greater than 1000 mm.

E9. An ophthalmic lens of one or more of examples E1 to E8, wherein the micro lenslet array is on the anterior surface of the spectacle lens.

E10. An ophthalmic lens of one or more of examples E1 to E9, wherein the micro lenslet array is on the posterior surface of the spectacle lens.

E11. An ophthalmic lens of one or more of examples E1 to E 10, wherein the micro lenslet array is embedded in the matrix of the base spectacle lens.

E12. The ophthalmic lens of one or more of examples E1 to E11, wherein the ophthalmic lens is comprised of 1, 2, 3 or 4 layers.

E13. The ophthalmic lens of one or more of examples E1 to E12, wherein the base lens is comprised of 1, 2, 3 or 4 layers.

E14. The ophthalmic lens of one or more of examples E1 to E13, wherein the at least one diffractive optical element array further comprises at least one refractive optical element configured to introduce a conflicting optical signal to the one or more L cone receptors of the retina of the wearer's eye.

E15. The ophthalmic lens of one or more of examples E1 to E14, wherein the ophthalmic lens further comprises at least one refractive optical element configured to introduce a conflicting optical signal to the one or more L cone receptors of the retina of the wearer's eye.

E16. The ophthalmic lens of one or more of examples E1 to E15, wherein the at least one refractive optical element is at least one refractive optical element array.

E17. The ophthalmic lens of one or more of examples E1 to E16, wherein the at least one refractive optical element array is configured to form one or more refractive optical element array zones.

E18. A method for reducing the progression of myopia by using the ophthalmic lens of examples E1 to E25.

E19. The ophthalmic lens of one or more of examples E1 to E25, wherein the ophthalmic lens is a spectacle lens.

E20. The ophthalmic lens of one or more of examples E1 to E25, wherein the at least one micro lenslet has one or more of the following shapes: circular, non-circular, oval, rectangular, hexagonal and square.

E21. The ophthalmic lens of one or more of examples E1 to E20, wherein the at least one micro lenslet has an area of less than 0.2, 0.3, 0.4, or 0.44 mm$^2$.

E22. The ophthalmic lens of one or more of examples E1 to E21, wherein the at least one micro lenslet has a diameter less than 400, 500, 600, 700 or 750 µm.

E23. The ophthalmic lens of one or more of examples E1 to E22, wherein the lens is configured to provide defocus in at least a portion of the peripheral region of the lens.

E24. The ophthalmic lens of one or more of examples E1 to E23, wherein the lens is configured to provide defocus in at least a substantial portion of the peripheral region of the lens.

E25. The ophthalmic lens of one or more of examples E1 to E24, wherein the lens is configured to provide defocus in a peripheral region of the lens.

SET OF 'F' EXAMPLES

F1. An ophthalmic lens comprising: a first refractive optical element having a first focal power; a second refractive optical element having a second focal power different from the first focal power; wherein the first refractive optical element is configured to correct at least in part refractive error of a wearer's eye; and wherein the second refractive optical element is configured to introduce conflicting optical signal of at least 0.25D between one or more M cone receptors of a retina of the wearer's eye.

F2. An ophthalmic lens comprising: a first refractive optical element having a first focal power; a second refractive optical element having a second focal power different from the first focal power; wherein the first refractive optical element is configured to correct at least in part refractive error of a wearer's eye; and wherein the second refractive optical element is configured to introduce conflicting optical signal of at least 0.25D between one or more L cone receptors of a retina of the wearer's eye.

F3. An ophthalmic lens for a myopic eye comprising: a first refractive optical element having a first focal power; a second refractive optical element having a second focal power different from the first focal power; wherein the first refractive optical element is configured to correct at least in part the myopic eye; and wherein the second refractive optical element is configured to introduce conflicting optical signal of at least 0.25D between the wavelengths 510 nm and 610 nm.

F4. An ophthalmic lens of one or more of examples F1 to F3, wherein the second refractive optical element has an area 450,000 µm$^2$ or less.

F5. An ophthalmic lens of one or more of examples F1 to F4, wherein the second refractive optical element has a diameter 750 μm or less.

F6. An ophthalmic lens of one or more of examples F1 to F5, wherein the second refractive optical element has a fill ratio of 20% or less.

F7. An ophthalmic lens of one or more of examples F1 to F6, wherein the second refractive optical element has a pupil fill ratio of 20% or less.

F8. An ophthalmic lens of one or more of examples F1 to F7, wherein the second refractive optical element has a focal length between 500 mm and 2000 mm.

F9. The ophthalmic lens of one or more of examples F1 to F8, wherein the ophthalmic lens is comprised of 1, 2, 3 or 4 layers.

F10. The ophthalmic lens of one or more of examples F1 to F9, wherein the second refractive optical element is part of at least one array and the at least one array is configured to introduce a conflicting optical signal to the one or more L cone receptors of the retina of the wearer's eye.

F11. A method for reducing the progression of myopia by using the ophthalmic lens of examples F1 to F18.

F12. The ophthalmic lens of one or more of examples F1 to F18, wherein the ophthalmic lens is a spectacle lens.

F13. The ophthalmic lens of one or more of examples F1 to F12, wherein the second refractive optical element has one or more of the following shapes: circular, non-circular, oval, rectangular, hexagonal and square.

F14. The ophthalmic lens of one or more of examples F1 to F13, wherein the second refractive optical element has an area of less than 0.2, 0.3, 0.4, or 0.44 mm$^2$.

F15. The ophthalmic lens of one or more of examples F1 to F14, wherein the second refractive optical element has a diameter less than 400, 500, 600, 700 or 750 μm.

F16. The ophthalmic lens of one or more of examples F1 to F15, wherein the lens is configured to provide defocus in at least a portion of the peripheral region of the lens.

F17. The ophthalmic lens of one or more of examples F1 to F16, wherein the lens is configured to provide defocus in at least a substantial portion of the peripheral region of the lens.

F18. The ophthalmic lens of one or more of examples F1 to F17, wherein the lens is configured to provide defocus in a peripheral region of the lens.

SET OF 'G' EXAMPLES

G1. An ophthalmic lens comprising: a first refractive optical element having a first focal power; a second refractive optical element having a second focal power different from the first focal power; wherein the first refractive optical element is configured to correct at least in part refractive error of a wearer's eye; and wherein the second refractive optical element is configured to introduce a focal pattern at the retinal level of the wearer's eye that is a spectrally variant and a spatially variant.

G2. An ophthalmic lens of example G1, wherein the second refractive optical element has an area 450,000 μm$^2$ or less.

G3. An ophthalmic lens of one or more of examples G1 to G2, wherein the second refractive optical element has a diameter 750 μm or less.

G4. An ophthalmic lens of one or more of examples G1 to G3, wherein the second refractive optical element has a fill ratio of 20% or less.

G5. An ophthalmic lens of one or more of examples G1 to G4, wherein the second refractive optical element has a pupil fill ratio of 20% or less.

G6. An ophthalmic lens of one or more of examples G1 to G5, wherein the second refractive optical element has a focal length between 500 mm and 2000 mm.

G7. The ophthalmic lens of one or more of one or more of examples G1 to G6, wherein the ophthalmic lens is for reducing the rate of myopia progression of the wearer's eye.

G8. The ophthalmic lens of one or more of one or more of examples G1 to G7, wherein the base lens is configured to substantially correct refractive error of the wearer's eye.

G9. The ophthalmic lens of one or more of one or more of examples G1 to G8, wherein the base lens is configured to substantially correct refractive error of the wearer's eye.

G10. The ophthalmic lens of one or more of one or more of examples G1 to G9, wherein the base lens is configured to correct refractive error of the wearer's eye.

G11. The ophthalmic lens of one or more of one or more of examples G1 to G10, wherein the one or more L cone receptors is one or more of the following: a portion of L cone receptors and a substantial portion of the L cone receptors.

G12. The ophthalmic lens of one or more of one or more of examples G1 to G11, wherein the one or more L cone receptors is at least 30%, 40% 50%, 60%, 70%, 80%, 90% or 95% the L cone receptors.

G13. The ophthalmic lens of one or more of one or more of examples G1 to G12, wherein the one or more M cone receptors is one or more of the following: a portion of M cone receptors and a substantial portion of the M cone receptors.

G14. The ophthalmic lens of one or more of one or more of examples G1 to G13, wherein the one or more M cone receptors is at least 30%, 40% 50%, 60%, 70%, 80%, 90% or 95% the M cone receptors.

G15. The ophthalmic lens of one or more of examples G1 to G8, wherein the ophthalmic lens is comprised of 1, 2, 3 or 4 layers.

G16. The ophthalmic lens of one or more of examples G1 to G9, wherein the second refractive optical element is part of at least one array and the at least one array is configured to introduce a conflicting optical signal to the one or more L cone receptors of the retina of the wearer's eye.

G17. A method for reducing the progression of myopia by using the ophthalmic lens of examples G1 to G24.

G18. The ophthalmic lens of one or more of examples G1 to G24, wherein the ophthalmic lens is a spectacle lens.

G19. The ophthalmic lens of one or more of examples G1 to G18, wherein the second refractive optical element has one or more of the following shapes: circular, non-circular, oval, rectangular, hexagonal and square.

G20. The ophthalmic lens of one or more of examples G1 to G19, wherein the second refractive optical element has an area of less than 0.2, 0.3, 0.4, or 0.44 mm$^2$.

G21. The ophthalmic lens of one or more of examples G1 to G20, wherein the second refractive optical element has a diameter less than 400, 500, 600, 700 or 750 μm.

G22. The ophthalmic lens of one or more of examples G1 to G21, wherein the lens is configured to provide defocus in at least a portion of the peripheral region of the lens.

G23. The ophthalmic lens of one or more of examples G1 to G22, wherein the lens is configured to provide defocus in at least a substantial portion of the peripheral region of the lens.

G24. The ophthalmic lens of one or more of examples G1 to G23, wherein the lens is configured to provide defocus in a peripheral region of the lens.

While certain embodiments have been shown and described herein, it will be obvious to those skilled in the art that such embodiments are provided by way of example only. It is intended that the following claims define the scope of the inventions and that methods and structures within the scope of these claims and their equivalents be covered thereby.

What is claimed is:

1. An ophthalmic lens for a myopic eye comprising:
 a base lens with a focal power to correct, at least in part, the refractive error of the eye; and
 at least one micro lenslet array comprising at least one micro lenslet;
 wherein the at least one micro lenslet array introduces a conflicting optical signal at a wavelength between 510 nm and 610 nm.

2. An ophthalmic lens of claim 1, wherein the at least one micro lenslet of the at least one micro lenslet array has an area 450,000 $\mu m^2$ or less.

3. The ophthalmic lens of claim 1, wherein the at least one micro lenslet has an area of less than 0.2 $mm^2$, 0.25 $mm^2$ or 0.3 $mm^2$.

4. An ophthalmic lens of claim 1, wherein the at least one micro lenslet of the at least one micro lenslet array has a diameter 750 µm or less.

5. The ophthalmic lens of claim 1, wherein the at least one micro lenslet has a diameter less than 400 µm, 500 µm or 600 µm.

6. An ophthalmic lens of claim 1, wherein the at least one micro lenslet of the at least one micro lenslet array has a fill ratio of 20% or less.

7. An ophthalmic lens of claim 1, wherein the at least one micro lenslet of the at least one micro lenslet array has a pupil fill ratio of 20% or less.

8. An ophthalmic lens of claim 1, wherein the at least one micro lenslet of the at least one micro lenslet array has a focal length between 500 mm and 2000 mm.

9. An ophthalmic lens of claim 1, wherein the at least one micro lenslet of the at least one micro lenslet array has a focal length greater than 1000 mm.

10. An ophthalmic lens of claim 1, wherein the micro lenslet array comprises of micro lenslets with a centre-to-centre distance is less than 1 mm.

11. An ophthalmic lens of claim 1, wherein the micro lenslet array is on the anterior surface of the spectacle lens.

12. An ophthalmic lens of claim 1, wherein the micro lenslet array is on the posterior surface of the spectacle lens.

13. An ophthalmic lens of claim 1, wherein the micro lenslet array is embedded in the matrix of the base spectacle lens.

14. The ophthalmic lens of claim 1, wherein the ophthalmic lens is comprised of 1, 2, 3 or 4 layers.

15. The ophthalmic lens of claim 1, wherein the base lens is comprised of 1, 2, 3 or 4 layers.

16. The ophthalmic lens of claim 1, wherein the at least one micro lenslet has one or more of the following shapes: circular, semi-circular, non-circular, oval, triangular, rectangular, pentagonal, hexagonal and square.

17. An ophthalmic lens for a myopic eye comprising: a base lens with a focal power to correct, at least in part, the refractive error of the eye; and
 at least one refractive optical element;
 wherein the at least one refractive optical element introduces a conflicting optical signal at a wavelength between 510 nm and 610 nm.

18. An ophthalmic lens of claim 17, wherein the at least one refractive optical element has an area 450,000 $\mu m^2$ or less.

19. The ophthalmic lens of claim 17, wherein the at least one refractive optical element has an area of less than 0.2 $mm^2$, 0.25 $mm^2$ or 0.3 $mm^2$.

20. An ophthalmic lens of claim 17, wherein the at least one refractive optical element has a diameter 750 µm or less.

* * * * *